US010122829B2

(12) United States Patent
Saavedra

(10) Patent No.: US 10,122,829 B2
(45) Date of Patent: *Nov. 6, 2018

(54) SYSTEM AND METHOD FOR PROVIDING A CONTROL PLANE FOR QUALITY OF SERVICE

(71) Applicant: TELOIP INC., Mississauga (CA)

(72) Inventor: Patricio Humberto Saavedra, Toronto (CA)

(73) Assignee: TELOIP INC., Mississauga (CA)

( * ) Notice: Subject to any disclaimer, the term of this patent is extended or adjusted under 35 U.S.C. 154(b) by 97 days.

This patent is subject to a terminal disclaimer.

(21) Appl. No.: 15/203,051

(22) Filed: Jul. 6, 2016

(65) Prior Publication Data
US 2016/0315808 A1  Oct. 27, 2016

Related U.S. Application Data

(63) Continuation-in-part of application No. 14/945,862, filed on Nov. 19, 2015, now Pat. No. 9,929,964, and
(Continued)

(51) Int. Cl.
*H04L 29/06* (2006.01)
*H04L 12/851* (2013.01)
(Continued)

(52) U.S. Cl.
CPC .......... *H04L 67/42* (2013.01); *H04L 12/2863* (2013.01); *H04L 12/2867* (2013.01);
(Continued)

(58) Field of Classification Search
CPC ... H04L 67/42; H04L 47/825; H04L 12/2867; H04L 45/50; H04L 47/828; H04L 49/70; H04L 12/4633
See application file for complete search history.

(56) References Cited

U.S. PATENT DOCUMENTS 7,630,412 B2  12/2009  Wright et al.
8,750,265 B2   6/2014  Scherzer et al.
(Continued)

FOREIGN PATENT DOCUMENTS

CN  1897492 A   1/2007
CN  102246475 B  11/2014
(Continued)

OTHER PUBLICATIONS

EPO, Office Action for EP Application 09825684.5 dated Sep. 15, 2017.
(Continued)

*Primary Examiner* — Jackie Zuniga Abad
(74) *Attorney, Agent, or Firm* — Norton Rose Fulbright Canada LLP

(57) ABSTRACT

A network system for improving network communication performance is provided. The system include at least one client site network component implemented at least at a first client site, the client site network component bonding or aggregating one or more diverse network connections so as to configure a bonded connection that has increased throughput, at least one network server component configured to connect to the client site network component using the bonded connection, the network server component automatically terminating the bonded connection and passing data traffic to the at least one network, a virtual control plane interface at the at least one network server component, and a cloud network controller configured to manage the data traffic, wherein the cloud network controller is operable to configure the virtual control plane interface to provide a priority queue for the data traffic from or to a plurality of client site network components.

33 Claims, 82 Drawing Sheets

Related U.S. Application Data a continuation-in-part of application No. 14/791,311, filed on Jul. 3, 2015, now Pat. No. 9,692,713, said application No. 14/945,862 is a continuation-in-part of application No. 14/791,311, filed on Jul. 3, 2015, now Pat. No. 9,692,713, and a continuation-in-part of application No. 14/638,267, filed on Mar. 4, 2015, now Pat. No. 9,426,029, application No. 15/203,051, which is a continuation-in-part of application No. 14/638,267, filed on Mar. 4, 2015, now Pat. No. 9,426,029, said application No. 14/791,311 is a continuation-in-part of application No. 14/489,036, filed on Sep. 17, 2014, now Pat. No. 9,264,350, which is a continuation-in-part of application No. 13/958,009, filed on Aug. 2, 2013, now Pat. No. 9,264,307, said application No. 14/638,267 is a continuation-in-part of application No. 13/958,009, filed on Aug. 2, 2013, now Pat. No. 9,264,307, which is a continuation-in-part of application No. 13/420,938, filed on Mar. 15, 2012, now Pat. No. 8,913,610, which is a continuation-in-part of application No. 12/269,439, filed on Nov. 12, 2008, now Pat. No. 8,155,158.

(51) Int. Cl.

| | | |
|---|---|---|
| *H04L 12/28* | (2006.01) | |
| *H04L 12/46* | (2006.01) | |
| *H04L 12/709* | (2013.01) | |
| *H04L 12/931* | (2013.01) | |
| *H04L 12/723* | (2013.01) | |
| *H04L 12/911* | (2013.01) | |
| *H04L 12/70* | (2013.01) | |

(52) U.S. Cl.
CPC ........ *H04L 12/4633* (2013.01); *H04L 45/245* (2013.01); *H04L 45/50* (2013.01); *H04L 47/24* (2013.01); *H04L 47/825* (2013.01); *H04L 47/828* (2013.01); *H04L 49/00* (2013.01); *H04L 49/70* (2013.01); *H04L 69/14* (2013.01); *H04L 2012/5624* (2013.01); *Y02D 50/30* (2018.01)

(56) References Cited

U.S. PATENT DOCUMENTS

| | | | |
|---|---|---|---|
| 9,692,713 B2* | 6/2017 | Saavedra | .............. H04L 47/825 |
| 2006/0098573 A1* | 5/2006 | Beer | ................... H04L 12/2856 370/230 |
| 2006/0176900 A1 | 8/2006 | Liu et al. | |
| 2011/0041002 A1 | 2/2011 | Saavedra | |
| 2015/0003465 A1 | 1/2015 | Saavedra | |
| 2015/0350019 A1 | 12/2015 | Terayama et al. | |

FOREIGN PATENT DOCUMENTS

| | | |
|---|---|---|
| WO | 2007113645 A2 | 10/2007 |
| WO | 2014145363 A2 | 9/2014 |

OTHER PUBLICATIONS

The Patent Office of the People's Republic of China, Notification of the First Office Action for CN Application No. 2014800435995 dated Sep. 5, 2016.
The Patent Office of the People's Republic of China, Search Report for CN Application No. 2014800435995.
WIPO, International Search Report and Written Opinion for PCT Application No. PCT/CA2016/000060 dated May 6, 2016.
IP Australia, Patent Examination Report No. 1 for AU Application No. 2015258288 dated Nov. 25, 2016.
WIPO, International Search Report and Written Opinion for PCT Application No. PCT/CA2017/050787 dated Oct. 12, 2017.
WIPO, International Search Report and Written Opinion for PCT Application No. PCT/CA2016/051343 dated Jan. 11, 2017.
WIPO, International Search Report and Written Opinion for PCT Application No. PCT/CA2016/000185 dated Sep. 30, 2016.
EPO, Extended European Search Report for EP Application No. 14832123.5 dated Apr. 20, 2017.

* cited by examiner

FIG. 10A

| Traffic Data | MBytes | Packets | Bpp | Total Flows | Pps | Bps | MBytes Input | MBytes Output |
|---|---|---|---|---|---|---|---|---|
| 94.75.250.52 | 112.71 | 136184 | 822 | 1 | 379 | 3500.62 | 110.47 | 2.24 |
| 108.175.40.198 | 70.9 | 84912.5 | 784 | 3 | 442.67 | 1672363.67 | 70.49 | 0.41 |
| 22.16.8.219 | 63.06 | 70738 | 834 | 1 | 3449 | 3224352 | 61.87 | 1.19 |
| 74.125.174.151 | 52.69 | 56680 | 927 | 1 | 1551 | 1438495 | 51.83 | 0.86 |
| 87.226.177.101 | 46.48 | 77132 | 631.5 | 5 | 54.8 | 35053 | 45.24 | 1.24 |
| 74.173.214.67 | 44.51 | 109497.33 | 155.3 | 10 | 67.4 | 64617.8 | 43.63 | 0.88 |
| 74.125.174.166 | 42.6 | 44214 | 1010 | 1 | 469 | 495086 | 42.12 | 0.46 |
| 74.125.174.304 | 40.47 | 42326 | 1002 | 2 | 2477 | 2485919 | 39.97 | 0.5 |
| 74.125.174.238 | 39.97 | 43128 | 971 | 1 | 1700 | 1653376 | 39.45 | 0.52 |
| 173.194.31.8 | 38.57 | 42648 | 948 | 1 | 411 | 390587 | 38.03 | 0.54 |

*ZTP Server to ZTP API on AgniOS "CC"*

CC Connections

| Session | Iface | Link | AAA Account | Proto | LL IP Info. CC <=> CPE | State |
|---|---|---|---|---|---|---|
| ama-0 | 205.24.95 138.34.5.45 VR0 Up | UL27 110.58.49 | lastsony | gto | 138.34.5.124 <=> 10.200.0.13 | connected |
| | | UL22 99.08.46 | lastsony | gto | 138.34.5.125 <=> 10.110.208 | connected |
| ama-1 | 68.34.27 204.138.58.20 VR1 Up | UL12 55.05.39 | AGNI LAB1 ramped | gto | 138.34.5.125 <=> 204.138.9.36 | connected |
| | | UL9 90.04.82 | AGNI LAB1 ramped | gto | 138.34.5.124 <=> 24.150.75.29 | connected |
| ama-2 | 165.30.47 204.138.58.38 VR2 Up | UL10 165.30.19 | arx moped | gto | 138.34.5.123 <=> 24.150.75.28 | connected |
| | | UL25 165.30.47 | arx moped | gto | 138.34.5.123 <=> 204.138.39.39 | connected |
| ama-3 | 135.20.14 204.138.58.32 VR3 Up | UL16 161.16.21 | JEREMY-HOME-YY2000-DIRECT | gto | 138.34.5.125 <=> 99.232.170.67 | connected |
| | | UL20 161.16.21 | JEREMY-HOME-YY2000-DIRECT | gto | 138.34.5.125 <=> 99.232.170.67 | connected |
| | | UL19 300.27.10 | JEREMY-HOME-YY2000-DIRECT | gto | 138.34.5.126 <=> 10.200.0.30 | connected |
| ama-4 | 60.40.28 138.34.11.101 VR4 Up | UL11 60.40.29 | democracy4 | gto | 138.34.5.128 <=> 204.138.59.103 | connected |
| | | UL17 60.35.32 | democracy4 | gto | 138.34.5.124 <=> 204.138.59.101 | connected |
| | | UL23 60.35.15 | democracy4 | gto | 138.34.5.126 <=> 204.138.59.102 | connected |
| ama-5 | 7.24.57 138.34.5.201 VR5 Up | UL14 7.24.59 | VISHNU YY245v | up | 138.34.5.128 <=> 174.117.171.49 | connected |

```
▽ Show log trace lower-links ana-0
  Select CPE     ▽ [Continuous] [Ten Seconds] [Twenty Seconds] [Start] [10] Seconds [Stop]     ZTP Server to ZTP API on AgniOS "CC"

Link LU3-17 - ana-0-L2 [connected] BW - bps 3,701,616  (O: 3,512,720, I: 198,896) W (O:1, I:3) J: 0.566 ms L: 6.149 ms QoE: 4.00
Link LU1-21 - ana-0-L1 [connected] BW - bps 7,195,032  (O: 7,127,368, I: 67,664) W (O:2, I:1) J: 1.064 ms L: 10.345 ms QoE: 3.99

Link LU3-17 - ana-0-L2 [connected] BW - bps 3,678,976  (O: 3,505,752, I: 174,224) W (O:1, I:3) J: 3.516 ms L: 12.963 ms QoE: 4.00
Link LU1-21 - ana-0-L1 [connected] BW - bps 7,187,568  (O: 7,129,280, I: 58,288) W (O:2, I:1) J: 4.329 ms L: 19.003 ms QoE: 3.99

Link LU3-17 - ana-0-L2 [connected] BW - bps 3,672,336  (O: 3,495,704, I: 176,632) W (O:1, I:3) J: 3.319 ms L: 16.420 ms QoE: 4.00
Link LU1-21 - ana-0-L1 [connected] BW - bps 7,045,016  (O: 6,985,824, I: 59,192) W (O:2, I:1) J: 4.186 ms L: 12.870 ms QoE: 3.99

Link LU3-17 - ana-0-L2 [connected] BW - bps 3,671,496  (O: 3,486,016, I: 185,480) W (O:1, I:3) J: 0.250 ms L: 6.408 ms QoE: 4.05
Link LU1-21 - ana-0-L1 [connected] BW - bps 7,000,784  (O: 6,941,544, I: 59,240) W (O:2, I:1) J: 1.982 ms L: 10.956 ms QoE: 4.01

Link LU3-17 - ana-0-L2 [connected] BW - bps 3,639,016  (O: 3,461,248, I: 177,768) W (O:1, I:3) J: 0.166 ms L: 6.593 ms QoE: 4.05
Link LU1-21 - ana-0-L1 [connected] BW - bps 7,033,008  (O: 6,968,192, I: 64,816) W (O:2, I:1) J: 0.426 ms L: 11.102 ms QoE: 4.01

Link LU3-17 - ana-0-L2 [connected] BW - bps 3,646,744  (O: 3,459,560, I: 187,184) W (O:1, I:3) J: 5.897 ms L: 6.578 ms QoE: 4.05
Link LU1-21 - ana-0-L1 [connected] BW - bps 7,033,056  (O: 6,970,312, I: 62,744) W (O:2, I:1) J: 7.056 ms L: 9.210 ms QoE: 4.01

Link LU3-17 - ana-0-L2 [connected] BW - bps 3,627,696  (O: 3,453,048, I: 174,648) W (O:1, I:3) J: 1.879 ms L: 6.125 ms QoE: 4.05
Link LU1-21 - ana-0-L1 [connected] BW - bps 7,050,680  (O: 6,991,688, I: 58,992) W (O:2, I:1) J: 2.155 ms L: 9.487 ms QoE: 4.01

Link LU3-17 - ana-0-L2 [connected] BW - bps 3,653,128  (O: 3,453,288, I: 199,840) W (O:1, I:3) J: 2.346 ms L: 6.125 ms QoE: 4.05
Link LU1-21 - ana-0-L1 [connected] BW - bps 7,049,616  (O: 6,986,024, I: 63,592) W (O:2, I:1) J: 4.013 ms L: 17.513 ms QoE: 4.01

Link LU3-17 - ana-0-L2 [connected] BW - bps 3,195,224  (O: 3,024,122, I: 171,112) W (O:1, I:3) J: 2.082 ms L: 9.356 ms QoE: 4.05
Link LU1-21 - ana-0-L1 [connected] BW - bps 6,167,352  (O: 6,112,296, I: 55,056) W (O:2, I:1) J: 4.904 ms L: 21.386 ms QoE: 3.97

Link LU3-17 - ana-0-L2 [connected] BW - bps 2,032,344  (O: 1,881,560, I: 150,784) W (O:1, I:3) J: 1.409 ms L: 6.539 ms QoE: 4.05
Link LU1-21 - ana-0-L1 [connected] BW - bps 3,746,872  (O: 3,698,944, I: 47,928) W (O:2, I:1) J: 5.796 ms L: 9.804 ms QoE: 3.97
```

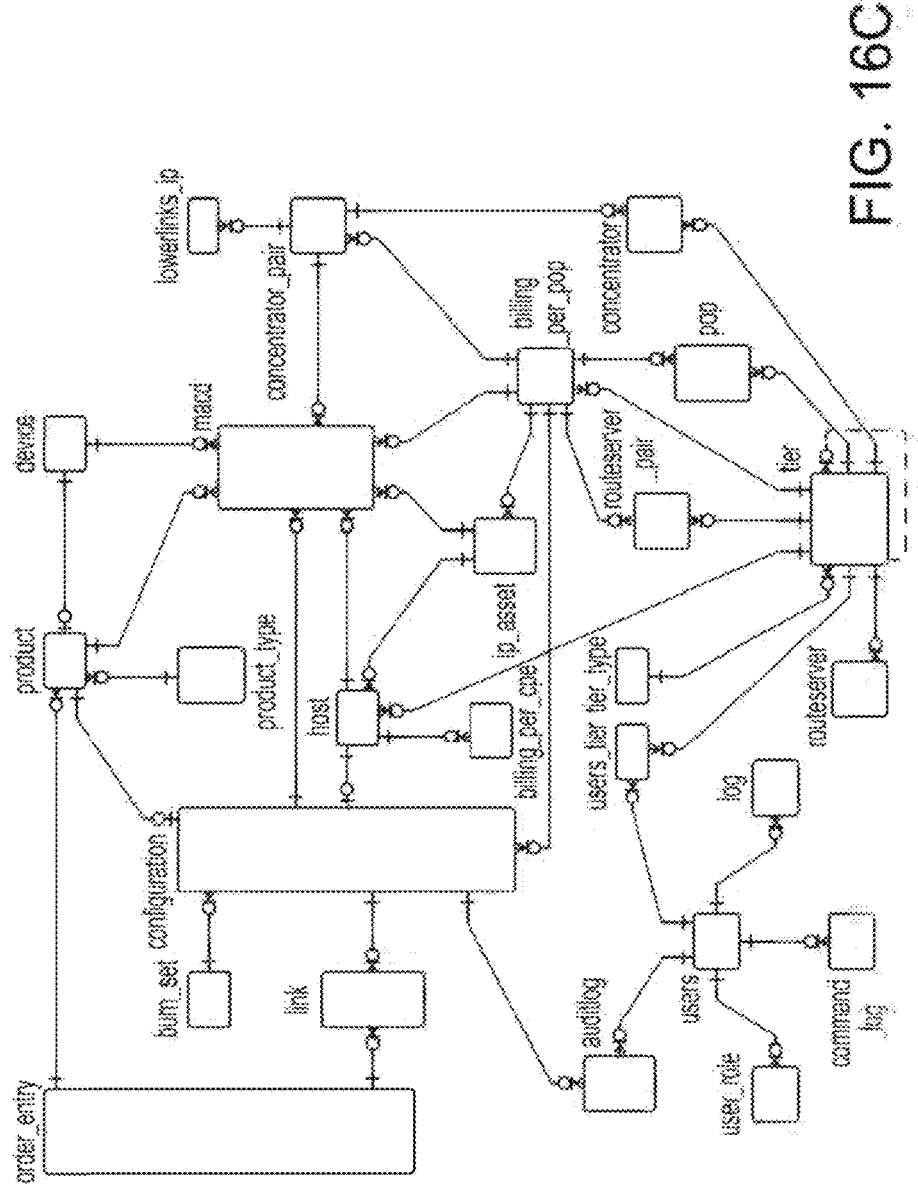

|   | D | E | F | G | H | I | J | K | L |   |
|---|---|---|---|---|---|---|---|---|---|---|
|   | YYZ | JFK | ORD | DFW | ATL | DEN | SEA | LAX | YVR | X2 |
| 2 YYZ |  | 3.75 | 4.20 | 3.41 | 3.60 | 3.50 | 3.41 | 1.00 | 2.01 | 1.00 |
| 3 JFK | 3.95 |  | 4.20 | 3.41 | 3.60 | 3.75 | 4.01 | 2.95 | 1.00 | 0.84 |
| 4 ORD | 4.20 | 4.30 |  | 4.20 | 4.20 | 4.20 | 4.20 | 4.20 | 3.20 | 0.13 |
| 5 DFW | 3.42 | 4.02 | 4.20 |  | 4.01 | 3.50 | 3.59 | 2.08 | 1.00 | 0.96 |
| 6 ATL | 3.50 | 3.75 | 4.20 | 3.95 |  | 3.59 | 2.60 | 3.95 | 2.40 | 0.70 |
| 7 DEN | 3.95 | 3.80 | 4.20 | 4.00 | 3.95 |  | 4.00 | 3.95 | 1.00 | 0.59 |
| 8 SEA | 3.41 | 2.75 | 4.20 | 3.65 | 3.95 | 4.20 |  | 3.95 | 2.65 | 0.61 |
| 9 LAX | 1.95 | 3.60 | 4.20 | 4.01 | 3.95 | 3.85 | 3.95 |  | 3.20 | 0.61 |
| 10 YVR | 2.30 | 3.80 | 3.20 | 3.70 | 1.00 | 4.01 | 3.80 | 3.95 |  | 1.01 |
| X1 | 0.87 | 0.49 | 0.13 | 0.41 | 0.67 | 0.36 | 0.53 | 0.95 | 2.13 |  |
| Y | 1.09 | 0.84 | 0.13 | 0.96 | 0.70 | 0.59 | 0.61 | 0.95 | 2.13 |  |
| Z | 3.83 | 3.28 | 4.09 | 3.16 | 3.42 | 3.55 | 3.59 | 3.17 | 1.99 |  |

Aggregated QoE Calculation

| Variable | Cell Formula |
|---|---|
| X1 | =((COUNT(D2:D10)*4.2)-(SUM(D2:D10)))/(COUNT(D2:D10)) |
|   | *Calculates the Max possible score minus the total score and presents the results as an average value* |
| X2 | =((COUNT(D2:L2)*4.2)-(SUM(D2:L2)))/(COUNT(D2:L2)) |
|   | *Calculates the Max possible score minus the total score and presents the results as an average value* |
| Y | =MAX(D54,N44) |
|   | *Gets the MAX of X1 & X2* |
| Z | =4.2-0.08-D55 |
|   | *R-Factor, adjusts for QoE Aggregation* |

FIG. 19

Using Business Process Intelligence – BPI

Advanced Business Process Intelligence for Monitoring

- Business Process Intelligence (BPI) provides the means to calibrate the sensitivity of the alerts and the notifications based on the types of services that the Host is running. This provides the Monitoring System with the intelligence to only send alerts when user Quality of Experience is at risk.

Nagios Business Process Intelligence

Nagios BPI v2.04
Nagios Enterprises LCC
BPI Documentation
Manually Edit Config

Business Process Categories

| High Priority | Medium Priority | Low Priority | Hostgroups | Servicegroups | Create New BP2 Group |

Last Update: Tue May 06 2014 10:16:43 GMT-0-400 (Eastern Standard Time)
Essential group members are denoted with **

| Ok | ▼ YYZ CPE Devices | | Group health is 100.00% with 0 problems(a) | ANA Devices | Edit | Delete |
|---|---|---|---|---|---|---|
| Ok | ▼ BUNKER2-YYZ-DEV-TELOIP | | Group health is 100.00% with 0 problems (a) | BUNKER2 | Edit | Delete |
| Ok | Bunker2-dev-teloip.net | OK - 138.34.5.51: rta 24.899ms, lost 0% | | | | |
| Ok | Bunker2-dev-teloip.net | letter from yyz | OK - 138.34.5.51: yttar 7.547mg | | | |
| Ok | Bunker2-dev-teloip.net | Lower Link 1 | OK - Link1 OPEN | | | |
| Ok | Bunker2-dev-teloip.net | Lower Link 2 | OK - Link2 OPEN | | | |
| Ok | Bunker2-dev-teloip.net | Ping from yyz | PING OK = Packet loss = 0%, RTA = 7.53 ms | | | |
| Ok | Bunker2-dev-teloip.net | QoE_rule1 | Home-PoP : 3.99 | | | |
| Ok | Bunker2-dev-teloip.net | QoE_rule2 | VoIP-PoX : 4.09 | | | |
| Ok | Bunker2-dev-teloip.net | Uptime | OK ! AgnOS AI - 100_Beta3 4.0.0-RCS - up 1 data 12 hours 30 minutes | | | |

FIG. 21

SYSTEM AND METHOD FOR PROVIDING A CONTROL PLANE FOR QUALITY OF SERVICE

CROSS-REFERENCE TO RELATED APPLICATIONS

This application is a continuation-in-part of U.S. patent application Ser. No. 14/638,267 filed on Mar. 4, 2015, a continuation-in-part of U.S. patent application Ser. No. 14/791,311 filed on Jul. 3, 2015, and a continuation-in-part of U.S. patent application Ser. No. 14/945,862 filed on Nov. 19, 2015. U.S. patent application Ser. No. 14/945,862 is a continuation-in-part of U.S. patent application Ser. No. 14/638,267 and Ser. No. 14/791,311. U.S. patent application Ser. No. 14/791,311 is a continuation-in-part of U.S. patent application Ser. No. 14/489,036 filed on Sep. 17, 2014. Each of patent application Ser. No. 14/638,267 and 14/489,036 is a continuation-in-part of U.S. patent application Ser. No. 13/958,009 filed on Aug. 2, 2013, which is a continuation-in-part of U.S. patent application Ser. No. 13/420,938 filed on Mar. 15, 2012, which is a continuation of U.S. patent application Ser. No. 12/269,439 filed on Nov. 12, 2008, all of which are herein incorporated by reference in entirety.

FIELD

Embodiments described herein relate generally to network communications and, in particular, to monitor and control aggregated or bounded communications links to improve network performance or quality of services for a variety of different networks including wired and wireless networks, and including Wide Area Networks ("WAN").

BACKGROUND

While capacity of network connections has increased since the introduction of dial up, high speed connectivity is not ubiquitous in all regions. Also, bandwidth is not an unlimited resource and there is a need for solutions that improve the utilization of bandwidth and that also address network performance issues.

Various solutions exist for improving network performance such as load balancing, bonding of links to increase throughput, as well as aggregation of links. In regards to bonding/aggregation, various different technologies exist that allow two or more diverse links (which in this disclosure refers to links associated with different types of networks and/or different network carriers) to be associated with one another for carrying network traffic (such as a set of packets) across such associated links to improve network performance in relation for such packets.

Examples of such technologies include load balancing, WAN optimization, or ANA™ technology of TELoIP, as well as WAN aggregation technologies.

Many of such technologies for improving network performance are used to improve network performance between two or more locations (for example Location A, Location B, Location N or the "Locations"), where bonding/aggregation of links is provided at one or more of such locations. While the bonded/aggregated links provide significant network performance improvement over the connections available to carry network traffic for example from Location A to an access point to the backbone of a network (whether an Internet access point, or access point to another data network such as a private data network, an MPLS network, or high performance wireless network) ("network backbone"), the bonded/aggregated links are generally slower than the network backbone.

Prior art technologies including bonding/aggregation generally result in what is often referred to as "long haul" bonding/aggregation, which means that the bonded/aggregated links are maintained for example from Location A and Location B, including across the network backbone, which in many cases results in network impedance. As a result, while bonding/aggregation provides improved network performance for example from Location A to the network backbone, network performance across the entire network path, for example, from Location A to Location B, may be less than optimal because the technology in this case does not take full advantage of the network performance of the network backbone.

Furthermore, prior art systems are generally set up on trial and error, ignoring the fact that networks are dynamic and can be constantly varying in speed, data traffic volume, signal strength, and so on. There is no apparent solution in the prior art designed to monitor or address the varying network performance variables of both a bonded connection and a network path carried over a high performing network bone.

There is a need for a system and method that addresses at least some of these problems, or at least an alternative.

SUMMARY

In an aspect, embodiments described herein may provide a network system for improving network communication performance between at least a first client site and a second client site, wherein the first client site and the second client site are at a distance from one another that is such that would usually require long haul network communication. The system may include at least one client site network component implemented at least at the first client site, the client site network component bonding or aggregating one or more diverse network connections so as to configure a bonded/aggregated connection that has increased throughput. The system may include at least one network server component configured to connect to the client site network component using the bonded/aggregated connection, the network server component including at least one concentrator element implemented at a network access point to at least one network, the network server component automatically terminating the bonded/aggregated connection and passing data traffic to the network access point to the at least one network. The system may include a virtual control plane interface at the at least one network server component, the virtual control plane interface configured to establish a unicast path between the at least one network server component and each of a plurality of remote network server components connected to or within the at least one network, wherein a virtual network overlay is established between the at least one network server component and each of the plurality of remote network server components and each unicast path is used for data transmission over the corresponding virtual network overlay. The system may include a cloud network controller configured to manage the data traffic so as to provide a managed network overlay that incorporates at least one long haul network path carried over the at least one network, the at least one long haul network path including the virtual network overlay.

In one embodiment, the cloud network controller may be operable to configure the virtual control plane interface to provide a priority queue for the data traffic from or to a plurality of client site network components including the at least one client site network component.

In accordance with some embodiments, the cloud network controller may be further operable to configure the virtual control plane interface to provide a classification of service or quality of service indicator for the data traffic from or to the plurality of client site network components including the at least one client site network component.

In accordance with some embodiments, the virtual control plane interface may be configured to receive converged data traffic from the plurality of client site network components and the cloud network controller is further operable to configure the virtual control plane interface to provide at least one of: a priority queue, a classification of service indicator, and a quality of service indicator for the converged data traffic from the plurality of client site network components.

In accordance with some embodiments, the system may include a virtual edge connection providing at least one of transparent lower-link encryption and lower-link encapsulation using a common access protocol for the bonded/aggregated connection between the client site network component and the network server component, the virtual edge connection being part of the virtual network overlay.

In accordance with some embodiments, the network server component may include a first concentrator element implemented at the network access point to the at least one network and a second concentrator element implemented at another network access point to at least one other network. The first concentrator element and the second concentrator element may be configured to interoperate to provide a virtual core connection between the network access point and the other network access point, the virtual core connection providing another bonded/aggregated connection as part of the virtual network overlay. The cloud network controller may be configured to manage the data traffic so as to provide the managed network overlay that incorporates the virtual core connection and the at least one long haul network path carried over the at least one network and the at least one other network.

In accordance with some embodiments, the virtual core connection may provide at least one of the transparent lower-link encryption and the lower-link encapsulation using the common access protocol for the other bonded/aggregated connection.

In accordance with some embodiments, the network server component may have at least one other concentrator element, the at least one other concentrator element bonding or aggregating one or more other diverse network connections so as to configure another bonded/aggregated connection that has increased throughput, the other bonded/aggregated connection connecting the at least one concentrator element and the at least one other concentrator element.

In accordance with some embodiments, the cloud network controller may be configured to manage the data traffic so as to provide the managed network overlay that incorporates the bonded/aggregated connection and the other bonded/aggregated connection.

In accordance with some embodiments, the client site network component may be configured to separate lower-link data traffic and encapsulate data packets of the lower-link data traffic using the common access protocol for the bonded/aggregated connection.

In accordance with some embodiments, the client site network component may be configured with a route to the at least one network server component to separate the lower-link traffic to prepare the data traffic for the bonded/aggregated connection or the managed network overlay.

In accordance with some embodiments, the route is a static route, a dynamic route or a route from a separate or independent virtual routing forwarding table.

In accordance with some embodiments, the network server component is configured to connect with an intelligent packet distribution engine that manages data packets transmission over the at least one long haul network path by obtaining data traffic parameters and, based on the data traffic parameters and performance criteria, selectively applies one or more techniques to alter the traffic over the at least one long haul network path to conform to the data traffic parameters.

In accordance with some embodiments, the network server component is configured to provide Multi-Directional Pathway Selection (MDPS) for pre-emptive failover using echo packets received from the client site network component.

In accordance with some embodiments, the network server component is configured to provide an intelligent packet distribution engine (IPDE) for packet distribution with differing speed links using weighted packet distribution and for bi-directional (inbound and outbound) Quality of Service.

In accordance with some embodiments, the first client site and the second client site are at a distance from one another such that data traffic transmission between the first client site and the second client site is subject to long haul effects.

In accordance with some embodiments, each of the least one network server components is accessible to a plurality of client site network components, each client site network component being associated with a client site location.

In accordance with some embodiments, the system may have a network aggregation device that: (A) configures a plurality of dissimilar network connections or network connections provided by a plurality of diverse network carriers ("diverse network connections") as one or more aggregated groups, at least one aggregated group creating the bonded/aggregated connection that is a logical connection of the plurality of diverse connections; and (B) routes and handles bi-directional transmissions over the aggregated network connection; wherein two or more of the diverse network connections have dissimilar network characteristics including variable path bidirectional transfer rates and latencies; wherein the logical connection is utilizable for a transfer of communication traffic bidirectionally on any of the diverse network connections without any configuration for the dissimilar network connections or by the diverse network carriers; and wherein the network aggregation engine includes or is linked to a network aggregation policy database that includes one or more network aggregation policies for configuring the aggregated groups within accepted tolerances so as to configure and maintain the aggregated network connection so that the logical connection has a total communication traffic throughput that is a sum of available communication traffic throughputs of the aggregated group of diverse network connections.

In another aspect, embodiments described herein may provide a client site network component implemented at least at least a first client site in network communication with a second client site, wherein the first client site and the second client site are at a distance from one another that is such that would usually require long haul network communication, the client site network component bonding or aggregating one or more diverse network connections so as to configure a bonded/aggregated connection that has increased throughput, the client site network component configured to connect to at least one network server component implemented at an access point to at least one wide area network, the network server component automatically terminating the bonded/aggregated connection and passing the data traffic to an access point to at least one wide area network, the client site network component configuring a virtual edge providing at least one of transparent lower-link encryption and lower-link encapsulation using a common access protocol for the bonded/aggregated connection, wherein the at least one network server component includes a virtual control plane interface, the virtual control plane interface configured to establish a unicast path between the at least one network server component and each of a plurality of remote network server components connected to or within the at least one wide area network, wherein a virtual network overlay is established between the at least one network server component and each of the plurality of remote network server components and each unicast path is used for data transmission over the corresponding virtual network overlay, the virtual network overlay including the virtual edge.

In accordance with some embodiments, the virtual control plane interface may be configured to provide a priority queue for the data traffic from or to a plurality of client site network components including the at least one client site network component.

In accordance with some embodiments, the virtual control plane interface may be further configured to provide a classification of service or quality of service indicator for the data traffic from or to the plurality of client site network components including the at least one client site network component.

In accordance with some embodiments, the virtual control plane interface may be configured to: receive converged data traffic from the plurality of client site network components; and provide at least one of: a priority queue, a classification of service indicator, and a quality of service indicator for the converged data traffic from the plurality of client site network components.

In accordance with some embodiments, the client site network component may be configured to separate lower-link data traffic and use the common access lower-link protocol for encapsulation of data packets of the lower-link data traffic for the bonded/aggregated connection.

In accordance with some embodiments, the client site network component may configure a route to the at least one network server component to separate the lower-link traffic to prepare the data traffic for the bonded/aggregated connection or the managed network overlay.

In accordance with some embodiments, the route may be a static route, a dynamic route or a route from a separate or independent virtual routing forwarding table.

In accordance with some embodiments, the client site network component may be configured to transmit echo packets to the network server component to provide Multi-Directional Pathway Selection for pre-emptive failover using the echo packets.

In accordance with some embodiments, the client site network component may be further configured to provide IPDE for packet distribution with differing speed links using weighted packet distribution and for bi-directional (inbound and outbound) QoS.

In another aspect, there is provided a network server component configured to interoperate with a client site network component at a first client site to bond or aggregate one or more diverse network connections so as to configure a bonded/aggregated connection that has increased throughput, the network server component including at least one concentrator element implemented at a network access point to at least one network, the network server component automatically terminating the bonded/aggregated connection and passing data traffic to the network access point to the at least one network for data transmission to a second client site, the first client site and the second client site at a distance from one another that is such that would usually require long haul network communication, the network server component in communication with a cloud network controller configured to manage the data traffic so as to provide a managed network overlay that incorporates at least one long haul network path carried over the at least one network, wherein the network server component includes a virtual control plane interface, the virtual control plane interface configured to establish a unicast path between the network server component and each of a plurality of remote network server components connected to or within the at least one network, wherein a virtual network overlay is established between the network server component and each of the plurality of remote network server components and each unicast path is used for data transmission over the corresponding virtual network overlay, and wherein the at least one long haul network path including the virtual network overlay.

In accordance with some embodiments, the cloud network controller may be operable to configure the virtual control plane interface to provide a priority queue for the data traffic from or to a plurality of client site network components including the client site network component.

In accordance with some embodiments, the cloud network controller may be further operable to configure the virtual control plane interface to provide a classification of service or quality of service indicator for the data traffic from or to the plurality of client site network components including the client site network component.

In accordance with some embodiments, the virtual control plane interface may be configured to receive converged data traffic from the plurality of client site network components, and the cloud network controller is further operable to configure the virtual control plane interface to provide at least one of: a priority queue, a classification of service indicator, and a quality of service indicator for the converged data traffic from the plurality of client site network components.

In accordance with some embodiments, the network server component may include a virtual edge connection providing at least one of transparent lower-link encryption and lower-link encapsulation using a common access protocol for the bonded/aggregated connection, the virtual network overlay including the virtual edge connection.

In accordance with some embodiments, the network server component may have a first concentrator element implemented at the network access point to the at least one network and a second concentrator element implemented at another network access point to at least one other network. The first concentrator element and the second concentrator element are configured to interoperate to provide a virtual core connection between the network access point and the other network access point, the virtual core connection providing another bonded/aggregated connection. The cloud network controller is configured to manage the data traffic so as to provide the managed network overlay that incorporates the virtual edge connection, the virtual core connection and the at least one long haul network path carried over the at least one network and the at least one other network.

In accordance with some embodiments, the network server component may be configured to use the common access lower-link protocol for encapsulation of data packets of the lower-link data traffic for the bonded/aggregated connection.

In accordance with some embodiments, the network server component may be configured to receive echo packets from the client site network component to provide Multi-Directional Pathway Selection (MDPS) for pre-emptive failover using the echo packets.

In accordance with some embodiments, the network server component may be configured to provide IPDE for packet distribution with differing speed links using weighted packet distribution and for bi-directional (inbound and outbound) QoS.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

Examples of embodiments will now be described in greater detail with reference to the accompanying drawings, in which:

Figure 10A:
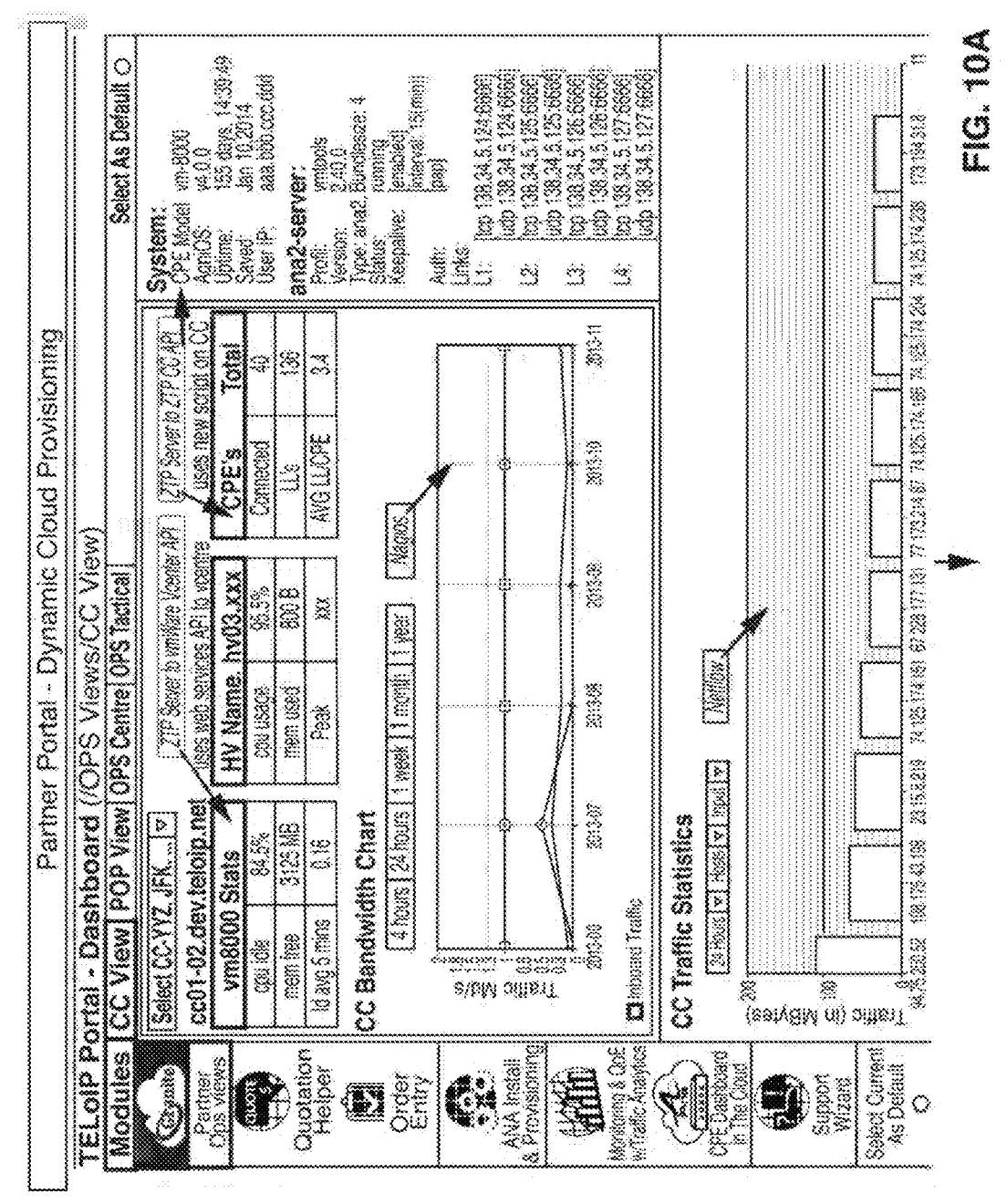
Figure 10C:
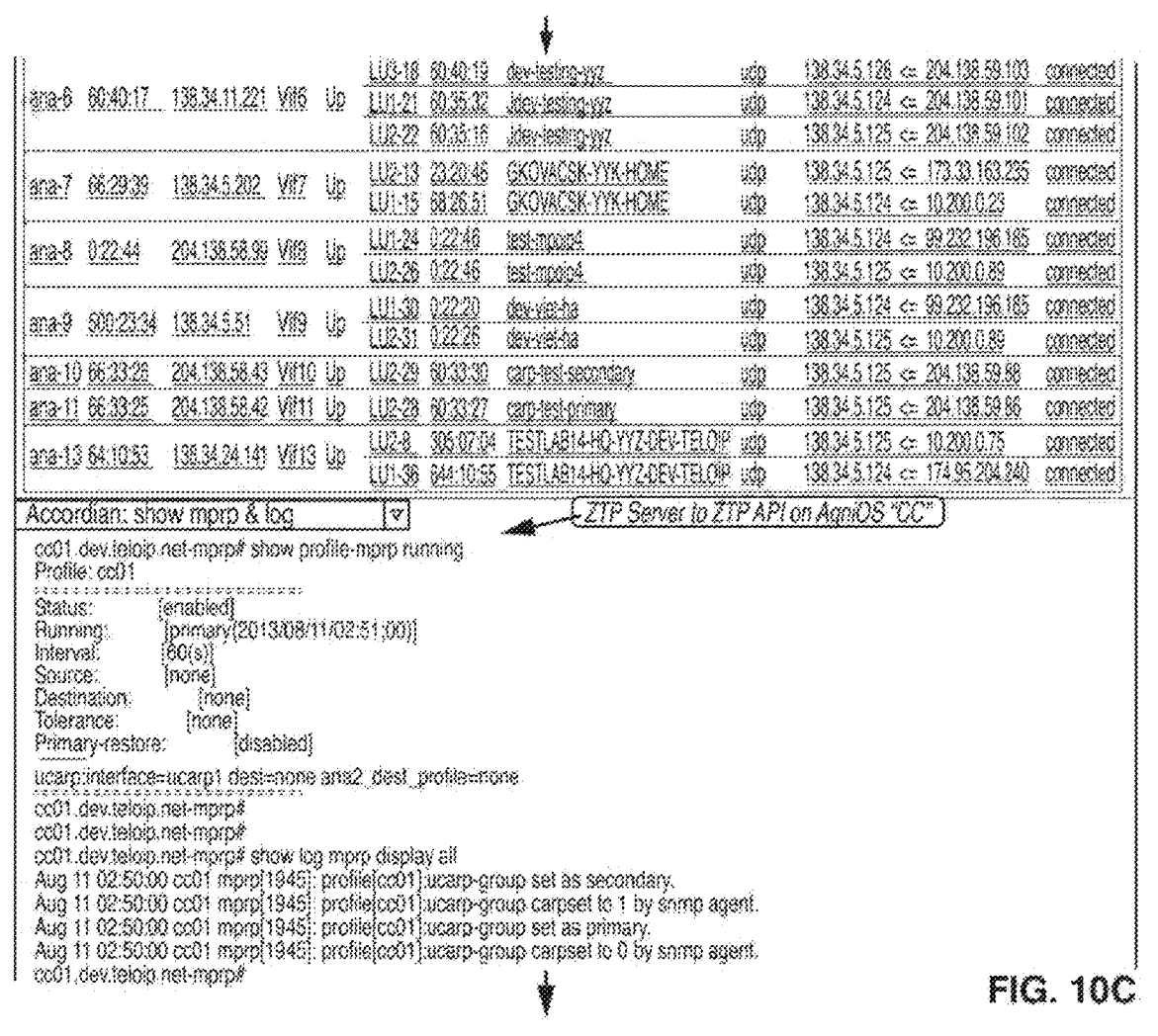

FIG. 10A illustrates a first portion of a Cloud Concentrator Dashboard interface shown on a Portal as provided by a Cloud Based Network Manager, exemplary of an embodiment.

FIG. 10B illustrates a second portion of a Cloud Concentrator Dashboard interface shown on a Portal as provided by a Cloud Based Network Manager, exemplary of an embodiment.

FIG. 10C illustrates a third portion of a Cloud Concentrator Dashboard interface shown on a Portal as provided by a Cloud Based Network Manager, exemplary of an embodiment.

FIG. 10D illustrates a forth portion of a Cloud Concentrator Dashboard interface shown on a Portal as provided by a Cloud Based Network Manager, exemplary of an embodiment.

FIG. 11A illustrates a first portion of a CPE Dashboard standard interface shown on a Portal as provided by a Cloud Based Network Manager, exemplary of an embodiment.

FIG. 11C illustrates a third portion of a CPE Dashboard standard interface shown on a Portal as provided by a Cloud Based Network Manager, exemplary of an embodiment.

FIG. 13C illustrates a third portion of a PoP Dashboard interface shown on a Portal as provided by a Cloud Based Network Manager, exemplary of an embodiment.

FIG. 16C shows an exemplary main entity relationship diagram (ERD) for a central SCN database.

FIG. 19 illustrates an example method of aggregated Quality of Experience (QoE) calculation, exemplary of an embodiment.

FIG. 21 illustrates an example Business Process Intelligence interface, exemplary of an embodiment.

DETAILED DESCRIPTION

Figure 1A:
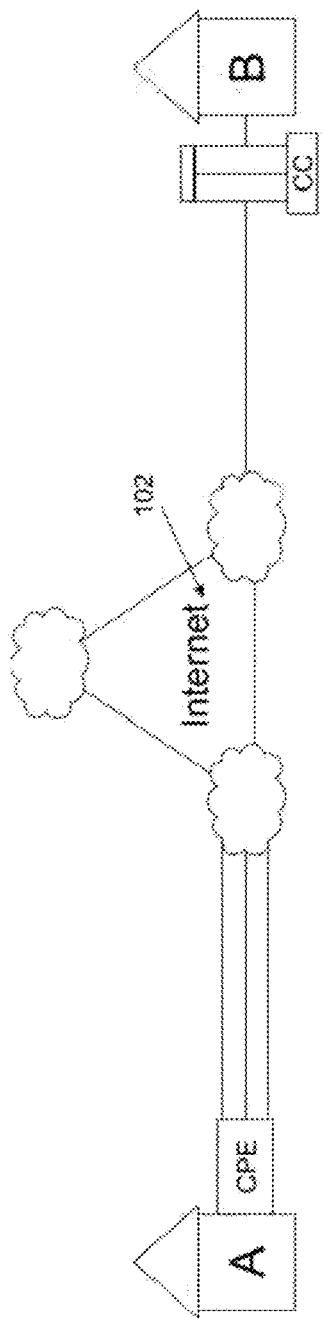
FIG. 1A illustrates a prior art network configuration that includes a bonded/aggregated network connection, and illustrates the problem of long haul aggregation/bonding.

Systems, network architectures, and networking methods are provided.

Embodiments may provide network infrastructure with utilization of diverse carriers and diverse connections via high-quality link aggregation in combination with a secured and trusted virtual network overlay. The virtual network overlay may provide a managed and encrypted connection of virtual links to provide a virtual WAN, for example.

Wide Area Networks ("WAN")

A Wide Area Network ("WAN") is a network that covers a wide or broad geographic area that may span cities, regions, countries, or the world. The Internet may be viewed as a WAN, for example. A WAN may be used to transmit data over long distances and connect different networks, including Personal Area Networks ("PAN"), Local Area Networks ("LAN"), or other local or regional network. A WAN may connect physically disparate networks and different types of networks that may be local or remote. An Enterprise WAN may refer to a private WAN built for a specific enterprise often using leased or private lines or circuit-switching or packet-switching methods.

Multi-Protocol Label Switch (MPLS)

Multi-Protocol Label Switch (MPLS) is a technology framework developed by the Internet Engineering Task Force. MPLS can be a WAN virtualization using virtual routing and forwarding. The technology may be used to build carrier and enterprise networks, implemented with routers and switches. Notably, MPLS is protocol independent and can map IP addresses to MPLS labels. MPLS improves network performance by forwarding packets (e.g. IP packets) from one network node to the next based on short path labels, avoiding complex lookups in a routing table. MPLS utilizes the concept of labels to direct data traffic, as a label associated with a packet generally contains the information required to direct the packet within an MPLS network. Generally speaking, a packet can enter an MPLS network through an MPLS ingress router or a provider edge/point-of-entry (PE) router, which encapsulates the packet with the appropriate labels. As the packet is transmitted along the MPLS network paths, various nodes in the network forward the packet based on the content of the labels. Sometimes a label switch router (LSR) switches or swaps the label(s) on a packet as it forwards the packet to the next node. When the packet leaves the MPLS network, an MPLS egress router or a provider edge (PE) router removes the label(s) from the packet and sends it on its way to the final destination. Typically, provider edge (PE) routers or their equivalent network elements sit on the edge of an MPLS network and act as an interface between the customer-side network and the MPLS core network. PE routers, as described above, can add or remove label(s) to incoming and exiting packets or data traffic. A single PE router may be connected to one or more customer networks. Within the MPLS core network, label switch routers (LSRs) receive incoming packets and route or forward the packets in accordance with their respective label information. LSRs can also swap or add label(s) to each packet.

A customer who wishes to connect to an MPLS network may employ the use of customer edge (CE) routers or their equivalent network elements, which can be located on the customer premises. The CE routers can connect to one or more PE routers, which in turn connects to the MPLS core network.

MPLS can deliver a range of benefits to customers, including: convergence of voice and data networking, high performance for mission-critical and cloud applications, easy-to-manage or fully managed environments reducing operating cost, SLA based assurances, and so on. MPLS can be delivered with a variety of access technologies such as layer2, layer3, on the edge over the internet via IPSEC, and so on. In addition, MPLS itself is trending as a core networking technology with options to establish access edge points.

Routers may be any device including, without limitation, a router, switch, server, computer or any network equipment that provides routing or package forwarding capacity. Routers may or may not have routing tables. Routers may be implemented in hardware, software, or a combination of both. Routers may also be implemented as a cloud service and remotely configurable.

IPVPN/IPSEC

To improve security and confidentiality of data communicated over an MPLS network, Internet Protocol Security (IPSEC), a protocol suite for securing IP communication, may be adapted in addition to an MPLS network. With IPSEC VPN, the MPLS network is considered secured and trusted. IPSEC gateways can be any network equipment such as computers, servers, routers, or special IPSEC devices. IPSEC VPN is typically provisioned using a CE router connected to a broadband internet circuit. Alternatively, IPSEC may be implemented at the PE routers or device. AN MPLS network with IPSEC features is also sometimes also referred to as an IPSEC VPN or IPVPN network.

For example, IPSEC VPN can access MPLS networks on the edge, which may be a low cost approach for branch connectivity. However, while typical IPSEC VPN can offer low price tag and reach, it lacks traffic prioritization/CoS capabilities and may be hindered by poor provider Service Level Agreement (SLA) and/or Mean Time to Repair (MTTR). IPSEC VPN for MPLS Edge has not been innovated.

Generally speaking, the MPLS market in North America is growing quickly, however, price of MPLS is suffering from commoditization of private networks and from customer demand for lower prices. Despite such constraints, purchasing MPLS network can be as much as 30% more expensive compared to getting typical broadband network. Many customers are seeking an IPVPN solution with a lower price tag and increased bandwidth. For example, many MPLS customers seek an IPVPN backup solution on top of their primary network. These customers may also desire alternative network providers, technologies and implementations (e.g. 4G, other broadband solutions). Today IPVPN is typically purchased for cost and reach. However, IPVPN has numerous drawbacks such as the lack of traffic prioritization and CoS capabilities. IPVPN can also be hindered by poor provider service-level agreement (SLA) and mean time to repair (MTTR) on a given service or provider. There is thus a need for an innovative network solution that provides better network performance and quality of service.

Link Aggregation with MPLS

For customers who want to have an end-to-end VPN or MPLS network, at least one issue with MPLS networks is that they do not typically extend to the actual customer or client sites as the PE or ingress routers defining the "edge" of the MPLS network core are typically situated at network providers' premises. In order to maintain the high level of performance provided by an MPLS (with or without IPSEC) network, a solution is required to connect the client site to the MPLS network at the PE routers. To date, some form of link aggregation technology has been occasionally adapted to fill the gap between the MPLS PE routers and the actual client site(s). However, in the current state of the art, most link aggregation technologies cannot connect to dissimilar or diverse carriers or connections.

An MPLS network or Enterprise WAN is typically sold as a private product or service and thus cannot offer diverse carriers or network providers, but rather require physical local loop to the end customer using the same carrier or network provider.

In a market research, drivers for corporations to choose a network architecture solution may include:
Demand for low-cost IP network services to converge business applications
Support for multiple access technologies
Cost competitiveness against MPLS and IPVPN
Support for traffic prioritization
Reasons for deploying a network architecture solution may include:
Improved operational efficiency/lower OPEX
Improved service scalability (quick & simplified service deployment)
Link major company sites/facilities
Consolidate converged applications (voice, data, Internet, video)
Focus on core business while provider manages the routing
Reduce IT/Telecom staff
Criteria for selecting WAN network architecture solution and services may include:
Security
Price and pricing structure complexity
Service reliability/QoS
Adequate guaranteed bandwidth
Service availability at key sites (geographic reach)
Performance/SLA guarantees
Operation/OPEX costs
Interoperability with existing network and access services
Self-service portals and customer support/customer care
Flexibility/scalability (quick service provisioning/bandwidth changes)
CAPEX/equipment costs (including ability to leverage existing CPE)

Examples are described herein in relation to MPLS as an illustrative example transport mechanism where data packets are assigned labels. This is an example only and other transport mechanisms may be used with different labeling or encapsulation techniques.

The embodiments of the systems and methods described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface. For example, and without limitation, the various programmable computers may be a server, network appliance, set-top box, embedded device, computer expansion module, personal computer, laptop, personal data assistant, cellular telephone, smartphone device, UMPC tablets and wireless hypermedia device or any other computing device capable of being configured to carry out the methods described herein.

Program code is applied to input data to perform the functions described herein and to generate output information. The output information is applied to one or more output devices, in known fashion. In some embodiments, the communication interface may be a network communication interface. In embodiments in which elements of the invention are combined, the communication interface may be a software communication interface, such as those for inter-process communication (IPC). In still other embodiments, there may be a combination of communication interfaces implemented as hardware, software, and combination thereof.

Each program may be implemented in a high level procedural or object oriented programming or scripting language, or both, to communicate with a computer system. However, alternatively the programs may be implemented in assembly or machine language, if desired. The language may be a compiled or interpreted language. Each such computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program, where the storage medium so configured causes a computer to operate in a specific and predefined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on, where the data stored thereon may only be temporarily stored. The computer useable instructions may also be in various forms, including compiled and non-compiled code.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

MPLS Edge

Some embodiments may involve an MPLS network as an example network. MPLS Edge is an improved alternative to IPSEC VPN on the MPLS network. In one aspect, Autonomous Network Aggregation (ANA) or a network bonding/aggregation technology can be used as part of a hybrid solution to extend an MPLS network, allowing partners to use lower-cost broadband connectivity while maintaining the quality and reliability of an MPLS service. In another aspect, MPLS Edge virtualizes MPLS over network bonding/aggregation on the edge of carrier infrastructures, delivering MPLS labels to the customer premises equipment or device coupled with network bonding/aggregation. For example, cloud concentrators in ANA or a link aggregation system may act as an MPLS PE (Provider Edge) router on the edge of the network.

Most existing prior art link aggregation technologies cannot connect to dissimilar or diverse network carriers or connections. In addition, MPLS network is typically sold as a private product or service and thus cannot offer diverse carriers or network providers, but rather require physical local loop to the end customer using the same carrier or network provider. Using the network bonding/aggregation technology with MPLS network as described herein allows for the utilization of diverse carriers and diverse connections via high-quality link aggregation in combination with a secured and trusted MPLS network.

MPLS Edge technology can extend an MPLS network to the customer's LAN as a private service offering that can deliver consolidated WAN, VoIP, and Internet access.

In one aspect of embodiments described herein, a system and network architecture is provided for aggregating multiple network access connections from similar or diverse carriers to create a new aggregated connection that accommodates greater speed and high availability characteristics, and that connects to an MPLS network via customer premises equipment (CPE) or cloud concentrator/provider equipment (CCPE).

In another aspect of embodiments described herein, a network solution is provided for improving network communication performance between at least two sites, where the two sites are at a distance from one another that would usually require long haul network communication. The network solutions includes at least one network bonding/aggregation system that includes (A) at least one first network component that is implemented at a first service site, the first network component being configured to bond or aggregate one or more diverse network connections so as to configure a bonded/aggregated connection that has increased throughput; and (B) a second network component, configured to interoperate with the first network component, the second network component including a server/concentrator (also referred to as network server component) that is implemented at an access or point-of-entry point to a multiple protocol label switching network. Multiprotocol label switching (MPLS) is a network mechanism that directs data between network using path labels rather than network addresses, avoiding complex routing table lookups. The labels identify virtual links or paths between nodes rather than endpoints. MPLS can encapsulate packets of various network protocols and supports a range of access technologies. As will be described herein, embodiments described herein may provide a virtual edge provide encryption over the bonded/aggregated network connection.

In one aspect, the first network component may be implemented using what is called in this disclosure a "CPE" or customer premises equipment (also referred to as customer edge (CE) router or client site network component). The CPE and a server/concentrator (also known as a Cloud Concentrator Provider Equipment CCPE) component (more fully described below) interoperate to configure the bonded/aggregated connections in order to provide improved network connections at a site associated with the CPE. The CPE may involve a third party router that may be particularly configured in accordance with embodiments to provide the bonded/aggregated network connection. This configuration may involve separating lower-link data traffic on third party routers by removing default routing information and adding routes on each respective lower-link for the corresponding concentrator lower-link IP address. This configuration may further involve using a common access protocol for encapsulation of lower-link data packets. Further configuration details are described herein. The CPE may be implemented using a virtual edge, as will be described herein.

In one aspect of the embodiments described herein, the server/concentrator is implemented at an access or point-of-entry point to an MPLS network or other network, with access to the network backbone provided by an MPLS networking solution so as to provide a high-quality, end-to-end, secured network connection. The server/concentrator may provide a bridge between the bonded/aggregated network and the broadband network portion to deliver MPLS to the CPE. The server/concentrator may be configured to operate as a provider edge or point-of-entry (PE) router on the MPLS network. As will be described below, MPLS is protocol independent and supports a bonded/aggregated network supported protocol. This is an example protocol described for illustrative purpose.

The server/concentrator may also support lower-link encapsulation to be compatible with CPE routers that are configured to provide separation and encapsulation of lower-link data traffic.

In addition, the server/concentrator may be implemented as a cloud service, a cluster service or simply a cluster hosted in cloud, or a router server configured based on certain configurations. It may also be referred to as a cluster or a cloud concentrator throughout this application. The clusters or cloud concentrators may serve multiple CPEs. A client site may have multiple CPEs and a cluster can serve multiple client sites. The clusters or cloud concentrators may also communicate with one another on a basis of multiple points-of-presence ("Multi-POP"), as will be described below.

In another embodiment, the server/concentrator (or network server component) may be remotely or closely coupled with one or more CPEs, and comprise of software, or entirely of hardware, or include both software and hardware components. The server/concentrator may be implemented to one or more server computers, or may be implemented as an interconnected network of computer residing at the same or different physical locations, and connected to one or more CPEs and the core network (e.g. MPLS or other protocol) through one or more trusted network connections. The server/concentrator can interoperate with CPEs and/or the other components in the network architecture in order to deliver the functionalities described herein.

Network architectures that involve long-haul bonded/aggregated network communication result in less than optimal performance, thereby minimizing the advantages of the bonding/aggregation technology. In other words, while the bonding/aggregation technology may improve service to Site A associated with for example a CPE (or equivalent to customer premises equipment), based on bonding/aggregation between the CPE and an associated server/concentrator (or equivalent such as a cloud concentrator), overall performance may be less than desired and in fact may be less than what would be available without bonding/aggregation because of the long haul effects of carrying the bonded/aggregated from Site A, to at least Site B. These long haul effects will present wherever Site A and at least Site B are at a substantial distance from one another. The Example in Operation described below illustrates the decrease in performance that results from the long haul effects. In one exemplary embodiment of the invention, the CCPE may be implemented with virtualization software such as vmWare, vSphere5, Citrix Xen, and so on.

Referring now to FIG. 1A, which illustrates the problem of long haul aggregation/bonding generally. In a bonded/aggregated network communication shown in FIG. 1A, packets are carried over the Internet through an extension of the bonded/aggregated connection across the Internet (102), rather than a high performing Internet core network such as an MPLS core network. The bonded/aggregated connection, across a distance that is subject to long haul effects, will not perform as well as the Internet, thereby providing less than ideal performance.

Figure 1B:
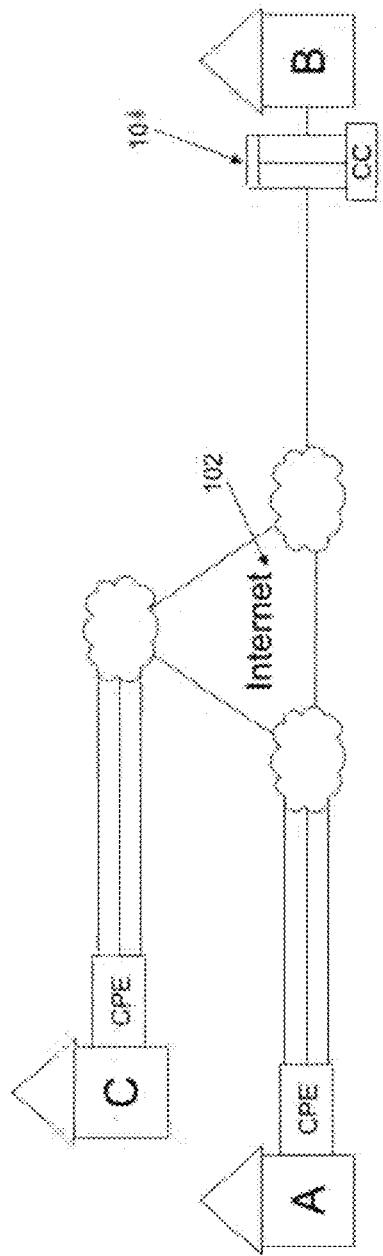
FIG. 1B also illustrates a prior art network configuration that includes central management of bonded/aggregated network connections, which also shows the problem of long-haul aggregation/bonding with multiple customer sites.

Another problem with some bonding/aggregation solutions is that they generally require control or management by a central server. Depending on the location of the central server, this can result in multiplying the long haul effects because traffic between Site A and Site B may need to also be transferred to a Site C that is associated with the central server. This aspect of the prior art technology is illustrated for example in FIG. 1B. Central server (104) manages network communications, and routes network communications between Site A and Site C. To the extent that the distance between central servers (104) is substantial from either of Site A or Site C, long haul effects will present. If central server (104) is at a substantial distance from each of Site A and Site C, then there will be a multiplying of the long haul effects, as network traffic will pass from Site A to the central server (104) to Site C, and from Site C to the central server (104) to Site A.

As illustrated in the Example in Operation described below, long haul effects have a negative impact on speed (slowing traffic) and also on latency. Conversely, embodiments of the present invention may provide significant improvements in regards to both speed and latency.

In an aspect, a network solution is provided for improving network communication performance between at least two sites, where the two sites are at a distance from one another that would usually require long haul network communication. The network solutions include at least one network bonding/aggregation system that includes (A) at least one first network component that is implemented at a first service site, the first network component being configured to bond or aggregate one or more diverse network connections so as to configure a bonded/aggregated connection that has increased throughput; and (B) a second network component, configured to interoperate with the first network component, the second network component including a server/concentrator (also referred to as network server component) that is implemented at an access point to a high performing network backbone.

In an aspect, the first network component may be implemented using what is referred to in this disclosure a "CPE" or customer premises equipment (also referred to as client site network component). The CPE and a server/concentrator component (more fully described below) interoperate to configure the bonded/aggregated connections in order to provide improve network connections at a site associated with the CPE. A CPE may be referred to as a client site network component, where a server/concentrator may be referred to as a cloud concentrator (CC) or a network server component.

In an aspect, the server/concentrator is implemented at an access point, with access to the network backbone (e.g. a high performing network 112) so as to avoid long-haul bonded/aggregated network communications. As set out in the Example in Operation cited below, network architectures that involve long-haul bonded/aggregated network communication result in less than optimal performance, thereby minimizing the advantages of the bonding/aggregation technology. In other words, while the bonding/aggregation technology may improve service to Site A associated with for example a CPE (or equivalent), based on bonding/aggregation between the CPE and an associated server/concentrator (or equivalent), overall performance may be less than desired and in fact may be less than what would be available without bonding/aggregation because of the long haul effects of carrying the bonded/aggregation from Site A, to at least Site B. These long haul effects may be present wherever Site A and at least Site B are at a substantial distance from one another.

In addition, the server/concentrator may be implemented as a cloud service, a cluster service or simply a cluster hosted in cloud, or a router server configured based on certain configurations. It may also be referred to as a cluster or a cloud concentrator ("CC") throughout this application. The clusters or cloud concentrators may serve multiple CPEs. A client site may have multiple CPEs and a cluster can serve multiple client sites. The clusters or cloud concentrators ("CC") may also communicate with one another on a basis of multiple points-of-presence ("Multi-POP"), as will be described below.

In an embodiment (not illustrated), the server/concentrator (or network server component) may be remotely or closely coupled with one or more CPEs, and may be implemented by software components, hardware components, or a combination of both software and hardware components. The server/concentrator may be implemented to one or more server computers, or may be implemented as an interconnected network of computers residing at the same or different physical locations, and connected to one or more CPEs and the core network (e.g. MPLS) through one or more trusted network connections. The server/concentrator can interoperate with CPEs and/or the other components in the network architecture in order to deliver the functionalities described herein.

The Example in Operation below illustrates the decrease in performance that results from the long haul effects.

FIG. 1A illustrates the problem of long haul aggregation/bonding generally. In the prior art bonded/aggregated network communication shown in FIG. 1A, packets are carried over the Internet through an extension of the bonded/aggregated connection across the Internet (102), rather than a high performing Internet. The bonded/aggregated connection, across a distance that is subject to long haul effects, will not perform as well as the Internet, thereby providing less than ideal performance.

The Example in Operation reflects another problem with prior art bonding/aggregation solutions, namely that they generally require control or management by a central server. Depending on the location of the central server, this can result in multiplying the long haul effects because traffic between Site A and Site B may also need to be transferred to a Site C that is associated with the central server. This aspect is illustrated for example in FIG. 1B. Central server (104) manages network communications, and in fact routes network communications between Site A and Site C. To the extent that the distance between central server (104) is substantial from either of Site A or Site C, long haul effects will present. If central server (104) is at a substantial distance from each of Site A and Site C, then there will be a multiplying of the long haul effects, as network traffic will pass from Site A to the central server (104) to Site C, and from Site C to the central server (104) to Site A.

As illustrated in the Example of Operation, long haul effects have a negative impact on speed (slowing traffic) and also on latency. Conversely, an embodiment may provide significant improvements in regards to both speed and latency.

Embodiments disclosed herein may provide a network solution, including a networking system and architecture and associated networking method, may address the aforesaid long haul effects that have a negative effect on performance.

Figure 1C:
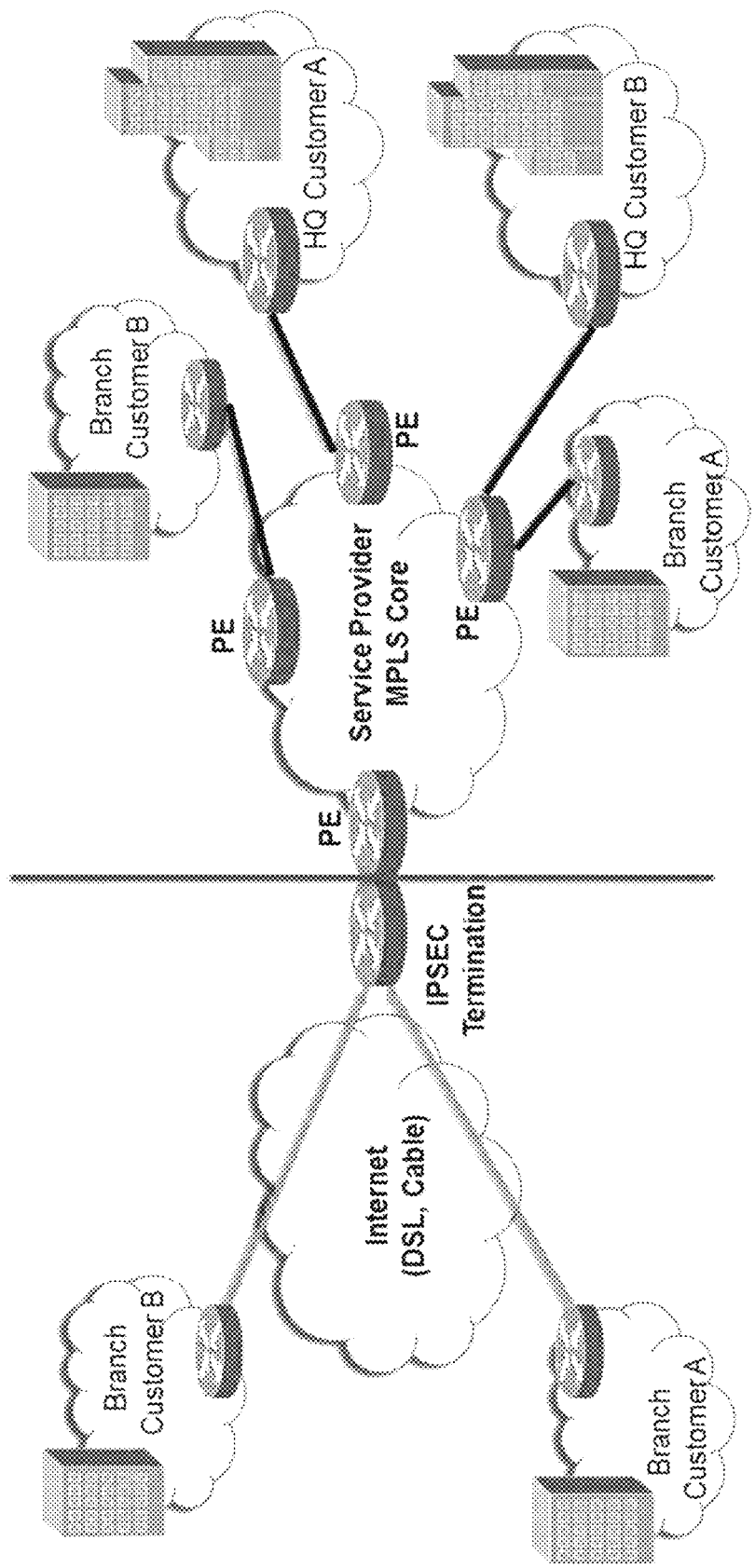
FIG. 1C illustrates a prior art MPLS network configuration with IPSEC embedded.

FIG. 1C illustrates a prior art MPLS network configuration with IPSEC embedded therein. In the prior art MPLS network shown in FIG. 1C, packets are carried over the Internet through a single connection such as DSL or cable, from Branch Customers A or B (e.g. Sites A or B) to one PE router of MPLS. An IPSEC tunnel may be implemented between the Branch Customers A or B to the MPLS PE router, and terminated immediately before or at the PE router. The PE router therefore fulfills two tasks: IPSEC remote access termination and providing an MPLS PE router. IPSEC in this prior art configuration serves mainly as a secure access method into the MPLS network. The protection of IPSEC secures the data on transport over any untrusted infrastructure, such as public WIFI hot spots or DSL Internet.

As can be seen from FIG. 1C, the network path from Branch Customer A or B to IPSEC Termination may be over a sole connection that can be, for example, a cable or a DSL connection. If the cable connection from Branch Customer A fails for any reason, then that customer would not be able to connect to the MPLS network as there is no alternative Internet connection available. In contrast, embodiments of the present invention provide significant improvements in regards to a number of additional features such as bi-directional communication, failover protection and diversity of carriers.

Though not illustrated here, it is understood that IPSEC tunnel may also be implemented from one PE router to another PE router over the MPLS network core or from Branch Customer A to HQ Customer B (CPE to CPE). Regardless of the particular configuration of IPSEC over MPLS, MPLS networks with embedded IPSEC are very costly to set up, difficult to maintain and reconfigure, and generally leave much to be desired in terms of carrier diversity, failover protection, aggregated bandwidth, bi-directional communication, quality of service (QoS), prevention of dropped calls, application acceleration, and scoring of quality of experience (QoE), to name a few.

Figure 2A:
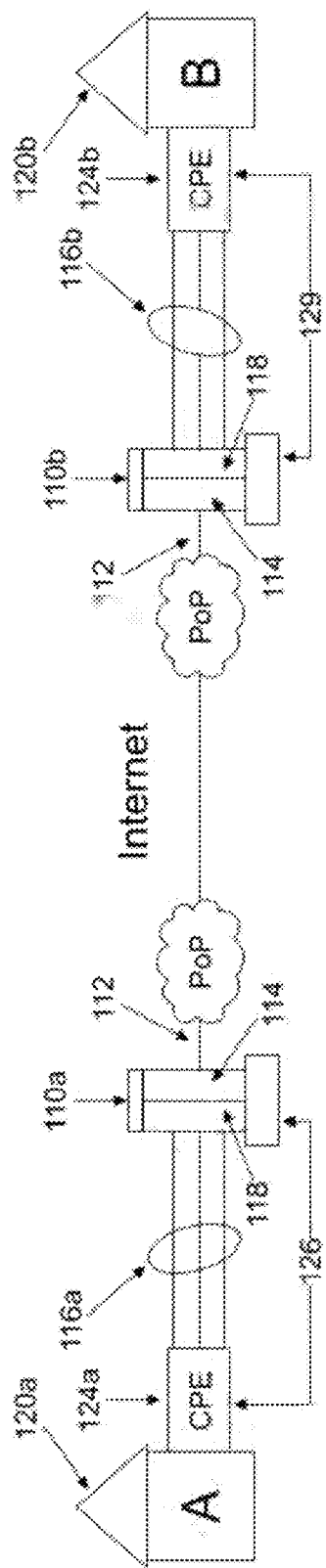
FIG. 2A shows a network solution with bonding/aggregation implemented at both Site A and Site B, while minimizing long haul effects, exemplary of an embodiment.

As shown in FIG. 2A, in an aspect, the server/concentrator side of a bonding/aggregation network solution for Site A (120a) is implemented such that (A) the location of the server/concentrator is implemented with access to the network backbone of Internet (112), and (B) the server/concentrator (110a) includes functionality for (i) receiving packets by means of the bonded/aggregated connection (116a), (ii) interrupting the bonded/aggregated connection (116a) using an interruptor (118), and (iii) directing the packets (114) to the Internet (112) for delivery to a Site B (120b). If Site B also has bonded/aggregated network service, then the packets are delivered to a Site B side server/concentrator (110b). Server/concentrator (110b) established a further bonded/aggregated connection (116b) and directs the packets (114) via the bonded/aggregated connection (116b) to a CPE (B) (124b) at Site B.

Figure 2B:
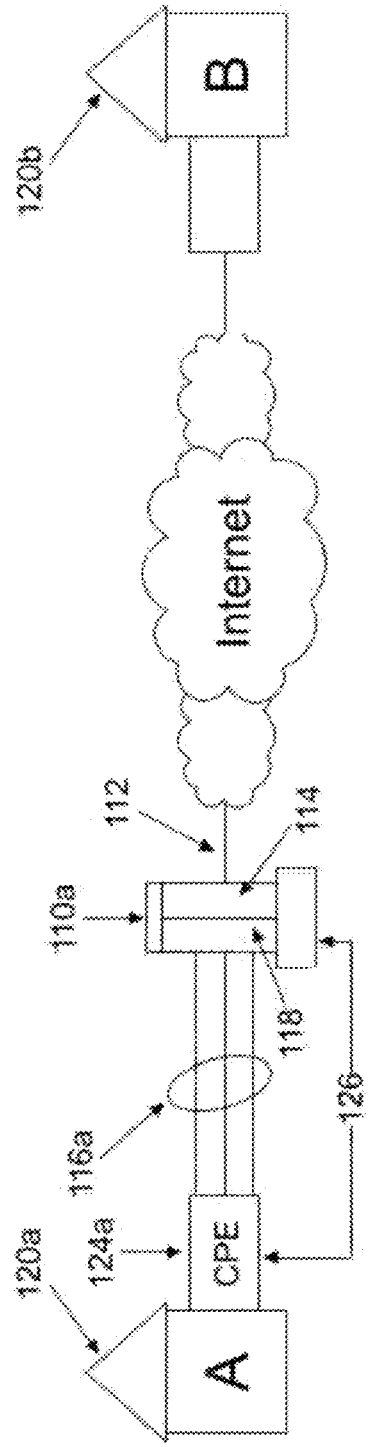
FIG. 2B shows another network solution, in which bonded/aggregated network service exists at Site A but not at Site B, exemplary of an embodiment.

FIG. 2B illustrates a configuration where bonded/aggregated network service exists at Site A but not at Site B.

Figure 2C:
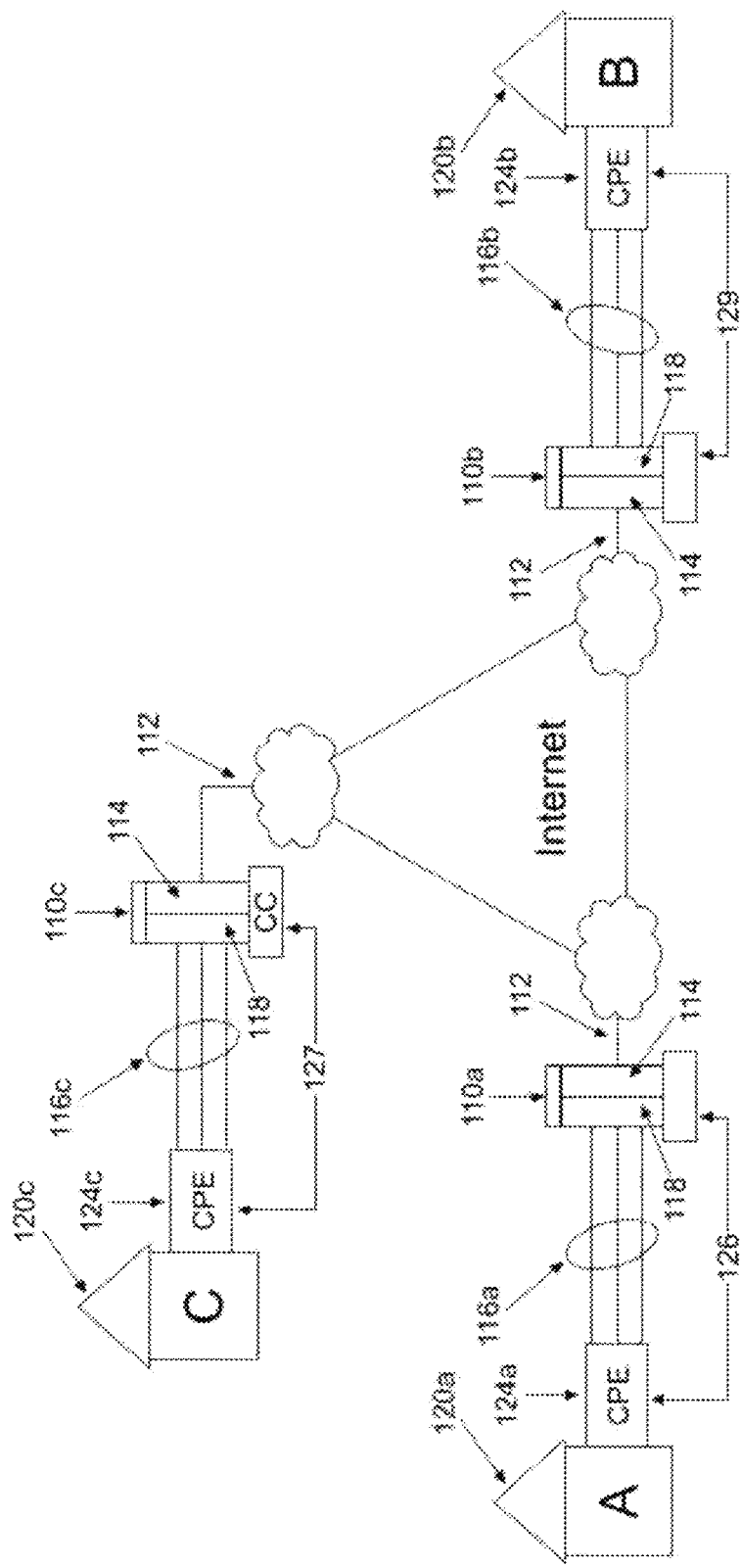
FIG. 2C shows still another network solution in which bonding/aggregation is implemented as between Site A, Site B, and Site C, exemplary of an embodiment.

More than two sites are possible, where the network system of example embodiments improves network performance for network communications between for example Site A, Site B, and Site C where one or more sites will include bonded/aggregated service. In an example embodiment, as shown in FIG. 2C, bonded/aggregated service is present for each of Site A, Site B and Site C. FIG. 2C illustrates one possible implementation, where the network system is based on a distributed network architecture where server/concentrators (110a) (110b) (110c) and corresponding CPEs (124a) (124b) (124c) are configured to provide improved network communications, including interruption of network communications at the network backbone so as to reduce long haul effects, dynamically and on a peer to peer basis without the need for a persistent central manager. In one implementation, each of the network components of the network system included functionality to operate on a peer to peer basis.

A CPE (124) initiates network communications on a bonded/aggregated basis, cooperating with a server/concentrator (110), with packets destined for a remote location. Each server/concentrator (110) receives dynamic updates including a location and identifier associated with other server/concentrators (110). Packets are dynamically sent to a server/concentrator (110) at the remote location, if available, and from the server/concentrator (110) at the remote location to its CPE (124). The CPEs (124) and their server/concentrators (110) use bi-directional control of network communications to establish a network overlay to provide improved network performance. The network overlay for example provides desirable quality of service despite underlying network conditions that may otherwise resulted in a decrease in network performance.

In accordance with an embodiment, the network system may establish and manage two or more network overlays. Referring for example to FIG. 2a, a first network overlay (126) is established between the CPE(A) (124a) and server/concentrator (110a); then, communications are transferred over the Internet (112) without a network overlay; then, a second network overlay (129) is established between server/concentrator (110b) and CPE(B) (124b). As a result, IP transport is provided between Site A and Site B where this will provide better performance than the aggregated/bonded network connections. Bonding/aggregation in effect is distributed across the locations, rather than attempting to span the distance between the locations with end to end bonding/aggregation.

Embodiments disclosed herein therefore may provide distributed bonding/aggregation. Embodiments disclosed herein may also provide a network system that automatically provides distributed bonding/aggregation in a way that bonding/aggregation is proximal, and beyond proximal connections IP transport is used, with proximal bonded/aggregated connections and fast Internet being used as part of end-to-end improved service.

In some embodiment, a distribute proximal aggregation model for the network may be implemented. For example, a plurality of Concentrators or CCs may be established in multiple locations covering a multitude of Proximal Aggregation points which may be referred to as Home-POPs. Each CC can support multi-tenant configurations used for multiple clients associated with different CPEs to improve network performance for such multiple clients by providing termination of their ANA service and transfer of communications to the network backbone/Internet. The network solution can include multiple Points-of-Presence, distributed geographically to bridge disparate areas with improved network communication using proximal aggregation to each customer link-aggregation CPE device.

Figure 2D:
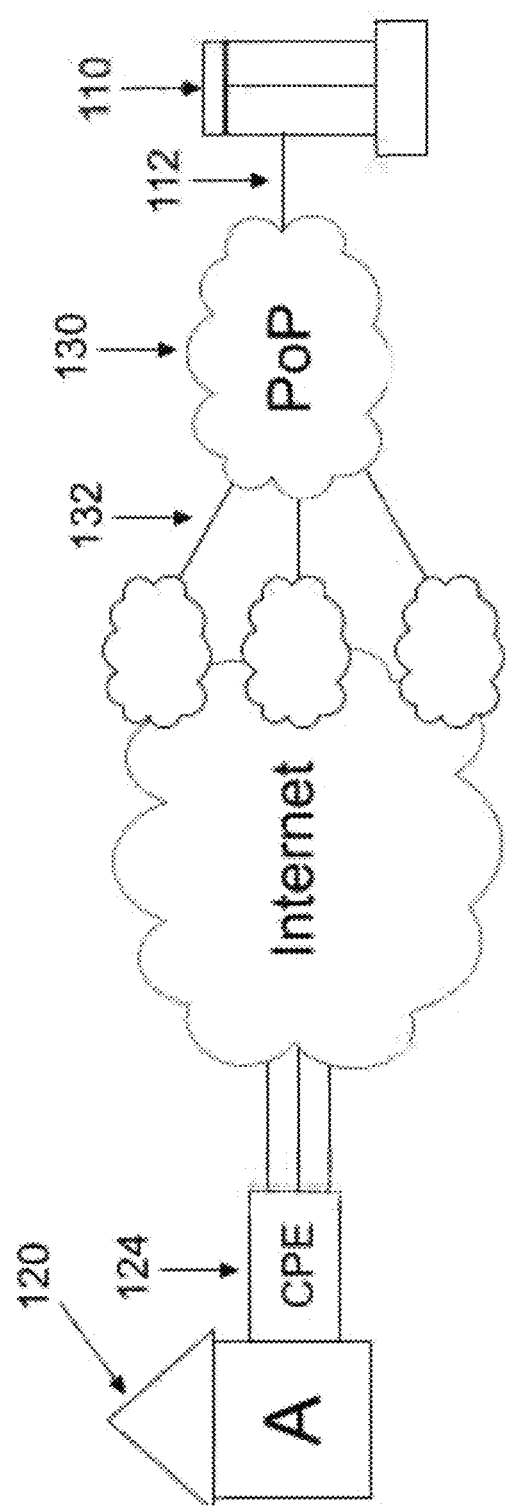
FIG. 2D shows a further implementation of a network architecture in which servers/concentrators are implemented as part of a Point-of-Presence, exemplary of an embodiment.

In another aspect, and as shown in FIG. 2D, one or more server/concentrators can be implemented at a physical location, as part of a Point-of Presence (PoP) (130). In an aspect, in the context of the present disclosure, a PoP (130) can define a relatively high concentration of servers/concentrators within an area. In another aspect, a plurality of PoPs (130) may be available in a geographic location. A plurality of PoPs (130) may be established based on network topology or service requirements in a given area.

In an aspect, each PoP (130) has one or more network backbone connections (132), because in some locations different network backbones may be available. The PoP (130) may be implemented so that it dynamically interoperates with surrounding networks. The PoP (130) is a collection of network components, established at the periphery of the network backbone (112), associated with a plurality of networks, and cumulatively providing network communication service to a one or more clients in a defined geographic area. In one possible implementation, the server/concentrators (110) located within the PoP (130) functions as a network access server for connecting to the Internet (112). The network access server (110) acts as the access point to the Internet (112) for a plurality of CPE devices (124) that are connected to the PoP (130). The servers/concentrators (110) may be configured to communicate with one another to share information regarding network conditions. Servers/concentrators (110) provide connectivity to CPEs (124) and may also run a networking protocol such as BGP to route servers and other network backbone connections (112).

In an aspect, servers/concentrators (110) are configured to detect changes in their network environment.

The CPE (124) may be configured to collect information from network components in its vicinity including from one or more available PoPs (130) and their servers/concentrators (110). The CPE (124) for example connects to a closest available server/concentrator (124), implemented as part of a PoP (130), and thereby having access to a connection to the network backbone (112). Whether the connection to the network backbone (112) is direct or indirect, the network connections are established so as to minimize long haul effects.

In one implementation, each CPE (124) wanting to establish a connection dynamically advertises its IP address, and receives replies from associated servers/concentrators (110) along with their current network performance information. The CPE (124) initiates a bonded/aggregated connection with a server/concentrator (110) that is both proximal (to minimize long haul effects between the CPE (124) to the network backbone (112)), and also that based on network conditions relevant to the particular server/concentrator, is performing well.

In one implementation, a network device is deployed that bonds or aggregate multiple, diverse links. The network device may be WAN aggregator or a link aggregator.

Once the network overlay is established, various other network optimization and quality of services ("QoS") techniques may be applied.

One or more CPEs and one or more concentrators (e.g. CC) can create various different network configurations that improve network performance in relation to network communications between them. The CPEs and concentrators are designed to be self-configuring, and to interoperate with one another to manage traffic in a more effective way.

"Proximal" means a distance such that based on relevant network conditions, long haul network communication and associated effects are avoided. The distance between the CPE and the server/concentrator is proximal, thereby enabling good network service. For example, the network components may be at disparate locations.

To take advantage of the network architecture disclosed herein, the server/concentrator (110) may be located at an access point to the network backbone (112) or in some other way to minimize the long haul effect, for example, by the server/concentrator being located proximal to an access point so as to further avoid long haul network communication.

In another aspect, the bonded/aggregated connection at Site A and the bonded/aggregated connection at Site B may be different, in the sense that each may include different types of network connections and that may be associated with different carriers. In an aspect, the network overlay provided operates notwithstanding such diversity.

The more sites that have the CPEs/CCs associated with them the better network performance between them. Representative performance details are described below.

The network backbone (112) could be any high performance network including for example a private WAN, the Internet, or an MPLS network.

Figure 2E:
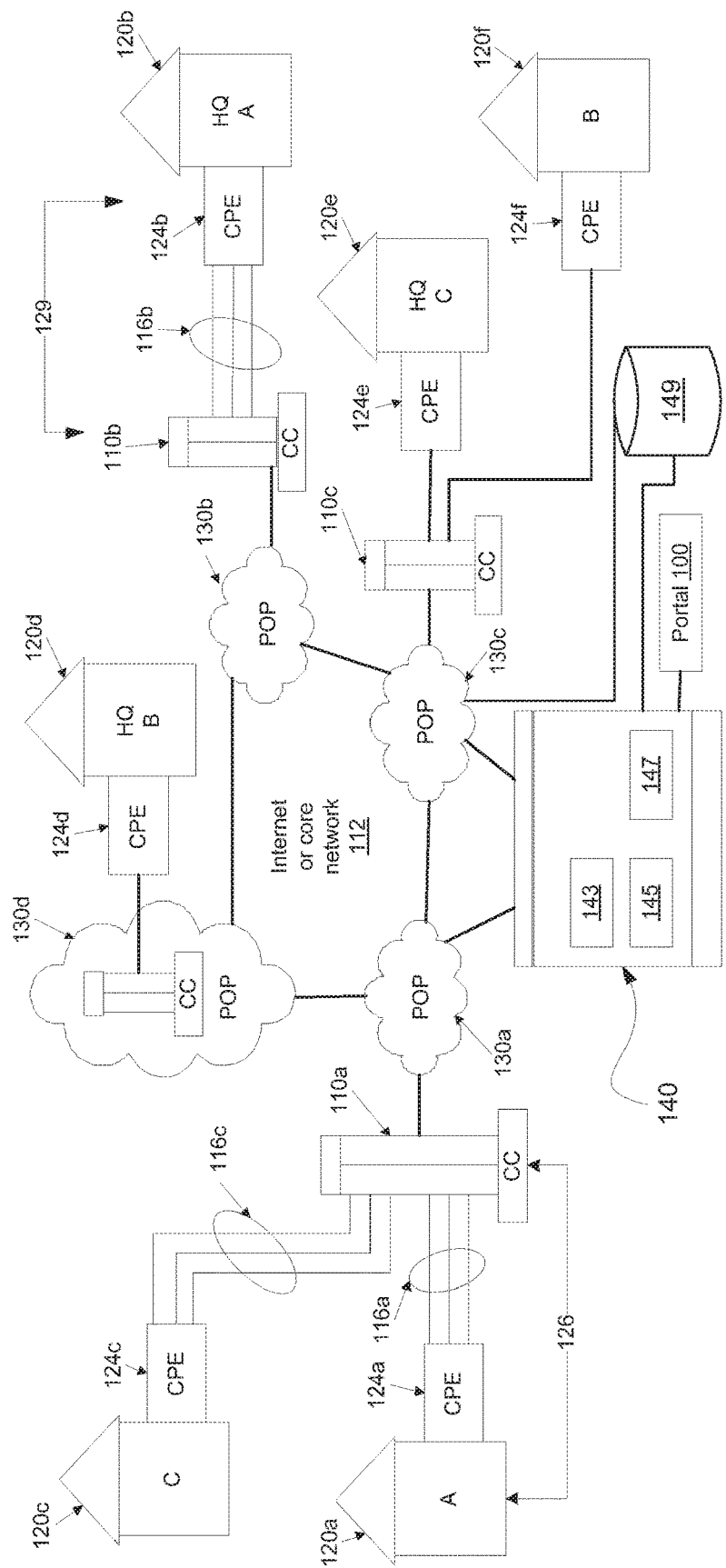
FIG. 2E shows a network solution with bonding/aggregation and cloud provisioning implemented at both Site A, Headquarter (HQ) A and Site C to connect to Internet and other sites, exemplary of an embodiment.
Figure 2F:
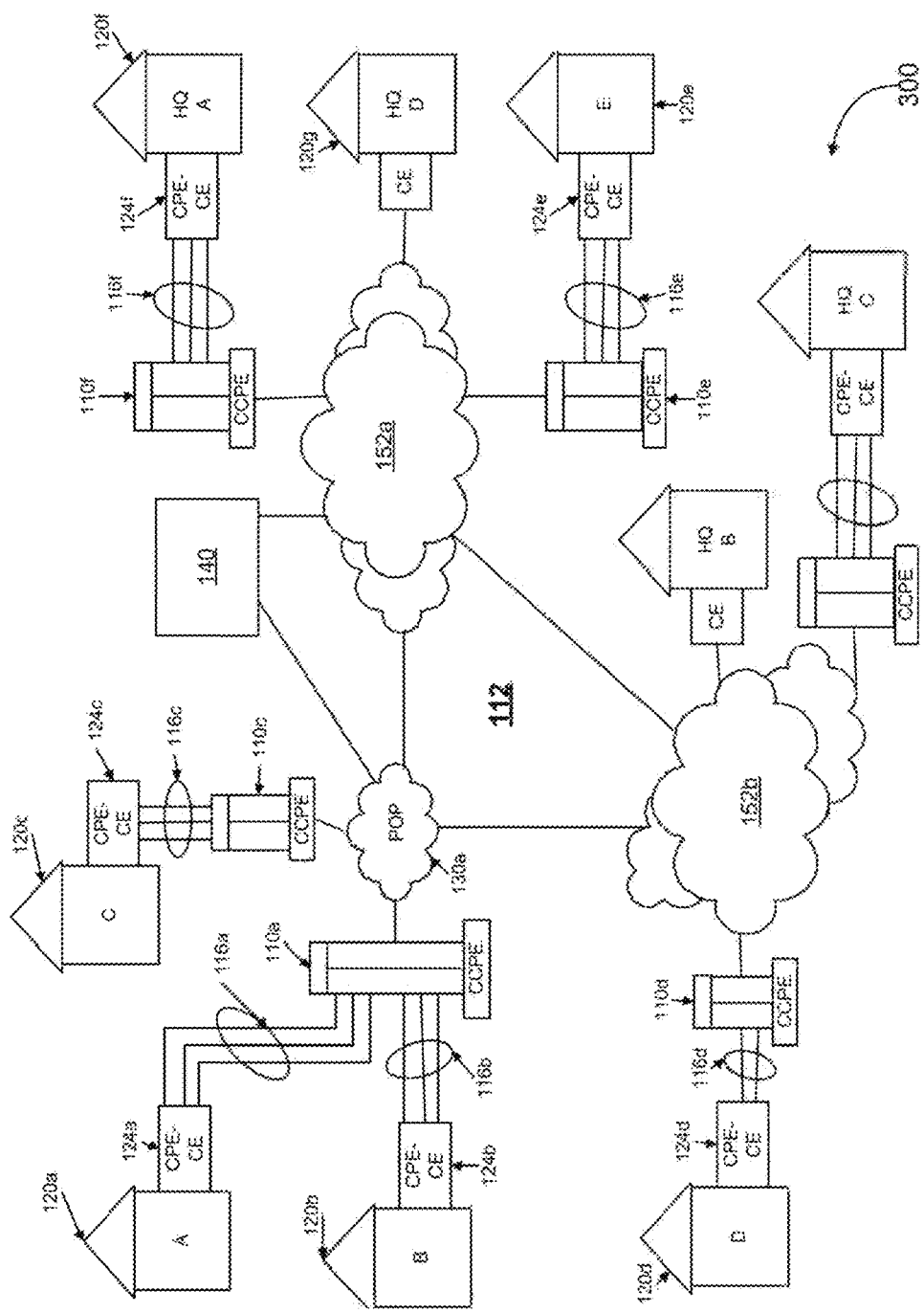
FIG. 2F shows a network solution with bonding/aggregation implemented at Site A, Site B, Site C, Site D, HQ A, HQ C and Site E to connect to a first MPLS network from a first provider connecting and a second MPLS network from a second provider.

Referring now to FIG. 2E, a number of customer sites (120*a*, 120*b*, 120*c*, 120*d*, 120*e*, and 1200 are connected to each other via Internet 112, which may provide a secured private VPN network solution to multiple users. In an embodiment, the Internet may include a high performing network such as an MPLS network backbone that is typically provided by one carrier; multiple MPLS networks provided by multiple carriers may also be connected via multiple Points-of-Presence (POPs) to form a super network. As can be seen from the exemplary embodiment, each of Site A 120*a* and Site C 120*c* has a CPE (124*a* and 124*c*, respectively), which is then connected to a cloud concentrator CC 110*a* with some form of link aggregation/bonding technology as described elsewhere in this disclosure. The CC 110*a* can be also connected to other CCs (not shown) within a Point-of-Presence 130*a* located closest to Site A 120*a* and Site C 120*c*.

In another embodiment, some CCs may not be associated with a POP. Whether a CC is part of a POP may change over time, as CC and/or a cloud based Network Manager 140 (further described below) may dynamically receive and analyze real-time data regarding various network characteristics. For example, CC 110*b* or the cloud based Network Manager 140 may receive information indicating that a commonly used network path has failed due to power outage, it then may decide to seek alternative connection to the Internet via the closest POP 130*d*. As described below, the cloud based Network Manager 140 may configure or reconfigure the client site network components (e.g. CPEs) or network server components (e.g. CCs) in real-time or near real-time based on a plurality of network characteristics. For example, the Network Manager 140 may automatically reconfigure a CPE to collect network performance data and initiate the configuration of a network overlay to include one or more network server components to improve network performance.

In one embodiment, the Network Manager 140 may be operably linked to a central SCN database or data store 149, which may be a SQL database.

Figure 16A:
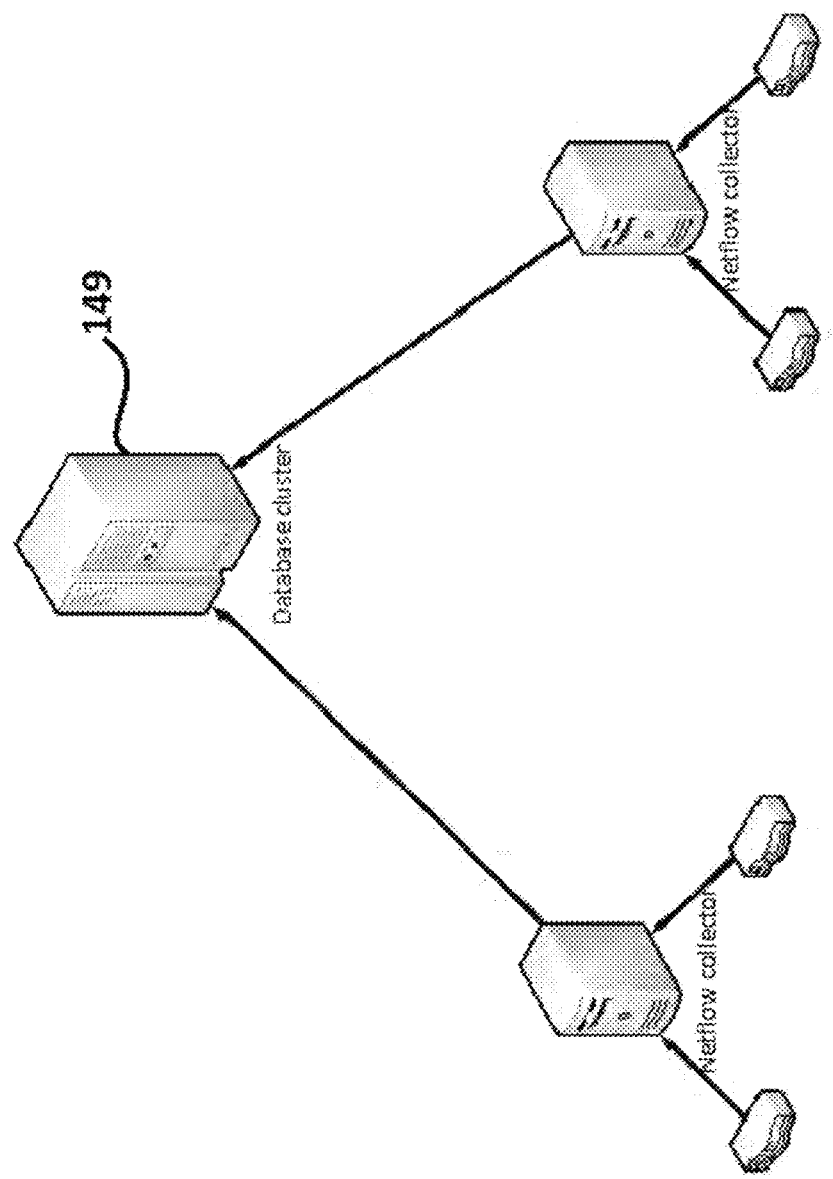
FIG. 16A shows an example relationship between a netflow collector and a SCN central database.
Figure 16B:
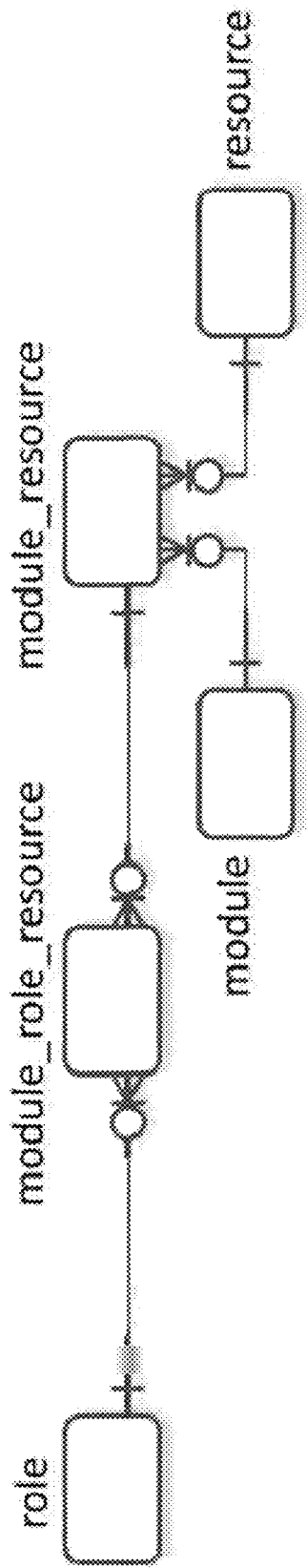
FIG. 16B illustrates exemplary relationship diagrams for cloud manager 140 and SCN Database and tables.

FIG. 16B illustrates exemplary relationship diagrams for cloud manager 140 and SCN database and tables.

FIG. 16C is an example main entity relationship diagram (ERD) for central SCN database 149. The database 149 may provide the following example functionalities: represent entities or objects for storage and reuse between sessions and pages; represent objects for security and management of applications; and store and retrieve data obtained from devices for historical data, troubleshooting or billing. The list of functionalities is not meant to be limiting and is illustrative of example functionality.

The architecture of embodiments disclosed herein can be understood as a centralized architecture for aggregating network connections, broadband or otherwise. Diverse network connections are aggregated into a virtual (logical) connection that provides higher throughput as well as independence of the network characteristics of the constituent (physical) network. The virtual connection can then be connected to a network in manners as described herein. Aggregation may be performed at a given CPE terminal.

For instance, in one example of the implementation, a Metro Ethernet 10 Mbps (E10) link and a T1 (DS1) link can be aggregated in accordance with embodiments as described below, in order to provide higher fault tolerance and improved access speeds. The aggregation of diverse carriers may extend to any broadband network connection including Digital Subscriber Line (DSL) communications links, Data over Cable Service Interface Specification (DOCSIS), Integrated Services Digital Network, Multi-protocol Label Switching, Asynchronous Transfer Mode (ATM), and Ethernet, etc.

The links to be aggregated can be any private or public Internet services such as cable, ADSL, T1, Fibre, xOE (over Ethernet types), wireless, as well as other MPLS connections so long as the network path reaches a CC for lower-link processing from a CPE terminal.

Network Overlay

In an aspect, one or more network overlays are established, thereby in an aspect providing a multi-POP network that exploits multiple points of presence so as to provide a persistent, configurable/reconfigurable network configuration that provides substantial network performance improvements over prior art methods.

In an aspect, the CPEs/concentrators may monitor network performance, including in the areas proximate to their position, and may reconfigure the network overlay dynamically, across multiple locations (including multiple PoPs) based on changes in network performance while providing continuity of service.

In an aspect, the network components of embodiments disclosed herein may be intelligent, and iteratively collect network performance information. Significantly, in an aspect each CPE is able to direct associated concentrator(s) and any CPE to in aggregate re-configure the network overlay.

Significantly, in the created network overlay 126, 129, management of the network may be centralized or decentralized, such as through the cloud based Network Manager 140, depending on the configuration that provides the best overall performance. This is in contrast to prior art solutions that generally require central management for example of termination of connection which results in traffic being carrier over bonded/aggregated connection that involve long haul transmission that fail to take advantage of network paths that may provide inherently better performance than the bonded/aggregated connection paths.

In an aspect, decentralized management is made possible by peer-to-peer functionality implemented to the network components.

In an aspect, a plurality of servers/concentrators may be established in multiple locations covering a plurality of different access points. Each server/concentrator may be used for multiple clients associated with different CPEs to improve network performance for such multiple clients by providing termination of their bonded/aggregated connection and transfer of communications to the network backbone. The network solution disclosed herein therefore may include multiple Points-of-Presence, distributed geographically including for example in areas requiring network service, and through the network architecture disclosed herein bridging geographically disparate areas with improved network communication therebetween.

In one embodiment, the connections within one or more network overlays 126, 129 may be implemented with Intelligence Packet Distributed Engine (IPDE), a system that can use an advanced queuing and distribution algorithm with bidirectional information to support asymmetrical environments. The IPDE can leverage the bandwidth of bonded or aggregated network connections, even where the links in the connection exhibit substantially different performance. In some aspects, the IPDE may support diverse carrier/access aggregation, combine differing speeds or latency links, and combine symmetrical and asymmetrical links.

In another embodiment, IPDE may further be implemented with the RLA (Rate-Limit-Avoidance) feature for lower links to recognize and avoid poor quality bandwidth regions of broadband circuits or connections. This technique can provide a queue bypass to optimize WAN and Internet traffic. IPDE may provide QoS to a public Internet network infrastructure, with improved quality for converged voice and data over public broadband links. In this manner, RLA reserved bandwidth options can give high priority data traffic (e.g. VoIP) both urgent and guaranteed delivery.

In another embodiment, the IPDE-RLA utility may be further implemented to automatically calibrate lower links and set the RLA parameters for optimal performance when mixing voice and data traffic. For example, an auto-calibration technique may use different lower-link characteristics to place customer traffic within usable low-latency range of circuit by: 1) automatically identifying poor-quality-bandwidth-region while measuring link bandwidth and quality to set the OPDe-RAL bandwidth and IPDE-weight settings for lower-links; 2) using the IPDE-RLA reserve values to ensure the reserved traffic has been accommodated for in the RLA settings for IPDE-RLA-Bypass traffic; and 3) automatically calibrating lower-links for data and data/voice users (e.g. with a single command) and adjusting appropriate parameters such as max bandwidth detected, RLA bandwidth detection, RLA reserved bandwidth, link weight setting, and lower-link MTE detection. In some aspect, IPDE-Queue parameters can be set automatically according to a RLA bandwidth for improved accuracy. In another aspect, auto-calibration can be scheduled for lower links whose bandwidth and quality may fluctuate. In particular, auto-calibration may be part of a CPE configuration during zero-touch provisioning when a CPE is remotely configured and calibrated by the Network Manager 140.

The IPDE or IPDE-RLA engine may be installed on the Network Manager 140, or at least may be operably linked or coupled to the Network Manager 140.

Additional Implementation Details

As previously stated, embodiments disclosed herein may be implemented in connection with any technology for bonding or aggregating links, and thereby reduce long haul effects.

What follows is additional detail regarding link aggregation, which is one form of bonding/aggregation that may be used as part of the overall network solution and network architecture disclosed herein.

In an aspect, the system, method and network architecture may be implemented such that the aggregated/bonded network connections described are implemented using the link aggregation technology described in U.S. Pat. No. 8,155,158.

What follows is further discussion of possible embodiments of the CPE and the server/concentrator (or concentrator) components previously described, emphasizing their creation and management of the bonded/aggregated connections between them, which in the network configuration disclosed herein form a part of the overall network overlay that incorporates the one or more portions that are carried over the network backbone.

Diverse network connections may be aggregated into virtual (logical) connections that provide higher throughput as well as independence of the network characteristics of the constituent (physical) network. Aggregation may be performed to a given CPE.

For instance, in one example implementation, a Metro Ethernet 10 Mbps (E10) link and a T1 (DS1) link are aggregated, in order to provide higher fault tolerance and improved access speeds. The aggregation of diverse carriers may extend to any broadband network connection including Digital Subscriber Line (DSL) communications links, Data over Cable Service Interface Specification (DOCSIS), Integrated Services Digital Network, Multi-protocol Label Switching, Asynchronous Transfer Mode (ATM), and Ethernet, etc. The network connections may also include a WAN.

According to an aspect, an apparatus is provided for managing transfer of communication traffic over diverse network connections aggregated into a single autonomous connection, independent of the various underlying network connections. The apparatus may include a network aggregation device and an aggregation engine. The network aggregation device may be adapted to configure a plurality of network connections, which transfers communication traffic between a further network connection and the plurality of network connections, as an aggregated group for providing a transfer rate on the further communication link, and to allocate to the aggregate group a rate of transfer equal to the total available transfer rate of the underlying networks. The aggregation engine may be adapted to manage the distribution of communication traffic received both to and from a plurality of network connections, establishing newly formed aggregated network connections. The aggregation engine may be implemented in software for execution by a processor, or in hardware, for example.

In accordance with this aspect, a plurality of diverse network connections may be aggregated to create an aggregated network connection. The diversity of the network connections may be a result of diversity in provider networks due to the usage of different equipment vendors, network architectures/topologies, internal routing protocols, transmission media and even routing policies. These diversities may lead to different network connections with different latencies and/or jitter on the network connection.

Also, variation within transmission paths in a single provider network may lead to latency and/or jitter variations within a network connection.

Latency and jitter typically affect all data communication across the network connection. Latency may refer to the round-trip time for a transmission occurring end-to-end on a network connection. Jitter may refer to the variance in latency on a network connection for the same data flow. High latency and jitter typically have a direct and significant impact on application performance and bandwidth. Applications such as VOIP, and video delivery are typically sensitive to jitter and latency increases and can degrade as they increase.

Transparent aggregation of a plurality of network connections in an aggregated network connection requires the management of data transmitted over the aggregated connection by the aggregation engine and received from the aggregation traffic termination engine. In an aspect, transparent aggregation does not require any configuration by a network provider. The aggregation engine and the aggregation traffic termination engine may manage data transmission such that the variable path speeds and latencies on the plurality of network connections do not affect the application data transmitted over the aggregated network connection. The network aggregation engine and the aggregation traffic termination engine may handle sequencing and segmentation of the data transmitted through the aggregated connection to transparently deliver application data through the aggregated connection with minimal possible delay while ensuring the ordered delivery of application data.

In an aspect, the network aggregation engine provides a newly aggregated network connection with a capacity equal to the sum of the configured maximum throughput of the network connections.

The aggregation engine and an aggregation traffic termination engine (further explained below) handle the segmentation of packets as required in confirmation with architectural specifications such as Maximum Segment Size (MSS) and Maximum Transmission Unit of the underlying network connections. The network aggregation device is operable to handle assignment of sequence identifiers to packets transmitted through the aggregated network connection for the purpose of maintaining the ordering of transmitted data units over the aggregated network connection.

In a further aspect, the network connection device includes or is linked to a connection termination device, and a plurality of fixed or hot swappable transceivers for transmitting communication traffic on respective sets of network connections, for the purpose of configuring a plurality of network connections as an aggregated connection or the management of multiple aggregated network connections and providing access to the aggregated network connection for any network communications traversing the device.

In the present disclosure, routing protocols or route selection mechanisms described are intended only to provide non-limiting examples.

Figure 3A:
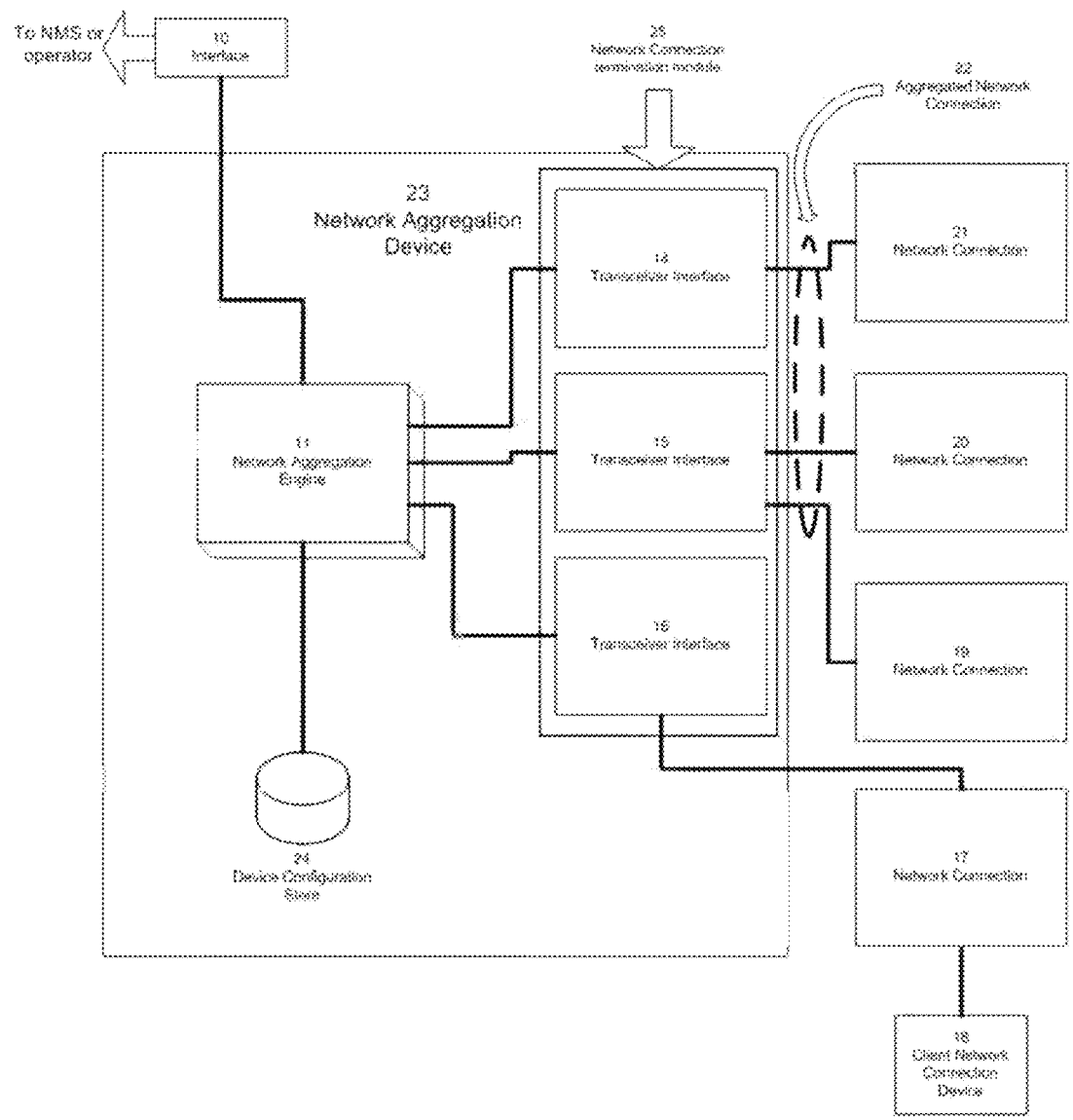
FIG. 3A is a block diagram of a communication device providing aggregation means on the client/CPE side of a network connection, exemplary of an embodiment.

FIG. 3A is a block diagram of a communication device acting as a client, exemplary of an embodiment.

As shown in FIG. 3A, the network element/network aggregation device (also referred to in this disclosure simply as the "device" or the "network aggregation device") 23 includes (in this particular embodiment shown for illustration) a network connection termination module 25 that includes representative transceiver interfaces 14, 15 and 16. Each transceiver interface 14, 15 and 16 represents an interface to a physical communication medium through which communications may be established to network connections.

A possible implementation of the network aggregation device may use a single or multiple chassis with slots for multiple network connection termination modules and multiple network aggregation engine modules. The multiple network connection termination modules may be grouped by protocol specific or medium specific transceiver/interfaces.

The network aggregation engine 11 may handle the configuration of the network aggregation device and all related interactions with external inputs. A device configuration store 24 may provide persistent data storage for device configuration information such as a network aggregation policy.

The network aggregation engine 11 may handle queries from external sources, such as configuration parameters of a network management protocol such as Simple Network Management Protocol, for example. The interface 10 may be a protocol agent and may provide for communication with a Network Management System (NMS) or operator system for configuration of the aggregation engine by the definition of an aggregation policy. Control and management information may be transferred between the network aggregation device 23 and the NMS or operator system through the interface 10 via any available or specifically designated network connection 19, 20, 21 and 17 through any transceiver interface 14, 15 and 16.

In accordance with an aspect, multiple network connections may be combined to form an aggregated network connection 22, as disclosed in further detail herein. Each individual network connection may be configured with a maximum communication traffic rate, which may be expressed as a bit rate in bits per second.

The network aggregation engine 11 may be implemented in software for execution by a processor in the network aggregation device 23, or in hardware such as by means of a Field Programmable Gate Array (FPGA) or other integrated circuit, or some combination thereof. The network aggregation engine 11 may be implemented in a distributed manner by distributing aggregation engine intelligence to the network connection termination module 25.

The network aggregation engine 11 may receive traffic from client network connection device 18 through a network connection 17 provided through a transceiver interface 16. The client network connection device 18 may be any device including, without limitation, a router, switch, or media converter that is capable of providing termination for a single or multiple client nodes, where nodes are any devices capable of connecting to a network irrespective of protocol or interface specificity. In various embodiments, traffic may be received over multiple network connections through a single or multiple transceiver interfaces. The network aggregation engine 11 may accept all traffic from the client network connection, may provide encapsulation and segmentation services for the traffic for transmission through the aggregated network connection 22, and may transmit it over any of the network connections 19, 20 and 21 through any of the transceiver interfaces 14, 15 and 16. The network aggregation engine 11 may handle segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

The network aggregation engine 11 may poll the state of network connections 19, 20 and 21, for example as per configured intervals stored in the device configuration store 24, to ensure that all network connections configured in an aggregated group are within configured acceptable tolerances. If a network connection 19, 20, and 21 exceeds acceptable tolerance values for any of the polled parameters, the network aggregation engine 11 may remove the network connection 19, 20, and 21 from within the aggregated network connection 22 without removing it from the polled network connections list. By leaving the removed network connection 19, 20, and 21 in the polled network connection list, the network aggregation engine 11 may aggregate the network connection into the aggregated network connection 22 once it has come back within acceptable tolerance values. This may ensure that a network connection may change states between residing in an aggregated network connection 22 or not, without the intervention of an external system or input. The network aggregation engine 11 may handle notifications to all end points configured within the device configuration store 24 with internal events such as changes in network connection state, threshold violations on configured thresholds for any number of configurable variables for any object within or connected to the network aggregation device 23. The network aggregation engine 12 may also handle events such as changes in the state of a network connection 19, 20, and 21 included in the aggregated connection, changes in latency of a network connection included in the aggregated network connection 22, scheduling changes, event logging, and other events.

Figure 3B:
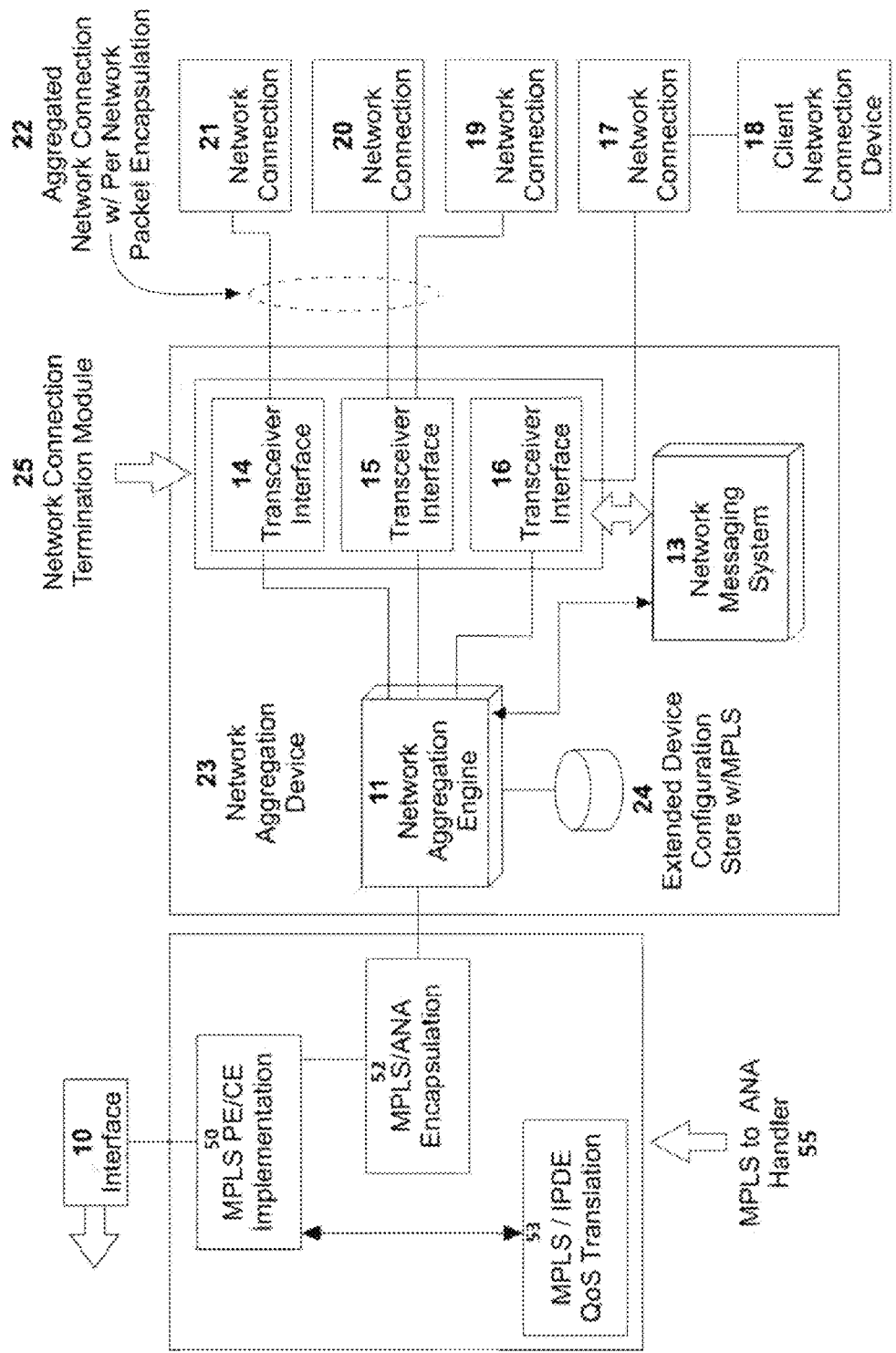
FIG. 3B is a block diagram of a communication device incorporating a particular embodiment, demonstrating the device as an aggregation means on the client/CPE side of a network connection.

FIG. 3B is another block diagram of a communication device acting as a client or CPE, as an example embodiment.

The network aggregation engine 11 in FIG. 3B may handle the configuration of the network aggregation device and all related interactions with external inputs. An extended device configuration store with MPLS capacity 24 may provide persistent data storage for device configuration information such as a network aggregation policy and MPLS related configuration information and policies. MPLS related configuration information may include label lookup table, forwarding table, routing table, labeling and mapping policies, and/or MPLS provider information.

The network aggregation engine 11 may handle queries from external sources, such as configuration parameters of a network management protocol such as Simple Network Management Protocol, for example. The interface 10 may be a protocol agent and may provide for communication with a Network Management System (NMS) or operator system for configuration of the aggregation engine by the definition of an aggregation policy. Control and management information may be transferred between the network aggregation device 23 and the NMS or operator system through the interface 10 via any available or specifically designated network connection 19, 20, 21 and 17 through any transceiver interface 14, 15 and 16.

In one exemplary embodiment, the described system can transport MPLS packets back and forth between MPLS core network and ANA link aggregation connection(s) so as to enable extending communication of MPLS packets beyond the edge of the MPLS core network, using ANA link aggregation technology. The system can include specific mechanisms for enabling the transport of the MPLS packets (e.g., data packets leaving MPLS core network and entering ANA) using transcoding/translating and then encapsulation for ANA link aggregation connection(s), in a way that maintains the integrity of the MPLS packet, including processing instructions such as those related to QoS. In the reverse transport flow, MPLS packets (e.g. data packets leaving ANA and entering MPLS core network) can be de-encapsulated to remove ANA protocol and where appropriate, transcoding/translation in order to obtain the original data packet without affecting integrity, and in such a way that can enable further, if any, MPLS processing to happen automatically.

For example, encapsulation, as will be described further herein, can be handled either by MPLS-to-ANA Handler 55. The MPLS-to-ANA Handler 55 can be implemented either as the ANA client, the ANA server and/or the ANA protocol itself.

In the embodiment as shown in FIG. 3B, the network aggregation engine 11 may be connected to an MPLS to ANA Handler 55. The engine 55 may comprise an MPLS PE/CE implementation module 50, an MPLS/ANA encapsulation module 52 and an MPLS to IPDE QoS Translation module 53. During operation of transmitting data packets from client site CPE to MPLS core, network aggregation engine 11 may send the packet to the MPLS to ANA Handler 55. The data packet may be encapsulated via MPLS/ANA Encapsulation 52 based on specific MPLS configuration data in the extended device configuration store 24. The encapsulated data packet can then be sent to MPLS PE/CE implementation module 50, which may further provide segmentation in a manner that avoids the fragmentation of aggregated communication traffic received through the client network connection device 18, when transmission occurs over the aggregated network connection 22 through any of the network connections 19, 20 and 21, by ensuring that the length of a packet/frame transmitted over any of the network connections 19, 20 and 21 is less than or equal to the configured or detected frame length for the respective connections in the aggregated network connection 22.

In addition, MPLS to link aggregation (or ANA) transcoding can be performed between the MPLS core and the Customer LAN via the MPLS to ANA Handler 55. In a direction from MPLS core to the edge, as an example, the CCPE MPLS protocol implementation can communicate with the MPLS core recognizing packets that are destined for the customer LAN located over the link aggregation session serviced by the a CCPE implementation. At this point, the data packets with MPLS protocol can be transcoded and transmitted over the link aggregation session to the customer's CPE device with labels intact. When the packets reach the ANA CPE device, the CPE device can transcode from link aggregation ANA to MPLS again and deliver the packets on to the customer LAN.

In one embodiment, the virtual (logical) link aggregated from a variety of diverse or dissimilar network connections through a single or multiple transceiver interfaces may be implemented over one physical link to encompass a single link aggregation for MPLS Edge with a bi-directional IP Quality of Service (QoS) achieved.

In one exemplary embodiment, data packets with MPLS protocol may be transmitted across the MPLS core and arrive at the CPE side of a network connection with MPLS label(s). The MPLS labels can be retrieved and/or parsed by the CPE device 124 (e.g. by an MPLS to ANA Handler 55) in order to determine further processing of the packet. In the system described herein, (1) the MPLS labels can be acquired from the data packet with MPLS protocol (or also known as "MPLS packet"); (2) a table (such as a distribution table) maintained within or connected to the CPE device 124 can cause the destination associated with the data packet and/or the MPLS label to be determined and accessed, and to retrieve corresponding rules (from e.g. Extended Device Configuration Store 24) to determine how to distribute the data packet over aggregated network connections; (3) if corresponding MPLS processing rules are found these may be used for distribution of the data packet over aggregated network connection(s); and if (4) no corresponding MPLS processing rules are found the data packet is not handled. In the case of (4) the system may default to IP processing rules.

The MPLS packet can include a header that can be used for sub-processing. The sub-processing can include IPDE to QoS transcoding or translation by MPLS/IPDE QoS Translation module 53. This involves transcoding or translating the QoS request associated with a packet, as opposed to the packet itself. This now enables the link aggregation ANA system to handle the MPLS packet based on the associated QoS requests, and also ensure that those QoS requests remain intact for handling by MPLS PE/CE at the destination. The packet's integrity is maintained, including its MPLS label.

Once transcoding/translation is done, ANA encapsulation may occur. An encapsulation technique used can be MPLS network compatible or MPLS aware. This can be accomplished by using MPLS protocol as part of ANA encapsulation by MPLS/ANA Encapsulation module 52.

Extended Device Configuration Store 24 can allow ANA system to process MPLS packets. It may contain some of the same information that is used to perform the MPLS to IPDE QoS translation.

The system can continue to apply the QoS requests and therefore handling of MPLS packets continues to happen within ANA in a way that is consistent with transport of MPLS packets on an MPLS network. The packets are not necessarily modified, rather, handling of the MPLS packet can occur based in part on ANA rules that are made to adhere dynamically to MPLS handling rules.

In another embodiment, a similar process may operate in a reverse direction: MPLS packets may come out of ANA link aggregation connection first by de-encapsulating, and then translating/transcoding so as to provide the MPLS data packets.

In one embodiment, the network aggregation engine 11 may poll the state of network connections 19, 20 and 21, for example, as per configured intervals stored in the device configuration store 24, to ensure that all network connections configured in an aggregated group are within configured acceptable tolerances. If a network connection 19, 20, and 21 exceeds acceptable tolerance values for any of the polled parameters, the network aggregation engine 11 may remove the network connection 19, 20, and 21 from within the aggregated network connection 22 without removing it from the polled network connections list. By leaving the removed network connection 19, 20, and 21 in the polled network connection list, the network aggregation engine 11 may aggregate the network connection into the aggregated network connection 22 once it has come back within acceptable tolerance values. This may ensure that a network connection may change states between residing in an aggregated network connection 22 or not, without the intervention of an external system or input. The network aggregation engine 11 may handle notifications to all end points configured within the device configuration store 24 with internal events such as changes in network connection state, threshold violations on configured thresholds for any number of configurable variables for any object within or connected to the network aggregation device 23. The network aggregation engine 12 may also handle events such as changes in the state of a network connection 19, 20, and 21 included in the aggregated connection, changes in latency of a network connection included in the aggregated network connection 22, scheduling changes, event logging, and other events.

Figure 4:
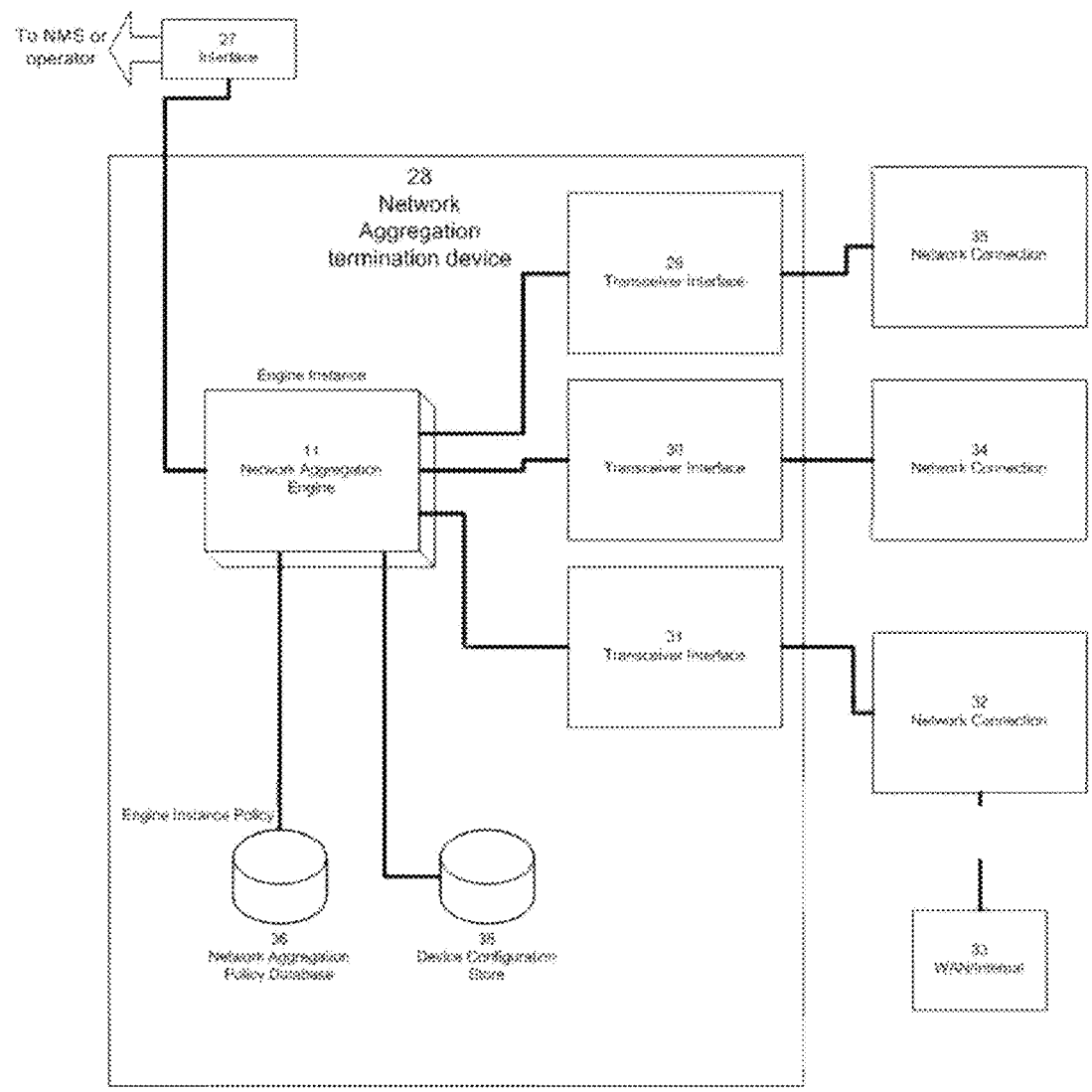
FIG. 4 is a block diagram of a communication device providing aggregation means on the server/concentrator side of a network connection, exemplary of an embodiment.

FIG. 4 is a block diagram of a communication device acting as a server/concentrator, exemplary of an embodiment.

The network aggregation engine 11 may provide access to a network aggregation policy database 36 which stores configuration information related to the various aggregated network connections that terminate on the aggregated network connection device 28. The network aggregation termination device 28 may be implemented in such a manner that each aggregated network connection defined in the network aggregation policy database 36 is handled by its own virtual instance, the use of which enables termination of each aggregated network connection from multiple customer premises equipment (CPE).

Figure 5:
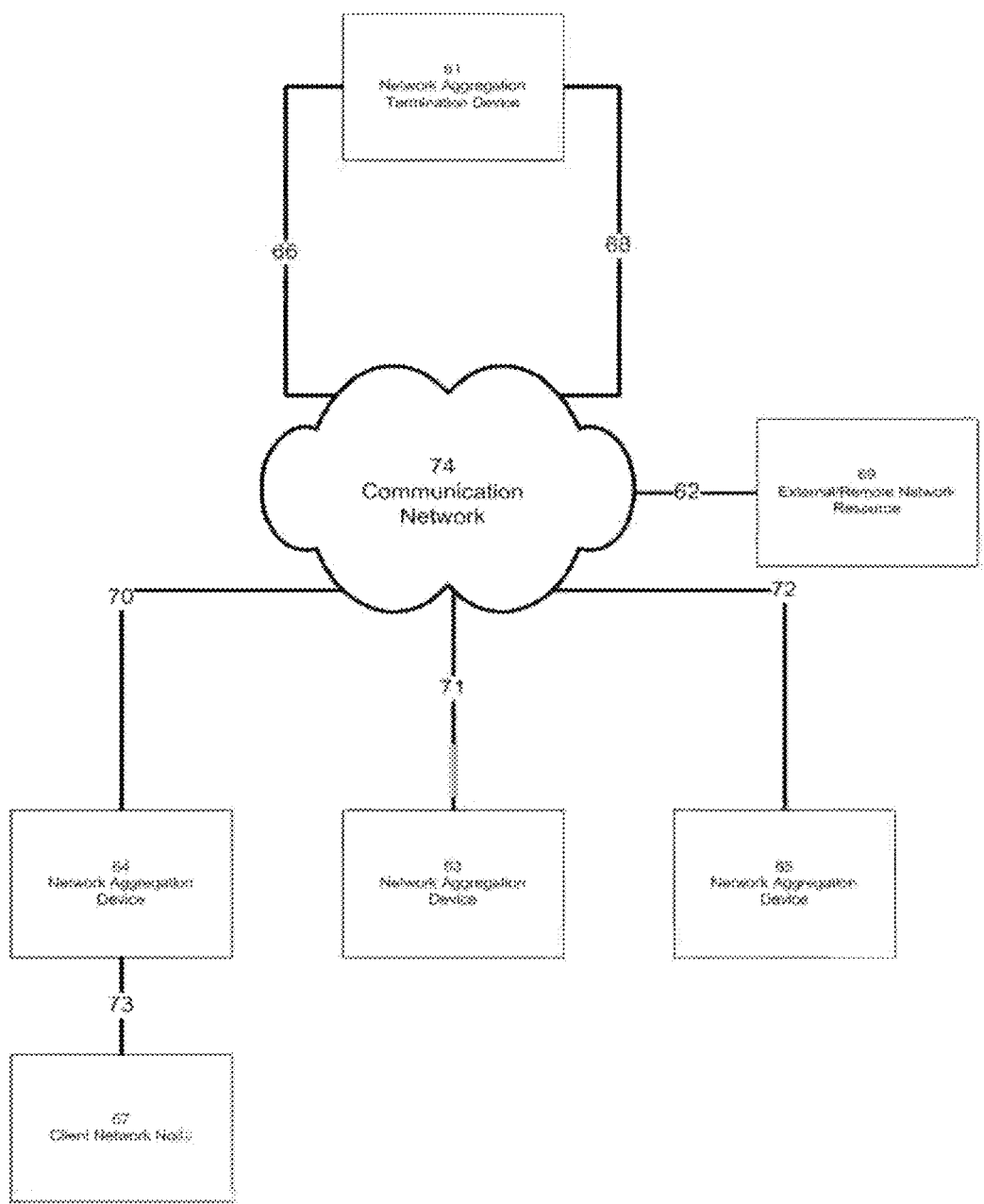
FIG. 5 is a block diagram of a communication network providing aggregation means on both the client/CPE side and server/concentrator side of a network connection, exemplary of an embodiment.

FIG. 5 is a block diagram of a communication network acting as a client/CPE and server/concentrator, exemplary of an embodiment.

In accordance with an embodiment, aggregated network connections 70, 71 and 72 may be built by network aggregation devices 63, 64 and 65, which terminate to a single aggregated network connection termination device 61 through network connections 66 and 68 as their endpoint. The aggregated network connection termination device 61 may access external communications networks through network connections 66 and 68 to access external/remote network resource 69. Access to external communications networks may be provided by the aggregated network connection termination device 61 by using either network connection 66 or 68 through the use of a routing protocol, such as Border Gateway Protocol (BGP), Open Shortest Path First (OSPF) protocol, or through the use of simpler mechanisms such as load sharing over multiple static routes within the communication network 74 that acts as the valid next-hop for the aggregated network connection termination device 61.

Aggregated network connections 70, 71 and 72 may provide access to client network nodes 67 connected to the network aggregation devices 63, 64 and 65 through the aggregated network connections 70, 71 and 72 to communications networks 74 accessible by the aggregated network connection termination device 61.

A client network node 67 may request data provided by an external/remote network resource 69 accessible through a communication network 74. This request for the external/remote network resource may be routed over the network connection 73 providing access from the client network node 67 over the aggregated network connection 70 to its end point which is the aggregated network connection termination device 61. This may be done through the communication network 74 by way of the network connection 66 into the aggregated network connection termination device 61. Any data sent by the external/remote network resource 69 may be routed back through the aggregated network connection termination device.

A particular embodiment may use the Internet as the communication network 74 referenced in FIG. 5. However, the communication network 74 may alternatively be built by multiple sub-networks created through the use of multiple network aggregation devices 63, 64 and 65 with aggregated network connection termination device 61 end points through multiple network connections 66 and 68.

Figure 6:
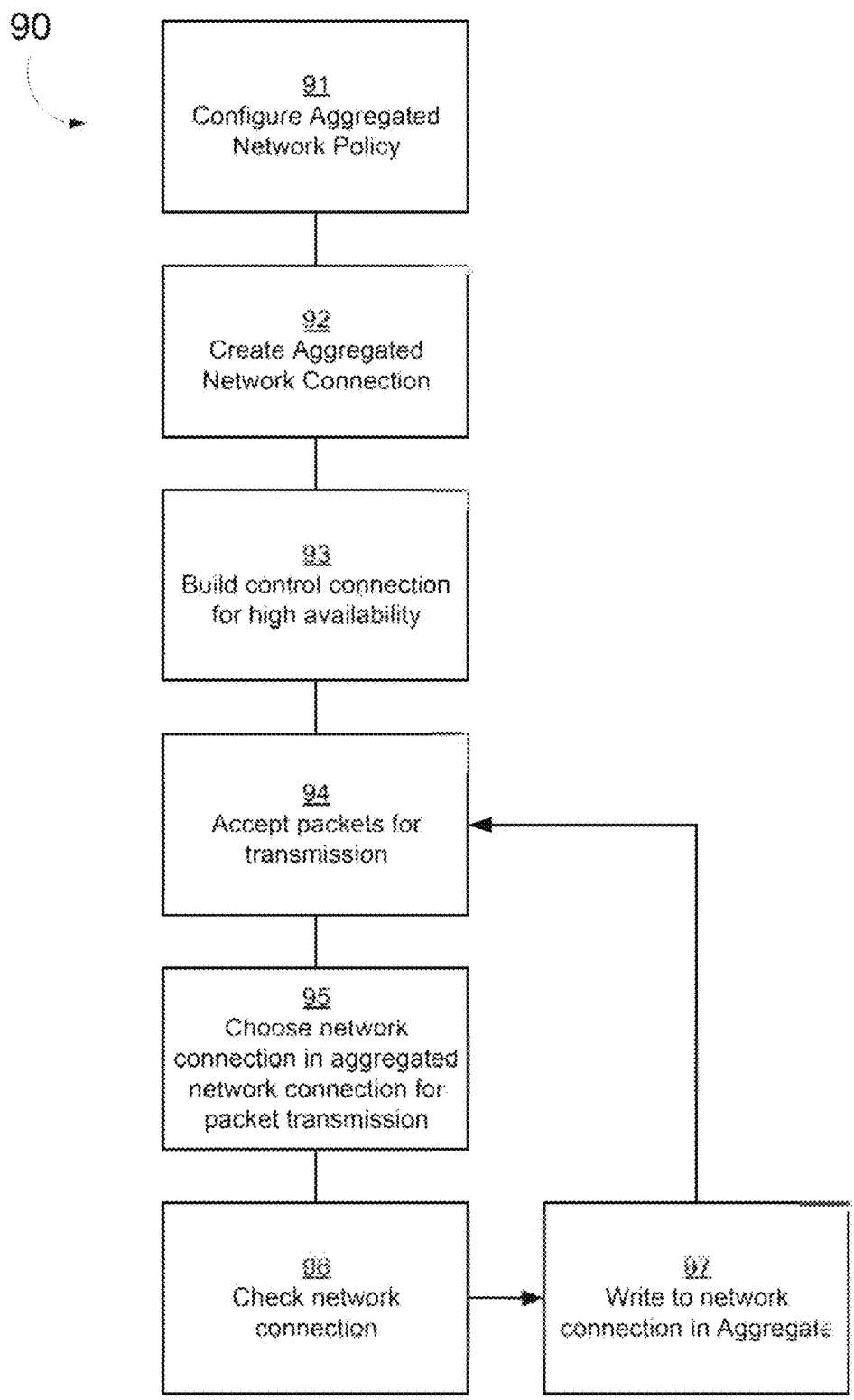
FIG. 6 is a flow diagram of a method of providing redundancy and increased throughput through a plurality of network connections in an aggregated network connection, exemplary of an embodiment.

A further aspect relates to the provisioning of high availability over the aggregated network connection by the network aggregation engine 11. FIG. 6 illustrates a method of providing redundancy and increased throughput through a plurality of network connections in an aggregated network connection. The method 90 may begin with a step of configuring a plurality of network connections 91 through the creation of a network aggregation policy to form 92 the aggregated network connection. The aggregated network connection may be initialized as per the network aggregation policy. Control connections may be created 93 for the plurality of network connections configured as part of the aggregated connection to allow the aggregation engine 11 to manage the membership of a network connection within the aggregated connection. The network aggregation engine 11 may accept packets for transmission 94 over the aggregated network connection 22. The network aggregation engine 11 may choose a network connection 95 among the group of network connections configured 91 in the aggregate in the stored aggregation policy for transmission of the current packet being transmitted. The choice of network connection for transmission of the current packet may be specified within the aggregation policy and may take into account data provided by the control connection built at 94.

According to an embodiment, a non-responsive network connection may be easily detected when using latency and packet loss as a measure. The mechanism for detecting 96 and adapting to 97 the network connection change within an aggregated network connection may be implemented within the data transmission routine in the aggregation engine 11 or as a separate process in parallel to the transmission routine in the aggregation engine 11 to allow for further flexibility in provisioning redundancy within the aggregated network connection.

Since this may occur on a per packet basis as opposed to on a per stream basis, a single non-responsive network connection may not affect the aggregated network connection and may allow data transmission to continue regardless of the individual states of network connections so long as a single network connection within the aggregated network connection is available for data transmission.

Example in Operation

Figure 7A:
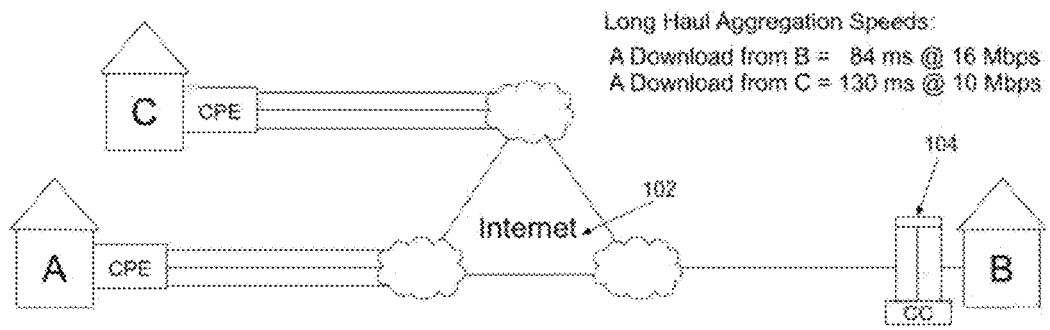
FIG. 7A illustrates a prior art network architecture where long haul effects apply, and presents network performance based on download speed.
Figure 7B:
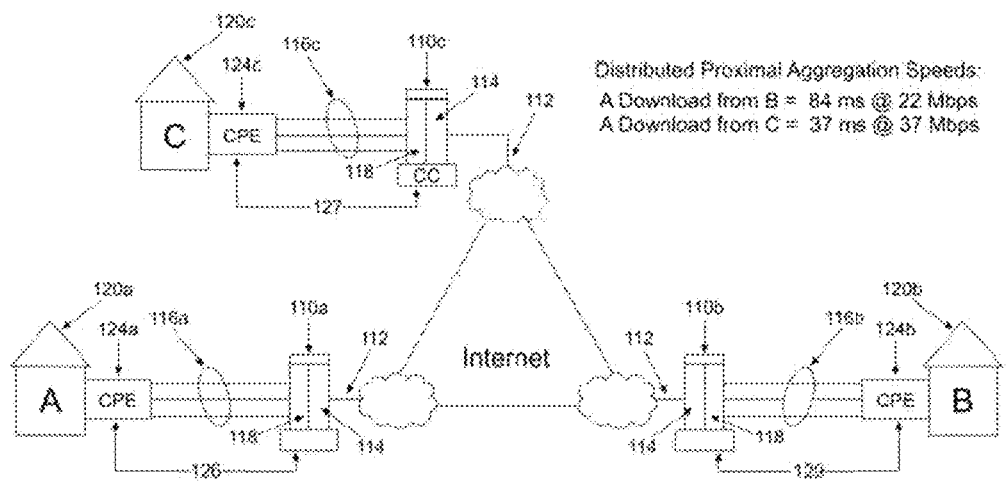
FIG. 7B illustrates, in similar network conditions as in FIG. 7A, an embodiment that reduces long haul bonding/aggregation, improved network performance based on faster download speed.

In one possible implementation, 3 locations are provided namely Site A, Site B, and Site C, and Site D. FIGS. 7A and 7B illustrate network performance as discussed herein. FIG. 7A illustrates performance with long haul effects. FIG. 7B illustrates performance with reduction of long haul effects, based on the embodiments disclosed herein in network conditions otherwise similar to those on which FIG. 7A is based.

FIG. 7B shows an improvement in performance over FIG. 7A, based on reduction of long haul effects in relatively long distance network communications are implemented using the network architecture.

Embodiments disclosed herein therefore may provide improved network performance relative to speed and performance. Other aspects of network performance are also improved, based on embodiments disclosed herein, for example latency.

Overview of Cloud Provisioning

As detailed herein, cloud provisioning may be implemented using a collection of applications including a cloud based Network Manager (Orchestration) 140 and an automated cloud management portal (orchestration portal) 100 (see e.g. FIG. 2E). The Network Manager 140 and the portal 100 may provide orchestration and automation of a wide area network through providing virtualized network services and other applications. These services and applications can cooperatively provide Software Controlled Networking (SCN) solutions using distributed points-of-presence across a region. Network Manager 140 and Portal 100 cooperate to provide a cloud-based interface that enables comprehensive network management and automated provisioning.

In an embodiment, the Network Manager 140 and Portal 100 may be implemented to provide the following features to provide SDN or SCN solutions:

| SD WAN (SDN) | IP Networking | Network Manager 140 and Portal 100 | Advanced Functions of Network Manager 140 and Portal 100 |
|---|---|---|---|
| Orchestration | Management Plane | SCN Portal | Multi-System Integration (OE, Tickets, NMS, CPE API) |
| Control Plane | Forwarding Plane | CC Multi-PoP | Virtual Control Plane (FIB, VE to ViF, OSPF) |
| Data Plane | Route Table | CPE | Virtual Data Plane (Routes, ANA Vif, DG or OSPF) |
| Encryption | IPSec | Security | Transparent Encryption (LL & Core Transport) |

OTT—Lower Plane Infrastructure

| Core/Cloud Infrastructure | Internet | Multi-PoP (Multi-Peer, NNI, CNI) | iBGP |
|---|---|---|---|
| Site/Branch Infrastructure | Internet or Private Line | Cable, ADSL, etc. | IP, MPLS, Ethernet |

The SCN solutions may be implemented as a software layer on top of existing carrier networks, creating virtual networks for business customers across one or more regions. The SCN solutions may provide WAN and Internet optimization using existing infrastructures, and create faster high performance networks for lower cost with centralized provisioning, monitoring and management of networks.

In an embodiment, SCN solutions may include Zero Touch Provisioning (ZTP) for efficiently pre-configuring devices for customer premises.

In an embodiment, SCN solutions may be managed through an automated management and provisioning portal that can help shrink operational costs while managing the user's Quality of Experience, as further elaborated below.

In an embodiment, SCN solutions may be implemented as Software Defined Services using Over-The-Top Virtual Network Solutions without equipment replacement of routers and switches along the network path.

Embodiments of a cloud provisioning system disclosed herein may include cloud based Network Manager 140, which may include or be operably connected to a cloud-based automated network management portal 100, as well as associated applications. The cloud based Network Manager 140 may be connected to the existing network 112 (e.g. Internet or a core network) through one or more of CCs 110 or one or more POPs 130.

In an embodiment, the present solution provides improved efficiency and customer service for networking and telecommunications providers, eliminating many tasks and touch points on customer premises (CPE) and network infrastructure.

In an embodiment, the present solution, in conjunction with customer premise equipment (CPE), may be implemented using a single, low cost cloud-managed device. In an embodiment, the present solution allows service providers to seamlessly integrate network optimization as a service and control these features from a cloud-based management portal.

In an embodiment, virtual features are built into the software providing WAN optimization and Internet optimization, using acceleration to increase WAN and Internet throughput, aggregation to increase WAN and Internet bandwidth, IPQS to provide bi-directional quality assurance for WAN and Internet traffic, and seamless failover to provide high availability for WAN and Internet, and a single sign-on cloud portal improves quality of service while reducing operational costs. The CPE and services may be remotely provisioned, monitored and managed.

In another embodiment, the Network Manager 140 may comprise one or more of the software modules listed in table below:

| | |
|---|---|
| Billing | This modules addresses billing related items, such as reports and viewing bandwidth usage or client uptime. |
| Dashboard | This modules addresses main landing page with appropriate logo and menu, both of which can be customized. |
| IP Management | This modules manages IP address spaces and IP assets, assignment, reassignment, adding and removing IP assets. |
| Jobs | This modules addresses management of periodic tasks and activities that need to be performed for the operation of the Network Manager 140 and the Portal 100 as a whole |
| Monitor | This modules addresses activities related to monitoring and troubleshooting devices, mostly read-only information to view behavior and gather feedback about devices and infrastructure in the field |
| Operations | This modules addresses activities used by the operations department to provision and configure devices in preparation for delivery to customers |
| Sales | This modules addresses order entry point for internal use and gathering of customer information. |
| Site | This modules addresses global items related to the Portal 100, menu, messages, emails and errors. |
| Staging | This modules addresses image buring and verification for devices. |
| System Admin | This modules addresses management of the system, user management, tier management, site wide caching, roles and permissions. |

Figure 8A:
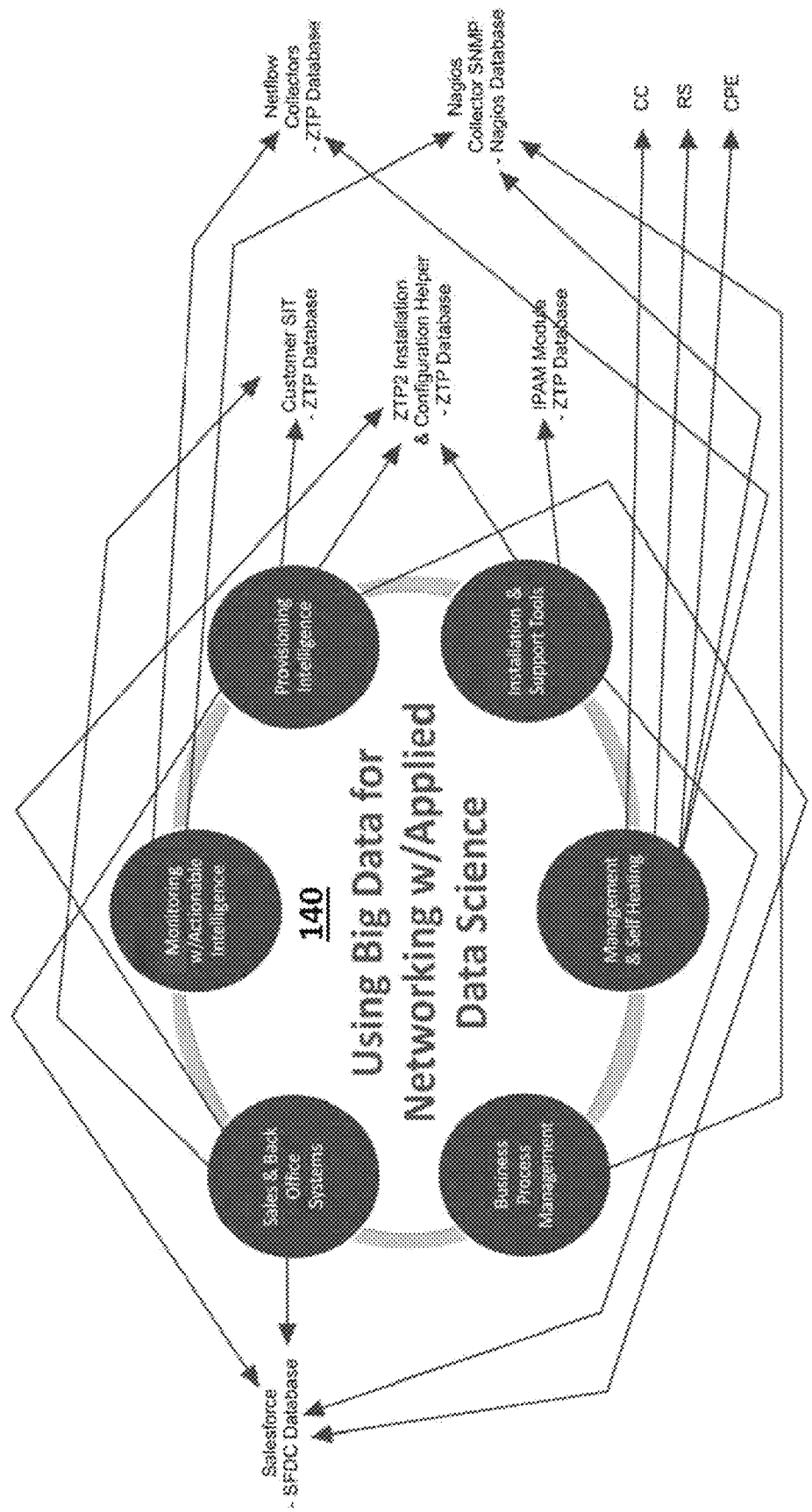
FIG. 8A illustrates a cloud provisioning system, exemplary of an embodiment.

FIG. 8A schematically illustrates a cloud provisioning system, exemplary of an embodiment. In this example, the cloud provisioning system may be configured to use big data for networking with applied data science. Data from various sub-systems or modules (e.g. sales and back office systems, business process management, provisioning intelligence and so on) may be collected.

Network partners can benefit from advanced network data science and traffic analytics to run their networks, all without requiring to login to every CPE device.

Figure 8B:
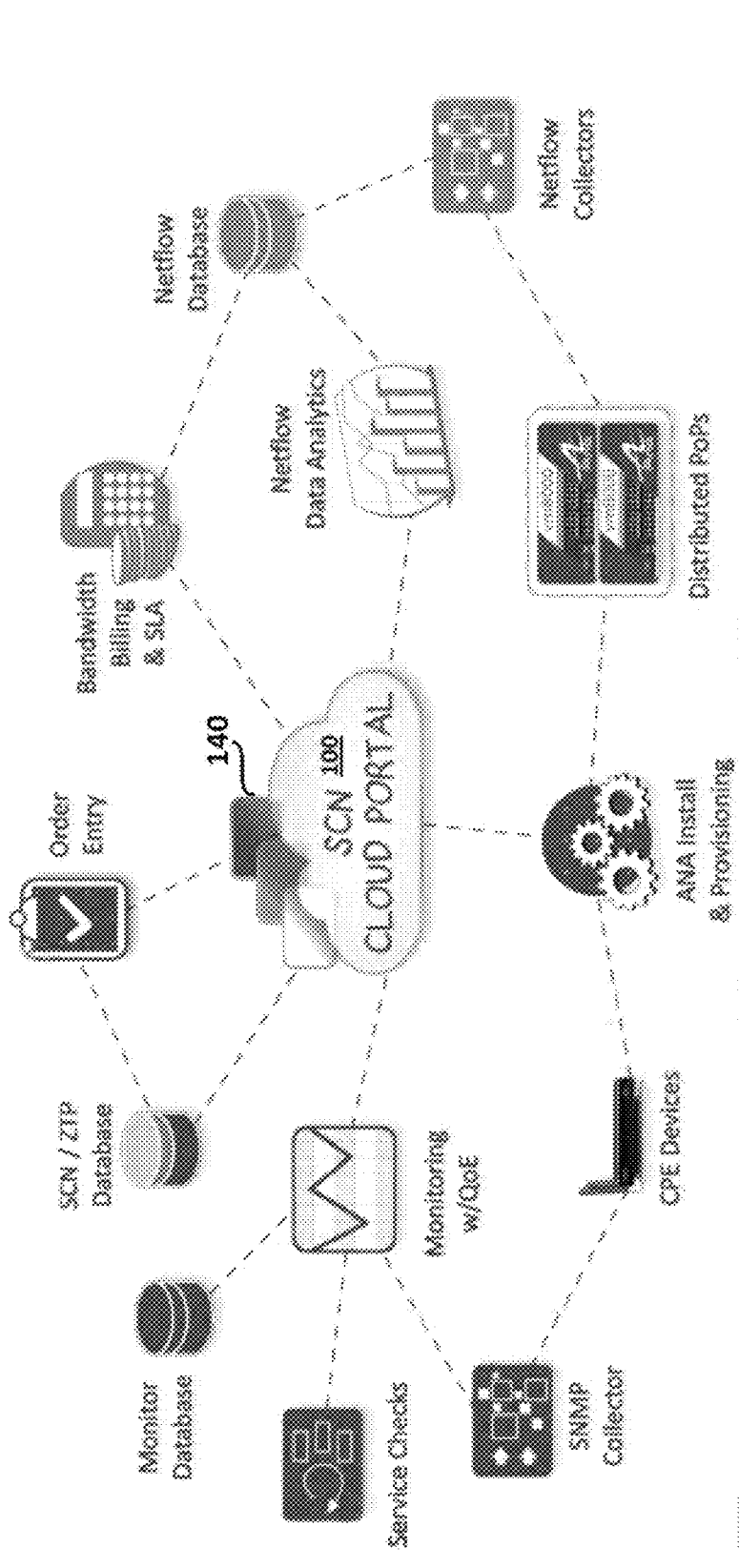
FIG. 8B illustrates an electronic portal in a cloud provisioning system, exemplary of an embodiment.

Referring to FIG. 8B, an electronic Management Portal 100 may be provided, which facilitates management of networks. The portal may help shrink operational costs while managing the user's Quality of Experience (QoE). The Management Portal 100 may also be referred to as a ZTP Portal 100 or SCN Cloud Portal 100 (or more generally as Portal 100) throughout this disclosure. The Management Portal 100 may involve a vertically integrated multi-systems implementation that connects a variety of management, monitoring and provisioning systems into a unified cloud management application, such as Network Manager 140.

As shown in FIG. 8B, the Management Portal 100 ties various systems together and presents complex tools through a convenient interface for network operators and end customers.

In an embodiment, the cloud provisioning network may be managed through the Management Portal 100 which allows partner operators to control the provisioning, configuration and deployment of the Autonomous Network Aggregation (ANA) solution to customers using a friendly Web-GUI with features including:

Order Entry
Zero-Touch Provisioning
Install and configuration
Quality-of-Experience
Monitoring and Management w/Advanced Traffic Analytics
Self-healing Network capabilities able to fix and recalibrate connections remotely
Automatically optimize WAN and Internet performance as network conditions change
Multi-Systems Integration In an embodiment, the Management Portal 100 provides access to a suite of functions and widgets that work with an authenticated API on the CPE device to send and retrieve information and configuration data.

In an embodiment, once a customer orders a CPE device, a Zero Touch Provisioning process provided at Management Portal 100 can automatically pre-configure the CPE device with parameters relating to customer and service information prior to shipment. When a customer receives the pre-configured CPE device, the CPE device may automatically connect to the Internet and join a virtual network. The CPE device may also be pre-configured to automatically perform device calibration. Further, the CPE device may be pre-configured to automatically register with a monitoring system and/or a remote management system.

Figure 9:
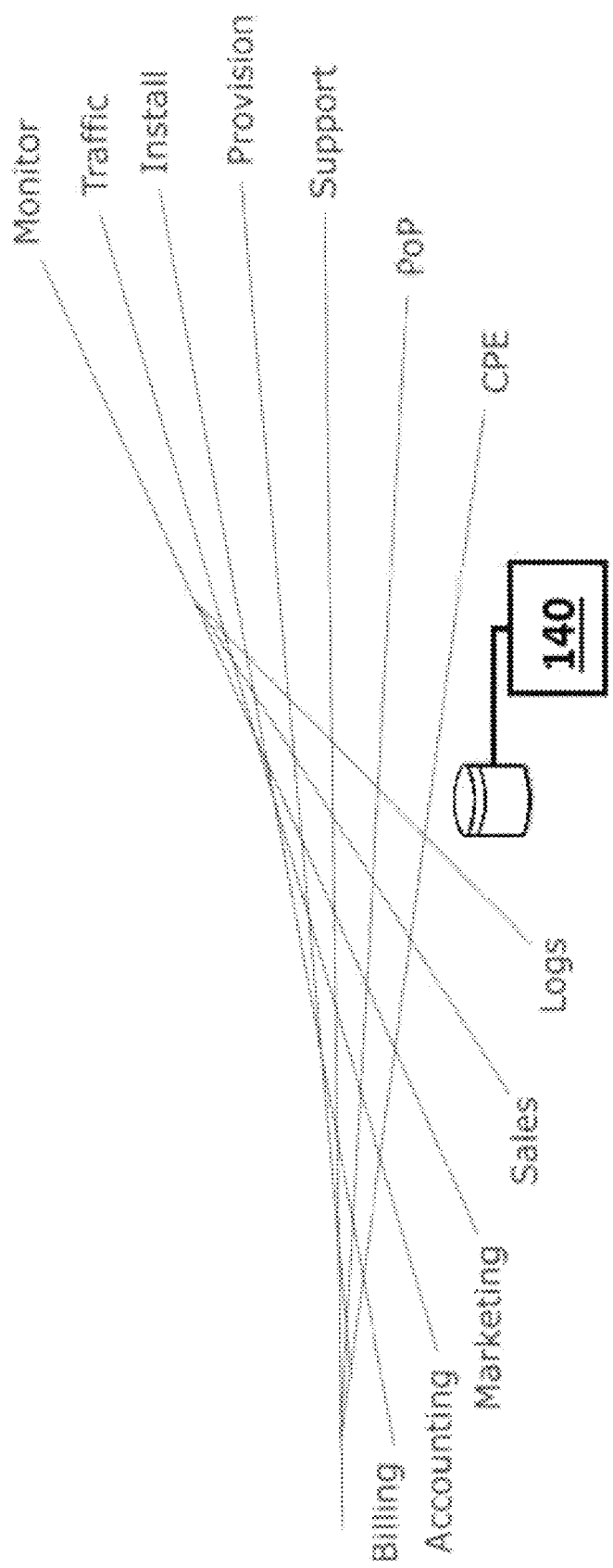
FIG. 9 illustrates multiple data sources in a cloud provisioning system, exemplary of an embodiment.

FIG. 9 illustrates multiple data sources or systems that may be connected directly or indirectly to the Management Portal 100 in a cloud provisioning system, exemplary of embodiments. For example, part or all of billing, accounting, marketing, sales, logs, CPE, PoP, support, provision, install, traffic and monitor may be integrated into the cloud provisioning system, providing real or near real time data to the Management Portal 100.

In an embodiment, the cloud provisioning system also provides autonomy and flexibility as it is customizable based on customer requirements, offer requirements and specific needs without physical interventions to the system; and it is more reactive to customer needs, as easy as a screen refresh.

In addition, the following advanced portal features may be provided to customers and users at large:

Remotely Provision Additional Services with ZTP;
Add another Link to Increase the Bandwidth;
Prioritize Application Traffic with QoS;
Use full solution of business IP services;
CPE Bandwidth, Uptime and Tools;
Alerts with more business intelligence; and
VoIP support tools.

In an embodiment, the cloud provisioning system and the Management Portal 100 may further offer improved operational efficiency/lower OPEX:

Building and managing low-cost, high quality IPSec VPN and remote access
Service scalability with quick and simplified service deployment
Focus on core business and leverage network management
Reduce IT/Telecom overhead
Turnkey solution that easily integrates with existing infrastructure
Maximizes human resources, systems/IT resources, application resources, and truck roll resources.

In an embodiment, the cloud provisioning system and Management Portal 100 interface also can provide increase Intelligence using Multiple Data Sources:

Assistance: Installation, Configuration, Provisioning, Support Tools/Wizards;
Alerts: More Intelligence with Business Process Management;
Action: Rapid Response with Data Intelligence; and
Adaptive: Self-Healing Network and OSS Technology Analytics: Network and Application Reporting and Analysis.

In an embodiment, the cloud provisioning system and the Management Portal 100 can enhance the user's experience via features such as:

IP Traffic: Netflow Advanced IP Traffic and Flow Information
Monitoring: SNMP Monitoring Information and Alerts Information
Logs: CPE and Concentrator Log Information
Tickets: Ticket System Information
Device Info: CPE's, Concentrators, Route Servers, Application Servers
IPAM: IP Address Management Information and Statistics
Installation: Installation and Configuration Information and Statistics.

The Cloud Based Network Management System

As described in this disclosure, one or more CPE devices or other types of network equipment can be linked to one or more network connected server or cloud concentrators (CC). The CPE devices and the server or cloud concentrators can form a network overlay, connected to a plurality of wired or wireless networks ("multiple networks"), and may provide improved network performance (including using link aggregation). The CPE devices or other types of network equipment may include, without limitation, routers, switches, load balancers, physical and/or virtual computing equipment such as servers, desktops, terminals, storage area network devices, and so on.

A Cloud Based Network Manager (or simply "Network Manager") 140 as shown in FIG. 2E may also be referred to as cloud provisioning services 140. As shown, the Network Manager 140 can be operably linked to one or more network servers and/or network overlays (including multi-POP clusters), implementing one or more cloud based network management functions that enable the deployment and management of network solutions, which in real time (or near real time) selectively uses and/or manages the multiple networks, including data paths, communications resources, upstream providers, and other network decision points. The Cloud Based Network Manager 140 may be accessed by one or more authorized users using a computer device that connects to the Cloud Based Network Manager (or "network manager") 140 via a Management Portal 100 using a network connection. The Cloud Based Network Manager 140 can facilitate deployment and management of network solutions, regardless of particular networks used to carry data packets or the geographic location of senders/recipients. In an embodiment, the Network Manager 140 provides a software defined networking solution.

As used herein, software defined networking solution relates to (a) the capacity of removing physical network switch management and capabilities from the hardware, and providing this capacity using software, based on a custom Application Program Interface (API) that connects to hardware elements, and (b) the capacity of removing switch logic and control from hardware. More specifically, the Cloud Based Network Manager 140 can enable the decoupling of control plane from data plane on network switches or routers, and can further enable replacing of the control plane with a software controller having an interoperable and/or customizable API.

Network communications may be managed through software components that connect to network components (e.g., switches or routers) via an API, rather than middleware or firmware on those network components. Consequently, the cloud provisioning technology and the associated Cloud Based Network Manager 140 disclosed herein provide virtualization, in software network components, of network equipment or elements such as physical switches and routers. Therefore, the Cloud Based Network Manager 140 can also be referred to as "software defined network manager" that operates in the cloud.

The cloud provisioning technology and the Cloud Based Network Manager 140 disclosed herein may be implemented for any type of network configuration, including a network architecture without network aggregation/bonding technology.

In an embodiment, a Cloud Based Network Manager 140 can be an application that communicates with various network and/or business entities such as disparate collectors, alerting systems, log file systems, sales, provisioning, and ticketing systems, creating a more powerful and centralized control centre and visualization for users. In addition, it may also monitor and communicate with routers, switches, load balancers, physical and/or virtual computing equipment such as servers, desktops, terminals, storage area network devices. The system has the ability to add Operations Support Systems (OSS) in the same manner and can dynamically configure/re-configure devices such as the CPEs, switches, or routers using custom or open API's. As mentioned, customers and administrators may access the Manager via a Management Portal 100.

As shown in FIGS. 8A, 8B and 9, a Cloud Based Network Manager 140 can treat existing Simple Network Management Protocol ("SNMP") and Netflow monitoring and collection systems as third party collectors that can facilitate alerting services on the third party system or within the Management Portal 100. The system can optionally layer Business Process Management and Intelligence to setup more advanced logic for alerts and troubleshooting tools.

In one embodiment, the NetFlow system can collect IP traffic statistics from all Concentrators (i.e. CCs). The data can be uploaded to the a persistent data store or database 149 operably connected to the Network Manager 140, at which the traffic analytics can be conducted. For example, each CC may send netflow data to a netflow collector, which is operably linked to a central SCN data store 149, as shown in FIG. 16A. The Management Portal 100 can access the database 149 to display various traffic views. For instance, a bandwidth utilization based on a port or protocol may be displayed, which can aid operators in diagnosing overuse of particular services or ports.

The Management Portal 100 may provide many views depending on predetermined settings and/or the role of the user (e.g. Partner, Customer, Administrator, etc.). The Portal 100 may further provide automatic provisioning of network architecture in accordance with some aspects, as described in this disclosure.

In an embodiment, the Network Manager 140 can aggregate and parse one or more categories of data below from multiple data sources, and provide a corresponding Network View via Portal 100, which can provide:
  SNMP monitoring system/SNMP collector information
  Netflow collector/analyzer collecting advanced IP traffic information
  ticket system gathering last known ticket/support activity summary
  live data from a CPE device for real-time on-device statistics
  device configuration information from a configuration database and live devices (routers, switches, servers, etc.)
  determine and present relevant log data from centralized logs database
  produce a QoE (Quality of Experience) score based on the information above In an embodiment, the Network Manager can aggregate and parse data from multiple data sources, and provide a corresponding Device View via Management Portal 100, which can provide:
  SNMP monitoring system/SNMP collector information
  Netflow analyzer collecting advanced IP traffic information
  ticket system gathering last known ticket/support activity summary
  live data from a CPE device for real-time on-device statistics
  device configuration information from a configuration database and live CPE
  determine and present relevant log data from centralized logs database
  produce a QoE (Quality of Experience) score based on the information above In one embodiment, instructions embedded in each service check can use established rules for when services should be assigned a status including 'Critical', 'Warning', 'Unknown' or 'OK'. For instance, service checks can be displayed normally, but when a service check is not able to be completed, a status information can be filled with the last returned result and the status of a Home-POP link can be indicated to be OK. The following is an example of a CPE service check logic:

| | CPE Service Check Logic Example | | |
|---|---|---|---|
| | OK - SNMP Reachable | Unknown SNMP - CPE Overloaded | Sustained Unknown SNMP |
| Lower-Link Check | Return normal check: "OK: Line1 Connected" | Return OK status, ascertained by the Home-PoP ping status. Previous/Last returned status of the check is displayed | Display an Unknown status, instead of the de factor 'Critical' status. The last returned SNMP result is displayed; no e-mail alert. |

The Network Manager 140 can include a data logger or a data collection utility 143 that collects and logs network performance data, and then stores the network performance data to a centralized or distributed log database. The Network Manager 140 can further determine and present relevant log data from the centralized or distributed log database. A variety of data may be collected from different systems, in different data formats or structures. The Network Manager 140 can aggregate and process all the data for further analyzing. In some embodiment, the centralized log database may be central SCN database 149.

The Network Manager 140 can also include an analytics layer (e.g. network performance analysis utility 145) that is configured to analyze the network performance data stored in a database (e.g. central SCN database 149). For example, network performance analysis utility 145 can generate network performance scores (e.g. QoE) in real time or near real time.

The Network Manager 140 can further include a network configuration utility 147 for configuring or reconfiguring various components and network links, e.g., client site network component or CPE 124, network server components or CC 110. The network configuration utility 147 may also perform a variety of services such as monitoring, provisioning, or initiation of network overlays 126, 129, network paths, client site network components 124, network server components 110, access points, point(s)-of-presence 130, and so on.

The Network Manager 140 can reconfigure, through the network configuration utility 147, network paths using the network overlay 126, 129 based on a variety of factors including log data and/or network performance data gathered in real time or near real time.

The Network Manager 140 can further take corrective action based on application of predictive analytics.

In addition, there may be an API on the CPE devices—information on the CPE may be recorded and extracted live, and therefore users do not need to log into the CPE, either for provisioning purposes or management purposes. This is because cloud to machine transactions are being used, as opposed to machine to machine, or user to machine. As described elsewhere in this disclosure, a Management Portal 100 can be the user interface to display a variety of information to facilitate automated provisioning. That is, CPE devices can be initiated, configured, and deployed automatically into the cloud based Management Portal 100.

Figure 14:
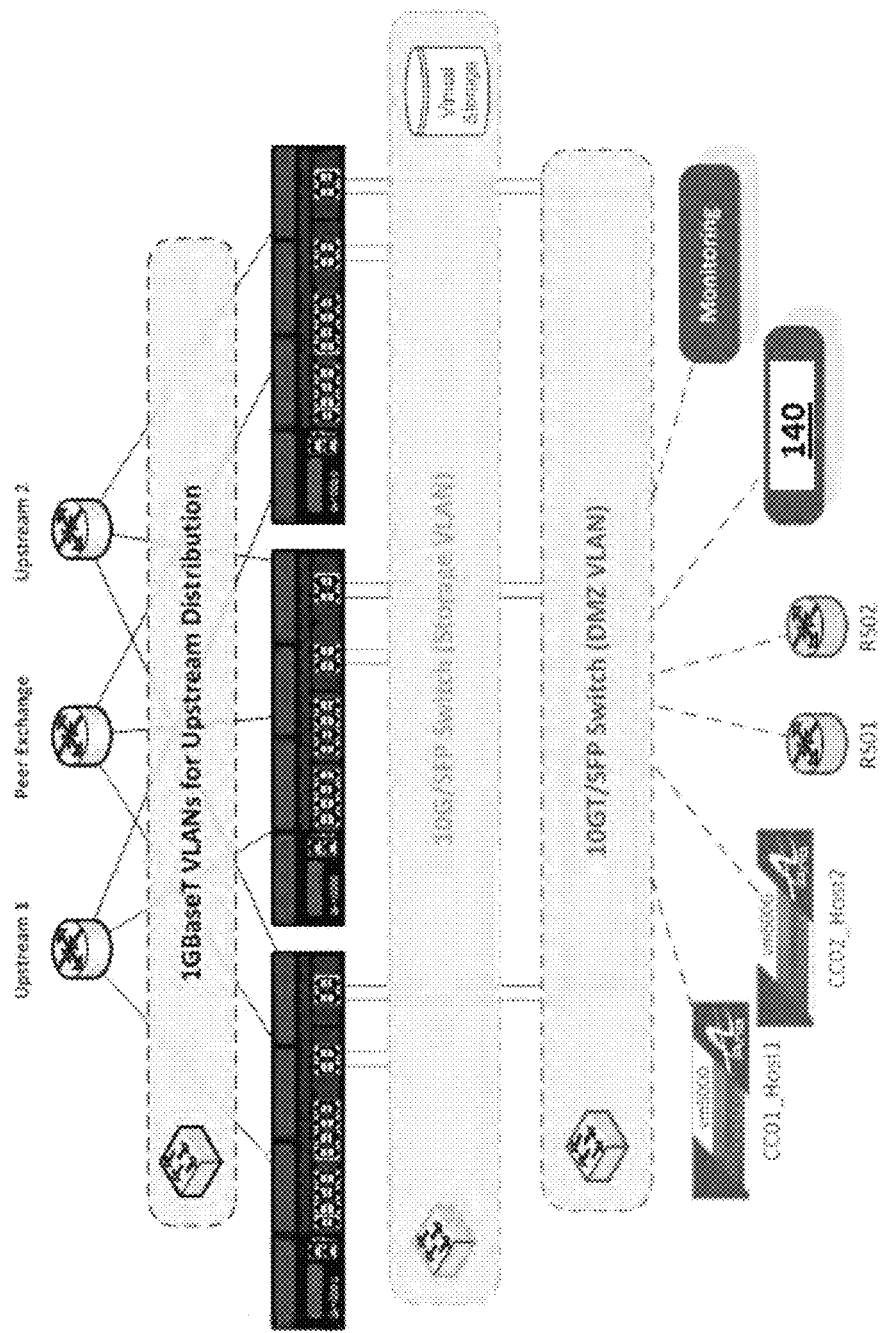
FIG. 14 illustrates various architecture components of a Cloud Based Network Manager, exemplary of an embodiment.
Figure 15:
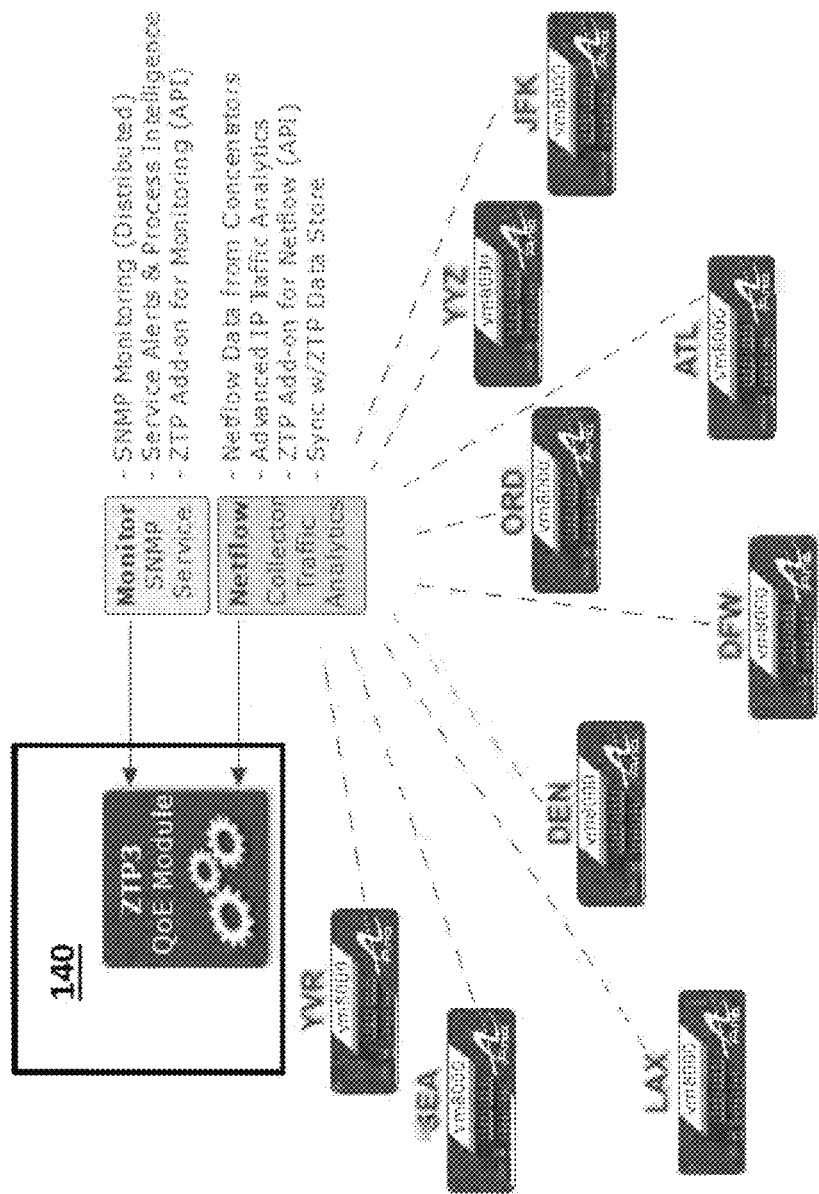
FIG. 15 illustrates additional architecture components of a Cloud Based Network Manager, exemplary of an embodiment.

As shown in FIGS. 14 and 15, the Cloud Based Network Manager 140 application implemented on one or more servers may be connected to a plurality of network or system entities, facilitating monitoring of various network performance data such as SNMP and Netflow data. The SNMP and Netflow collector infrastructure may include distributed collectors and SQL conversion.

Generally speaking, Netflow collectors (or CC) can use UDP for transport, which may or may not be reliable over the Internet. In another embodiment, as illustrated in FIG. 16A, Netflow collectors may be installed at each POP to avoid losses and may use PostgreSQL client on each collector to inject records directly to central SCN data store 149.

In an embodiment, raw files can be stored on cloud or Netflow collectors for a period of time. For example, raw files can be stored for 2 to 3 days. In another embodiment, raw files may be stored for as long as needed.

Netflow collectors, sometimes as part of a data collection utility 143, can run nfcapd from nfdump package, which can run specific command every time a new file is created.

Specific commands can be scripted using nfdump capability to export data to CSV as intermediate format and then import CSV to SQL using postgresql client. Alternatively, as another example, a Perl (or other scripting language) module can be implemented to work with nfdump data to convert and inject it to SQL directly in single program.

In an embodiment, the Cloud Based Network Manager 140 can provide automatic provisioning of CPEs, CEs, server concentrators and POPs for a variety of purposes such as to add sites, or add or modify network services to existing sites, and so on.

In an embodiment, the Cloud Based Network Manager 140 can streamline the deployment of multi-site network solutions using zero touch provisioning (ZTP). ZTP may enable smooth deployment of network solutions without physical access to network components, where normally access to at least some network components would be required.

In an embodiment, the Cloud Based Network Manager 140 can provide a cloud based provisioning system that enables deployment/management using an "SDN type" management interface.

In an embodiment, there is provided a cloud and software based network management solution (e.g. Cloud Based Network Manager 140 and Management Portal 100 interface) that does not require physical integration into network infrastructure in order to improve performance, by applying selectively performance improvement strategies in real time or near real time. The Cloud Based Network Manager provides a software-defined networking solution.

In an embodiment, the Cloud Based Network Manager 140 can combine, configure or reconfigure proximal aggregation at client sites, and multi-POP across distal sites, in order to improve network performance.

The Cloud Based Network Manager 140 can utilize data analytics, including predictive analytics, to improve Quality of Experience (QoE), across a multitude of possible communication links. The network overlay, as described above, can function as a data collection network that collects real time or near real time network performance data from various network points and communication links associated with the solution. In addition or as an alternative, a data collection utility 143 may be implemented to collect data in real time or near real-time from various network points such as CPE devices, disparate collectors, alerting systems, log file systems, sales, provisioning, and ticketing systems, creating a more powerful and centralized control centre and visualization for users. In addition, it may also monitor and collect data from routers, switches, load balancers, physical and/or virtual computing equipment such as servers, desktops, terminals, storage area network devices.

A database stored locally or on cloud data storage device can be continuously updated with information from the data collection network and this database (e.g., central SCN database 149) can be queried by a network performance analysis utility 145 so as to generate dynamically analysis data relevant to improving configuration of communication links on the fly, for example by modifying the network paths that carry packets, by modulating communication link aggregation dynamically, based on real time or near real time performance of one or more networks or paths in an aggregated link.

An aspect of the data analytics can include analysis of real-time, near real-time or historical data that can predict network performance issues which may affect network performance, including QoE. The data analytics (e.g. network performance analysis utility 145) may apply one or more predictive algorithms for predicting network performance issues such as link failure.

In another aspect, the network performance analysis utility 145 can use pattern recognition and machine learning techniques to generate network performance insights. The resulting insights may be used to train the predictive algorithms. This may occur in real time or near real time, thus addressing dynamic factors affecting network performance.

The network performance analysis utility 145 can implement data science techniques to managing network performance, without the need for integration into the network infrastructure of any network. This allows the network management solution to intelligently manage selective access to multiple networks in order to provide improved performance while utilizing available resources efficiently.

The network performance analysis utility 145 can be capable of processing a great volume of network data in real-time or near real-time, applying big data for the purposes of network management and improvement of network performance. In particular, the system can be configured to receive aggregation of data across different network management systems, and also automatically aggregating across multiple points across a network (e.g. through a bonded/aggregated connection).

The network performance analysis utility 145 can use network performance insights to build rules dynamically for addressing network performance issues.

In an embodiment, there is an intelligent network implemented firewall that utilizes the architecture described, and the network performance analysis utility 145 to detect and respond to network attacks, or network vulnerabilities (as they emerge) to network attacks.

The network management solution (e.g. Cloud Based Network Manager 140 and Management Portal 100) provide advantages particularly to multi-site customers that require WAN, Internet, and voice communication solutions, and converge between these communications.

In an embodiment, automatic provisioning of the network architecture and its associated components (e.g. CPEs, CEs, server concentrators and POPs) may be performed separately from network management.

In another embodiment, the network management solution (e.g. Cloud Based Network Manager and Management Portal 100) may offer the following services to the users: network management (including traffic management, alerts), managing sites (IPAM and provisioning, installation and configuration), and network performance support. For example, a Netflow database on data storage device may allow a user to see a screen that shows the "top ten talkers" in a user group (see. e.g. FIG. 18).

In another embodiment, aspects of the database storage architecture enable logging of information, in real time or near real time, from multiple sources and fast retrieval, as well as facilitate efficient analysis across different sites and so on.

When a user wishes to manage a site or a device, or monitor a site or device, the user may need a monitoring solution that pulls information from the relevant devices, such as a router etc.; or the user would have access to a platform that collects information from different devices, such as Netsuite. A platform solution such as Netsuite may allow the users to see information, across different devices. However, to actually initiate changes, a user normally needs to use a separate tool to log into each individual device and actively manage it. In contrast, the architecture in accordance with embodiments described in this disclosure associates a device (e.g. a CPE) with an API, and enables logging information in the cloud, where the API allows access to information but also control of various network components.

In an embodiment, the Cloud Based Network Manager 140 can connect to relevant links in real time and pull appropriate information, then create a single view in the Management Portal 100 that can show relevant information for a selection of devices. For example, the Portal 100 can generate advanced traffic management analytics.

In another embodiment, the Cloud Based Network Manager 140 can include an IPAM management system that simplifies workflows. For example, IP addresses may be generated and/or stored as an "asset" in the inventory management system.

Figure 17:
FIG. 17 illustrates a view of a Management Portal as provided by a Cloud Based Network Manager, exemplary of an embodiment.
Figure 18:
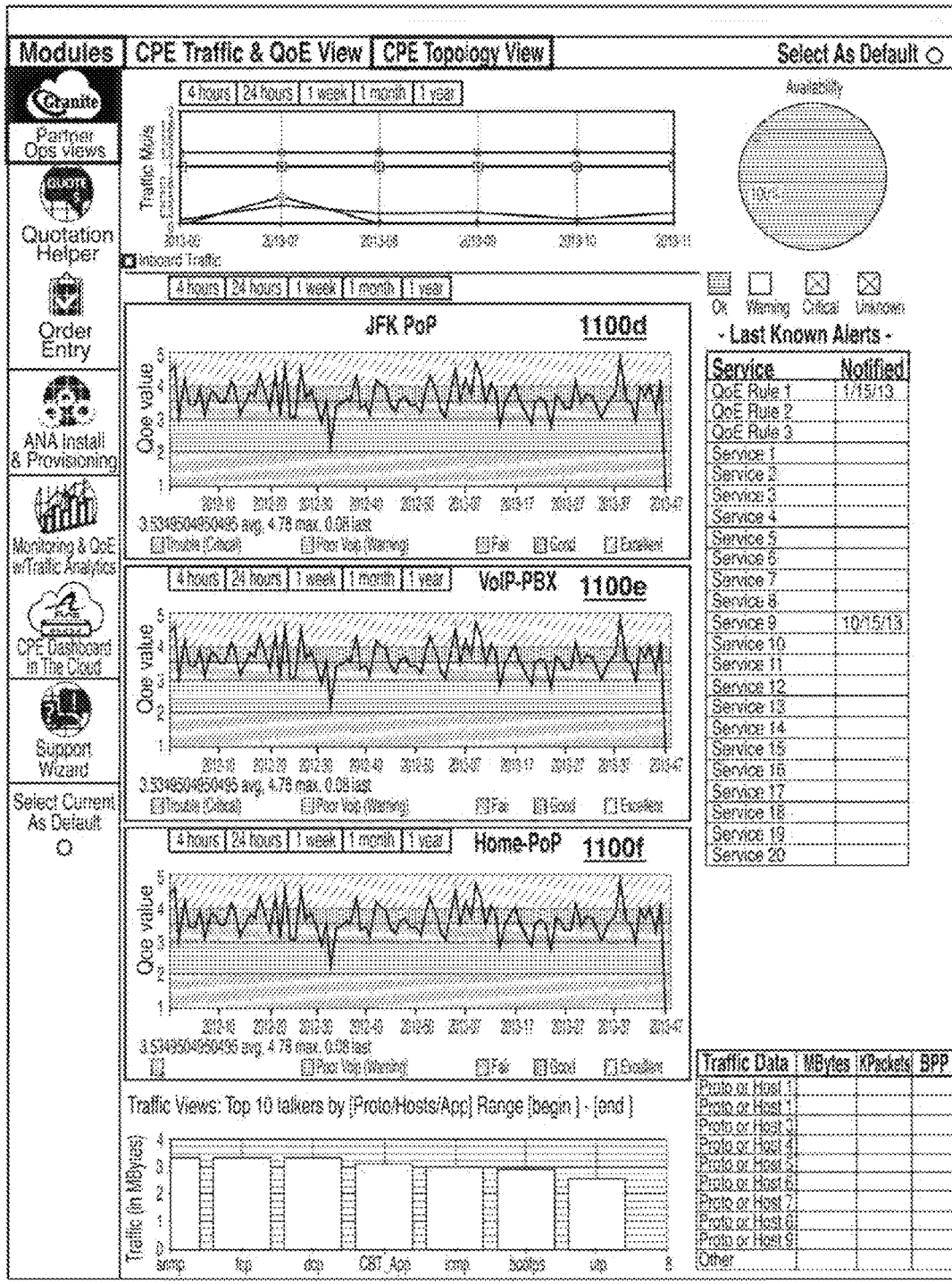
FIG. 18 illustrates another view of a Management Portal as provided by a Cloud Based Network Manager, exemplary of an embodiment.

FIGS. 17 and 18 illustrate example views of the Management Portal 100 as provided by a Cloud Based Network Manager 140 exemplary of an embodiment. In particular, FIG. 17 shows a tactical monitoring view of a particular network. As can be seen, performance of the network and its associated components are monitored in real-time or near real-time. For example, Network Outages, Network Health, Host Health, Service Health, Hosts, Services, and so on are viewable parameters.

FIG. 18 shows a Monitoring QoE view of a network provided by the Management Portal 100. In an embodiment, VoIP and Data quality from the CPE device to the PBX or Application server destinations may be monitored and measured to ensure quality of service.

In an embodiment, the Management Portal 100 may be configured to present QoE charts to provide visualizations of real time and historical performance. Such charts may provide a support team with end-to-end situational awareness, so problems may be quickly identified and dealt with. This may accelerate troubleshooting and repairs. In an embodiment, the Management Portal 100 can present a set of integrated graphs, reports, and tests. In an embodiment, the Management Portal 100 may provide a set of remote management tools that enable a customer or a system administrator to recalibrate and reconfigure devices to fix problems. In an embodiment, Management Portal 100 may be configured to provide collected data and associated analytics to a user-selected Network Management Platform.

In one exemplary embodiment, a Quality of Experience or QoE score may be synchronised to a subjective Mean Opinion Score (MOS) standard. Calculation of QoE may be based on latency, jitter or loss values, thereby making the QoE value a more robust indicator for link quality. In one instance, for lower-link QoE, QoE mechanism may be added to network aggregation links (e.g., at a MDPS or "Multi-Directional Pathway Selection") to obtain live link QoE information. For another example, QoE-check may be conducted via SNMP, where CLI commands may be added to networking node, so that QoE tests may update system SNMP OID for retrieval by any SNMP monitoring system to produce QoE results, including QoE graphs.

In one embodiment, MDPS is a pre-emptive network failover technology that generates or facilitates self-healing last-mile connection with no dropped VoIP calls and no IP address changes. All sessions and QoS configurations survive when any connection fails to ensure the user's Quality of Experience is not comprised from individual link outages. MDPS may be implemented in the following aspects: automated link removal and recovery, pre-emptive failover/bi-directional control, false positive checking, no dropped VoIP calls on failover, lossless data/TCP failover, one ping loss average <1 sec outage (e.g. 200 ms-2400 ms).

Figure 11A:
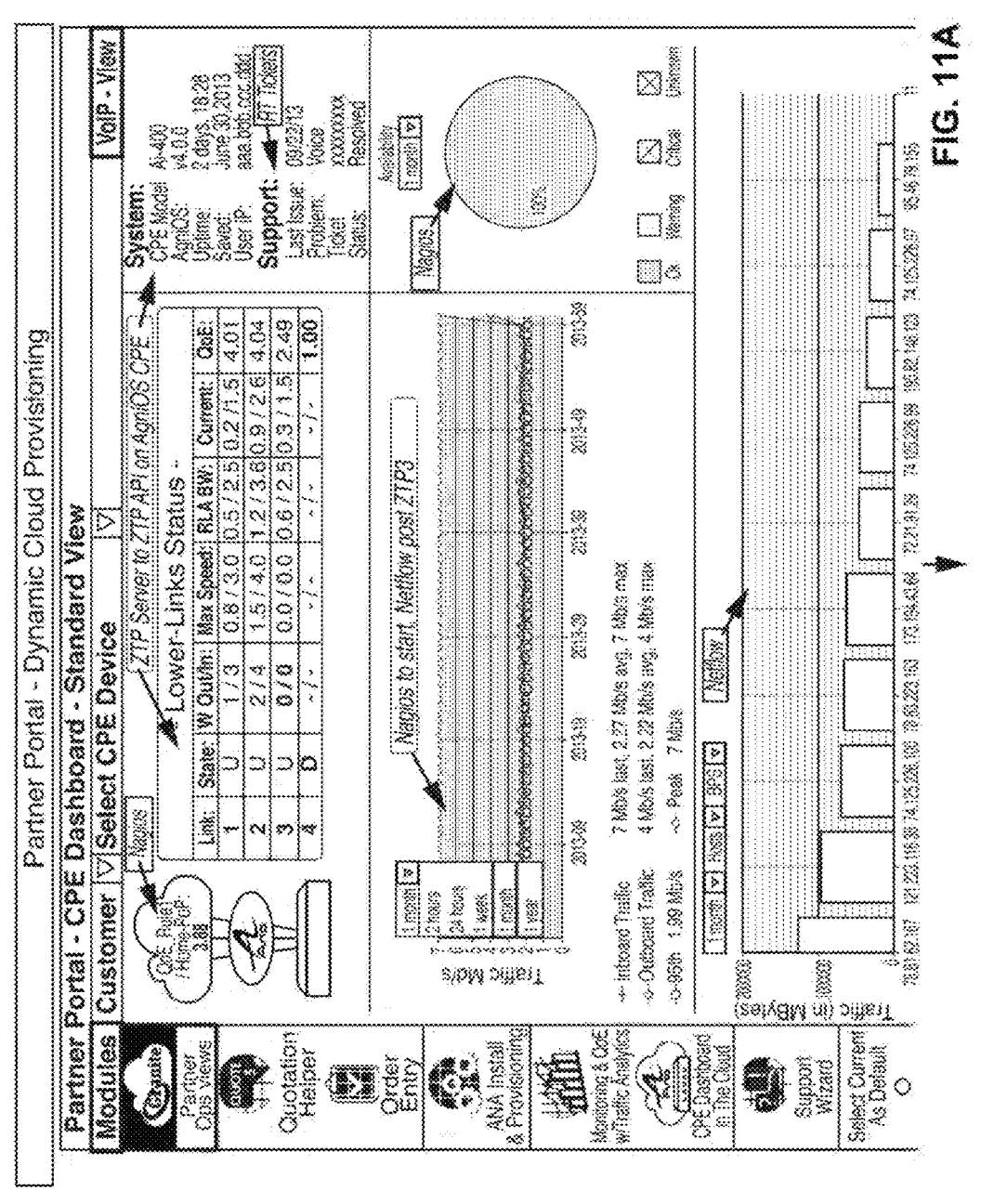
Figure 11B:
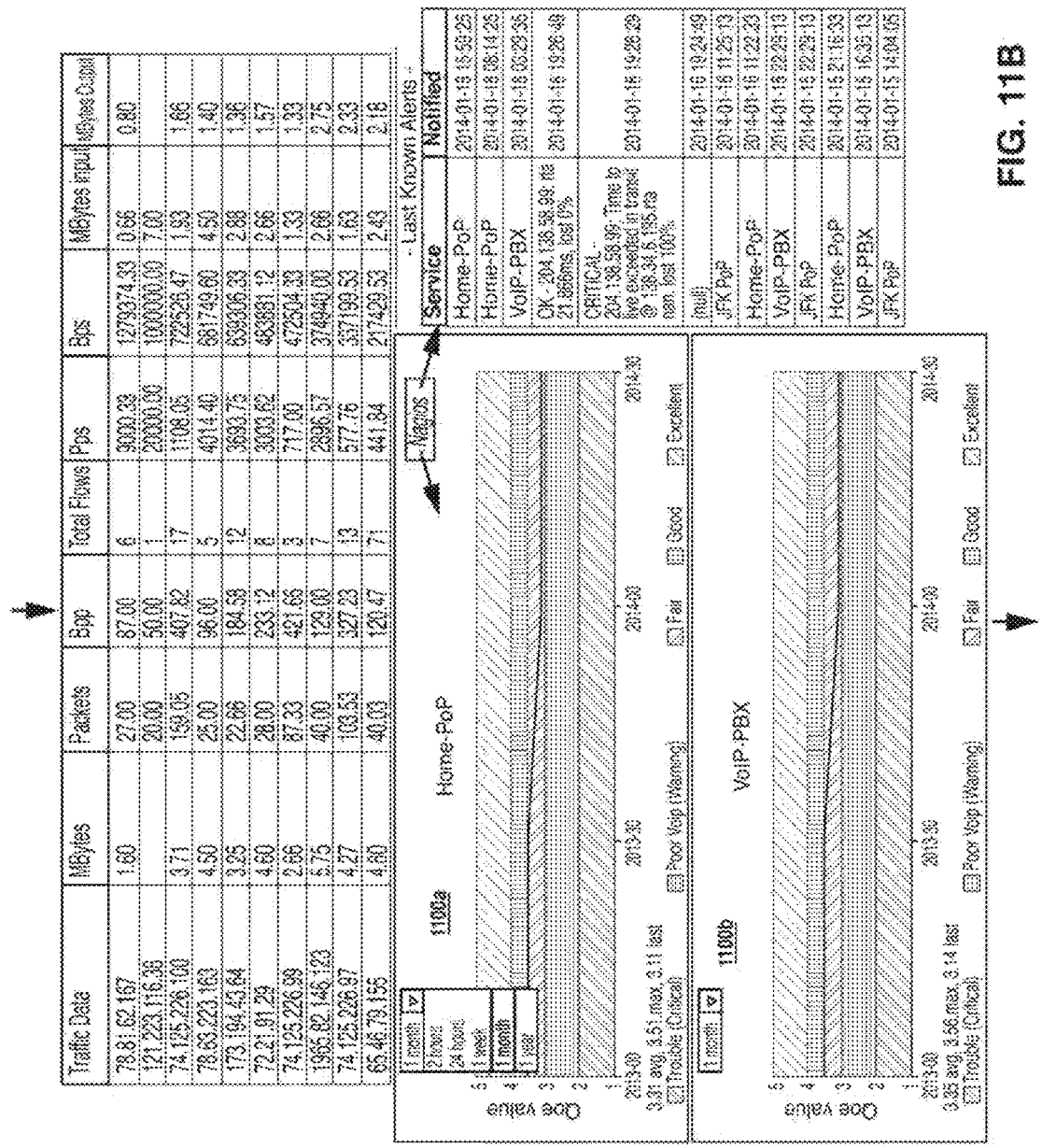
FIG. 11B illustrates a second portion of a CPE Dashboard standard interface shown on a Portal as provided by a Cloud Based Network Manager, exemplary of an embodiment.
Figure 11C:
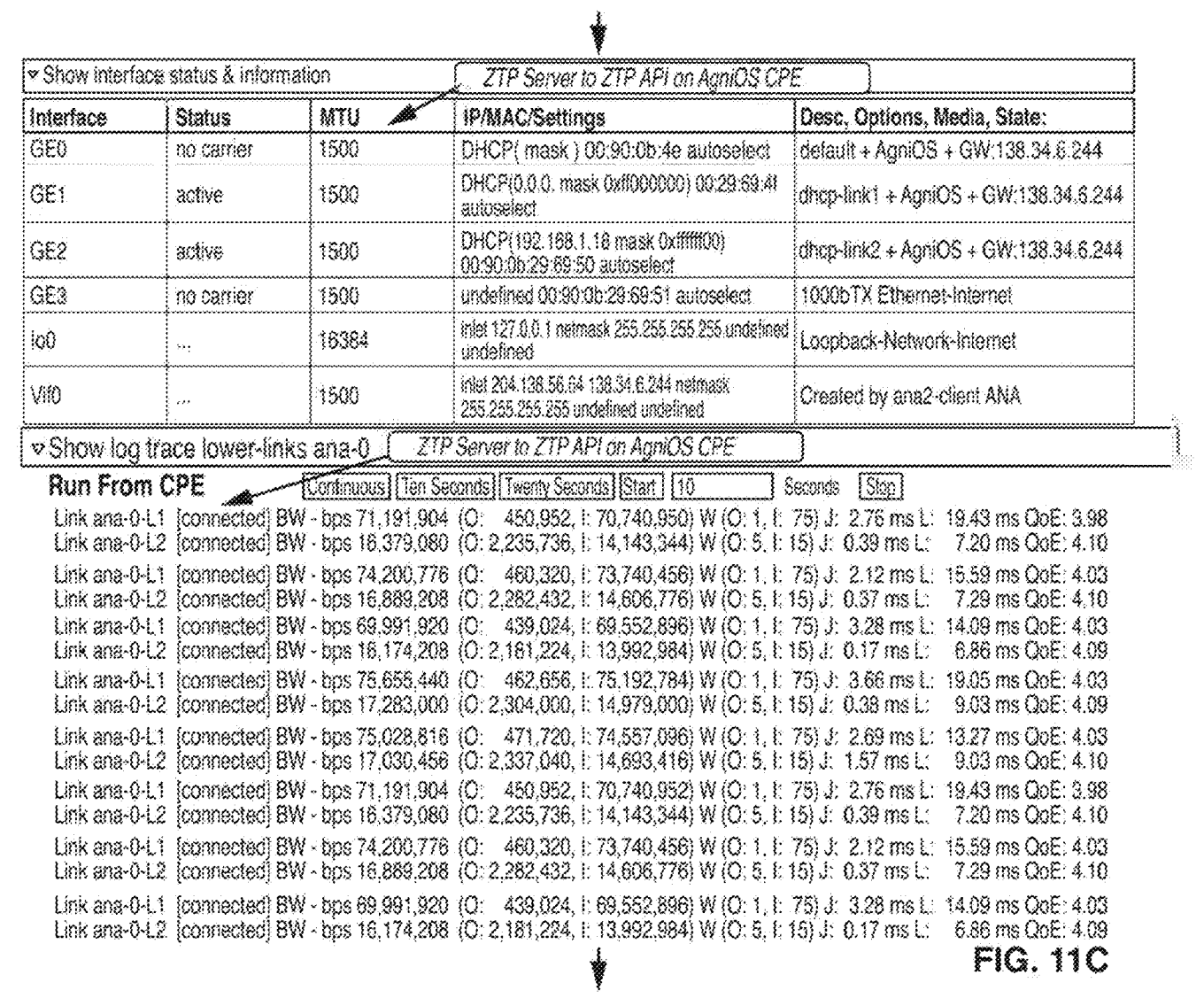
Figure 11D:
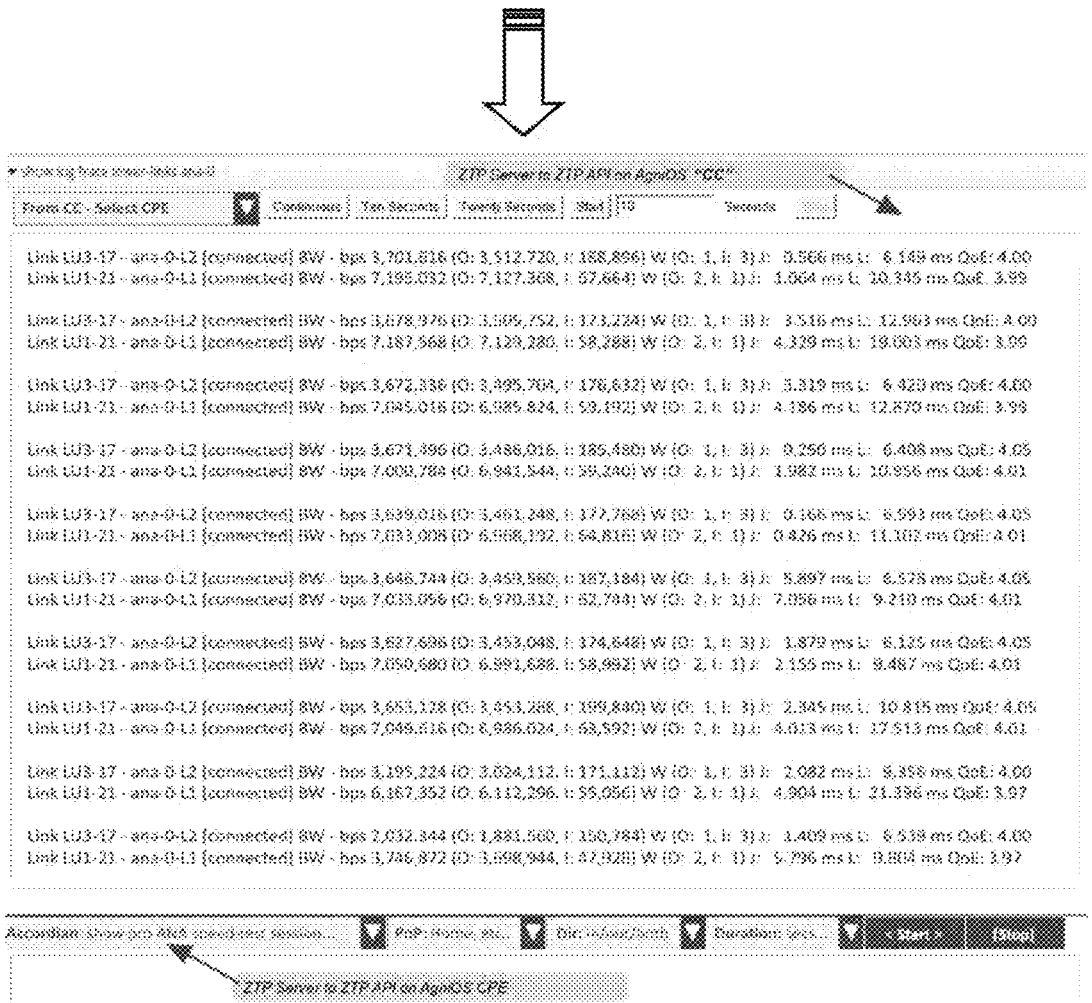
FIG. 11D illustrates a forth portion of a CPE Dashboard standard interface shown on a Portal as provided by a Cloud Based Network Manager, exemplary of an embodiment.
Figure 12A:
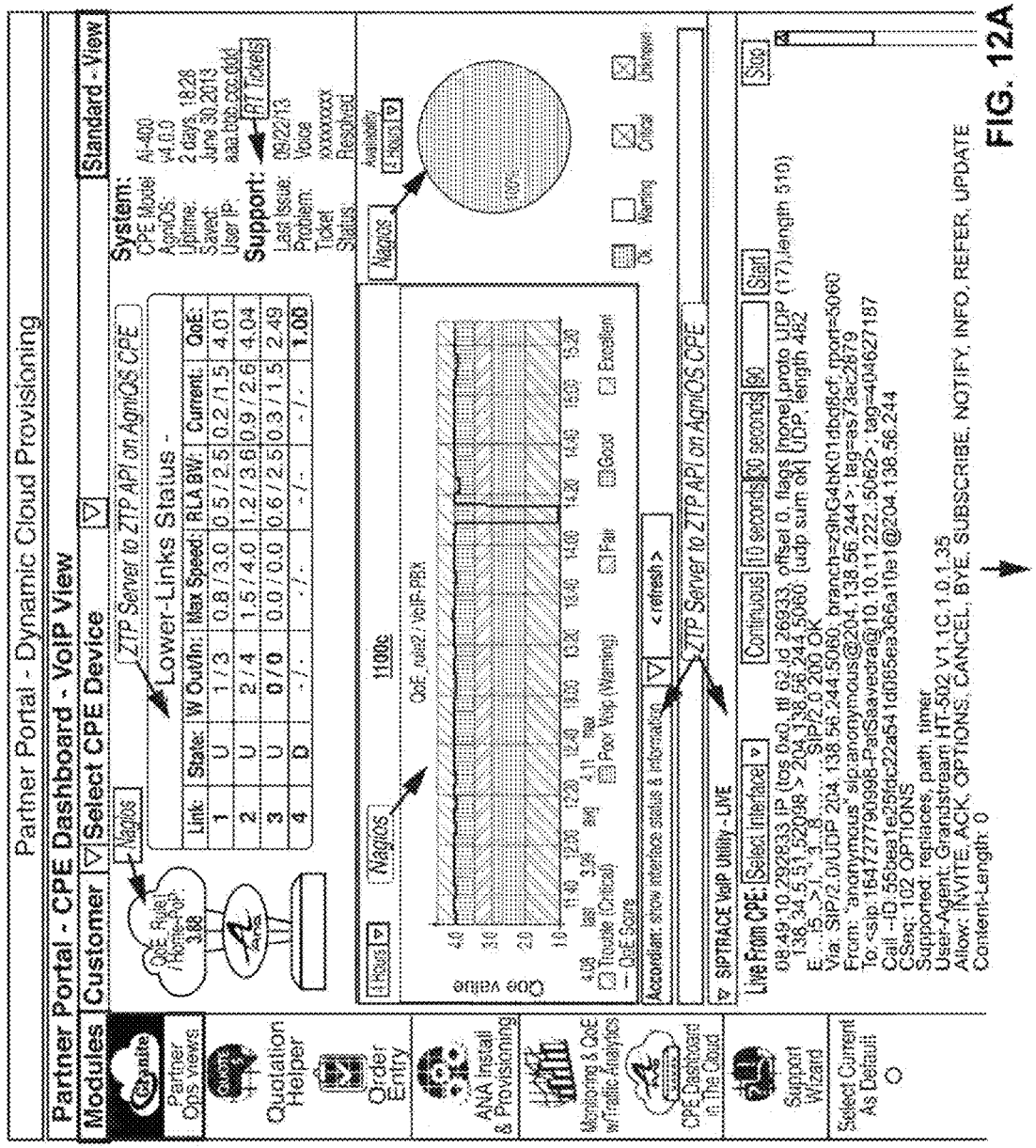
FIG. 12A illustrates a first portion of a CPE Dashboard VoIP interface shown on a Portal as provided by a Cloud Based Network Manager, exemplary of an embodiment.

FIGS. 11B, 12A and 18, 1100*a*-1100*f* demonstrate various exemplary QoE scores for VoIP and Data, as provided by Nagios. For example, QoE score graph (or simply QoE graph) 1100*a* of FIG. 11B illustrates QoE values for a Home PoP network over a selected period of time, and 1100*b* illustrates QoE values for VoIP-PBX for a selected period of time. These QoE graphs can also show the qualities of the QoE values such as "Trouble", "Poor", "Fair", "Good" or "Excellent", and each of the qualities may be represented by a different colour code or colour scheme, as shown in 1100a and 1100b. Referring now to FIG. 12A, 1100c illustrates another QoE graph for VoIP over a period of 4 hours. Referring now to FIG. 18, 1100d shows a QoE graph for a selected PoP (JFK), 1100e shows a QoE graph for a selected VoIP-PBX network connection, and 1100f shows a QoE graph for a Home-PoP network.

In one embodiment, Nagio may be used to supplement the data gathered by the Network Manager 140. For example, Nagio may be used to monitor uptime and service alerts for customer premises equipment (CPEs). The Nagio system may use RRD files to generate traffic and service monitoring graphs. In some exemplary implementation, all service checks and alerts via Nagio are polled in real time to a Nagios staging server, which can be used to reduce risk of abuse on the production server that is performing active SNMP checks.

In some embodiment, the Portal 100 enables users or operators to view per-second statistics for bandwidth utilization, jitter, latency and QoE.

These VoIP (Voice over IP) and Data can be for ERP (Enterprise Resource Planning) applications, ticketing systems, or for any other application. For example, if the QoE score is in the range of one (1.0) to two (2.0), it may indicate a troubled circuit or link. If the QoE score is in the range of two (2.0) to three (3.0), data transmission may be acceptable but VoIP may be poor. If the QoE score is in the range of 3.0 to 3.5, it is fair quality, and may be sufficient quality for voice over IP. The system can further determine and show the QoE score up to ranges of 3.5 to 4, or 4 to 5. In an embodiment, lower link QoE scores can demonstrate to a user, in real time or near real-time, the per second snapshot of the quality of experience of the links of a device. The snapshot may act as an indicator representing more than just latency jitter and loss. This QoE tool can continuously collect information, and generate a QoE score graph on demand, such as when requested by a SNMP system or a CPE device.

In an embodiment, VoIP tools may be implemented and provided to allow operators to analyze voice packets during active calls at the customer site. A voice call (with the approval of the end-client) can also be captured for analysis and record keeping (e.g. customer service centres).

VoIP capabilities may be automatically provisioned and configured. For example, during an initial CPE configuration, the cloud management system may automatically match bandwidth reservations to the Specific VoIP Codec. In addition, the cloud management system can include device discovery, so that VoIP phones can configure themselves virtually.

The QoE tool may be configured to measure a QoE score for each Session Initiation Protocol (SIP) session on a VoIP communication link or device can be measured with a QoE Score. Further, detailed latency, jitter and packet loss measurements may be presented by the QoE tool for each session.

In an embodiment, the QoE Tool may be configured to allow a user to record a live call as would be received by a call recipient. The recording may be played back through Portal 100, thereby allowing a user to assess the call quality from the perspective of the call recipient.

In another embodiment, saved voice analysis files may be stored for future analysis and reporting. Captured voice sessions can be shown in list form, and they can be downloaded or removed by the operator. When an operator selects a file from a list of captured voice sessions, details of the call may be made available, including Port, Codec used by each party, packets, lost packets, jitter and latency.

Referring now to FIG. 19, a method of determining aggregated QoE is shown. One or more QoE values for a network path from different points or locations (e.g. YYZ) can be used to generate an Aggregated QoE score as follows:

| Aggregated QoE Calculation | |
|---|---|
| Variable | Cell Formula |
| X1 | =((COUNT(D2:D10)*4.2)−(SUM(D2:D10)))/(COUNT(D2:D10)) Calculates the Max possible score minus the total score and presents the results as an average value |
| X2 | =((COUNT(D2:L2)*4.2)−(SUM(D2:L2)))/(COUNT(D2:L2)) Calculates the Max possible score minus the total score and presents the results as an average value |
| Y | =MAX(D54,N44) Gets the MAX of X1 & X2 |
| Z | =4.2−0.08−D55 R-Factor, adjusts for QoE Aggregation |

As shown in FIG. 19 the "Z" value/row for the top down YVR readings in column L for X1 can indicate many failure readings and therefore the score for YVR ends up in pink with 1.99 QoE Score being the lesser of X1 vs X2. In addition, for ORD in column F and row 4 we can see a score of 4.00 showing excellent QoE in blue shade.

Figure 20:
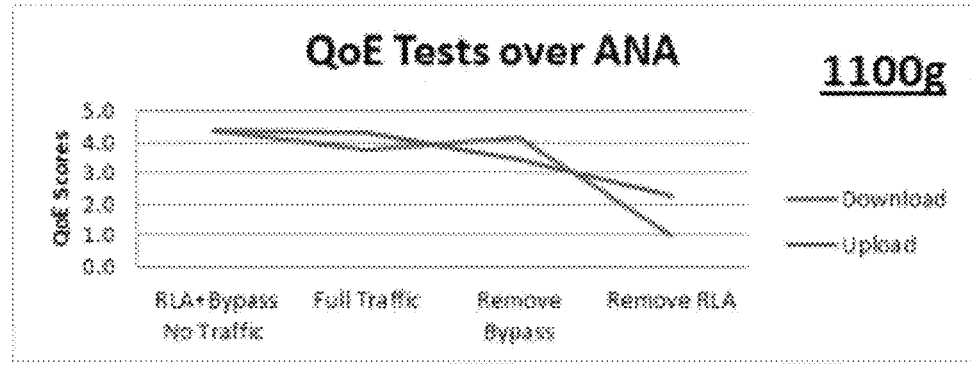
FIG. 20 illustrates a QoE test score graph over a bounded network, exemplary of an embodiment.

As shown in FIG. 20, a QoE graph 1100g shows different QoE values for different RLA (Rate-Limit-Avoidance) settings. As shown, the QoE value drops significantly when RLA, bypass, or both is removed and maximum bandwidth is used on the lower links. The removal of RLA entirely for the lower-links may result in a dramatic reduction in the QoE score as bandwidth suffers high latency or jitter.

Advanced business process intelligence (BPI) may be implemented to provide means to calibrate the sensitivity of alerts and notifications based on the types of services that a Host is running. This may provide a monitoring system with intelligence to only send alerts when user QoE is at risk or is below a certain threshold.

For example, as demonstrated in FIG. 21, a BPI tool in a SNMP collector system can provide high-level view and intelligence based on an aggregated QoE score. In an embodiment, white noise may be eliminated by the BPI tool so that only meaningful intelligence is taken into consideration. Default or custom rules may be set up to indicate when an alert is generated.

Figure 22:
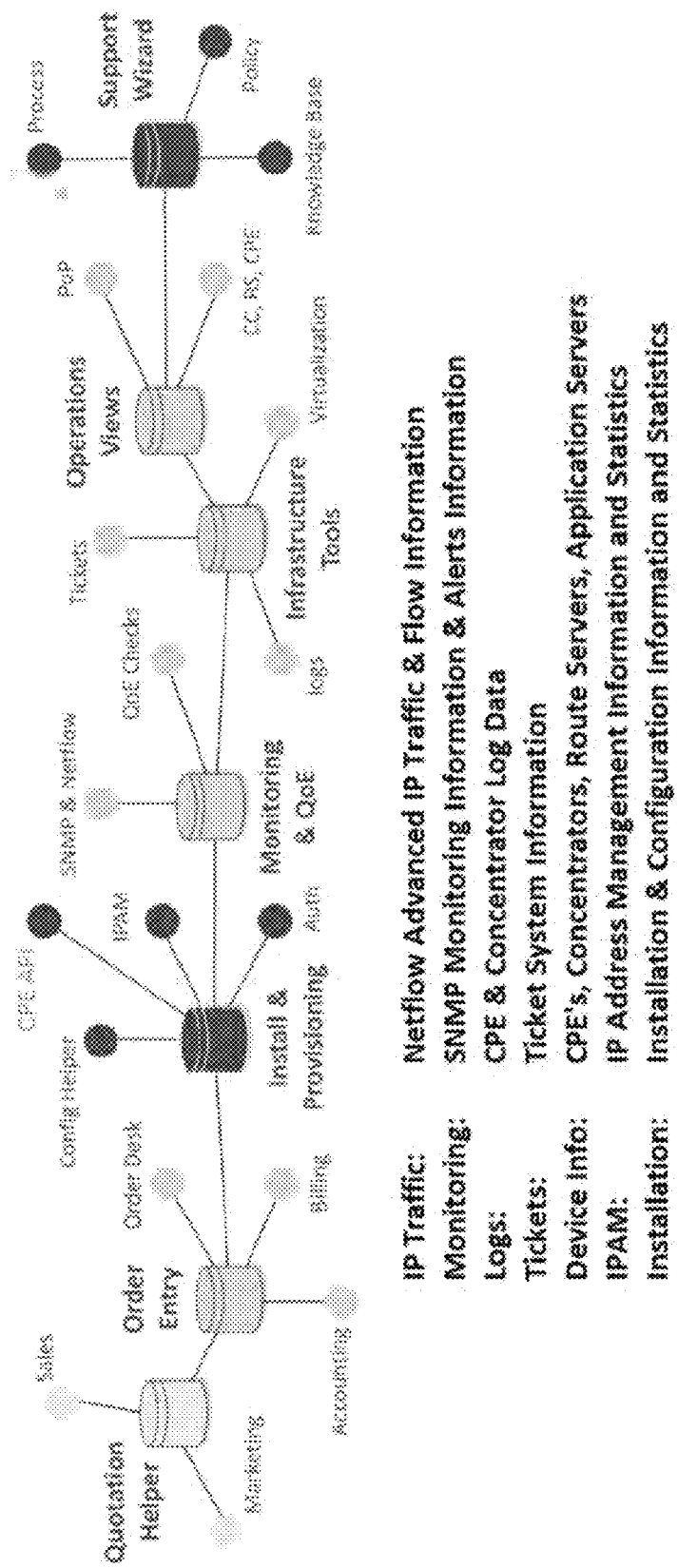
FIG. 22 illustrates Business Process Intelligence being provided by multiple data sources, exemplary of an embodiment.

FIG. 22 shows increasing business intelligence provided by multiple data sources such as Quotation helper, sales, marketing, order entry, accounting, order desk, configuration helper, install and provisioning, monitoring, and QoE, and so on. Moving from left to right through the exemplary process in FIG. 22, order entry information, IP address information, and all other appropriate information (e.g. as support, monitoring, maintenance) is entered or captured automatically from different sources such ticket systems, monitoring collectors, logs, the devices themselves, IP address management, and installation. Default or custom policies may be implemented to further filter or otherwise process the collected information, based on the desired intelligence output required.

Management Portal 100 may provide a variety of meaningful statistics and information to users. In one embodiment, the Network Manager 140 has queried the CPE database to obtain information such as IP addresses, type of CPE device (e.g. Ai100), associated URL (e.g. bunker2.dev.teloip.net), software information (e.g. AgniOS version 4, release candidate 7), network statistics (e.g. network has been up for 6 days and 21 hours, etc.), bonded/aggregated network connection status (e.g. been up for 165 hours, IP), as well as associated QoE score and any applicable rules. All of these information may be provided to users through Portal 100 interface. QoE information regarding two lower links are also presented: weights, jitter, latency, the QoE score at that moment in time. IPDE (Intelligent Packet Distribution Engine) RLA bandwidth is also shown. It is further evident that various settings may be shown. For example, information such as set to 52 meg in on Link 1, 18 meg in on Link 2, 1.593 meg out Link 1, 6.612 out Link 2, reserve bandwidth set about 500K in, 400K out, bypass rules, and so on, may be displayed as well on demand or by default.

Sample Portal User Interface

Referring now to FIGS. 10A to 10D, a Cloud Concentrator Dashboard view is shown on a Portal 100 for Partners (e.g. "Partner Portal" as an illustrative example). The Partner Portal is designed such that a user does not need to be a network administrator or professional to view or understand the data. As shown, the user can pick one or more Cloud Concentrators (e.g. YYZ, JFK, etc.) from a drop-down menu. Depending on the chosen CC(s), a variety of parameters and data analytics can be displayed in real-time or near-real time. Historical data may be shown as well. In some embodiment, on-board diagnostic tools may be provided to facilitate troubleshooting or isolating of issues.

For example, the following data may be viewed on the Partner Portal: server status, user IP, bandwidth chart, traffic statistics, Netflow data, CC connection details, underlying CPE data, network logs, and so on.

Referring now to FIGS. 11A to 11D, a CPE Dashboard standard view is shown on the Partner Portal. A user can select a CPE device he/she desires to view. Once selected, a variety of information may be collected, processed and/or displayed, such as: lower-links status, server data, traffic analytics, Netflow data, QoE values, historical alerts, interface status and information, logs for lower-links, and so on.

Figure 12B:
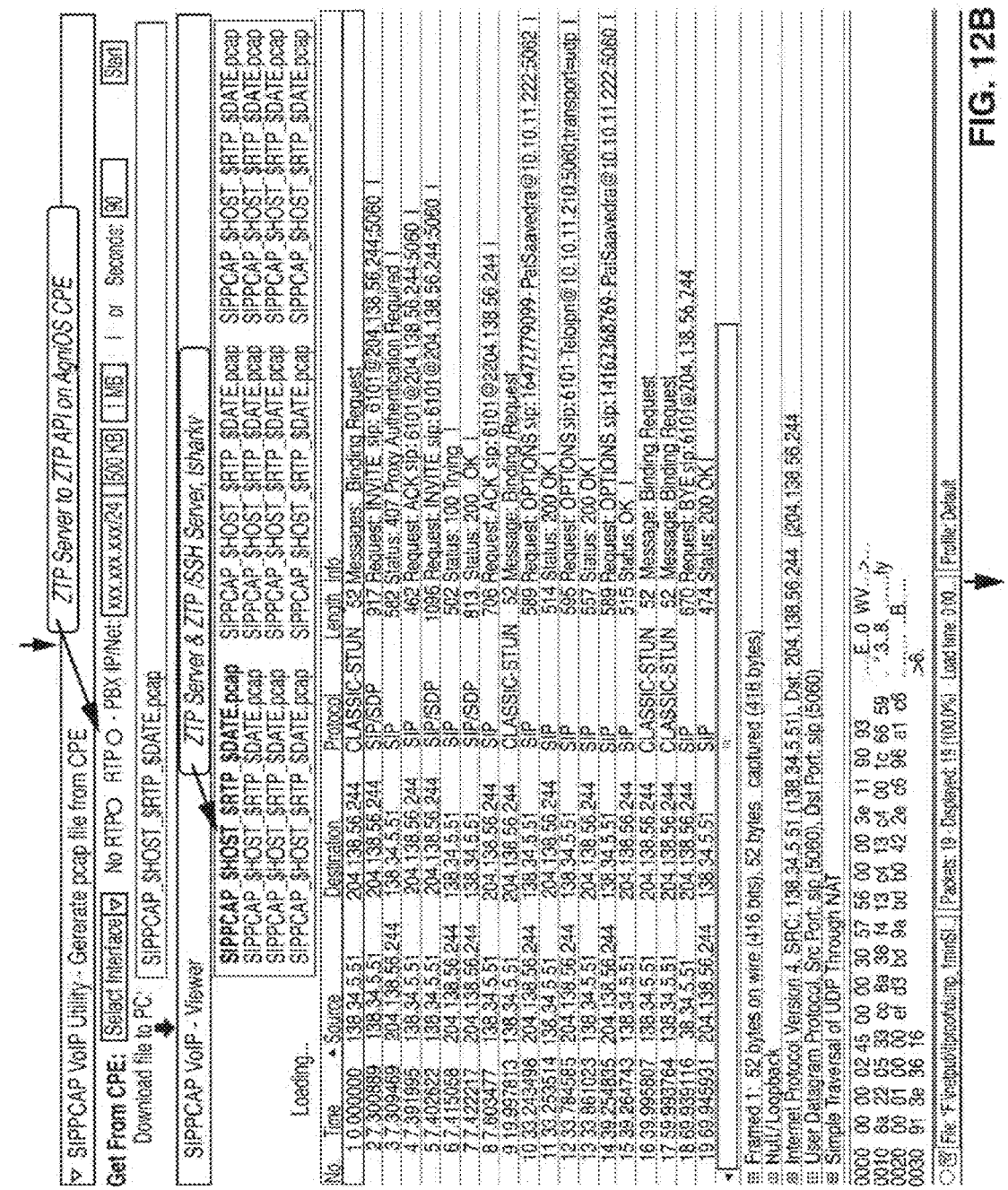
FIG. 12B illustrates a second portion of a CPE Dashboard VoIP interface shown on a Portal as provided by a Cloud Based Network Manager, exemplary of an embodiment.
Figure 12C:
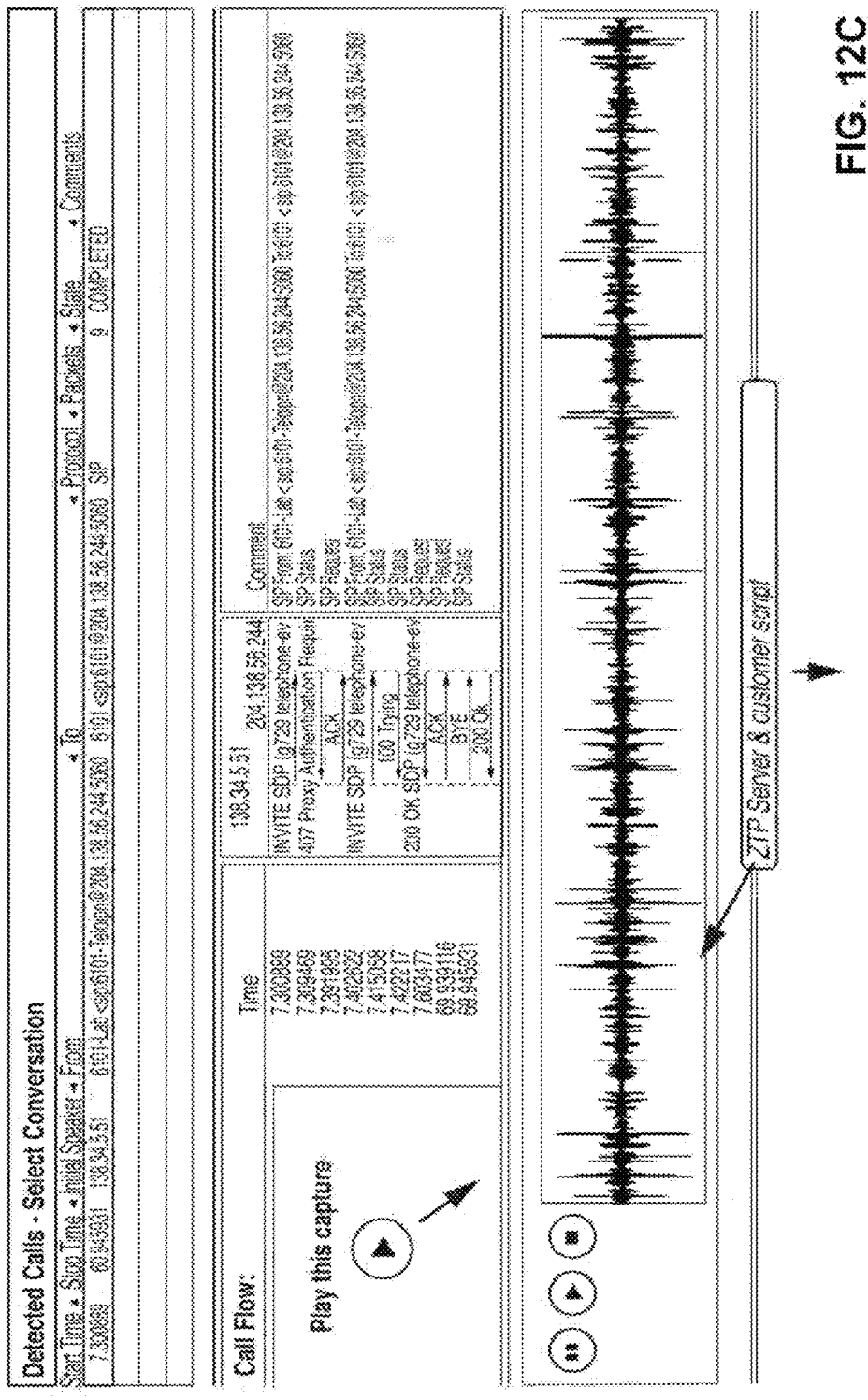
FIG. 12C illustrates a third portion of a CPE Dashboard VoIP interface shown on a Portal as provided by a Cloud Based Network Manager, exemplary of an embodiment.

Referring now to FIGS. 12A to 12C, a CPE Dashboard VoIP view is shown on the Partner Portal. Similarly to the standard view, a user can select a CPE device he/she desires to view. Once selected, a variety of information may be collected, processed and/or displayed, such as: lower-links status, server data, traffic analytics, Netflow data, QoE values, SIP trace, historical alerts, interface status and information, logs for lower-links, and so on. In particular:

(1) lower link status can be dynamically obtained from CPE device. Information can be collected dynamically from provisioning process and CPE device. The Portal can also show support status for existing tickets. A user may also open ticket from here as a link.

(2) From the perspective of the chosen CPE device, a QoE score for VoIP in the form of SNMP data can be shown. Availability in the form of SNMP data may also be shown.

(3) SIP trace can be shown (e.g. interface status and information data); a live trace of the SIP protocol may be shown in real-time or near real-time. This can facilitate troubleshooting.

(4) SIPPCAP VoIP utility can also be available—PCAP is a common tool for troubleshooting. SIPPCAP can be the alternative to PCAP. It can help the user with troubleshoot to show whether data jitter is on one end or the other. It can show packet information, routing information, can even access call itself.

Figure 13A:
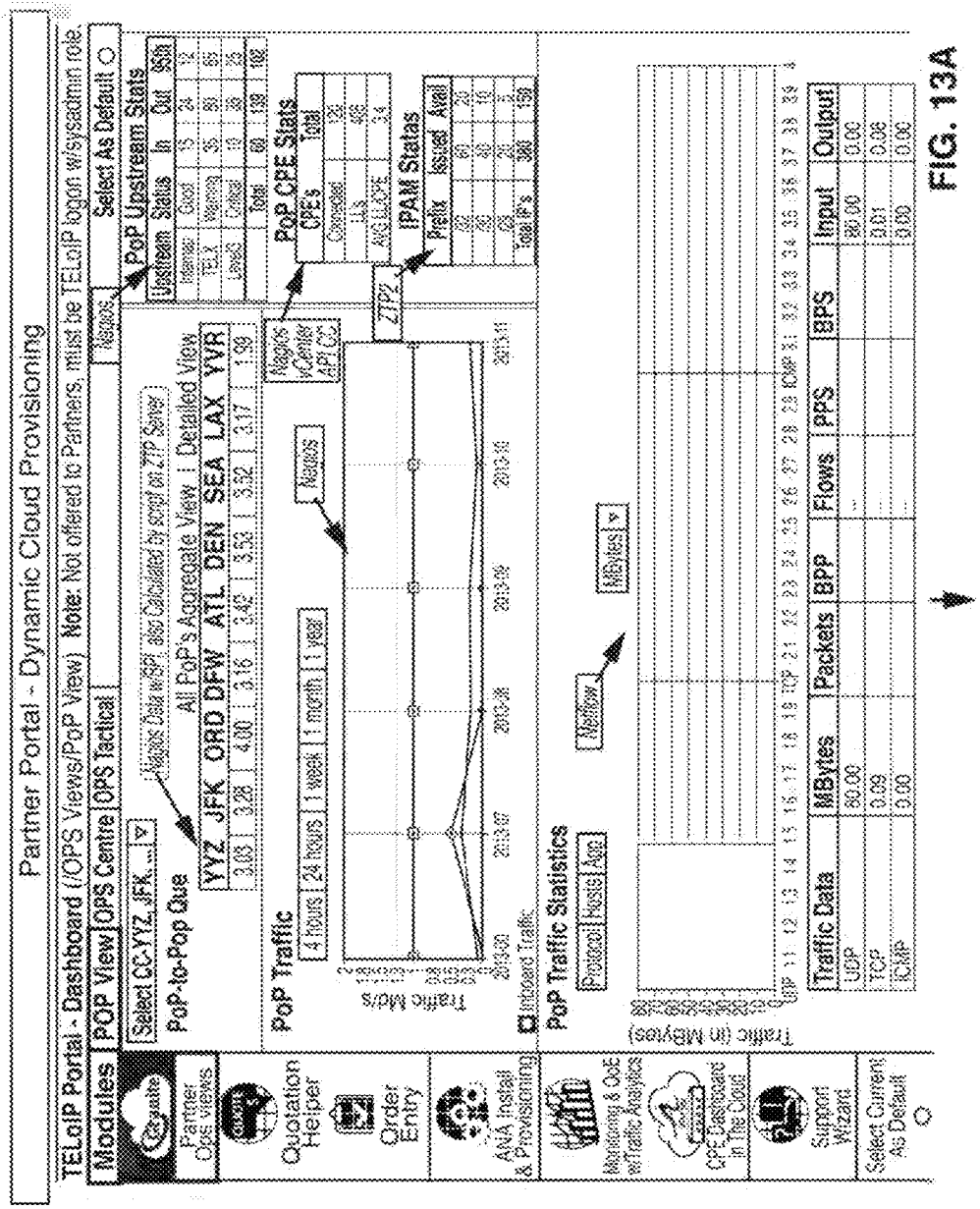
FIG. 13A illustrates a first portion of a Point-of-Presence (PoP) Dashboard interface shown as provided by a Portal of a Cloud Based Network Manager, exemplary of an embodiment.
Figure 13B:
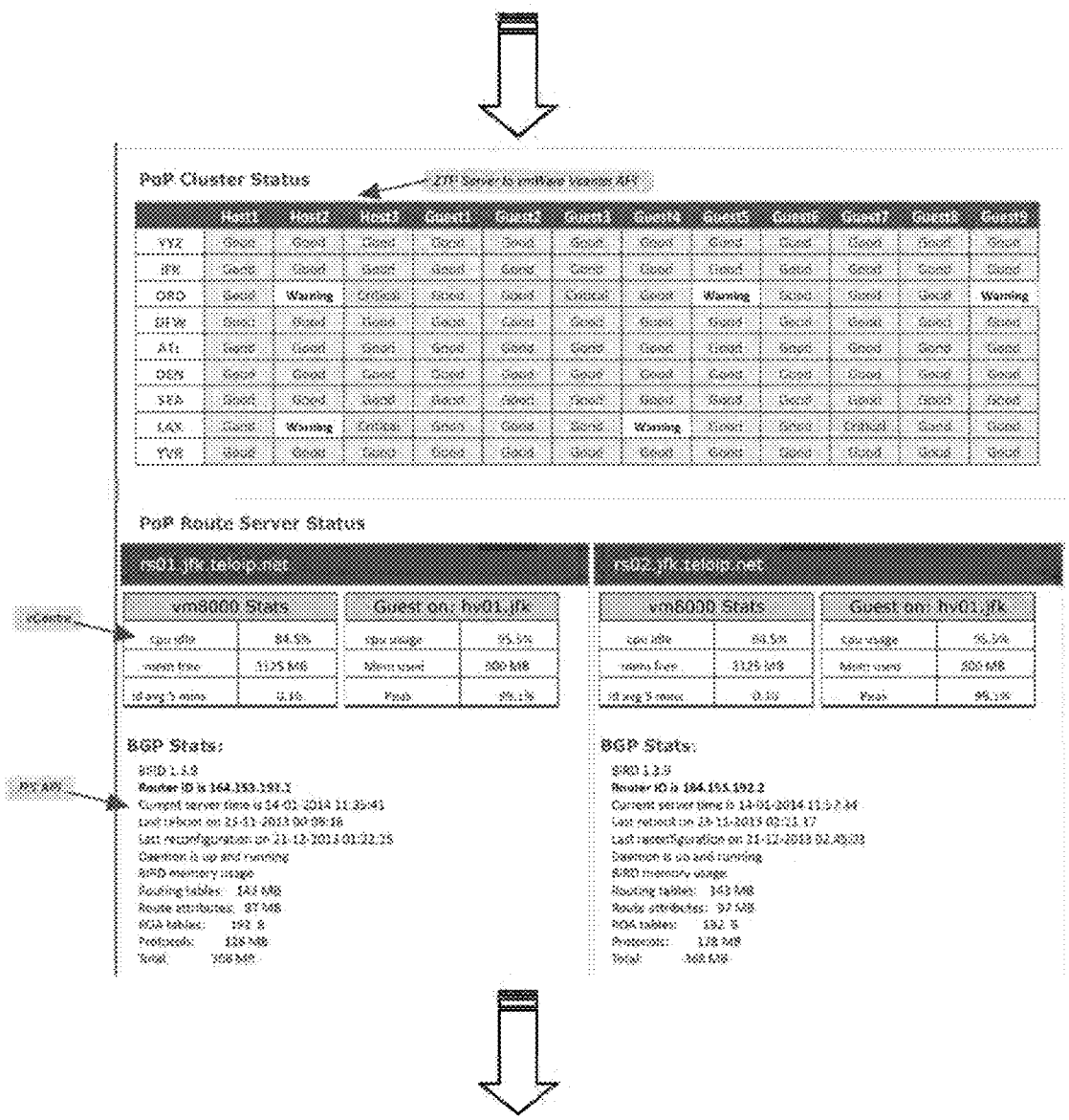
FIG. 13B illustrates a second portion of a PoP Dashboard interface shown on a Portal as provided by a Cloud Based Network Manager, exemplary of an embodiment.
Figure 13C:
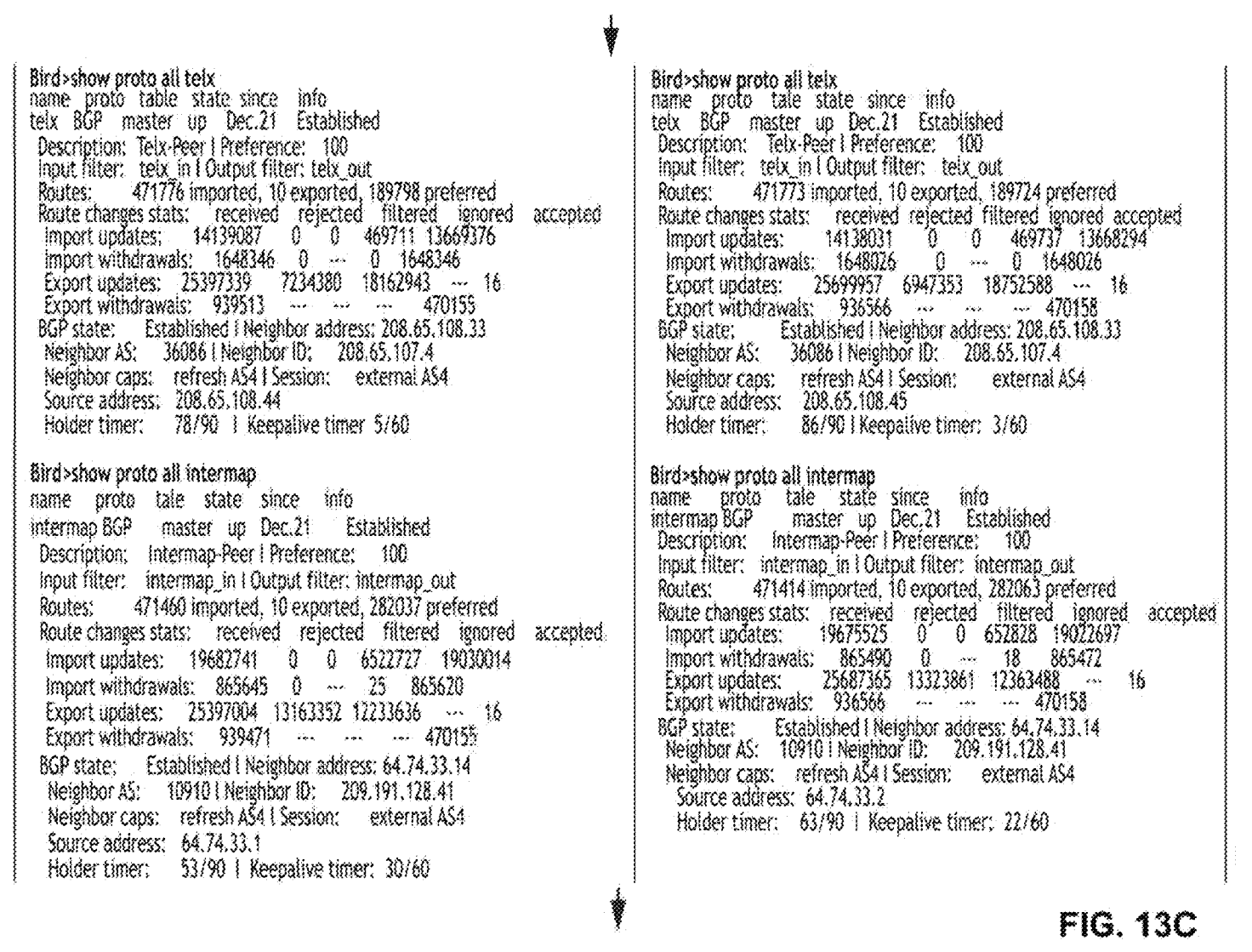

Referring now to FIGS. 13A to 13C, a Dashboard view of PoP is shown. As shown, the user can pick one or more PoP (e.g. YYZ, JFK, etc.) from a drop-down menu. Depending on the chosen PoP, a variety of parameters and data analytics can be displayed in real-time or near-real time. Historical data may be provided as well. For example:

(1) PoP-to-PoP QoE: this can be determined via a unique method and algorithm, through which the system (e.g. Cloud Based Network Manager) can calculate aggregated QoE.

(2) PoP Upstream Statistics (Stats): this shows bandwidth usage and status of upstream connections for a particular PoP.

(3) PoP CPE Stats: this is a query of active CPE for the client. It can show the number of CPEs connected; the number of lower-links across; and the number of average lower-links per CPE. This for example helps in capacity planning for cloud concentrators.

(4) IPAM Stats can show issued and available IPs.

(5) PoP Traffic can show both SNMP and Netflow data.

(6) PoP Traffic Statistics can show very granular data on number of call, amount of web traffic and so on.

(7) PoP Cluster Status can show the status of each host or guest device at each CPE location. For example, VMware can be used and queries can be sent to the VMware for corresponding status update in real-time or near real-time.

(8) Route server status can show VMware stats, such as live BGP statistics and so on.

User Ordering and Installation Process

The following is an exemplary ordering and installation process for a customer and a Partner:

1. Customer decides to order the product.

2. Partner connects to their salesforce.com portal and turns the lead/quote for this opportunity into an order. This is a pre-programmed function within the Partner's salesforce.com environment. The dynamic cloud provisioning system can use the salesforce.com API to receive or retrieve the new order. This order already has much information that is relevant to the provisioning process such as site location and services requested. For example, information can be in an order entry module, or in Salesforce. Information may include for example: city, number of links, speeds expected, DSL, ADSL and so on. So provisioning information may be extracted automatically.

3. Partner goes into the ZTP order entry module and finalizes the order without the need to re-enter much of the information. This can serve as a validation and confirmation step of the order process.

4. Partner or Project Manager (PM) can be automatically assigned. The ZTP system has API connectivity with the vendor and Partners ticketing system. The PM can now proceed to take the order through the next series of steps if required. IPAM, ZTP Installation and Configuration Modules may be accessed if appropriate. A support resource such as a Device Configuration Engineer (DCE) can be assigned. The authentication database is updated with the CPE S/N and MAC, and will now be allowed to connect once connected to any Internet service.

5. Product is shipped out of the Partner or vendor warehouse to the customer location or installer depot. This step may take place much earlier in the process as it is not dependent on any of the above items based on the automated provisioning process.

6. A Device Configuration Engineer (DCE) picks up the install when the device is connected on-site and completes the process using ZTP (Install and Config Helper). By this time the CPE has already connected to the corresponding provisioning/staging CC. Automated tools can then be run on the CPE over a secured session from the Portal 100 to the CPE using the ZTP API on the CPE. The device is moved to the Home-PoP CC and auto calibrates for the Lower-Links attached.

For example, CPE Lower-Links can be calibrated in the following aspects for maximum performance:
  Quality of Service—calibrating for poor quality bandwidth region avoidance and bandwidth reservation settings for applications;
  Bandwidth—calibrating to confirm delivered bandwidth versus provisioned bandwidth from the local carrier;
  Failover—calibrating pre-emptive lossless failover sensitivity; and
  Acceleration—calibrating on-the-fly traffic compression settings.

7. Upon completion of Installation ZTP automatically adds the CPE device to monitoring. ZTP will add the device to the monitoring system collectors such as Netflow and SNMP. The system also can create all alert criteria based on the Installation type such as Data Only or Voice and Data CPE.

8. The Partner and Customer can now see the device within the ZTP monitoring views.

9. Post Install support is connected to the Ticket System of the Partner and vendor. A wizard is used with logic from the TELoIP L1-L4 support process, which may be automated as well.

In another embodiment, the following features may be provided to a customer of the ZTP cloud provision system via the Portal 100:
  Quotation Helper
  Provisioning helper w/pending order status
  Provisioning database for lower-links w/o costing
  Accepts user input and uses existing OE/SIT/ZTP2 data
  Customer Order Entry/SIT Module
  Service Information Template Data Capture
  Automated updates via email for order completion
  Order status indicator
  Install scheduler (TELoIP Resources)
  Monthly order detailed reports generator
  Provisioning and Installation Module (ZTP)
  CPE configuration and Installation w/AgniOS API
  IP Address assignment tool
  Add CPE to monitoring
  Installation report
  Monitoring and QoE Module (Nagios+Netflow)
  QoE Dashboard/Partner Portal
    Ops Centre View
    Tactical View
    CPE Views (End-User Views)
  QoE Dashboard/End-User Single CPE
    QoE Graphs Views
    QoE Topological Views
  Traffic Analytics and Monitoring
  Host and Service Alerts
  Bandwidth usage and reporting
  SLA Reporting w/QoE data
  CPE Dashboard (AgniOS API)
  No more logon to CPE
  Cloud-based AgniOS API obtains live CPE data from CPE
  Initiate automatic image updates on the CPE
  No configuration options (MAC, remains L2 function)
  Individual CPE Firewall Management and Configuration tool w/integrated traffic and logfile data
  Post Install Support Request Wizard
  Questionnaire/wizard
  Gathers data and charts from logs
  Spawns post install support ticket In another embodiment, the following features may be provided to an administrator or operator of the ZTP cloud provision system via the Portal 100:
  OPS-ZTP2 Provisioning and Installation Module
  CPE configure and install w/AgniOS API (no DCE SSH)
  IP Address assignment tool (IPAM module)
  Automatically add CPE to monitoring
  Integrated IPAM, Auth/FreeIPA, DNS
  OE and ZTP2 reports for Operations
  OPS-IPAM—IP Management Module
  Internal Level3 Operations
  ZTP2 IP address assignment tool
  IPAM queries FreeIPA, ZTP also updates FreeIPA IP's
  OPS—QoE Management Tools
  Traffic Analytics and Monitoring (Netflow and Nagios)
  Bandwidth usage billing and reporting
  Per CPE, Customer, PoP, etc.
  Verify BW costs from upstream providers
  Establish average per Mbps cost
  Trend analysis
  Alerts for capacity planning
  SLA management w/QoE data
  PoP to PoP w/QoE Scores and BPI
  CPE QoE graph and Topological Views
  PoP upstream peer and upstream target QoE views
  PoP health views (QoE, SNMP, and Netflow data)
  Monthly Partner End-User Reports
  OPS—Post Install Support Request Wizard
  Wizard presents intelligent data and spawns ticket for incident resolution
  Incident Reporting
  ZTP Application—Role and User Management
  Role based billing for ZTP features/modules/tools
  Usage based billing for ZTP features/modules/tools
  ZTP Application—Multi-tier ACL Relationship
  Relational model using 1 to n hierarchy w/incidents:
  Carrier (1 and n Partners)
  Partner (1 and n Customers)
  Customer (1 and n sites)
  Sites (1 and n CPEs)
  Devices
Virtual Network Overlay and Tunnels Embodiments may provide a network system for improving network communication performance between client sites at a distance from one another that would usually require long haul network communication.

In some embodiments disclosed herein, there is provided a Virtual Network Overlay for multiple networks, such as for example one or more WAN. The Virtual Network Overly may allow multiple CPE devices to connect with CC devices and create an Over-The-Top Secure Network across Multiple Points-of-Presence between disparate sites. The Virtual Network Overlay service can provide features such as optimized Internet access, secure WAN (or other secure networks), and diverse carrier failover, for example. The Virtual Network Overly may support and integrate SCN, MDPS, and IPDE as described herein.

Figure 23A:
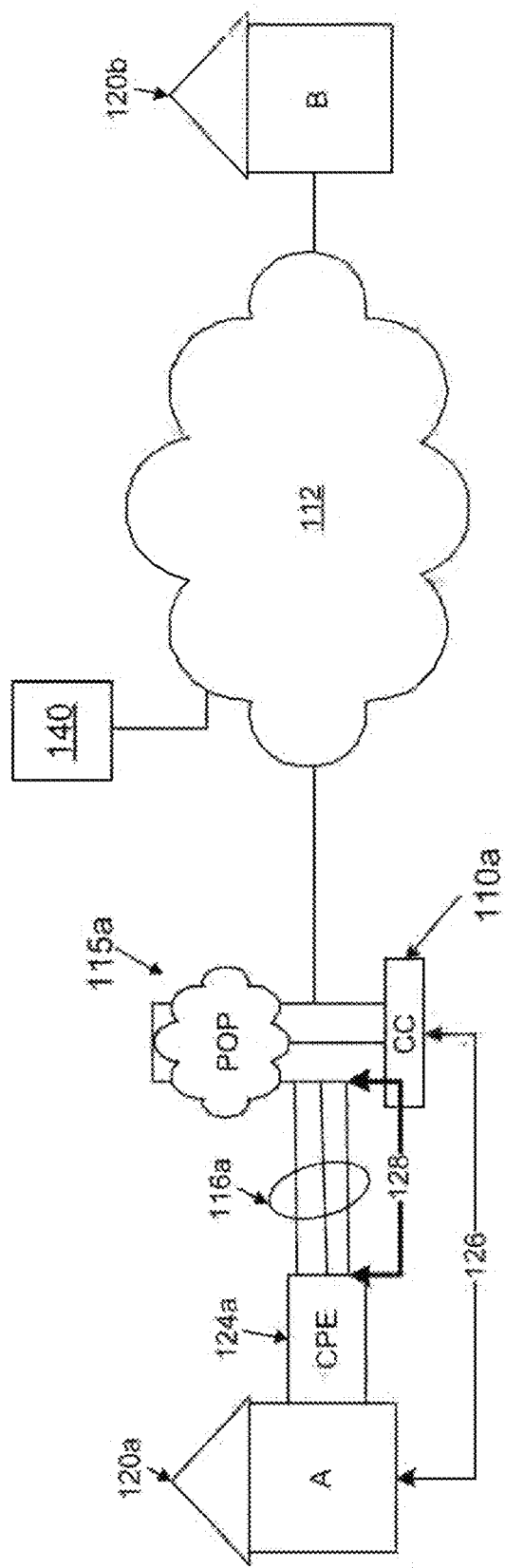
FIG. 23A illustrates a network solution with aggregated/bonded connections with a virtual edge in accordance with one embodiment.

As shown in FIG. 23A, there may be at least one client site network component 124a implemented at a client site A 120a for bonding or aggregating one or more diverse network connections so as to configure a bonded/aggregated connection 116a that has increased throughput.

There may be at least one network server component 115a that is configured to connect to the client site network component 124a using the bonded/aggregated connection 116a. The network server component 115a includes at least one concentrator element 110a implemented at a network access point to at least one network 112. As described, the network server component 115a automatically terminates the bonded/aggregated connection and passes the data traffic to an access point to at least one network 112.

A virtual edge 128 connects the network server component 115a and the client site network component 124a. The virtual edge 128 may provide transparent lower-link encryption for the connection between the client site network component 124a and the network server component 115a. The virtual edge 128 may implement a common access protocol for encapsulation of data packets for the data traffic carried over the bonded/aggregated connection 116a. This provides lower-link encapsulation support for protocols such as for example L2TP, PPPoE, PPTP, DHCP, UDP, and so on. By way of example, L2TP is a link-layer tunneling protocol to support VPNs. The virtual edge 128 may provide transparent encryption of the tunneling protocol to provide security and confidentiality. The virtual edge 128 component addresses the Transparent Encryption Layer aspect of the SDN to SCN Mapping architecture as per the tables of system and network components herein. The tunneling protocol allows for provision of network services that the underlying network does not provide directly. A tunneling protocol may use a data portion of a data packet (e.g. payload) to carry the packets that provide the desired service. For example, L2TP may use L2TP packets to provide different network services. In computer networking, the link layer is the lowest layer in the IP suite which may be referred to as TCP/IP which it the networking architecture of the Internet. A link may be the physical and logical network component used to interconnect hosts or nodes in the network. Accordingly, the link layer relates to the links the physically connect the nodes of the network including the devices of the client site network component 124a and the network server component 115a. The link layer may be described as a combination of the data link layer and the physical layer in the Open Systems Interconnection model. As another example, Point-to-Point Protocol over Ethernet (PPPoE) is a network protocol for frame encapsulation inside Ethernet frames. As a further example, Point-to-Point Tunneling Protocol (PPTP) may implement VPNs and may use a control channel over TCP and a GRE tunnel operating to encapsulate PPP packets. These are illustrative example protocols that may be used to support encapsulation of data packets using a common access protocol. The virtual edge 128 lower-link tunneling protocol connections address the Site/Branch Infrastructure component of the SDN to SCN mapping for the Lower Plane infrastructure architecture as per the tables of system and network components herein.

A cloud network controller 140 is configured to manage the data traffic so as to provide a managed network overlay 126 that incorporates the at least the bonded/aggregated connection 116a and at least one long haul network path carried over the at least one wide area network 112. The network overlay 126 may include one or more virtual edges 128. The Network Overlay 126 addresses the Virtual Data Plane aspect of the SDN to SCN Mapping as per the tables of system and network components herein.

Figure 23B:
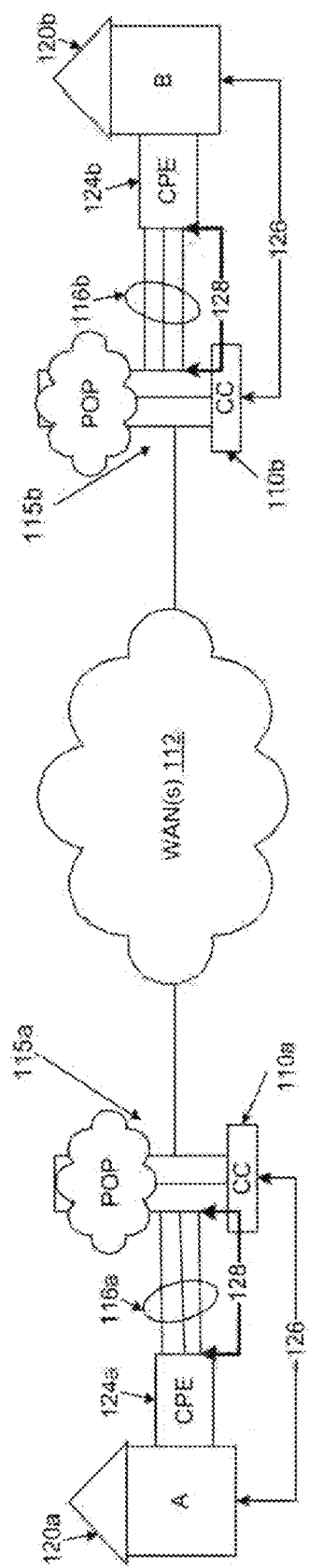
FIG. 23B illustrates another network solution with aggregated/bonded connections with a virtual edge in accordance with another embodiment.

As shown in FIG. 23B, there may be at least one other client site network component 124b implemented at a client site B 120b for bonding or aggregating one or more diverse network connections so as to configure a bonded/aggregated connection 116b that has increased throughput. Network server components 115a, 115b connect through a WAN network 112. There may also be a virtual edge 128 with transparent encryption and a managed network overlay 126 between the client site network component 124a, 124b and the corresponding network server component 115a, 115b. The client site A 120a and client site B 120b may be at a distance from each other such that at least one long haul network path is required to transmit data there between. The managed network overlays 126 may integrate to provide a single managed network overlay between disparate client sites and may include both virtual edges 128.

Figure 24A:
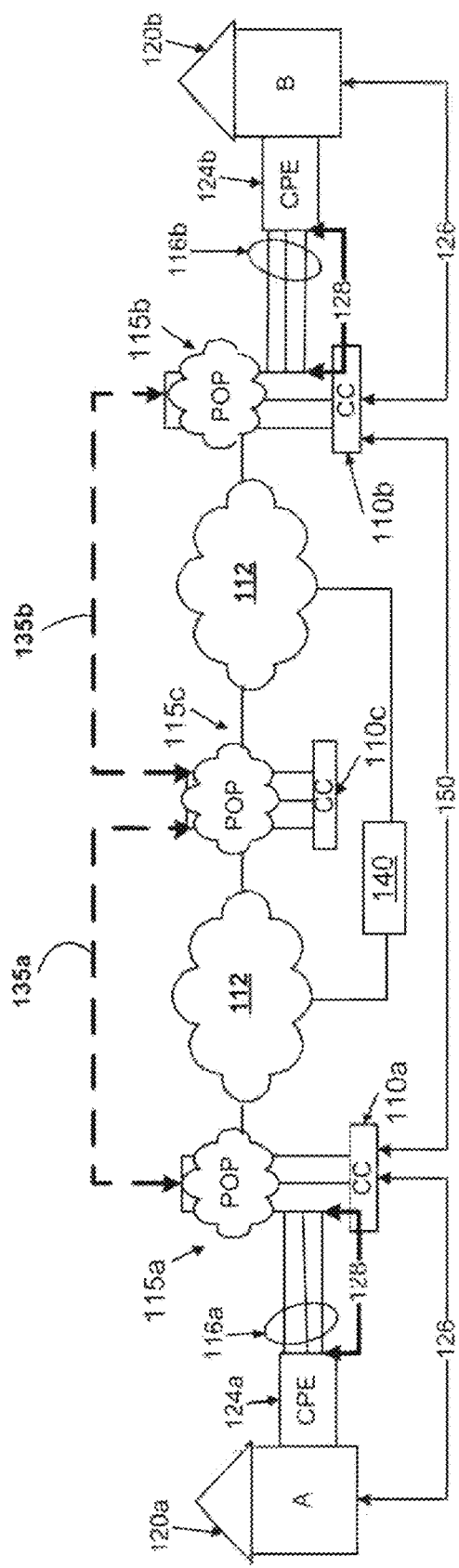
FIG. 24A illustrates a network solution with aggregated/bonded connections with a virtual edge and two virtual core connections in accordance with one embodiment.
Figure 24B:
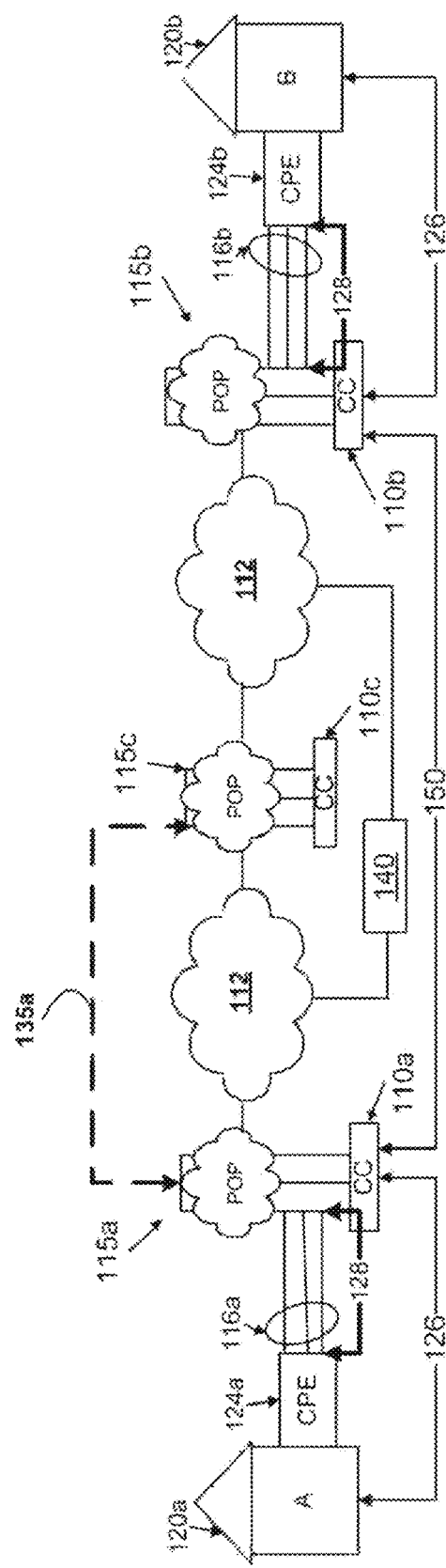
FIG. 24B illustrates a network solution with aggregated/bonded connections with a virtual edge and one virtual core connection in accordance with one embodiment.

In some examples, as shown in FIGS. 24A and 24B there may be multiple networks 112 connected by concentrator elements 110a, 110b, 110c. For example, there may be a first concentrator element 110a implemented at the access point to the at least one WAN 112. There may be a second concentrator element 110c implemented at another access point to at least one other WAN 112. There may be a third concentrator element 110b connected to an access point to a WAN 112. The first concentrator element 110a and the second concentrator element 110c are configured to interoperate to provide a virtual core (VC) connection 135a between the access points. The VC connection 135 may be a virtual Ethernet tunnel in some example embodiments. The third concentrator element 110b and the second concentrator element 110c are configured to interoperate to provide another VC connection 135b between the access points. The VC connection 135a, 135b provides transparent encryption. The VC connection 135a, 135b may also support a common access protocol for encapsulation of data packets. The VC connection 135a, 135b may provide both transparent encryption and support of the common access protocol in some embodiments. The Virtual Core connection 135 may address the Virtual Control Plane aspect of the SDN to SCN Mapping as per the tables of system and network components herein.

The cloud network controller 140 may be configured to manage the data traffic so as to provide a managed network overlay 150 that incorporates at least one long haul network path carried over the WANs 112. The managed network overlay 150 may be referred to herein as the Virtual Network Overlay 150. As shown in FIG. 24A, the Virtual Network Overlay 150 may involve the VC connections 135a, 135b to provide a virtual connection between the concentrator elements 110a, 110b. The VC connection 135a, 135b may provide a bonded/aggregated connection. As shown in FIG. 24B, the Virtual Network Overlay 150 may involve a VC connection 135a to provide a virtual connection between the concentrator elements 110a, 110c. A single managed virtual network overlay may integrate multiple Network Overlays 126, 150, multiple virtual edge connections 128, and multiple VC connections 135a, 135b. The singled managed virtual network overlay may provide an end-to-end overlay connecting disparate client sites (e.g. site A 120a, site B 120b). The Cloud Network Controller 140 addresses the Orchestration aspect of the SDN to SCN Mapping as per the tables of system and network components herein.

Figure 24C:
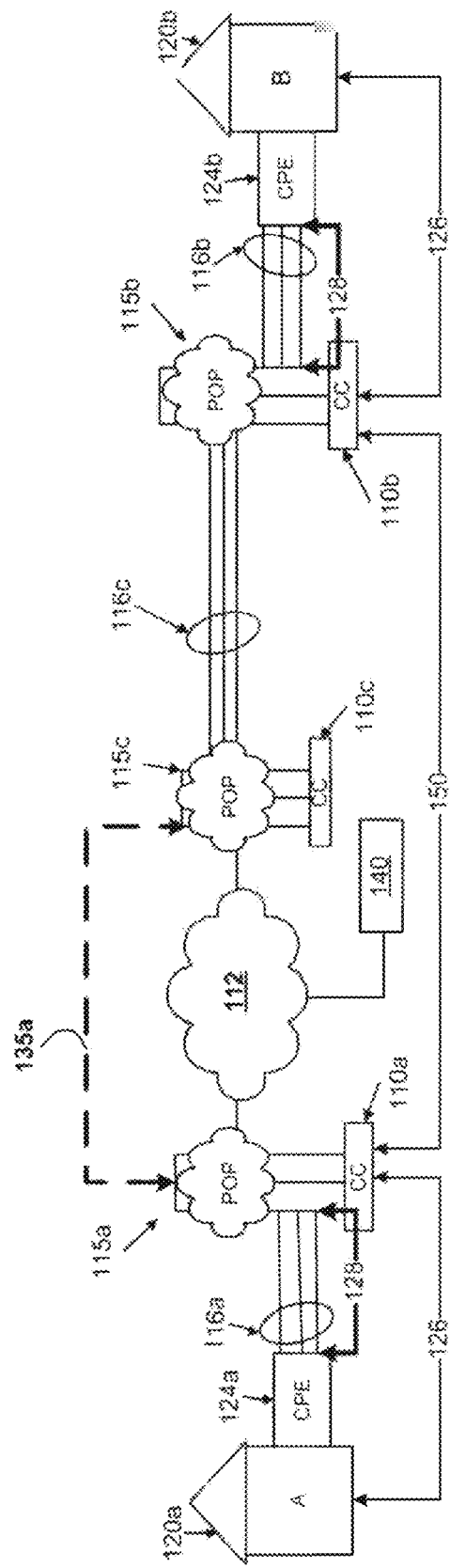
FIG. 24C illustrates another network solution with aggregated/bonded connections with a virtual edge and a virtual core connection in accordance with another embodiment.

As shown in FIG. 24C, there may be an bonded/aggregated connection 116c between a concentrator element 110c in a network server component 115c and at least one other concentrator element 110*b* in another network server component 115*b* connecting to the other client site network component 124*b* implemented at the client site B 120*b*. There may be a virtual edge 128 with transparent encryption. A cloud network controller 140 may be configured to manage the data traffic so as to provide the managed network overlay 150 that incorporates the other bonded/aggregated connection 116*c*.

Embodiments described herein may implement a cloud network controller 140 to implement Software Controlled Networking (SCN) to deliver bonded/aggregated connection and WAN virtualization between existing PoPs with concentrator elements. The solution may provide the ability to offer WAN-as-a-Service (WaaS) through a distributed PoP network.

Figure 37:
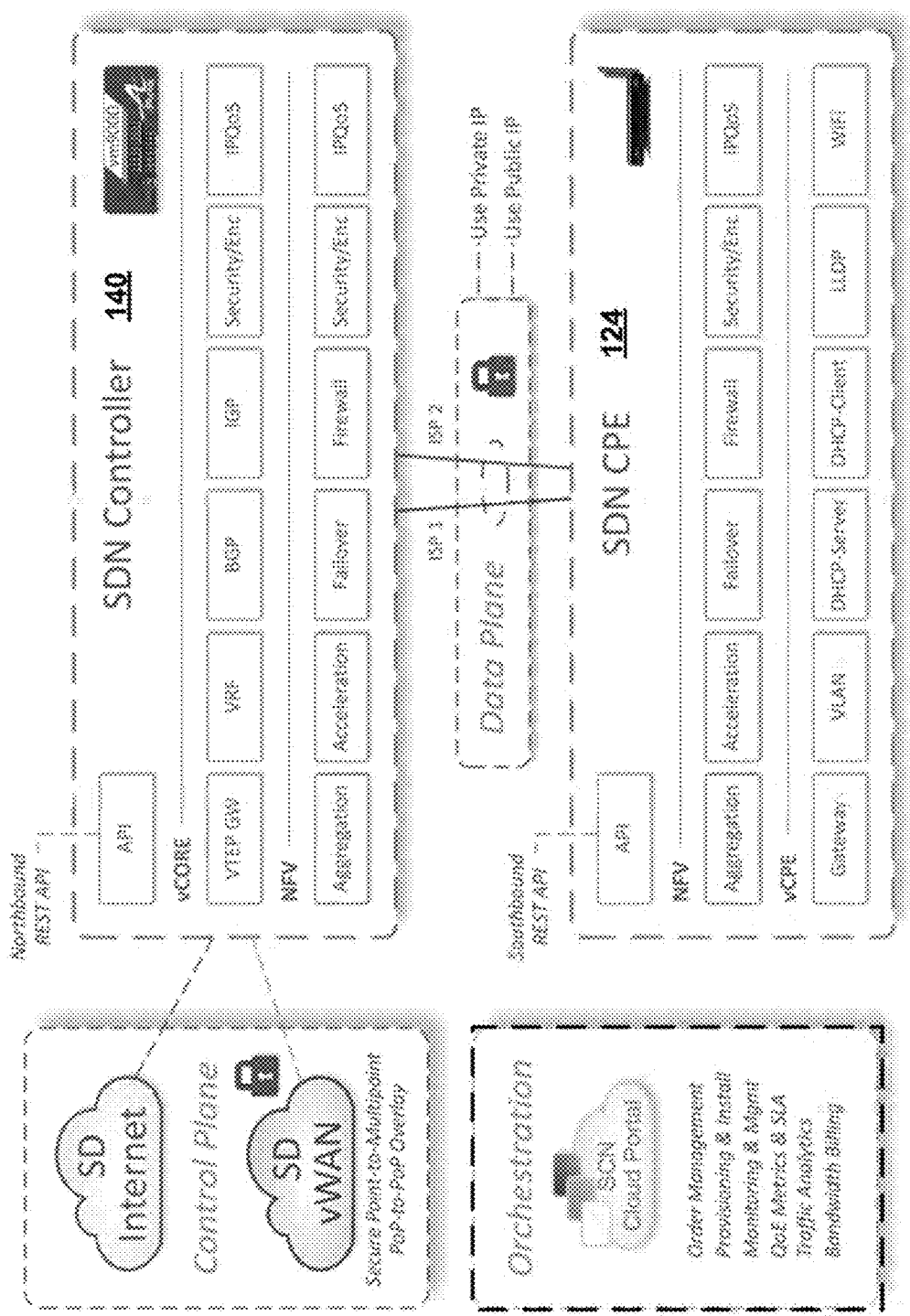
FIG. 37 illustrates an example software controlled networking including a SDN Controller and a Customer Premise Equipment.

Referring now to FIG. 37, which illustrates an example software controlled networking including a Cloud Manager or SDN (Software Defined Networking) Controller 140 and a Customer Premise Equipment (CPE) 124. As can be seen, Controller 140 may include a Virtual Core which may be configured to address the Virtual Control Plane, as further described herein. Controller 140 may further include Network Functions Virtualization (NFV) such as aggregation, acceleration, failover, firewall, security and encryption, and IP Quality of Service (Qos).

PoP-to-PoP Unicast Tunnel Communication

Embodiments described herein may implement a point-to-point, e.g. POP-to-POP or Concentrator-to-Concentrator, tunnel (also referred to as "path") communication using unicast transmission, which may require a new unicast path and associated Virtual Control Plane interface on a host Concentrator 110*a* for each remote Concentrator 110*b*, 110*c* connected thereto.

In one embodiment, an unicast path may represent a relationship from a local address to remote underlay endpoint addresses that the tunnel is built upon. In the Point-to-Multipoint over Unicast examples, there may be several underlay paths that each form an Overlay Tunnel to that unique destination or PoP between VCP Controllers.

Figure 35A:
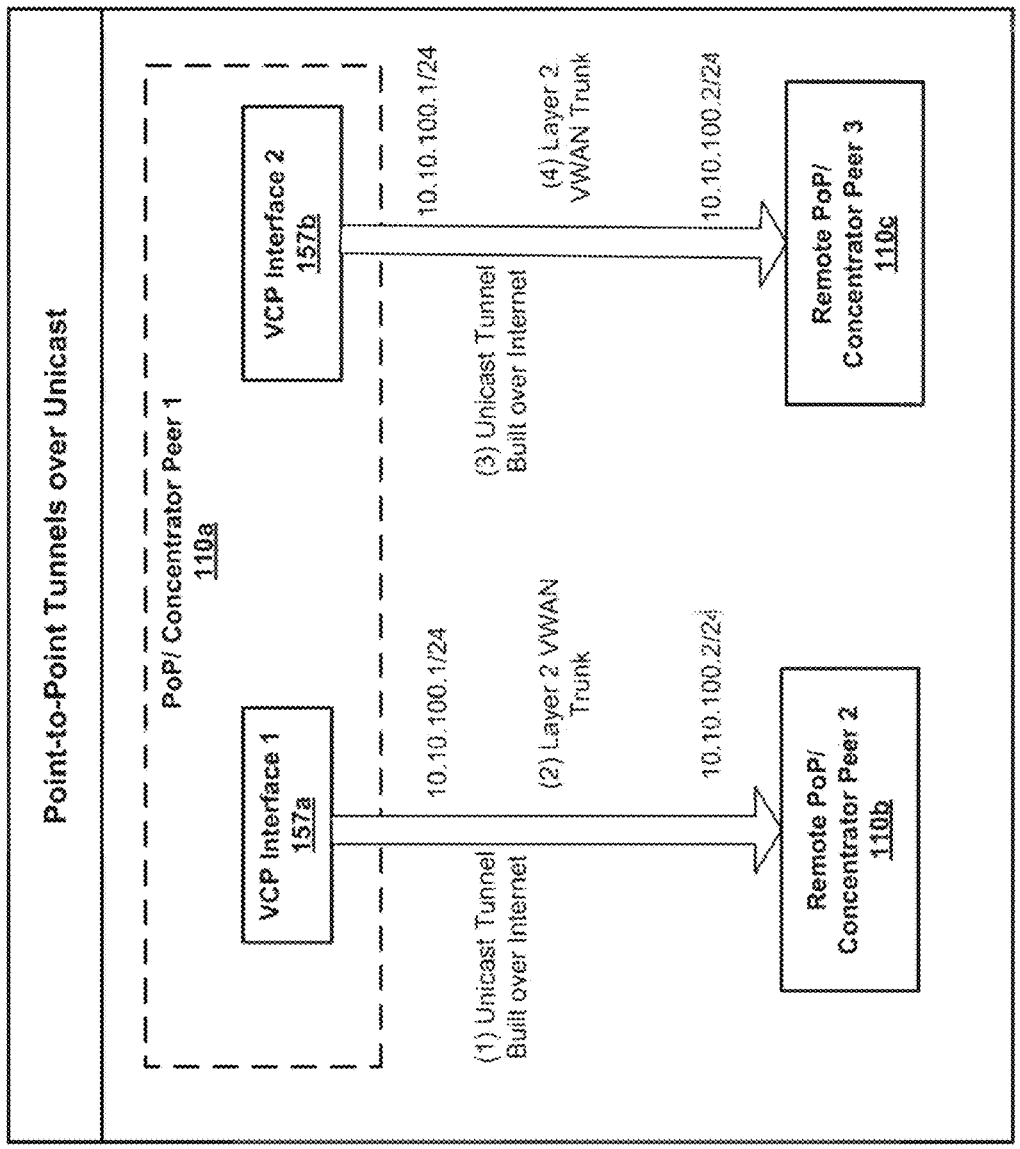
FIG. 35A illustrates an example point-to-point tunnel communication over unicast.

Turning now to FIG. 35A, there is shown an example point-to-point unicast tunnel. As can be seen, a Concentrator 110 may function as a Virtual Overlay Endpoint gateway for a PoP-to-PoP data transmission, such as for a Virtual Core 135 or Virtual Network Overlay 150 (not shown). Virtual Control Plane transport between each PoP may be encrypted to secure the data transmission for each customer. The Concentrator 110*a* may include at least one Virtual Control Plane (VCP) interface 157*a*, 157*b* for data traffic control and management.

In one embodiment, each VCP interface 157*a*, 157*b* may be configured to transmit to a single remote PoP or Concentrator "Peer 2" 110*b* or "Peer 3" 110*c* through a unicast tunnel built over a core network (e.g. Internet or MPLS), as shown. A Layer 2 (data link) data trunk may then be transmitted over the unicast tunnel.

In some embodiments, the point-to-point unicast communication may not be scalable in a multi-POP scenario. For example, there may be a large amount of connections for the host Concentrator, for example, where there may be over a thousand of multi-tenant connections.

For example, if there is a particular Concentrator with 1000 vWAN (SD-WAN) customers, and there are 100 PoPs that each has a CPE that belongs to each of these vWANs (SD-WANs), there may be as many as 100,000 unicast paths and 100,000 VCP interfaces on each Concentrator. This may not be the most efficient use of resources.

Point-to-Multipoint Tunnels Over Multicast Communication

Embodiments described herein may implement a Point-to-Multipoint implementation that uses multicast to identify members in a multicast group (e.g. MCAST NET). In some embodiments, multicast group members may include Concentrators 110*a*, 110*b*, 110*c*, where one or more Concentrators may each act as a Virtual Overlay Endpoint. Once a Concentrator member has joined the multicast group, the Concentrators in the group may establish dynamic unicast tunnels to one another over the same VCP interface.

This method may be scalable for local data center implementations and for Concentrators configured to act as Virtual Overlay Endpoints that are on the same subnet or have multicast routing enabled between them.

Figure 35B:
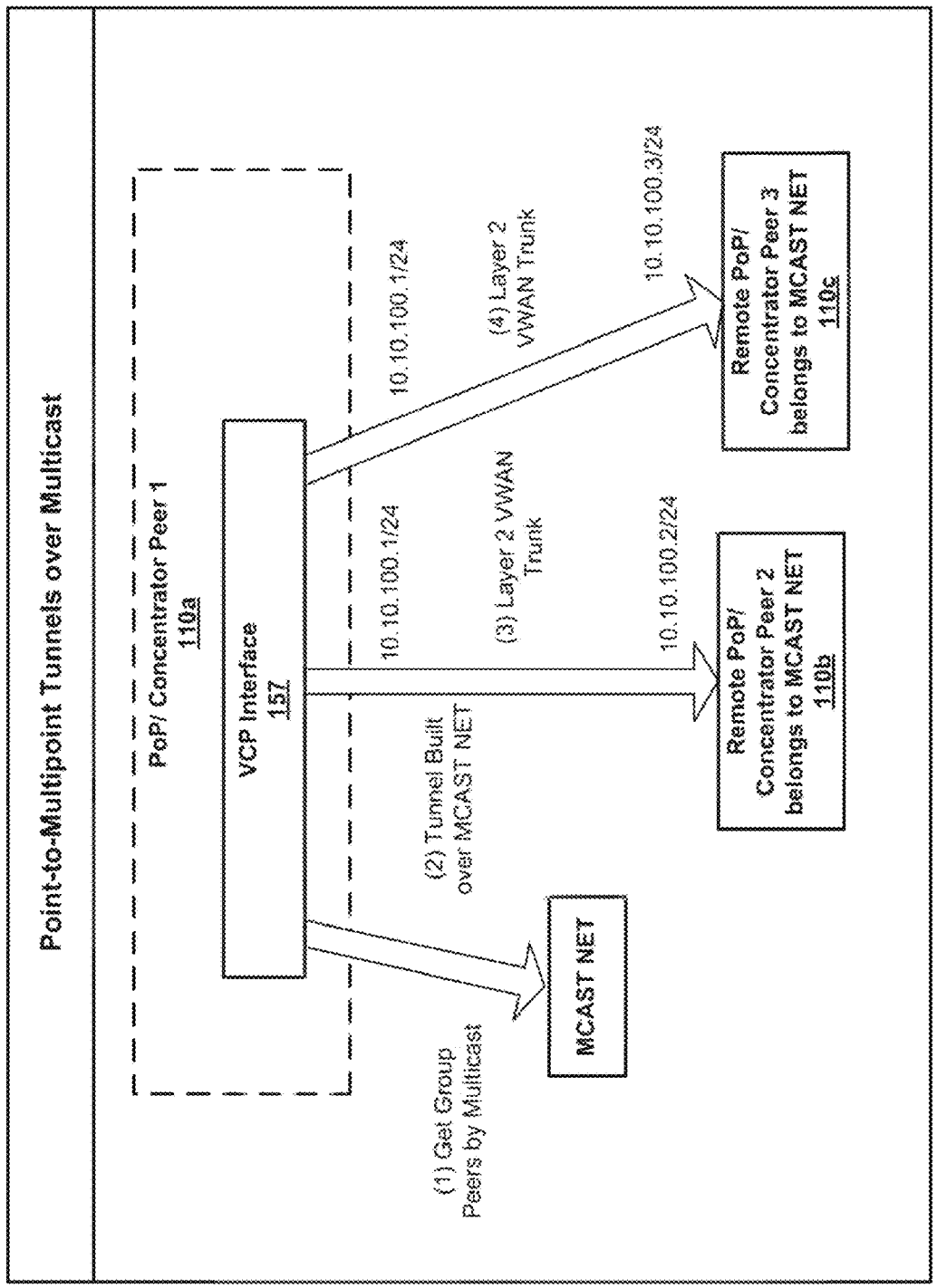
FIG. 35B illustrates an example point-to-multipoint tunnel communication over multicast.

Referring now to FIG. 35B, there is shown an example point-to-multipoint communication tunnel over multicast. As can be seen, a Concentrator 110*a* may function as a Virtual Overlay Endpoint gateway for a PoP-to-PoP data transmission, such as for a Virtual Core 135 or Virtual Network Overlay 150 (not shown). Virtual Control Plane transport between each PoP may be encrypted to secure the data transmission for each customer. The Concentrator 110*a* may include at least one Virtual Control Plane (VCP) interface 157 for data traffic control and management between Concentrator 110*a* and each of peer Concentrators 110*b*, 110*c*.

In some embodiments, VCP interface 157 of Concentrator 110*a* may receive or otherwise determine members or peers of a multicast group MCAST NET. For each multicast group member 110*b*, 110*c*, VCP interface 157 may be configured to implement a unilateral tunnel or path over MCAST NET for transmission of data trunk or packets over layer 2 network protocol to each remote PoP/Concentrator 110*b*, 110*c*. Each of the remote Concentrator 110*b*, 110*c* may in turn has its own VCP interfaces (not shown) for data transmission to peer Concentrators a multicast group.

In one embodiment, a fully meshed underlay between PoPs may be implemented to provide multicast between Concentrators at a distance over Internet.

In another embodiment, a further overlay between Concentrators configured to act as Virtual Overlay Endpoints may be implemented for a multicast group that supports a Virtual Network Overlay thorough a multicast overlay. In one aspect, Maximum Transmission Unit (MTU) size may be reduced. This multicast support network between PoPs may generate additional management overhead for operations.

This particular configuration with multicast tunnels may be an improvement over the point-to-point communication over unicast. For example, a Concentrator, which may be configured to function as a Virtual Overlay Endpoint, may have 1000 vWAN (SD-WAN) customers. There may be 100 PoPs that each has a CPE that belongs to each of these vWAN (SD-WAN) customers. This way, there may be as many as 1000 unicast paths and 1000 Virtual Control Plane interfaces on each Concentrator, which may be more resource-efficient than the 100,000 unicast paths and interfaces using the point-to-point communication over unicast path technology, as elaborated in section above.

In some embodiments, the infrastructure requirements for multicast between remote Virtue Overlay Endpoints at a distance is not trivial and may complicate the transparent flexibility of the virtual WAN with per customer PoP-to-PoP Network Overlays that can function over any network.

Unicast Path for Point-to-Multipoint Communication

In accordance to some embodiments, for a given network, Virtual Core 135a, 135b or Virtual Network Overlay 150 between a Concentrator 110a at a PoP and one or more Concentrators 110b, 110c at remote PoP(s) may include point-to-multipoint communication based on a unicast path, which may be managed by Virtual Control Plane. The Cloud Network Controller 140 may be configured to address the need for overlay networks within virtualized data centers accommodating multiple tenants, such as multiple concentrators 110a, 110b at one or more PoPs.

Figure 36:
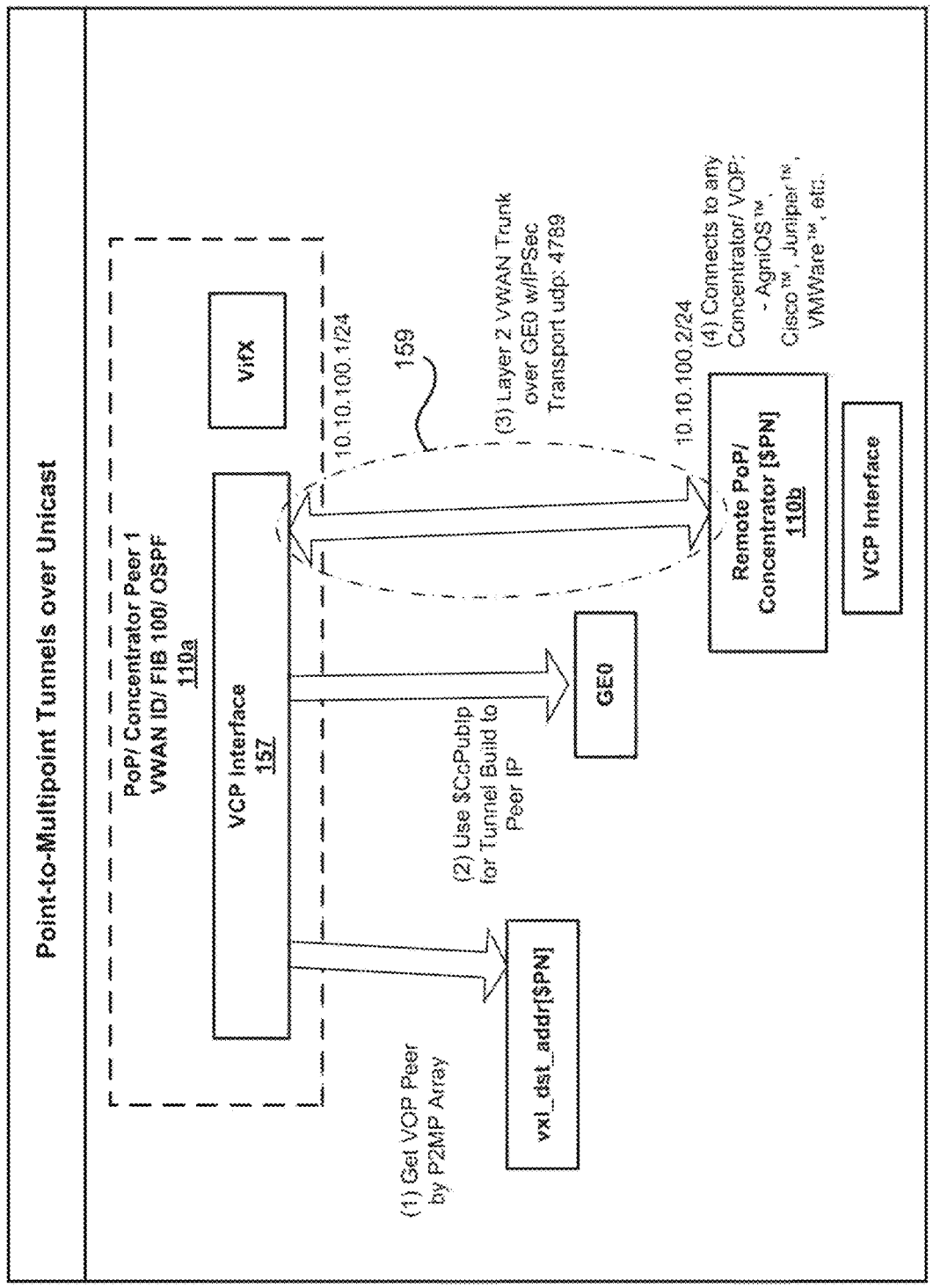
FIG. 36 illustrates an example point-to-multipoint tunnel communication over unicast.

Referring now to FIG. 36, for example, each Concentrator 110a, 110b may be configured to act as a Virtual Overlay Endpoint (VOE) and include an Virtual Control Plane (VCP) interface 157 for data traffic control and management over unicast path 159, which may be managed by Cloud Network Controller 140, For example, Cloud Network Controller 140 may be configured to manage, through VCP interface 157, unicast tunnel or path 159 for a given Virtual Network Overlay 150. Frame encapsulation may be conducted by each Concentrator in its capacity of a Virtual Overlay Endpoint. Each Concentrator as a Virtual Overlay Endpoint may have a logical interfaces such as a VCP interface 157. The VCP interface 157 may be responsible for sending or receiving frames with an IP address (e.g. 10.10.100.1/24). The IP address may be used for receiving or routing encapsulated frames. For example, packets received on the VCP interface 157 may be mapped based on a lookup operation from a local table. The lookup operation may provide the appropriate IP address of the destination Concentrator. Frame may be then encapsulated and transmitted accordingly.

In some embodiments, a CPE VIF and the VCP Interface 157 may be joined within a FIB in Concentrator 110a.

In some embodiments, the unicast path configuration described herein does not require a further underlay network in order to support a multicast group or an existing multi-tenant group implementation.

As an illustrative embodiment a WAN employing Virtual Network Overlay may be referred to herein as vWAN.

In one example embodiment, VCP interface 157 functionalities may be implemented in software, hardware, or a combination of both. For example, VCP interface 157 may be implemented as a virtual switch or within a physical switch or router. For example, source code within a Concentrator may be modified to support a unicast based point-to-multipoint implementation that can use a single VCP interface 157 on the Concentrator/VOE to connect with multiple remote Concentrators or VOEs belonging to a vWAN. Each VCP interface 157 on a VOE can be configured to support multiplex socket connections to other VOEs.

The array of unlimited list may include the broadcast domain and VCP peer lookup capacity. In some embodiments, a broadcast may be conducted to each VCP peer for communications, which may be susceptible to unnecessary overheads. In other embodiments, the list may be confined to the size of the subnet applied to the VCP Interface (e.g. 10.10.100.1/24=list of 254 max peers), which may be dynamically adjusted based on the specified subnet mask and provides a faster lookup.

Extending Bonded/Aggregated Connections from Edge to Core

Embodiments described herein may implement SCN-edge into a core network to provide end-to-end Virtualized Networking and deliver next generation WAN solutions using a Virtual Network Overlay 150. Examples are shown in FIGS. 23A, 23B, 24A, 24B, and 24C. For example, the VC connections may extend a bonded/aggregated connection to a core network 112.

Figure 25:
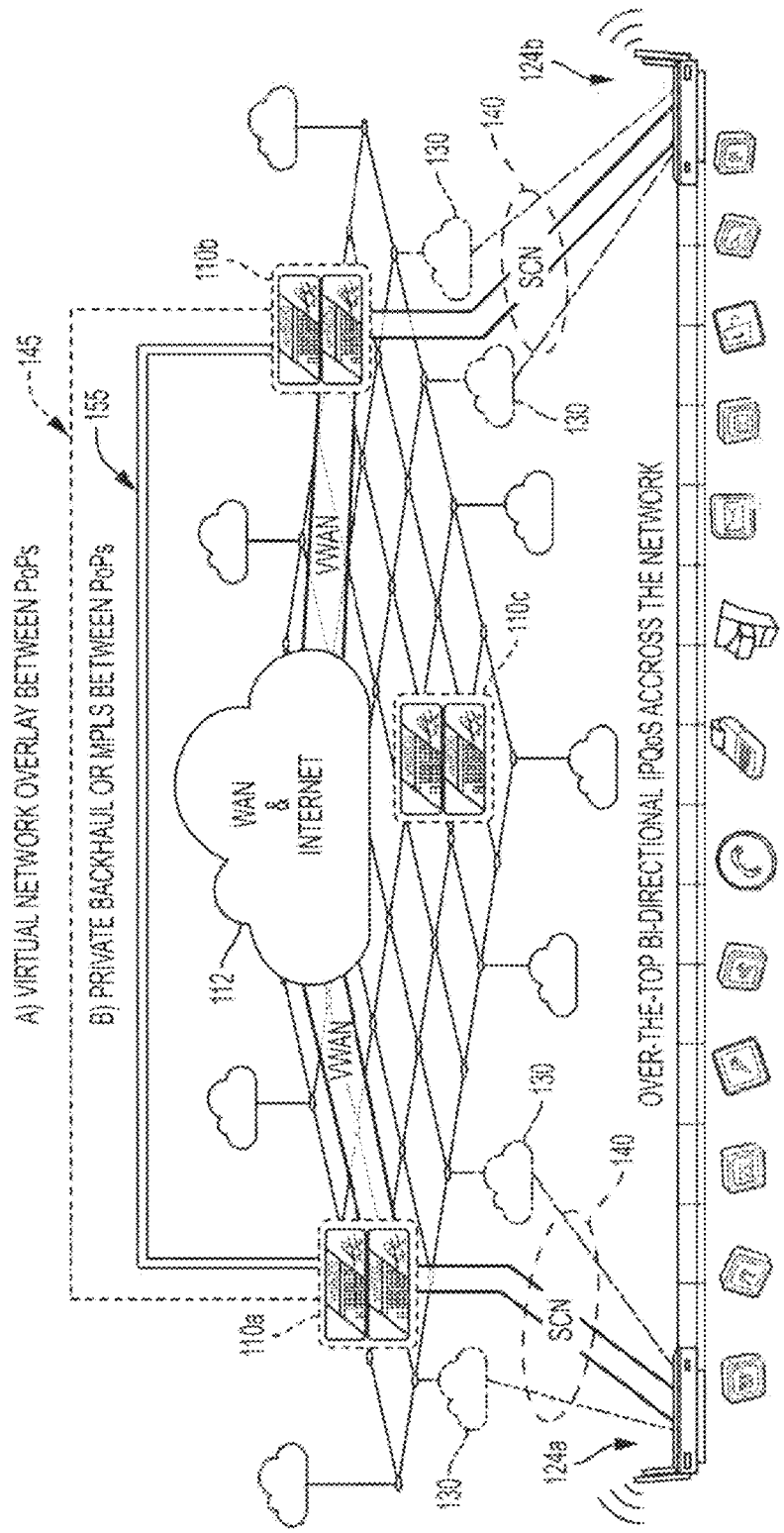
FIG. 25 illustrates a Virtual Network with aggregated/bonded connections with Virtual Network Overlay and private backhaul options in accordance with one embodiment.
Figure 27:
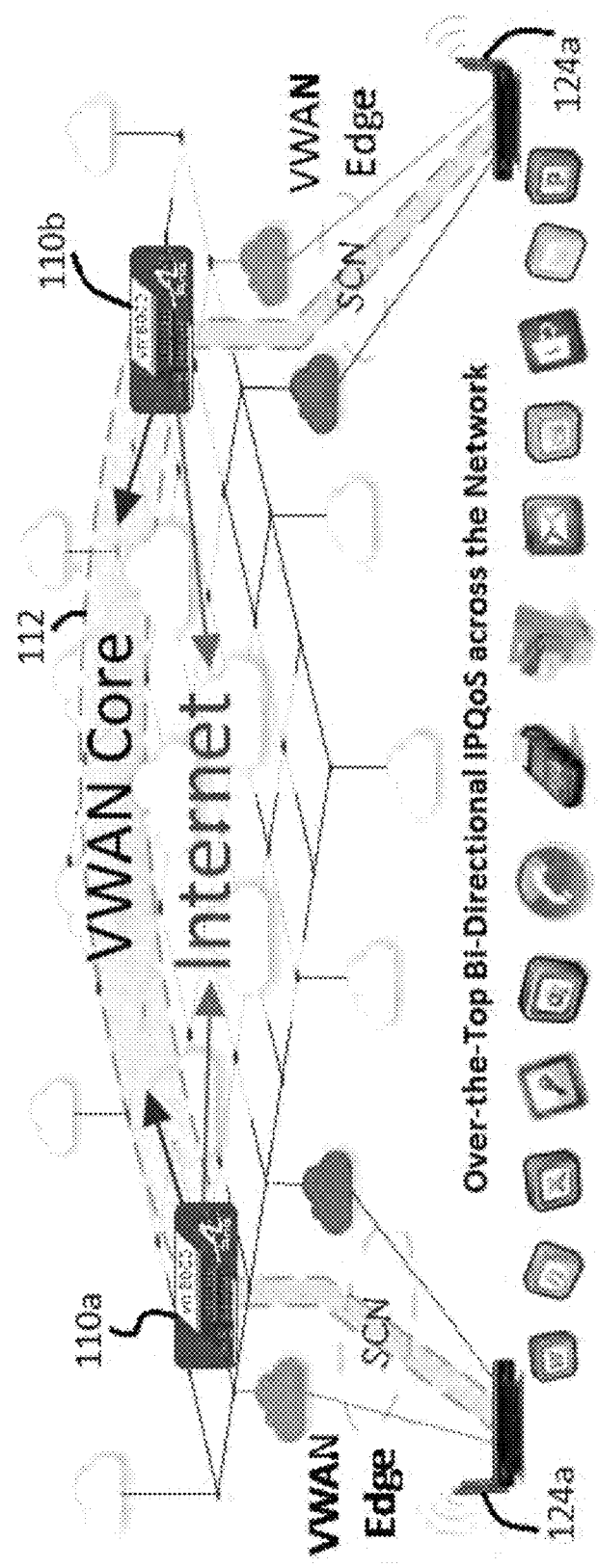
FIG. 27 illustrates another Virtual Network Overlay with aggregated/bonded connections and private backhaul options in accordance with one embodiment.

Two additional illustrative examples are shown in FIGS. 25 and 27. As shown in FIG. 25, the extension of a bonded/aggregated connection from the edge to core may be provided using the following illustrative example options: 1) deploying a virtual network overlay strategy between PoP's with encryption (A); and 2) interconnecting PoP's with private lines (B). These are illustrative examples only.

In one exemplary embodiment, the Virtual Network Overlay 150 may provide autonomy from any Carrier or Network in the core network 112. The core network 112 may be a central component or part of a communications network and may be implemented using different networking technologies and protocols. The Virtual Network Overlay 150 may be implemented as a virtual WAN backhaul between POPs 130 or concentrator elements 110. The Virtual Network Overlay 150 may be meshed Generic Routing Encapsulation (GRE) or virtual Ethernet tunnel network (e.g. using VC connections 135a, 135b) connecting multiple cloud concentrator elements (e.g. from cloud concentrator 110a to cloud concentrator 110b). The GRE protocol may belong to a specific VLAN by IP or Bridged.

Each concentrator element 110a, 110b may be part of a POP 130 or may be connected to a nearby POP 130. The concentrator element 110 may be referred to as a virtual WAN cloud concentrator instance generated by network controller 140 accessible by way of an SCN portal. Each concentrator element 110a, 110b may handle multiple bonded/aggregated connections and may handle one process per network or customer.

The network controller 140 may be accessed using an SCN portal as an illustrative embodiment. The SCN portal may be an interface to display real-time data about the network infrastructure and may be used to configure various components of the network infrastructure.

A CPE 124 a, 124b may be a virtual access CPE providing WAN or Internet access. It may have diverse carrier support with bandwidth aggregation. Additional optional features may include pre-emptive failover, lossless/same IP and bi-directional IPQoS capabilities.

A private backhaul or backbone option 155 may also be deployed to provide WAN solution. The private backhaul may include private MPLS or P2P links between POPs 130.

As an illustrative embodiment a WAN employing Virtual Network Overlay may be referred to herein as VWAN.

In some instances, a VWAN can be a VLAN associated per network or customer.

Furthermore, virtual edge architecture may allow for the Layering of MPLS or other network protocol over the top of this implementation.

PoP-to-CPE Transparent Lower-Link Encryption for Aggregated/Bonded Connection

Embodiments described herein may provide a virtual edge for aggregated/bonded connections with transparent lower-link encryption. FIG. 23A shows an example virtual edge 128.

Proximal Aggregation & Distributed CPE Encryption

In one embodiment, implementation of proximal aggregation connects multi-site customer CPE 124 devices to the nearest point-of-presence (POP) 130, thereby establishing an overlay network session with aggregated connections using the aggregated/bonded connection technology described herein. CPE 124 devices belonging to multi-site customers may use the larger non-aggregated Internet or backbone upstream connections to establish Internet access and build IPVPN connections for inter-office communications. This may eliminate the need to perform long-haul aggregation between sites which may degrade and/or negate the aggregated network performance when communicating at a distance.

Complexity of CPE Encryption for Multiple Tenants

CPE encryption for multi-tenant implementations add complexity to the practice of encrypted VPN when observed on a per customer basis and having to manage overlapping CPE LAN IP Subnets from various customers. Furthermore, this multi-tenant management of per customer IPVPN connections carries additional complexity when considering the distributed nature of these diverse VPN implementations and overlapping CPE LAN subnets.

Simplifying PoP-to-CPE Encryption

To help ease the complexity and limitations of standard encrypted IPVPN implementations while addressing the nuances of overlapping CPE LAN IP Subnets; a transparent Lower-Link protocol encryption technology or process may be deployed for the virtual edge that does not concern itself with the CPE LAN IP Subnet. This technology or process can encrypt the Lower-Link encapsulated traffic and moves the responsibility of the CPE LAN IP Subnet management up into the ANA and IP transport layers, where it can be addressed adequately without the complications of encryption management and complex encryption policy definitions in a multi-tenant deployment.

PoP-to-CPE Transparent Lower-Link Encryption for Aggregated/Bonded Network

In one exemplary embodiment, the Virtual Network Overlay may provide PoP-to-CPE Transparent Lower-Link Encryption for each aggregated/bonded connection 116 using virtual edge connections and virtual core (VC) connections. In an example embodiment, the VC connection may be implemented as a virtual Ethernet tunnel. This may eliminate the need for Customer IP intelligence in the encryption layer for Lower-Links. The transparent lower-link encryption at concentrator elements 110 can encrypt all aggregated/bonded encapsulation of Lower-Link connections transparently. In one embodiment, the Virtual Network Overlay is designed such that concentrator element 110 if and when CPE 124 is configured to enable lower-link encryption. This allows for both the Virtual Network Overlay and non-Virtual Network Overlay CPE implementations. Therefore, the Virtual Network Overlay can reach customers with a secure connection that may go faster and may cost less than traditional MPLS.

Figure 28A:
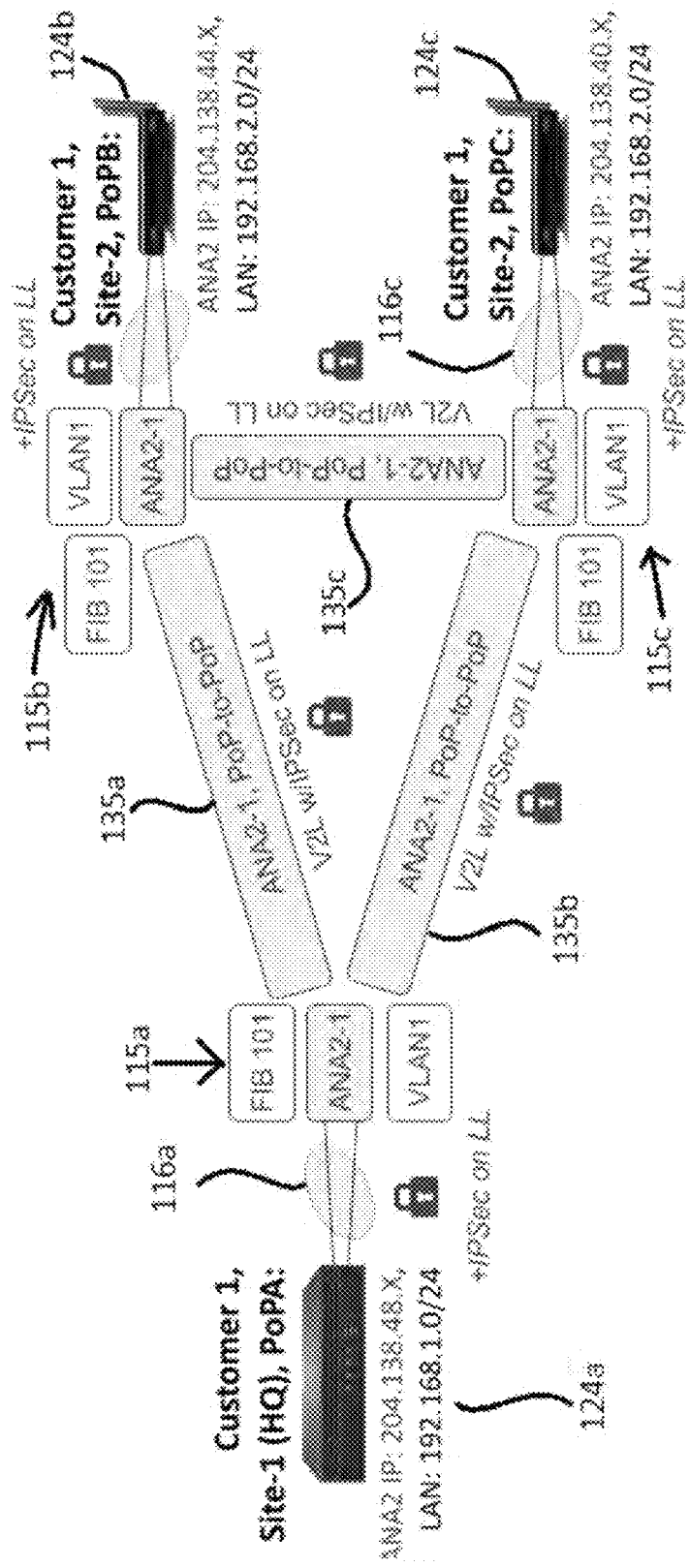
FIG. 28A illustrates a network solution where IPSEC encryption is used for Lower-Link transport, in accordance with one embodiment.
Figure 28B:
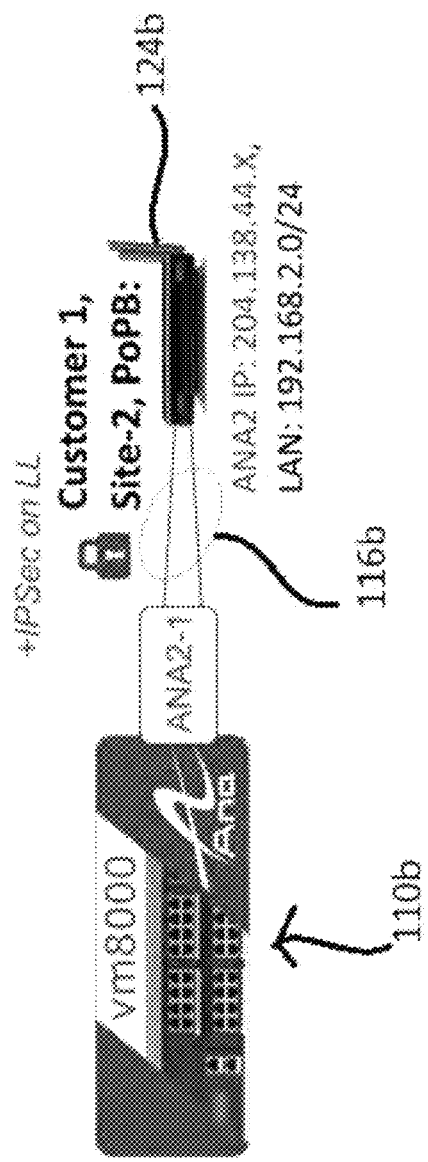
FIG. 28B illustrates another network solution where IPSEC encryption is used for Lower-Link transport, in accordance with one embodiment.

As illustrated in FIGS. 28A and 28B, IPSEC encryption may be used for Lower-Link transport. This allows for multiple CPE customers with overlapping IP subnets by not triggering the policy based on customer LAN subnet.

In one embodiment, lower-link encapsulation may have a 32 Byte overhead per packet implemented on the LMTU and LMRU settings. Furthermore, the Vif0 or 'ana session', may also have an overhead of 8 bytes implemented on the LMRRU setting of 1508.

IPSec encryption for Lower-Links may require an additional 72 Bytes for ESP Tunnel Mode and may be accommodated in configuration in the LMTU and LMRU settings, which may require changes to the calibration and also template configuration in cloud network controller 140 for service type of the Virtual Network Overlay.

Figure 26:
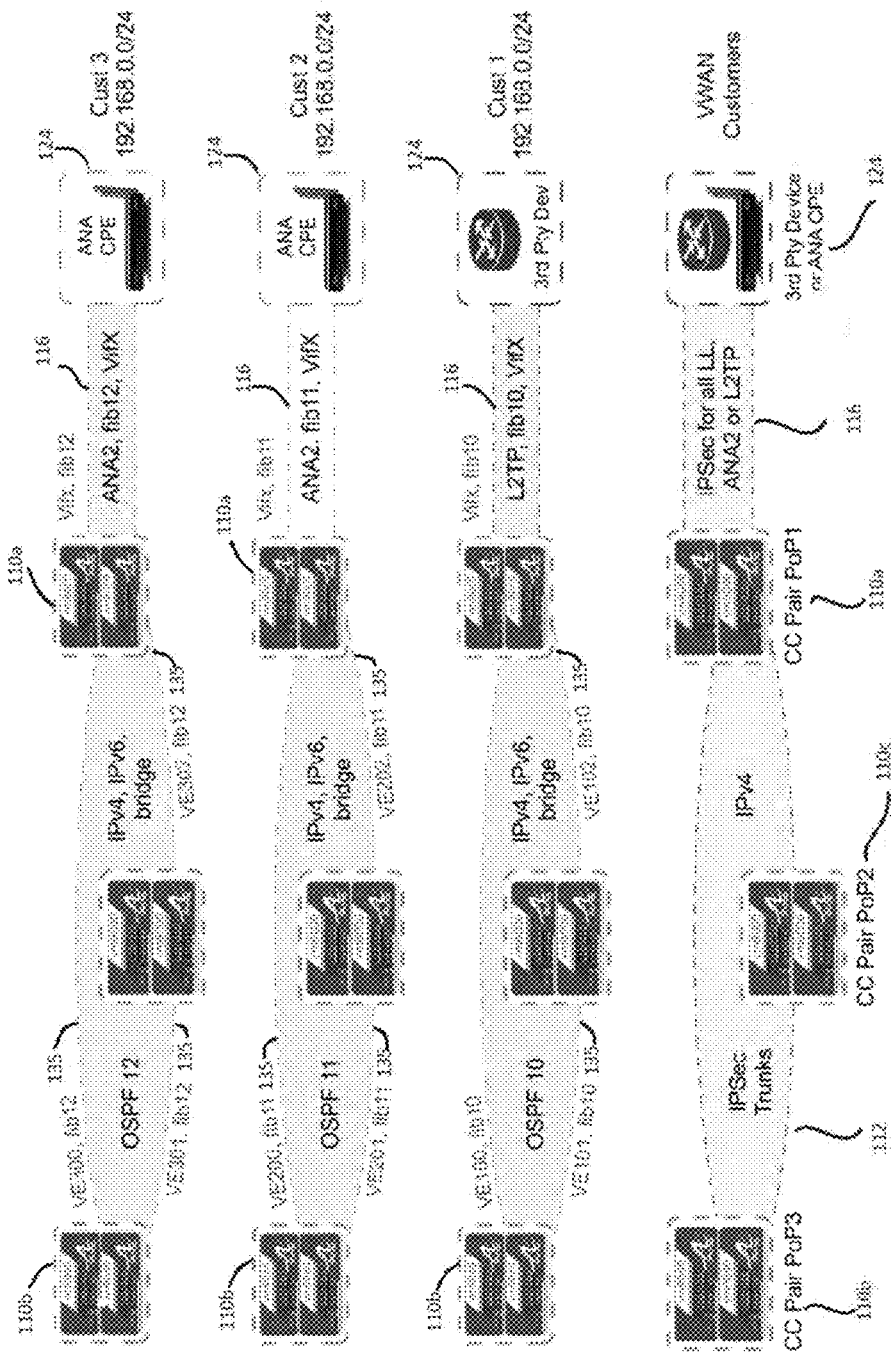
FIG. 26 illustrates an example of the Virtual Network Overlay framework is illustrated in accordance with one embodiment.

Referring now to FIG. 26, an example of the Virtual Network Overlay framework is illustrated in accordance with one embodiment. At customer premises, a CPE 124 or a third party device may be used to connect to concentrator element 110a through aggregated/bonded connection 116.

The CPE 124 or a third party device may be situated at overlapping IP subnets and possibly dealing with cpelan conflicts. The concentrator elements 110a may map Virtual Edge to CPE Vif and update routing accordingly, via for example RADIUS protocol, which provides overlay identifier (e.g. vwanid) and other attributes (e.g. cpelan attributes). Concentrator elements 110a may also inject route to OSPF. Concentrator elements 110a may also inject the route(s) into the Virtual Core's dynamic routing mechanism such as OSPF, RIP, or BGP.

In some embodiments, as shown, various VC connections 135a, 135b can be established between various concentrator elements 110a, 110b, 110c. These VC connections form a POP-to-POP Network Overlay, where each POP may include one or more concentrator elements 110. Transparent Encryption may be provided for the Virtual Network Overlay core transport. The Virtual Core connection 135 addresses the Virtual Control Plane aspect of the SDN to SCN Mapping as per the tables of system and network components herein. The transparent encryption of the virtual core tunneling protocol connections address the Core/Branch Infrastructure component of the SDN to SCN mapping for the Lower Plane infrastructure architecture as per the tables of system and network components herein.

The below tables demonstrate example functions and descriptions for selected components of the Virtual Network Overlay in accordance with one embodiment. The Virtual Network Overlay may be referred to herein as VWAN or virtual WAN as an illustrative example.

| | System Components | |
|---|---|---|
| Item | Function | Description |
| 5 | Monitoring & Management | The SCN Portal application may be extended to support the new VWAN monitoring and management requirements and provide a single sign-on unified Portal for VWAN customers. |
| 4 | Cloud Orchestration/ Provisioning | The SCN Portal application may be modified to support the new VWAN requirements as an extension to the aggregated connection CPE device provisioning. |
| 3 | Virtual Control Plane VRF w/OSPF | Concentrators may join VWAN CPE sessions with VWAN Core Routing to create secluded customer Route Domains managed dynamically using OSPF, a dynamic routing protocol. This may avoid a network trombone impact and may to support a split Internet & WAN access from the PoP for the Virtual Data Plane. |
| 2 | Virtual Data Plane Network Access & CPE Authentication | Concentrators perform Network Access Server (NAS) type functions that connect and aggregate CPE devices on the edge of the Core Network. New RADIUS (Remote Authentication Dial In User Service) attribute capability may be added to support VWAN. |
| 1 | Security with IPSec & Firewall | Concentrators and CPE devices may handle both Edge and Core encryption and Firewall to secure the network end-to-end. |

| Network Overlay Core Layers | | |
|---|---|---|
| Layer | Function | Description |
| 5 | Virtual Control Plane VRF w/OSPF | FIB for VRF Backbone Mapping Customer VWAN Trunk to aggregated connection Sessions (Core to Edge) |
| 4 | Star or Mesh Topology | VWAN Core Tunnels between PoPs/CCs in a Star or Mesh Topology |
| 3 | Virtual Data Plane w/Dynamic Routing | OSPF for Dynamic VWAN Routing Between PoPs/CCs |
| 2 | Encryption for VWAN Core: | Encryption for VWAN Trunks w/IPSec for lower layer traffic fully meshed between all CC's at all PoPs. |
| 1 | Firewall | Allowing VWAN Trunk encryption while protecting foreign encryption attempts. |

| Network Overlay Edge Layers | | |
|---|---|---|
| Layer | Function | Description |
| 4 | Virtual Control Plane VRF w/OSPF | FIB for VRF Edge Mapping Customer ANA Sessions to VWAN Trunks (Edge to Core) |
| | Virtual Data Plane w/Dynamic Routing | OSPF for Dynamic VWAN Routing Between PoPs/CCs |
| 3 | Virtual Data Plane for ANA w/Proximal Aggregation using Distributed PoPs | Uses Proximal Aggregation connecting multi-site customer CPE devices to the nearest PoP establishing an overlay network between sites. The CPE devices establish ANA Sessions with Lower-Links Aggregation, Pre-emptive Lossless Failover, and Bi-Directional IPQoS. Split Internet & WAN access from the PoP. |
| 2 | Encryption for ANA Lower-Links | Encryption for Lower-Links w/IPSec of aggregated connection encapsulated transport. Supports both VWAN and non VWAN CPE implementations. |
| 1 | Firewall | Allowing CPE Lower-Link encryption while protecting foreign encryption attempts. |

| SDN TO SCN Mapping | | | |
|---|---|---|---|
| SD WAN (SDN) | IP Networking | SCN | SCN and VWAN (Virtual Network Overlay) |
| Orchestration | Management Plane | SCN Portal | Multi-System Integration (OE, Tickets, NMS, CPE API) |
| Control Plane | Forwarding Plane | CC Multi-PoP | Virtual Control Plane (FIB, VE to ViF, OSPF) |
| Data Plane | Route Table | CPE | Virtual Data Plane (Routes, ANA Vif, DG or OSPF) |
| Encryption | IPSec | Security | Transparent Encryption (LL & Core Transport) |

| OTT - Lower Plane Infrastructure (IP Underlayer) | | | |
|---|---|---|---|
| Core/Cloud Infrastructure | Internet | Multi-PoP (Multi-Peer, NNI, CNI) | iBGP |
| Site/Branch Infrastructure | Internet or Private Line | Cable, ADSL, etc . . . | IP, MPLS, Ethernet |

The SDN to SCN table provides an illustrative example mapping between IP networking, SDN, SCN and Virtual Network Overlay to highlight example features. The terminology is used as an example illustration and other terminology may be used to reference various functionality. The table summarizes example features to provide an illustrative mapping. The table also lists example features for Over-The-Top (OTT) lower plane infrastructure as further illustrative mappings.

Virtual Network Overlay with SCN

In one embodiment, Virtual WAN or Network Overlay may use cloud network controller 140 with SCN Cloud management and automation to create an Over-The-Top Secure High Performance Network that connects multiple WAN sites across Multiple Points-of-Presence between CPE devices.

The Network Overlay may provide Optimized Internet Access, Secure WAN, Diverse Carrier Failover, and Bi-Directional IPQoS.

Carrier/Partner Features

In another embodiment, the VWAN configuration can support multi-tenant implementations by providing features such as route domain separation for overlapping customer IP Subnets, star and/or mesh WAN topology options with multipath WAN trunking, and dynamic per-VWAN routing updates with OSPF.

In one example, the Virtual Network Overlay (which may be referred to as VWAN) may provide PoP-to-PoP transparent VWAN trunk encryption, which has features such as:

Reduction of complexity by eliminating the need for Customer LAN intelligence in the encryption layer between PoPs;

Transparent customer WAN Core/Trunk encryption between PoPs. VWAN core trunks can be established for each multi-tenant customer as transparent Ethernet over IP tunnels that run on top of a single encryption session between CC's/PoPs;

Distributed PoPs provide a Virtual Point-of-Presence Network, enabling VWAN solutions to reach multi-site customers across North America.

The SCN Portal can be provided for accessing and configuring a cloud network controller 140 for ease of deployment and management of the VWAN. The SCN Portal can provide the following exemplary features:

OE, Install and Configuration, Monitoring & Management

Plugs Into Existing Monitoring System

Centralized Firewall, WiFi, & VWAN Control

Consistent Monitoring, Reporting & Management for all sites regardless of local carrier or connection type PoP-to-PoP Transparent Trunk Encryption VWAN may have a distributed PoP network covering North America for aggregation/bonded network services delivering speed, network efficiency, and reach for multi-site businesses.

A Virtual Point-of-Presence Carrier for the aggregated network system as described herein may provide customers with hot failover providing redundant and fault tolerant communications, supporting distributed points of presence for proximal aggregation throughout North America.

Distributed Proximal Aggregation with ANA & Multi-PoP

In another embodiment, Distributed Proximal Aggregation (DPA) may be implemented. DPA uses redundant Concentrators 110 established in multiple locations covering a multitude of Proximal Aggregation points known as Home-PoPs 130. Each Concentrator 110 supports multi-tenant configurations used for multiple clients associated with different CPEs 124 to improve network performance for such multiple clients by providing termination of their aggregation service and transfer of communications to the network backbone/Internet 112. This network solution may include multiple Points-of-Presence 130, distributed geographically bridging disparate areas with improved network communication with proximal aggregation to each customer CPE device 124.

Complexity of PoP-to-PoP Encryption for Multiple Tenants

PoP-to-PoP encryption for multi-tenant implementations adds complexity and may have limitations for the practice of Encrypted VPN between PoPs when observed on a per customer basis and having to deal with overlapping CPE LAN IP Subnets from various customers. Furthermore, the multi-tenant management of per customer IPVPN connections carries additional complexity when considering the distributed nature of these many diverse VPN implementations and overlapping CPE LAN subnets.

Simplifying PoP-to-PoP Encryption

In one embodiment, to overcome complexity and limitations of standard encrypted IPVPN implementations while addressing challenges of overlapping CPE LAN IP Subnets, extrapolation of the CPE LAN transport over the VWAN core from the encryption layer may be implemented to simplify the PoP-to-PoP encryption management.

In one example, Ethernet over IP tunnel (VE/gif) implementations on a per customer VWAN basis provides transparent encryption of these combined tunnels to simplify customer VWAN encryption requirements between PoPs 130.

This method moves the management of CPE LAN IP Subnets away from the VWAN Trunk encryption layer and up into the IP transport and IP routing layers.

In another embodiment, PoP-to-PoP Transparent VWAN Trunk Encryption may be implemented to eliminate the need for customer LAN intelligence in the encryption layer between PoPs, provide transparent customer WAN Core/trunk encryption between PoPs, and provide single encryption session between CC's/PoP's on top of which transparently create per customer multi-tenant Ethernet over IP tunnels (VE/gif) to facilitate VWAN Core Trunks.

The transparent encryption of the virtual core tunneling protocol connections address the Core/Branch Infrastructure component of the SDN to SCN mapping for the Lower Plane infrastructure architecture as per the tables of system and network components herein.

Virtual Backhaul—Multi-Tenant Support

In another embodiment, an over-the-top or Virtual Network Overlay solution can be implemented for the PoP-to-PoP interconnection of the core network. This solution can support multi-tenant implementations by providing route domain separation for overlapping customer IP Subnets, star and/or mesh WAN topology options with multipath WAN trunking, and dynamic per-VWAN routing updates with OSPF. This addresses the Virtual Control Plane component of the SDN to SCN mapping as per the tables of system and network components herein.

Per Customer Trunking

In order to address the potential overlapping of CPE LAN IP Subnets, the design associates VE PoP-to-PoP tunnels per customer VWAN with a distinct route domain by mapping VE trunks and ANA Vif sessions to unique FIBs/Route tables creating a per customer VWAN Route domain from one CPE to another CPE over the VWAN core.

Ethernet over IP tunnels (VE/gif for Trunking

The VE/gif interface can be a generic tunneling device for IPv4 and IPv6. It can tunnel IPv[46] traffic over IPv[46], thereby supporting four possible configurations. The behavior of gif is mainly based on RFC2893 IPv6-over-IPv4 configured tunnel.

Star & Mesh for Backhaul Network

Aggregation sessions are generally established between PoP's on a per customer basis. As seen below, a Star or a full Mesh implementation may be provided to address the varying needs of the customer.

Star Topology

Figure 29:
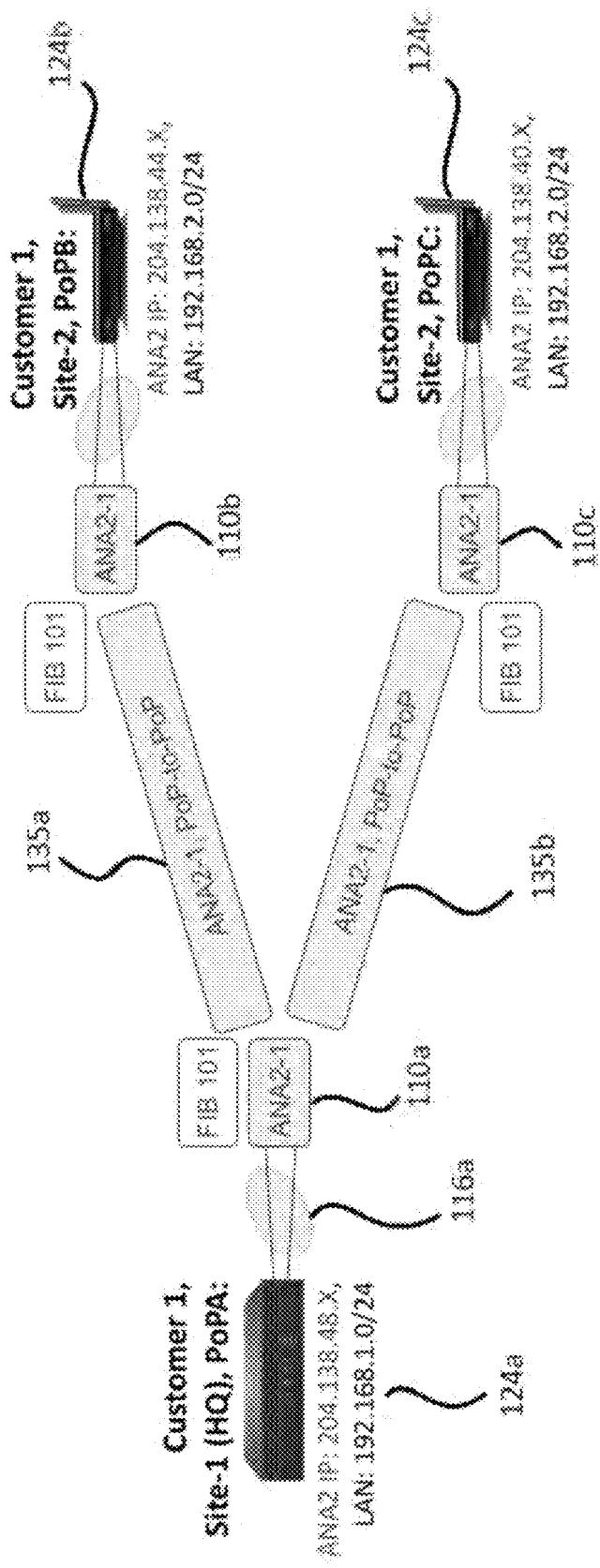
FIG. 29 illustrates a network solution in a star topology in accordance with one embodiment.

Referring now to FIG. 29, aggregation sessions established from all CPE side PoP's to Head Quarter's PoP 110a from the customer VWAN CC's and using the dedicated Multi-ANA instance which is associated to the dedicated customer FIB. CPE LAN traffic destined for the Head Quarter's LAN can traverse the ANA PoP-to-PoP session with full IPSec encryption.

Full Mesh Topology

Figure 30:
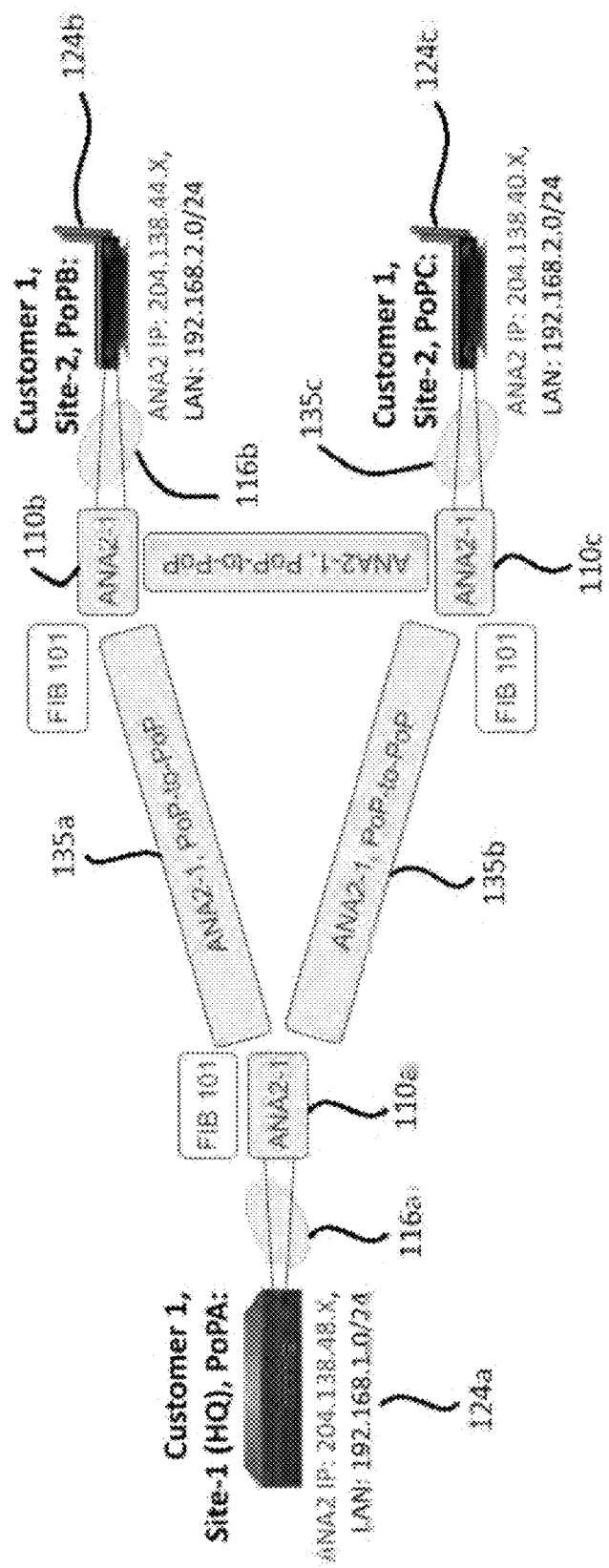
FIG. 30 illustrates a network solution in a full mesh topology in accordance with one embodiment.

Referring now to FIG. 30, aggregation sessions established from CPE side PoP's to Head Quarter's PoP 110a & also to every PoP containing this particular customer's CPE connections. The PoP-to-PoP ANA sessions originate and terminate on the customer VWAN CC's and use the dedicated Multi-ANA instance which is associated to the dedicated customer FIB. CPE LAN traffic destined for any other customer LAN can traverse the ANA PoP-to-PoP sessions with full IPSec encryption.

Rate-Limit & QoS

In another embodiment, The Virtual Network Overlay may provide the ability to subscribe to specific PoP-to-PoP bandwidth controlled by ANA RLA. Virtual Network Overlay may have the ability to use the IPDE RLA on lower-links for the Virtual Data Path (e.g. may be an aggregated product) and also between PoPs in the Virtual Control Plane (VC). The Virtual Network Overlay may provide VC connections, for example.

SCN Lit—RAS & Open Architecture

Figure 31:
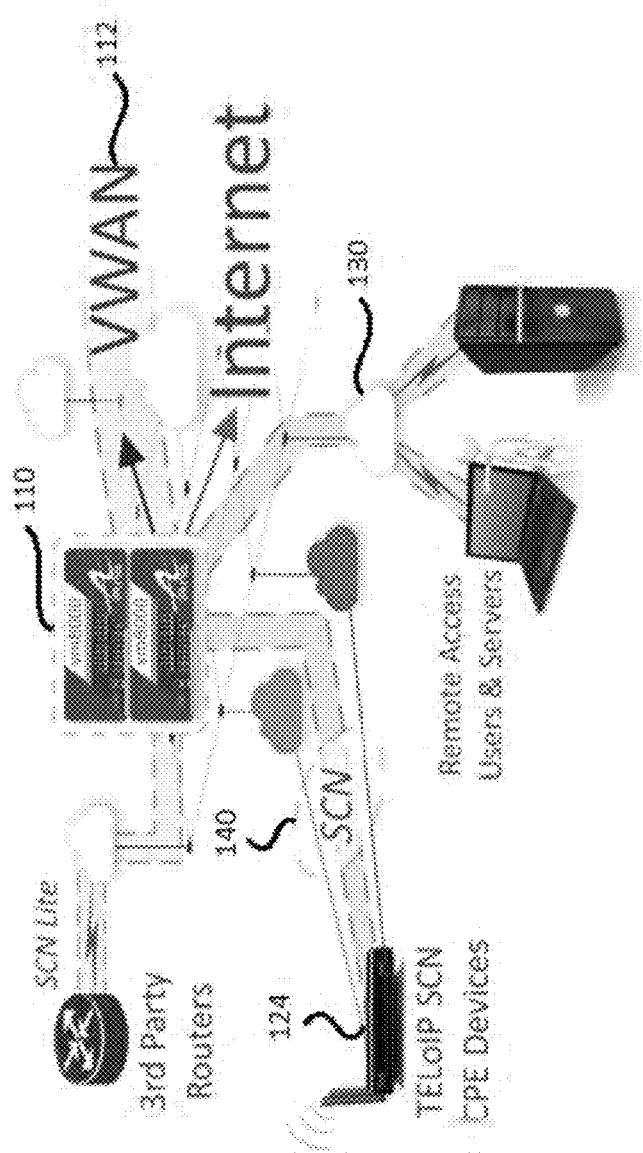
FIG. 31 illustrates a network solution with third party routers in accordance with one embodiment.

As shown in FIG. 31, routers with static ANA IP assignments can be implemented to connect as SCN-Lite for fixed sites. This embodiment opens up access to non-aggregated/bonded connection third party devices and software clients. In some embodiments, this may involve configuration of third party devices including both CPE and CCs. For example, a third party device may be a router. In some embodiments, third party devices, the CPE may be configured to support both non Aggregated and Aggregated implementations.

Embodiments described herein may involve particular configuration of third party network infrastructure for the Virtual Network Overlay, SCN, MDPS and IDPE functionality. The network infrastructure may be configured to support bonded/aggregated connections with multi-POP to provide improved virtual networking functionality. The Virtual Network Overlay may be implemented with carrier autonomy and independent CPE components supplied by third parties, for example. This may enable a user to avoid vendor lock as they update their CPE with particular configurations to support the Virtual Network Overlay. For example, third party routers may be upgraded with particular configurations described herein without requiring replacement of all hardware for the CPE.

In one embodiment, both ANA2 and L2TP link types may be supported simultaneously. There may also be a need to support multiple ANA2 ports such as x.x.x.x:6666, 7777, and 8888.

In another embodiment, ANA2-Server may support L2TP clients by configuring wildcard and NAT for Lower-Links security tasks on IPSec. Therefore, one solution may be implemented via mostly CLI and scripts. In one example, new RADIUS attributes may be added for third party device identification. For instance, new attribute may be set to SCNLITE, with value set to 1 or 0, and default value set to 0.

In yet another embodiment, CLI values may be changed to support both ANA2 and L2TP simultaneously.

A third party device may be configured to connect to an aggregate of multiple connections between concentrator elements using L2TP as the Lower-Links transport. This illustrative example uses L2TP which supports multilink and is used for connecting to ISP's and for remote access.

The particular configurations may enable integration of third party devices into the Virtual Network Overlay infrastructure to turn the third party devices into concentrator elements or CPE devices.

For third party CPE device support, an example illustrative embodiment may use MLPPP RFC 1990 with an aggregated/bonded connection as an overlay on top of common access protocols such as L2TP, PPPoE, or PPTP with multiple route tables and or static routes to manage and separate the Lower-Link traffic for aggregation. Once the traffic is separated we use MLPPP on the CPE to connect with CC elements.

The following process for configuration operations may be used.

First, the process may involve separating CPE traffic on the Lower-Links connecting the network infrastructure components. This may operation may involve configuration of a third party router (as part of the CPE) to update Lower-Links and multiple network connections. This may involve using a static IP route on each of the multiple interfaces or a dynamically assigned IP via DHCP or PPPoE or other protocol. This may further involve removing the default route on these interfaces or use of a separate routing table for each, such as a virtual routing and forwarding (VRF), for example. Static routes or multiple route tables may be added on each respective Lower-Link for the corresponding the CC Lower-Link IP. This effectively separates the Lower-Links data traffic.

Next, the process may involve CPE Links configuration for a Common Access Protocol. The Common Access Protocol may be for encapsulation and aggregation of data packets. This supports third party router equipment configuration for aggregated/bonded connection access using L2TP, PPPoE, PPTP, or other protocol. This may involve setup of virtual dialer templates for the lower-link transport using L2TP, PPPoE, or PPTP, for example. The virtual dialer templates allow for traditional MLPPP RFC 1990 to function over IP versus lower level serial type connections to T1 circuits. This may also involve setup of a multilink bundle with PPP multilink over the lower-link transport infrastructure. The aggregated/bonded connection may be compatible for MLPPP once the lower-link transport is compliant with a supported protocol such as L2TP, PPPoE, or PPTP, for example. This may also involve configuration of the third party router/CPE to use the multilink virtual interface as the default gateway.

These process operations may be used for CPE based on a third party device such as a third party router. From a Lower-Links perspective before aggregation these operations may ensure each lower-link has a separate path, and adds a static route for lower level IP address link. This may provide support for aggregated/bonded connections with a common transport protocol (L2TP). This may configure routers with multi-link over IP and provide lower-link encapsulation of data packets. For example, this may provide lower link encapsulation support for L2TP and PPPoE and PPTP and other protocols such as DHCP, UDP.

Further configurations may involve operations for CC to be compatible with lower links of configured third party device.

An operation may involve CC element configuration with MLPPP for Common Access Lower-Link Protocols. A CC for aggregated/bonded connections may be configured with MLPPP support over common Lower-Link transport protocols such as L2TP, PPPoE, or PPTP. This adds transport compatibility on the encapsulation side.

In an aspect, embodiments described herein may provide a Virtual Network Overlay for intelligent packet distribution over a plurality of potentially diverse links. The system may include an intelligent packet distribution engine ("IPDE") that incorporates or is linked to means for executing a decision tree. The IPDE, in real time, obtains data traffic parameters and, based on the data traffic parameters and performance criteria, selectively applies one or more techniques to alter the traffic over selected communication links to conform to the data traffic parameters. Further details are described in Applicant's U.S. Pat. No. 8,737,214, which is incorporated by reference.

Another operation may involve CC element configuration for the IPDE which can manage outbound packets to the CPE for differing speed links and RLA QoS. The CC element may use echo packets received from the CPE to implement aspects of the IPDE. A third party router may not be configured to support the IPDE and may not support differing speeds upload to the CC. For embodiments described herein, the CC may be updated to provide this IPDE implementation. Some example embodiments may be limited to Nx (Least Common Speed link) for aggregation. The configured CC element provides the aggregated/bonded connections.

A further operation may involve CC element configuration with MDPS support for fast failover and can use the third party Router configuration of Lower-Link transport LCP echo packets as control packets. The CC makes its own calculations based on the LCP echo packets for QoE scores and fast advanced failover. The third party router does not have MDPS and does not pre-emptively inform the CC over the other good links of a potential problem. The third party router may not have MDPS and may not calculate QoE scores from the LCP echo packets in some embodiments. The third party router may not have IPDE and pre-emptive failover. In an example, the CC takes echo packets or requests from the router (an example CPE) and generates QoE scores. The cloud controller may pull data from CC elements and augment data from router QoE to support IPDE, for example. Further details are described in Applicant's U.S. Pat. No. 8,737,214, which is incorporated by reference.

The same may be said in the reverse where some embodiments may involve setup of an ISP access core router to participate as a CC and connect to it with ANA CPE devices.

These operations may configure CC elements for separated lower-link traffic.

L2TP & IPSec on CC for Third Party Clients

An example embodiment, may involve IPSec Transport Mode Required with NAT Traversal Support. Example configuration details for third party devices are described herein and may be used for L2TP and IPSec implementations.

New Dynamic IP Address Pool for RAS

For remote access, and portability between PoPs on all CC's, in some embodiment, each CC 110 will be assigned a dynamic IP address Pool configured to support dynamic clients. IPSec may be used to provide the transparent lower-link encryption for CPE devices to address the encryption layer of the lower-link access in the tables of system and network components herein.

Dynamic Client RADIUS Account

In some embodiment, the Virtual Network Overlay may implement a dynamic IP address strategy for RAS accounts and type.

OSP—BIRD—Route Domains

Figure 32:
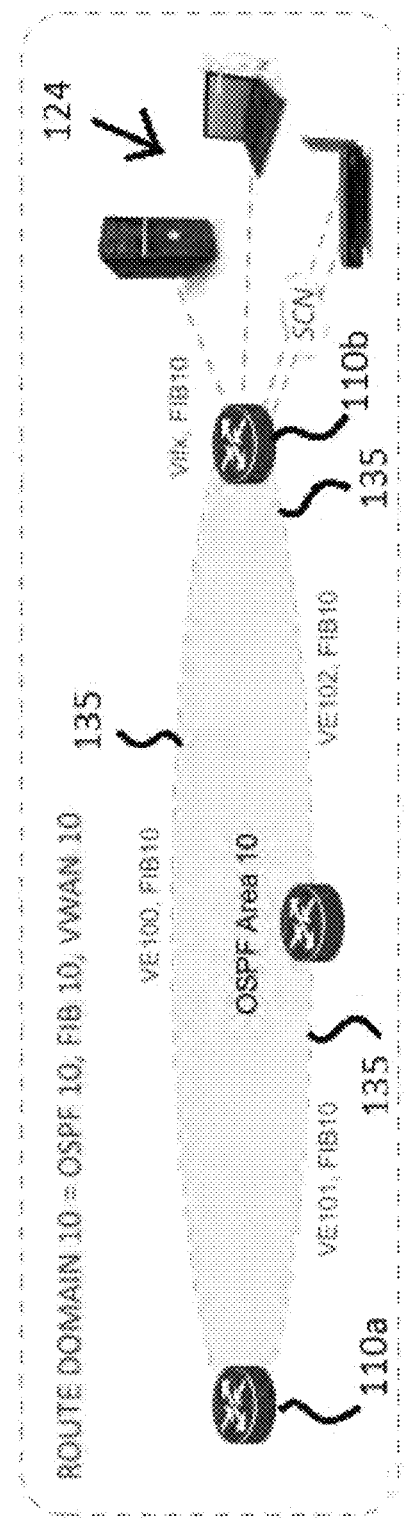
FIG. 32 illustrates a transparent encrypted transport of virtual core connections between PoPs for each customer and multiple CPE devices connecting on either side of the virtual core connections in accordance with one embodiment.

In another embodiment, as shown in FIG. 32, once transparent encrypted transport of VC connections between PoPs for each customer and multiple CPE devices connecting on either side of the VC connections are established, individual Routing Domains may be designated in operating systems to map VE to Vif, creating a per customer Forwarding Information Base (FIB) to address the overlapping CPE LAN IP Subnets problem by implementing per VWAN Customer Routing Domains. For example, individual Routing Domains may be designated for an example operating system using FIBs in AgniOS/FreeBSD to map VE to Vif. BIRD can support for multiple instances per VWAN and iBGP filters out VWANs.

In one embodiment, concentrator element 110 may advertise and receive routes from different FIBs over OSPF. A new CLI node router-ospf may be added to configure, show, enable and disable OSPF routes. In another embodiment, a new configure editor may be needed for OSPF configurations.

In some embodiment, two options exist for ensuring compatibility for BGP & OSPF on concentrator element 110. First option may be to use two different applications, BIRD for eBGP and iBGP, and BIRD-FIB for OSPF. The second option may be use one application for both BGP and OSPF.

In both cases, the routes from the default FIB or all FIBs can be advertised to BGP upstream neighbours. Concentrator element 110 may need to add some filters to prevent unnecessary BGP routes from being advertised. If both BGP and OSPF use the same configuration file for common sections such as kernel, static, direct, parts may need to be compatible for both protocols.

In some embodiment, BIRD may be used with iBGP for propagating connected CPE devices on the concentrator element 110. BIRD may have support for multiple instances of OSPF that can be used for managing virtual network overlay route domains.

OSPF—Managing Per Customer Routing Domains

In one embodiment, using the Open Shortest Path (OSPF) routing protocol for VWAN Route Domains provides an easy to manage dynamic IP Routing Core in a Multi-Tenant environment.

Dynamic Routing for VWAN Mesh Configuration

Figure 33:
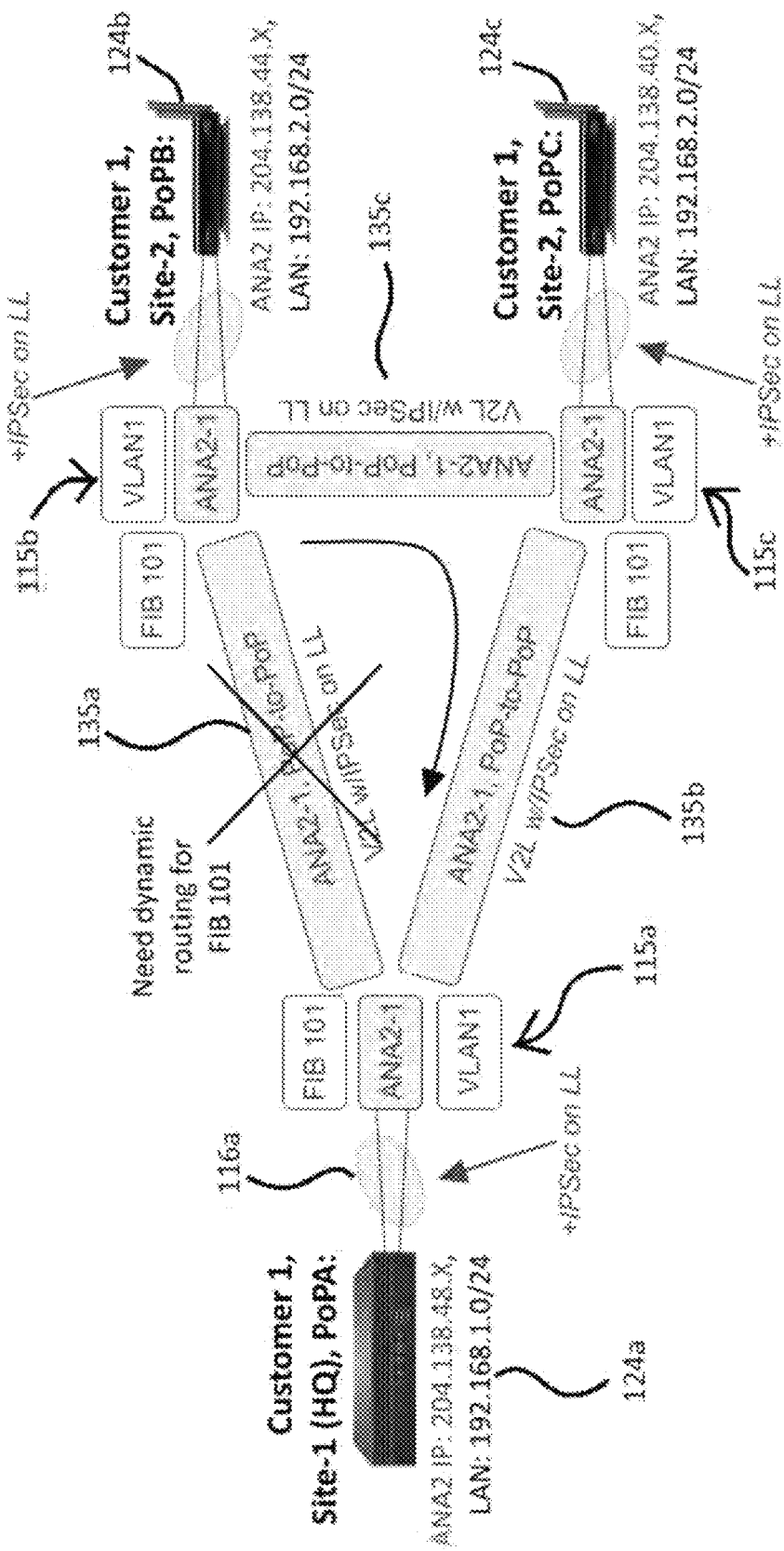
FIG. 33 illustrates BIRD and OSPF (or RIP) with multi-Fib support and filters for each FIB in accordance with one embodiment.

As illustrated in FIG. 33, in one embodiment, BIRD and OSPF (or RIP) with multi-Fib support and filters for each FIB can be implemented to achieve dynamic routing for VWAN Mesh configuration.

In one embodiment, only the remote LAN may be advertised. In another embodiment, IP addresses for CPE bonded connections may not be advertised, as instead they may be handled by the Internet.

RADIUS for Centralized VWAN Access Control

In one embodiment, concentrator element 110 can utilize RADIUS protocol, which provides an overlay identifier (e.g. vwanid) and other attributes (e.g. cpelan attributes). Concentrator elements 110 may also inject route to OSPF for centralized management of new vwanid & cpelan attributes In another embodiment, new concentrator element 110 RADIUS processing of new attributes can dynamically manage customer virtual network overlay mapping for ANA interface to virtual network overlay route domains.

In addition, attributes may be used by concentrator element 110 to inject LAN routes into a dynamic routing protocol such as RIP, OSPF, and iBGP.

For security and to protect against a first Customer connecting to a second Customer ANA2 instance by changing ports on lower-links, an additional RADIUS attribute to identify the unique customer (e.g. "VWANGROUP") may be needed.

An additional level of security on the ANA2 instance may be needed to inform RADIUS the "VWANGROUP" and therefore RADIUS allows this CC/ANA2 instance to authenticate CPE users that belong to the group identified by ID "VWANGROUP".

Furthermore, it may be advantageous to allow multiple customers in the case of a trading partner or trusted partner.

An example configuration on concentrator element 110 may be to set the unique customer ID ("vwangroup") to a first customer ID customer1 and a second customer ID customer2.

In another embodiment, the variable $fib may be used to set values for the unique customer ID ("vwangroup").

Authentication System Modification

Embodiments described herein may implement an Identity, Policy and Audit (IPA) suite or other type of authentication system. An example, is Free IPA. An Lightweight Directory Access Protocol (LDAP) is an open industry standard application protocol for accessing and maintaining distributed directory information services over an Internet Protocol (IP) network. LDAP may also be part of an authentication system. Remote Authentication Dial In User Service (RADIUS) is a networking protocol that provides centralized Authentication, Authorization, and Accounting (AAA) management for users who connect and use a network service. RADIUS may also be part of an authentication system. In one embodiment, a custom attribute may be created in LDAP and enabled to be visible to concentrator element 110. Since everything in LDAP is hierarchical, including object-classes and attributes, to create a custom attribute, the appropriate scheme file needs to be edited. This is an example implement. Embodiments described herein may provide an authentication backend for the Virtual Network Overlay which may include LDAP or RADIUS, or both.

If the custom attribute requires a new ldif file, a new file may need to be created and stored in the appropriate scheme file.

An attribute may be created by matching objectClasses and attributeTypes exactly.

To make a new attribute visible to concentrator element 110, the attribute may be added into two files: attribute map and FreeRadius. These are illustrative example files.

If the attribute needs a custom dictionary, a file can be created. For example, the file may be created as "/usr/share/freeradius" dictionary.yourName.

Define the Attribute in ldap.Attrmap

In one embodiment, the ldap.attrmap can map dictionary attributes to LDAP directory to be used by LDAP authentication. For example, the attribute may be added in "/etc/raddb". When all changes are done, RADIUS or other authentication system may be restarted.

IPDE-RLA Dynamic

In another embodiment, dynamic IPDE-RLA implemented on VWAN can bring dynamic bandwidth reservation for RLA allowing IPDE-RLA-bypass rules for traffic for which the reserve bandwidth can be specified and dynamically applied, if the traffic exists. When the traffic is no longer present, the bandwidth can be released for use by other applications.

One illustrative example is Voice and Video with Data. For instance, voice tends to be much easier to deal with in a static configuration. It requires relatively low bandwidth and the reservation of this bandwidth can be an acceptable sacrifice for the other applications. Video conferencing, on the other hand, tends to require large amounts of bandwidth (from upload perspective) and is not always on. The problem is that in order for a static system to support video, it needs to reserve the bandwidth all the time and this is not an acceptable sacrifice for other applications.

In another embodiment, "dynamic, bandwidth, timeout" parameters can be added to support the new feature.

In some embodiment, means to control certificates may be required within cloud manager 140.

There may be many dependencies associated with ANA connections. Some of which govern the Lower-Link activities such as obtaining DHCP address for the links.

Virtual WAN Backhaul—Multi-Tenant Support

In one embodiment, the Virtual Network Overlay may provide a virtual WAN backhaul with multi-tenant support.

VC Connection Management (CLI & SCN)

In one embodiment, the Virtual Network Overlay may provide VC connection management. Example configurations for VC connection management may include:
  delete ve VE
  set ve VE ip-address Ip Netmask
  set ve VC connection IP In one embodiment, the Virtual Network Overlay may provide VC connection management. Example configurations for fibs support may include:
  delete ve VC [fib]
  set ve VC ip-address Ip Netmask [fib]
  set ve VC connection IP [fib]

An automated means may map the various VC interfaces with customer Route tables/VRF in the cloud that uses an API connection to the VC devices (Concentrators) and performs the otherwise manual task Map VC & Vif to FIB (RADIUS on CC)

An automated means may map the various VC interfaces with customer Route tables/VRF and also with customer ANA sessions in the cloud that uses an API connection to the VC devices (Concentrators) and performs the otherwise manual task.

Map Vif to FIB (RADIUS on CC)

In example embodiments, once CPE connects to CC, CC can read the CPEVWANID from CPE radius configuration and then can run commands such as:
  ifconfig $interface fib $CPEVWANID This may use the $CPEVWANID as the FIB number for this CPE's Vif interface, and thus map this CPE Vif interface to the specific FIB. The use of a centralized store which in this example scenario is RADIUS to maintain VWAN specific details which in turn are used by the Concentrators/VC to automate the interconnectivity of the VWAN control Plan and Data plane.

Map VC to FIB (RADIUS on CC)

In example embodiments, VC interfaces can be created only in the default FIB (FIB 0) and will manage traffic between this CC and other CCs. Firewall rules and routes will be added to distribute CPE VWAN traffic from/to each FIB.

In example embodiments, VC interfaces can also be created in different FIB's, same as the CPE Vif interface. RADIUS is an illustrative example authentication component.

IP Node, System Node, CLI & Scripts, SCN

In example embodiments, IP nodes may provide FIB support for VE interface management. In some example embodiments, system node may provide FIB support which may be required for any command with an interface specified Operating System Support for 4096 or Greater FIB's In example embodiments, different operating systems may be support multiple FIBs. For example, AgniOS v4.1.2+ may support multiple FIBs (e.g. up to 16 in some examples). For each WAN to have a unique FIB, we will need to add many more FIB's.

Net.Fibs

In example embodiments, there may be support for 4096 individual VWANs. Each VWAN will not need multiple FIB's for each CPE as the CC brings them in on setfib $FIB ana2-server.

net.add_addr_allfibs=0 (ANA only affect $FIBCUST for
     ANA2-$CUST)

In example embodiments, implementations may enable addition of routes on all FIBs for new interfaces by default. When this is set to 0, it will only allocate routes on interface changes for the FIB of the caller when adding a new set of addresses to an interface. Note that this tunable and is set to 1 by default.

Portal Management for the Virtual Network Overlay

Cloud manager 140 can provide for Ease of Deployment
  and Management via implementation of following functions
  and features:
    OE, Install & Config, Monitoring & Management
    Plugs Into Existing Monitoring System
    Centralized Firewall, WiFi, & the Virtual Network Overlay Control
    Consistent Monitoring, Reporting & Mgmt. for all sites
      regardless of local carrier or connection type
    Items for management can include:
    CPE ANA Lower-Link Encryption/IPSec
    CC PoP-to-PoP ANA Lower-Link Encryption/IPSec for
      the V2L
    Spawning dedicated Multi-ANA CC instance per Customer FIB on Virtual Network Overlay CC
    Virtual Machines/vm9000
    BIRD OSPF for Dynamic Routing of Virtual Network
      Overlay aggregated/bonded connection sessions
    CC VWAN Firewall profile per Customer/FIB
    CPE Firewall
    Management & Monitoring for Virtual Network Overlay
      CPE & CC
    QoE rules on CPE for Enterprise Virtual Network Overlay
      & APPS
    QoE rules on CC VWAN for WAN & APPS Advanced Traffic Analytics for Virtual Network Overlay & Internet Bandwidth usage reporting for Virtual Network Overlay, CPE, Internet Categories for management can include:

Order Entry

Install and configuration

Quality-of-Experience

Monitoring & Management w/Advanced Traffic Analytics

New: VWAN Calibrate (CPELAN to HQLAN)

SCN PostgreSQL Database (ZTP2, Nagios RRD, Netflow)

Nagios Monitoring System (Config, RRD, MYSQL)

Netflow Collector System

Identity, Policy and Audit (IPA) suite software (e.g. FreeIPA with AAA, LDAP)

RT Tickets System

AgniOS or other operating system API

Design New DB Tables & Structure

A new ID Table may be created for the Virtual Network Overlay by specifying variables such as vwanid, vwansubnet (RFC1918/24), partnerid, custid.

VWANID variable may be set by specifying or searching for cloud concentrator pairs and selecting a topology (e.g. star or mesh).

The Core Virtual Network Overlay (e.g. VC connections) between PoPs/Concentrator elements may be set up. Concentrator elements can be configured for VC connections- .sending via AGNIAPID VC connections require private IP assigned from $vwansubnet where each concentrator elements shares same src (x.x.x.1/24) MAP VE interfaces in TABLE for each VWAN and concentrator element Pairs.

Unique identifier for the Virtual Network Overlay may be selected, CPELAN attributes may be set. The attributes may be added to LDAP/RADIUS for CPE profile. QoE parameters may be set for HQ/CC VE.

ZTP Database Design & Structure

FIGS. 16B and 16C illustrate exemplary relationship diagrams for cloud manager 140 and SCN Database and tables.

Portal Access Control List (ACL)

Portal Access Control List for managing portal resources is also illustrated in FIGS. 16B and 16C.

New Dynamic IP Address Pool for RAS

For remote access, and portability between PoPs on all concentrator elements 110, each concentrator element may need a dynamic IP address Pool configured to support dynamic clients. For example, dynamic IP pool may be assigned to each concentrator element, and/or each concentrator element may be further configured for a dynamic pool.

This method can allow traveling users to connect with proximal remote access termination for optimal service.

Exemplary Components of Cloud Manager 140:

| | |
|---|---|
| 1. | ACL |
| 2. | DB/Schema |
| 3. | ORM |
| 4. | Mail Service |
| 5. | RT API/Email Interfacing |
| 6. | Workflow/Navigation |
| 7. | User-interface/Forms |
| 8. | MAC/Serial Lookup |
| 9. | Testing |
| 10. | IP Plan Integration |
| 11. | Netflow/Nagios |
| 12. | Agniapid |
| 13. | Multi-tier segregation |
| 14. | Virtual Network Overlay |
| 15. | Managed FW & VPN . . . |

Distributed Cloud Firewall/Intrusion Prevention

ANA GRID Routing and Firewall can be controlled from the cloud and achieve software defined networking and global denial of service with intrusion detection protection. Centralized Control for all BGP and Firewall Devices.

In one embodiment, centralized control of all BGP devices (e.g. from VIPS implementation) may be required.

In another embodiment, Dissemination of Flow Specification Rules may be achieved by using RFC 5575.

Global Denial of Service Detection

In one embodiment, a Denial of Service Attack can be detected at any device and a global defence may be triggered according. This attack can be filtered to prevent entry to any ANA Grid controlled Network.

Global Intrusion Detection

A simplified Intrusion detection software instance running on all BGP devices controlled by cloud manager 140 can inform the cloud manager 140, which can make a centralized intrusion detection decision with threat level analysis.

Upon intrusion decision, the system can propagate a deny rule for said traffic to all devices and the culprit traffic will be filtered out from all PoPs. This technology can also extend to the CPE devices.

Wi-Fi Enterprise Access Security for Operating System

Software Controlled Networking solutions can provide the most efficient means of combining multiple connections for WAN, Internet, & Voice convergence for the enterprise. The WiFi access security may be implemented for various operating systems, such as, for example, AgniOS.

In addition, CPE devices can provide WiFi for the Enterprise using Virtual Access Point technology with centralized authentication and security, managed central portal of cloud manager 140 in the cloud.

Virtual Access Point

A Virtual Access Point (VAP) is the implementation of a secondary Wi-Fi AP or Hotspot using multiple SSID's (Service Set Identification) and or WLAN interfaces over a common physical Wi-Fi radio. VAP's can be used to separate groups of users such as guests and employees for security and privacy purposes.

VAP w/WEP+VPN

When used as an access point for Wi-Fi devices, VWAN can support Enterprise grade Wi-Fi services using a combination of cloud management features, CPE firewall, and CPE VPN remote access VPN capabilities that work with the customer's corporate authentication mechanisms such as Active Directory or RADIUS.

CPE PPTP-Server & Active Directory/RADIUS

Figure 34:
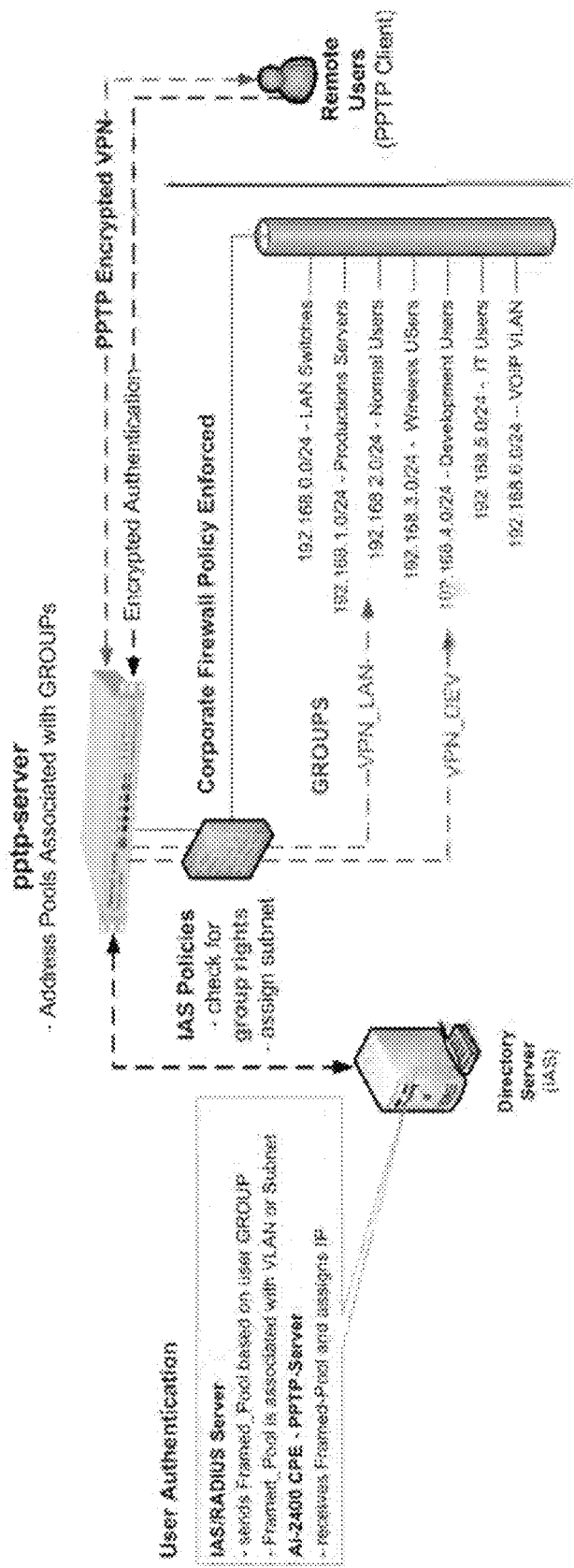
FIG. 34 illustrates a CPE node using a corporate Active Directory security, or Customer RADIUS database for assigning users in accordance with one embodiment.

As illustrated in FIG. 34, in one exemplary embodiment, the CPE <pptp-server> node can use the corporate Active Directory security, or Customer RADIUS database for assigning users to special remote access groups which in turn assigns users to VLANs on the CPE device.

In another embodiment, creation of new dedicated concentrator elements (CC's) 110 for Large Enterprise customers may be used to provide private meshes between PoPs for transport of WAN traffic with Over-The-Top control from both Edge (CPE to Home-PoP) and Core (PoP-to-PoP between CC's).

Multiple Aggregated/Bonded Connection Implementations

Multiple aggregated/bonded connections (which may be referred to as ANA™, ANA2™) implementations may be run in one embodiment, assigning one aggregated/bonded process for each Large Enterprise customer and associating this aggregated/bonded instance to a particular FIB.

Virtual Control Plane

Figure 38:
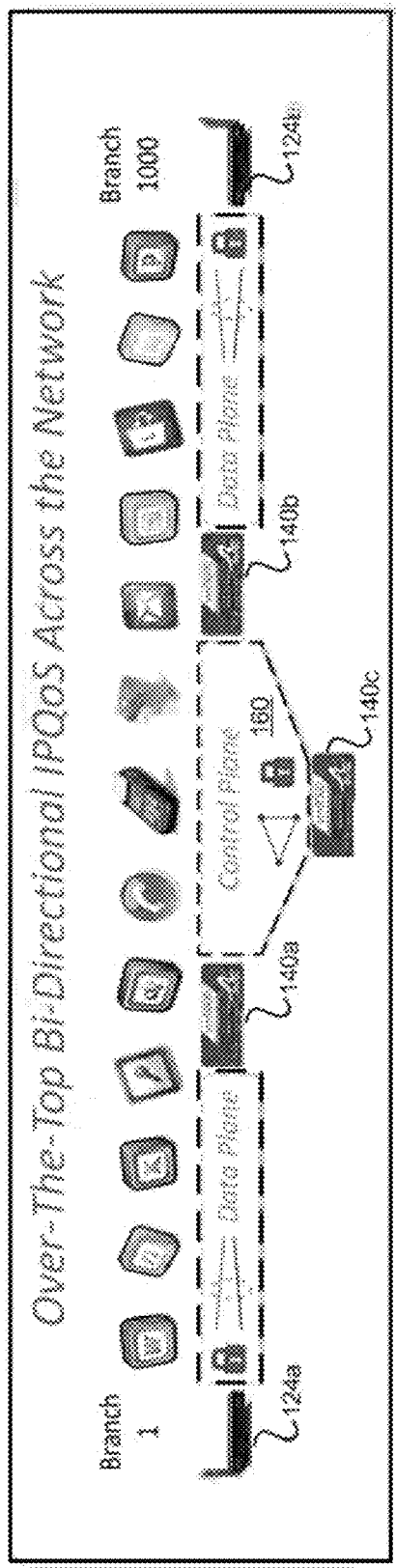
FIG. 38 illustrates an example block diagram of vWAN with data plane and control plane.

Referring now to FIG. 38, which illustrates an example block diagram of vWAN (SD WAN) with data plane and control plane 160. The vWAN or SD WAN may include over-the-top bi-directional IPQoS across the network. CPE device 124a, 124b may be controlled by Controllers 140a, 140b, 140c through a Virtual Control Plane 160.

In one embodiment, each of the Controllers 140a, 140b, 140c may be a Concentrator in the network. For example, a Concentrator may include a Virtual Core which may be configured to address the Virtual Control Plane 160. Concentrator may further include Network Functions Virtualization (NFV) such as aggregation, acceleration, failover, firewall, security and encryption, and IP Quality of Service (Qos).

In another embodiment, one or more Concentrators may interoperate to perform the functionalities of a controller 140.

The data plane may support traffic conditioning for multiple underlay connections, which involves features such as bi-directional IDPE, ANA, and real time link avoidance.

The control plane 160 may provide an end-to-end intelligent network overlay for Quality of Service, as further elaborated below.

Figure 39:
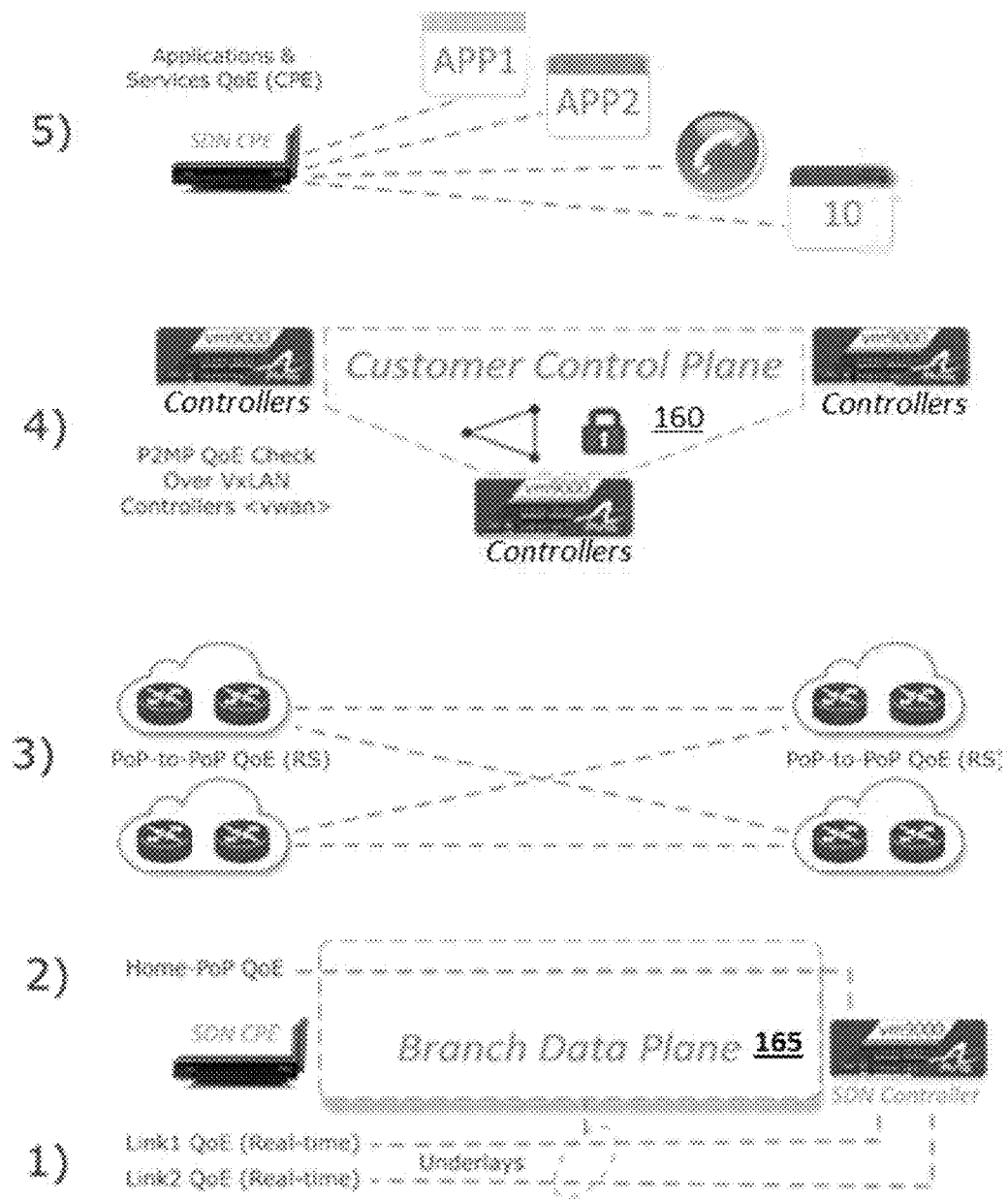
FIG. 39 illustrates example QoE monitored at various layers of control plane, data plane and application/service components.

Referring now to FIG. 39, table below illustrates how each layer of the control plane, data plane or application/service component monitors Quality of Experience (QoE).

| Quality of Experience (QoE) Monitoring | | | | | |
|---|---|---|---|---|---|
| QoE Component | Check | Interval | Portal | Facility | Alerting |
| 5) Application/ Service | Service Path (HQ, VoIP, etc) | Scheduled (5 mins) | CPE View | SNMP | Yes |
| 4) Control Plane Overlay | P2MP Per Cust | Scheduled (5 mins) | N/A Yet | SNMP | TBD |
| 3) Control Plane Underlay | PoP-to-PoP (Route Servers) | Scheduled (5 mins) | Network View | SNMP | Yes (only Ops) |
| 2) Data Plane Overlay | Home-PoP | Scheduled (5 mins) | CPE View | SNMP | Yes |
| 1) Data Plane Underlay | Diverse Circuits | Real-time | CPE View | CLI/ Logging | No |

As can be seen from FIG. 39, a data plane underlay (1) may monitor quality of experience in real time or near real time. A branch data plane overlay 165 (2) may monitor quality of experience on a schedule, from from the branch to the nearest home-PoP, controller, or concentrator. A control plane underlay (3) may monitor quality of experience on a schedule from PoP to PoP. A control plane 160 (4) may monitor quality of experience on a schedule for each customer between controllers, as configured by controllers. From the CPE device (5) on application/service level, each application or service may have monitored quality of experience scores on a schedule as well.

QoS Management

In an example embodiment, Quality of Experience (QoE) may be measured in the following ways:

QoE on each Edge Underlay circuit to the controller for the data plane

QoE for the Aggregate Data Plane Overlay from the CPE to Home-PoP

QoE on the Core Underlay Upstreams between controllers for the control plane

QoE for applications across the network and to the cloud

Management of CoS/QoS/QoE may include policy management, SLA, alerting, reporting, and troubleshooting. Monitoring of CoS/QoS/QoE may include SNMP & NetFlow collection, alerting, analytics, and visualizations.

Quality of Service (QoS) components may include Class of Service (CoS), which includes classification and identification of data traffic. Such classification and identification may include, for example, TOS byte data, layer 4 filters by IP proto and port, and flows by src and dst and layer4, and layer7 Deep Packet Inspection rules.

TOS marking is an admission control and marking policy, which may also include, for example, TOS byte data, layer 4 filters by IP proto and port, and flows by src and dst and layer4, and layer7 Deep Packet Inspection rules.

IPDE-Dynamic RLA allows for dynamic data plane traffic engineering on the edge with IPDE-RLA and Dynamic RLA, which may include, for example, TOS byte data, layer 4 filters by IP proto and port, flows by src and dst and layer4, layer7 Deep Packet Inspection rules, and avoidance of poor-quality bandwidth region.

QoS policy may be implemented by QoS administration from portal/orchestrator. Such administration may include, for example, CoS, TOS marking and IPDE-Dynamic RLA.

In one embodiment, management of data traffic may be based on user Quality-of-Experience (QoE) scores that combine latency, jitter and loss into an accurate real-time metric for all networks, sites and applications. QoE checks may be implemented at various points in the cloud network, including, for example, CPE to world, controller to controller, PoP to PoP (RS to RS), and PoP to world. Real-time underlay QoE scores may also be collected.

Figure 40:
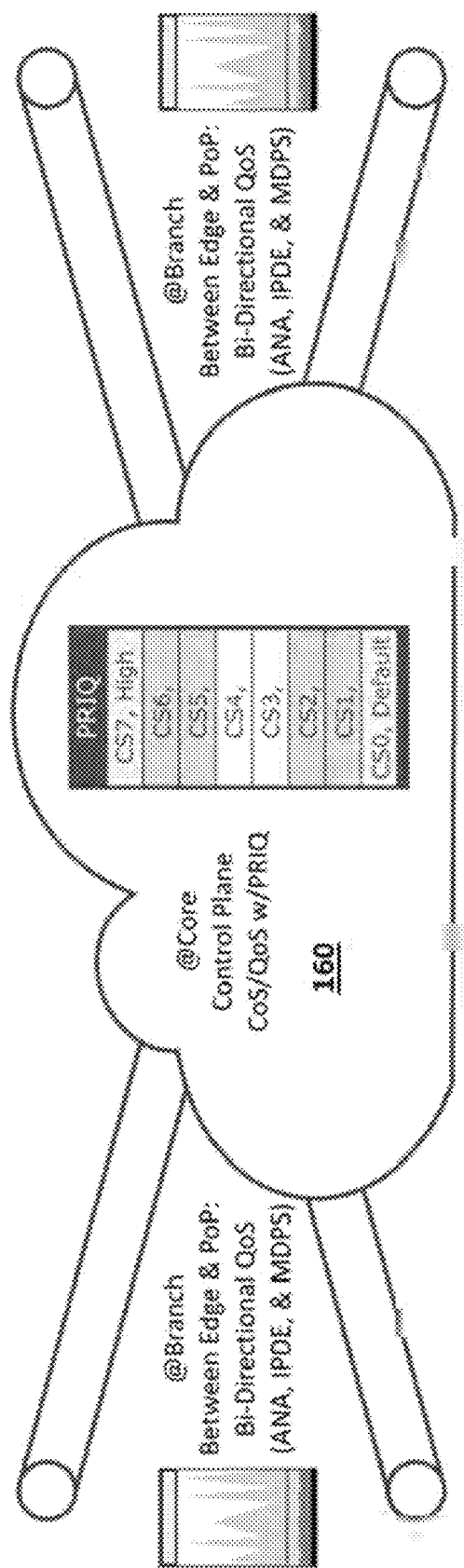
FIG. 40 illustrates an example decentralized IPQoS concept diagram.

In one embodiment, a system for cloud-controlled decentralized IP quality of service (IPQoS) for overlay networks is provided. FIG. 40 shows a decentralized IPQoS concept diagram.

This model as depicted in FIG. 40 may deliver Class of Service (CoS) and Quality of Service (QoS) capabilities over the top of existing network infrastructures that have limited or no IPQoS control mechanisms, such as the Internet or generic MPLS.

The model may help the customer by addressing their needs for application quality while abstracting the needs of the carrier to maximize ROI of existing network infrastructures. For example, carriers may be generally expected to provide bandwidth services for underlay connections while respecting Net Neutrality rules with no discrimination against customer traffic and applications. The model may manage diverse underlay connections and carriers in aggregate flows encapsulating the edge data planes 165 and core control planes 160 to provide quality for the overlays. This implementation may deliver End-to-End Bi-Directional IPQoS for both Software-Defined Internet and WAN overlay solutions.

In addition, the system may allow full control of all of the traffic within the entire available bandwidth spectrum of all the connections in every direction, including management of both inbound and outbound traffic on the edge where asymmetrical bandwidth is present (e.g. where inbound is greater than outbound).

Figure 41:
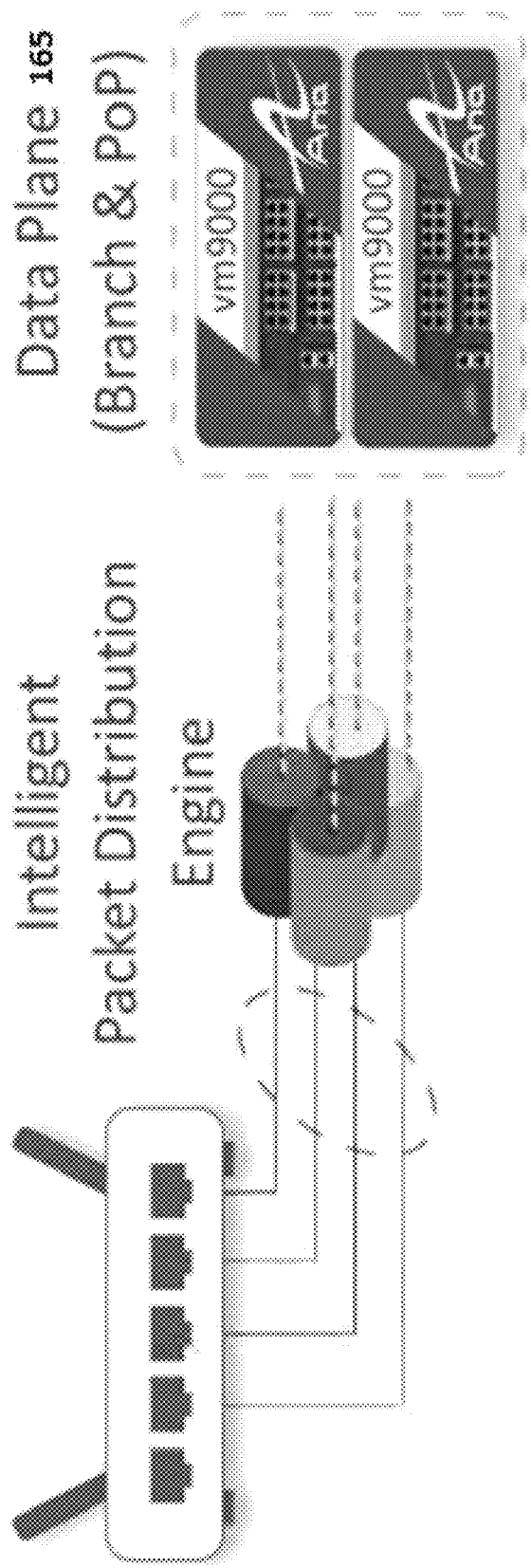
FIG. 41 illustrates an example diagram for edge QoS at data planes.

Referring now to FIG. 41, a diagram illustrating edge QoS from branch to PoP is shown. Edge QoS/CoS/QoE policies may be enforced on all the aggregated underlay connections managing the performance of WAN, Cloud, and Internet applications running through the overlay via the data plane 165 at Branch.

Figure 42:
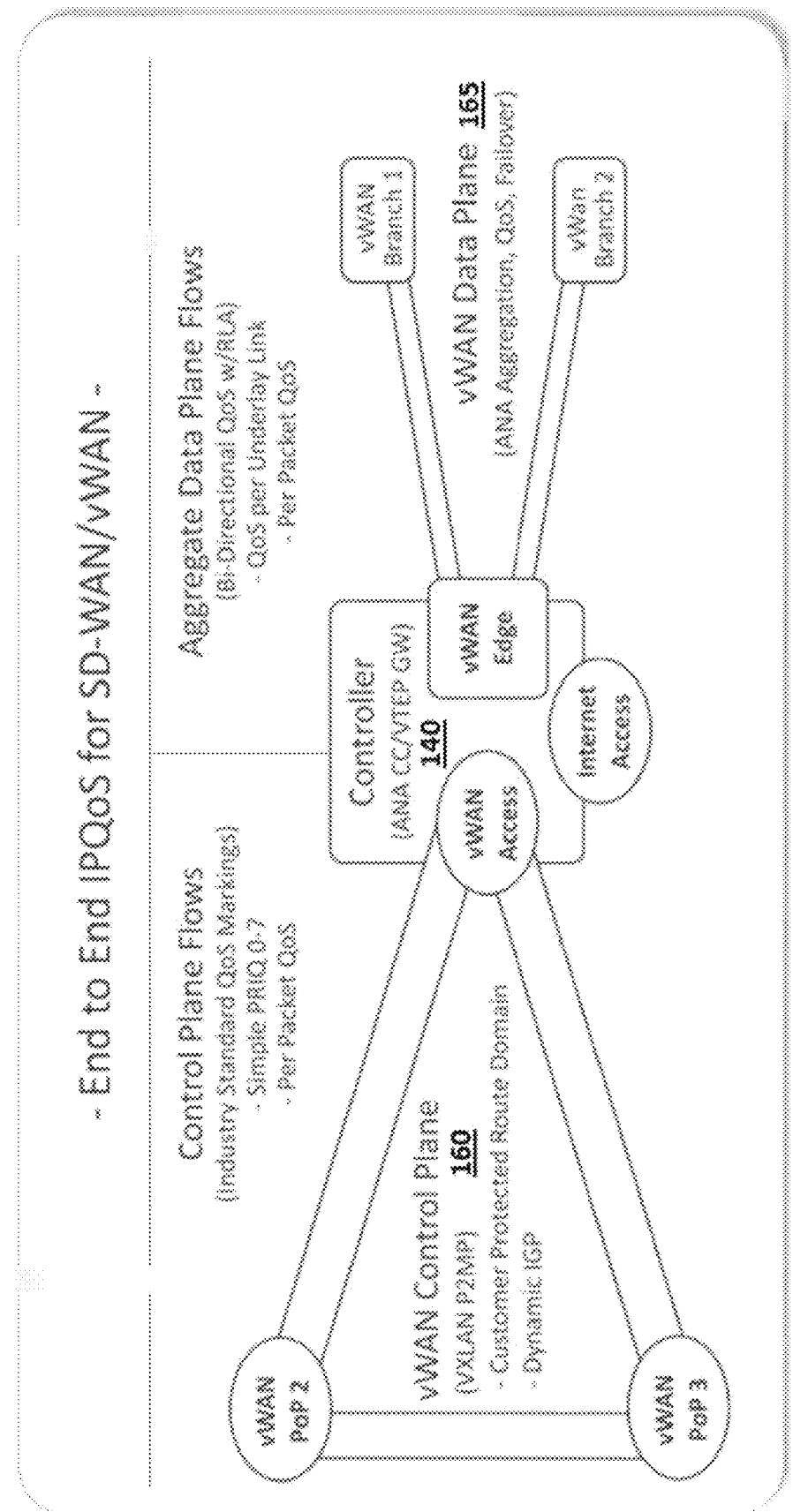
FIG. 42 illustrates an example IPQoS schematic diagram in accordance with an example embodiment.

Referring now to FIG. 42, which illustrates an end-to-end SD-WAN/VWAN IPQoS concept diagram. In this embodiment, there may be a priority queuing per customer in the core over the P2MP overlay control plane 160. In addition, there may be bi-directional IPQoS on the edge within the data plane 160 with aggregated links, IPDE, MDPS within the Data Plane.

Figure 43:
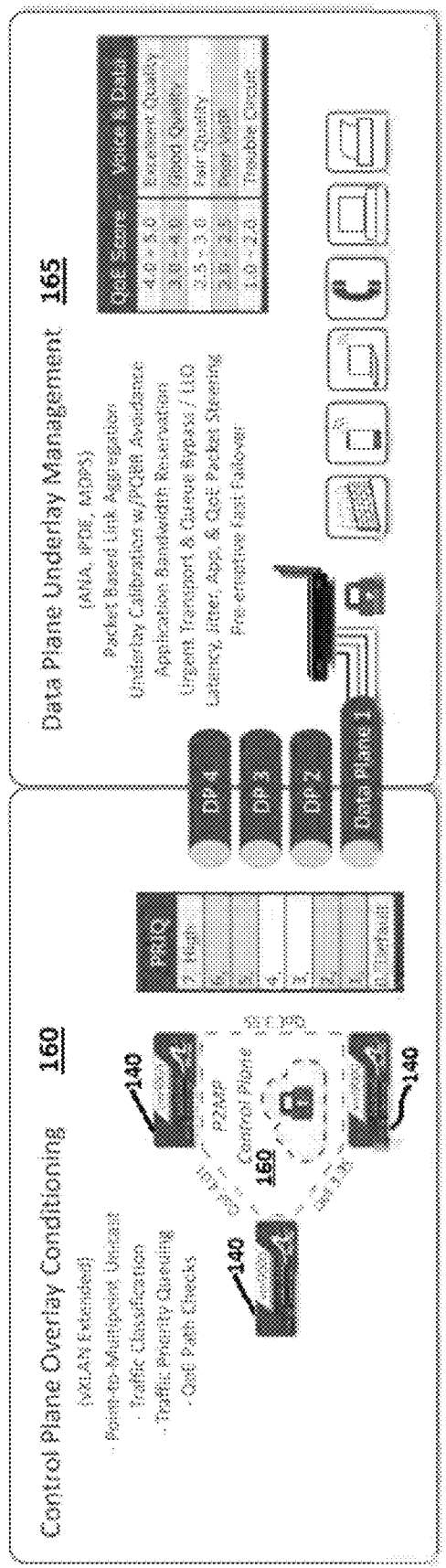
FIG. 43 illustrates an example diagram for control plane overlay conditioning and data plane underlay management.

Referring now to FIG. 43, in one embodiment, the system may provide enterprise quality over broadband Internet underlay connections on the edge—e.g. data plane 165. This allows the system to support traffic conditioning for multiple underlay connections. At control plane 160, the system may provide MPLS-like quality over internet upstream underlay connections between PoPs. Overlay traffic management may be provided within the control plane 160 per SD-WAN.

Nested Multi-Tenant CoS/QoS/QoE Solution

Traditionally differentiated services also known as DiffServ or DS, helps manage CoS/QoS using the TOS Byte data from an IP packet. This method is a widely adopted industry standard used by carriers for managing quality of service across their networks. In many cases carriers use this to maintain and manage quality at a high level for the aggregate customer traffic within their core or back bone.

RFC 2474 (Differentiated Services Field (DS Field) in the IPv4 and IPv6 Headers)

Differentiated services enhancements to Internet protocol are intended to enable scalable service discrimination in the Internet without the need for per-flow state and signaling at every hop. A variety of services may be built from a small, well-defined set of building blocks which are deployed in network nodes. The services may be either end-to-end or intra-domain; they include both those that can satisfy quantitative performance requirements (e.g., peak bandwidth) and those based on relative performance (e.g., "class" differentiation). Services can be constructed by a combination of:

- Setting bits in an IP header field at network boundaries (autonomous system boundaries, internal administrative boundaries, or hosts)
- Using those bits to determine how packets are forwarded by the nodes inside the network, and
- Conditioning the marked packets at network boundaries in accordance with the requirements or rules of each service.

RFC 2475 (Architecture for Differentiated Services)

RFC 2475 defines an architecture for implementing scalable service differentiation in the Internet. This architecture achieves scalability by aggregating traffic classification state which is conveyed by means of IP-layer packet marking using the DS field. Packets are classified and marked to receive a particular per-hop forwarding behavior on nodes along their path. Sophisticated classification, marking, policing, and shaping operations need only be implemented at network boundaries or hosts. Network resources are allocated to traffic streams by service provisioning policies which govern how traffic is marked and conditioned upon entry to a differentiated services-capable network, and how that traffic is forwarded within that network. A wide variety of services can be implemented on top of these building blocks.

As an improvement to the traditional differentiated services (e.g. RFC 2474 and 2475), the embodiments described herein prioritize data plane packets within a control plane 160 at the point of egress over the VxLAN P2MP interface exiting the controller 140 and destined for another controller 140 at a distant PoP. This provides effective per customer quality control within the same SD-WAN.

Below is a PRIQ (Priority Queuing) Map from AgniOS QoS Map Table. This PRIQ Map represents the association between different CoS (Class of Service) markings used in the ToS (Type of Service) Byte of an IP header and is used for supporting the multiple marking and classification methods in the industry such as: IP Precedence (IPP), Internet Protocol Type of Service (IPTOS), DSCP (Differentiated Services Code Point (DSCP), Class of Service (Class/CoS).

| Pri | IPP | IPTOS | DSCP | Class | Description |
| --- | --- | --- | --- | --- | --- |
| 7 | 111 | 0xE0 | 56-64 | CS7 | Network Control |
| 6 | 110 | 0xC0 | 48-55 | CS6 | Internetwork Control |
| 5 | | | | | Critical |
| | 101 | 0xB8 | 46 | EF | Voice Data (RTP) |
| | 101 | 0xA0 | 40 | CS5 | |
| 4 | | | | | Flash Override |
| | 100 | 0x88 | 34 | AF41 | Video Data (RTP) |
| | 100 | 0x90 | 36 | AF42 | |
| | 100 | 0x98 | 38 | AF43 | |
| | 100 | 0x80 | 32 | CS4 | |
| 3 | | | | | Flash |
| | 011 | 0x68 | 26 | AF31 | Voice Control |
| | 011 | 0x70 | 28 | AF32 | |
| | 011 | 0x78 | 30 | AF33 | |
| | 011 | 0x60 | 24 | CS3 | |
| 2 | | | | | Immediate |
| | 010 | 0x48 | 18 | AF21 | Deterministic (SNA) |
| | 010 | 0x50 | 20 | AF22 | |
| | 010 | 0x58 | 22 | AF23 | |
| | 010 | 0x40 | 16 | CS2 | |
| 1 | | | | | Priority |
| | 001 | 0x28 | 10 | AF11 | Controlled Load |
| | 001 | 0x30 | 12 | AF12 | |
| | 001 | 0x38 | 14 | AF13 | |
| | 001 | 0x20 | 8 | CS1 | |
| 0 | | | | | Routine |
| | 000 | 0x00 | 0 | CS0 | Best Effort |
| | 000 | 0x08 | 2 | | Penalty Box |

Figure 44:
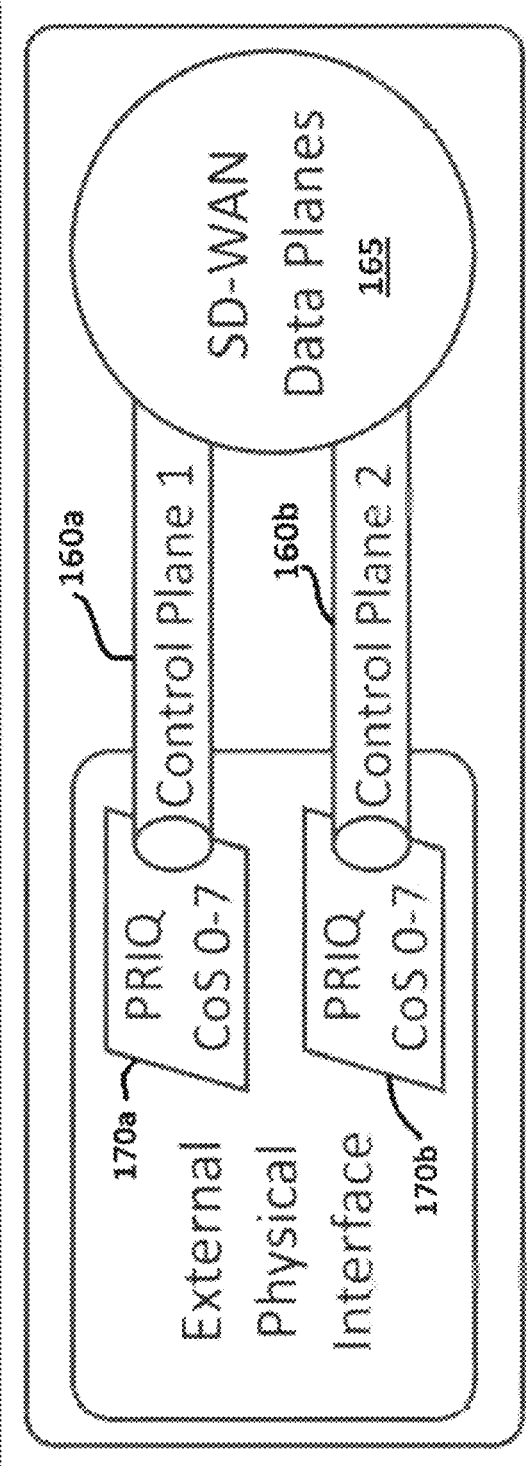
FIG. 44 illustrates an example schematic diagram for CoS/QoS monitoring at a controller.

Referring now to FIG. 44, which illustrates control planes 160a and 160b per SD-WAN CoS/QoS as configured by a controller 140. As can be seen, edge data plane 165 is joined with the control planes 160a, 160b at the controller 140. A first PRIQ Class of Service (CoS) 170a from control plane 160a and a second PRIQ Class of Service (CoS) 170b from control plane 160b are collected at the controller 140.

Figure 45:
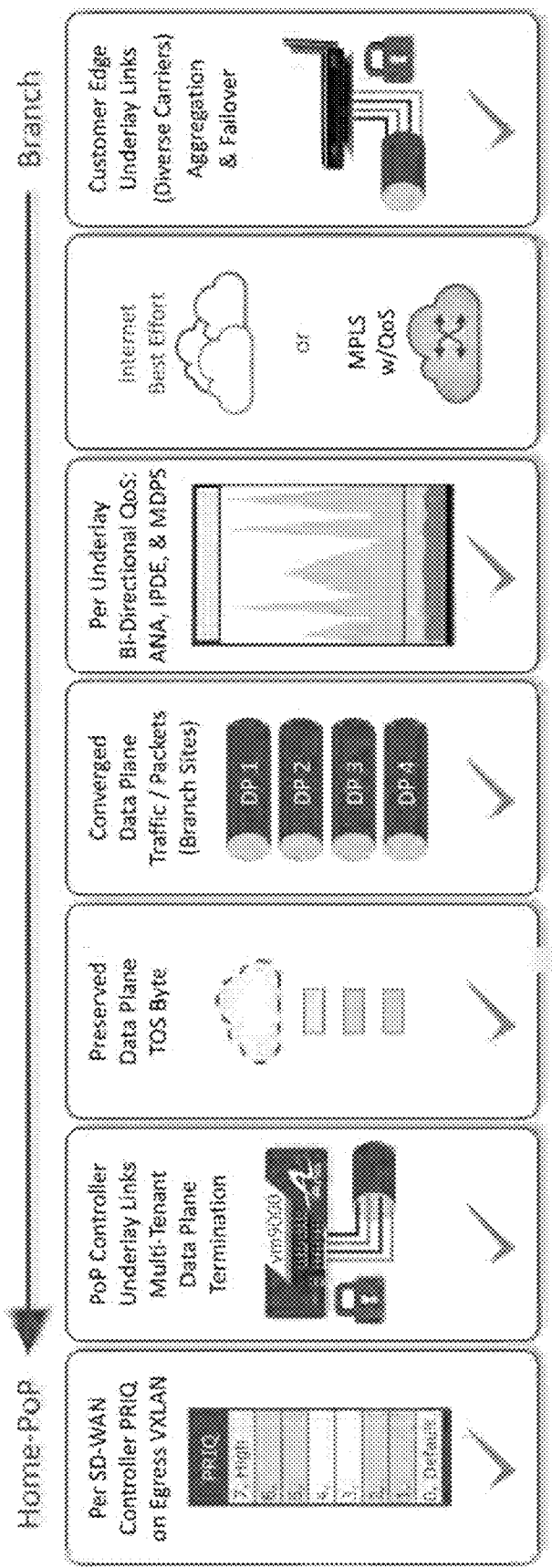
FIG. 45 illustrates an example diagram for QoS flow from branch data plane to SD-WAN control plane.

Referring now to FIG. 45, which illustrates QoS flow from branch data plane to a control plane. At the customer edge, diverse links are aggregated with failover safe measures. At each underlay connection, bi-directional QoS are monitored. Then traffic may converge at various data planes at branch sites. Once data plane traffic from multiple tenants arrive at PoP controller, data planes terminate and are placed onto a control plane Forwarding Information Base (FIB) in a customer protected route domain, and a priority queue is formed for the data traffic at each SD-WAN controller in the control plane. From this point the multitenant data planes have been converged onto their respective control planes as per FIG. 44, and now multiple Control Planes can be further PRIQ'd against each other on the egress out the external interface of the Controller. Preserved TOS Byte Data means that the original TOS Byte of the customer packets are not overwritten when Control Plane Underlay is encapsulated, which allows the controller egress interface to perform PRIQ across all the converged control planes as it can see the original TOS byte data.

Aggregated CoS/QoS Control Plane Concept

In some embodiment, multiple per customer overlay networks may exist within the same controller 140 at the same PoP and across the entire cloud network. There is a need to autonomously control competing SD-WAN traffic in a multi-tenant environment as aggregated bulk data apply the same QoS management techniques on a global scale for more granular control at the controller, PoP, and data center level. This may simulate a more advanced carrier model abstracting the customer protected SD-WAN environment from individual TOS Byte packet data for all traffic.

In some cases, per-customer implementation may provide control plane CoS/QoS on a per customer bases but does not prioritize one customer's traffic and packets from another. Each overlay may be encapsulated in the underlay overwriting the original customer TOS Byte information, obfuscating all Class of Service information for the aggregate control plane flows.

Therefore, a priority queuing implementation is provided in some embodiment to deal with the aggregate underlay packets for the multiple control plane instances so that complete traffic engineering at the controller and PoP level may be provided.

Overwritten ToS Byte Data by Control Plane Overlays

Some overlay technologies such as GRE tunnels may not preserve the original customer's TOS Byte Data in the encapsulated packet of the underlay. Furthermore, these technologies may not distinguish between priority and non-priority traffic of the inner data plane packets between control planes.

Figure 46:
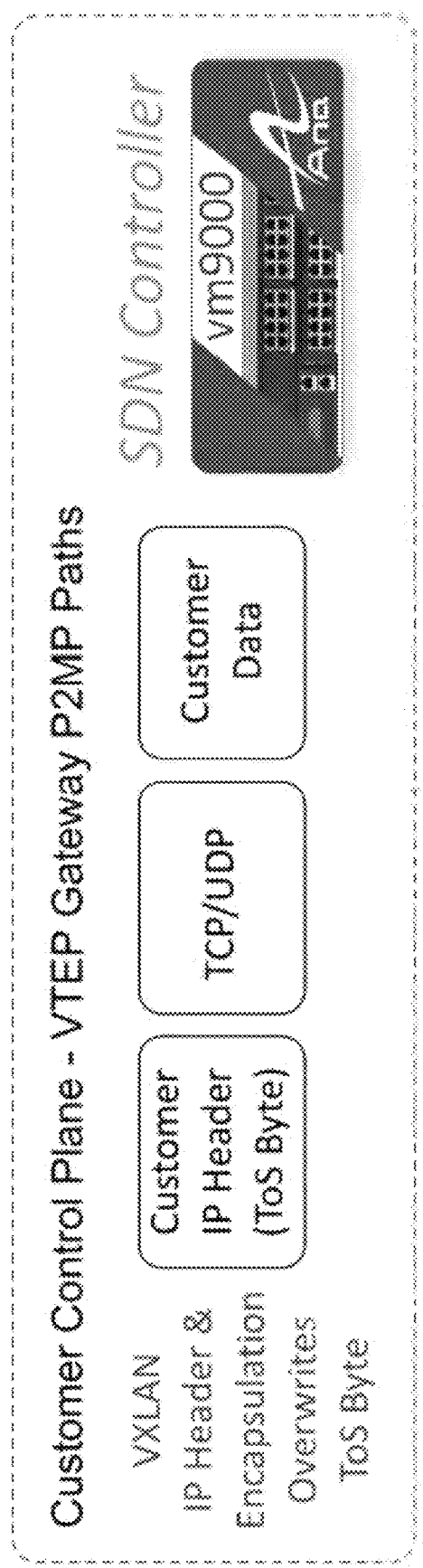
FIG. 46 illustrates an example customer control plane.

For example, FIG. 46 shows a diagram of a customer control plane. This configuration may be vulnerable when the Controller reaches saturation during peak traffic events. To counter this weakness, an example embodiment may manage encapsulated packet priority when sending aggregated customer control plane traffic upstream, as shown in FIG. 47, which illustrates a diagram for aggregated CoS/QoS control plane.

Figure 47:
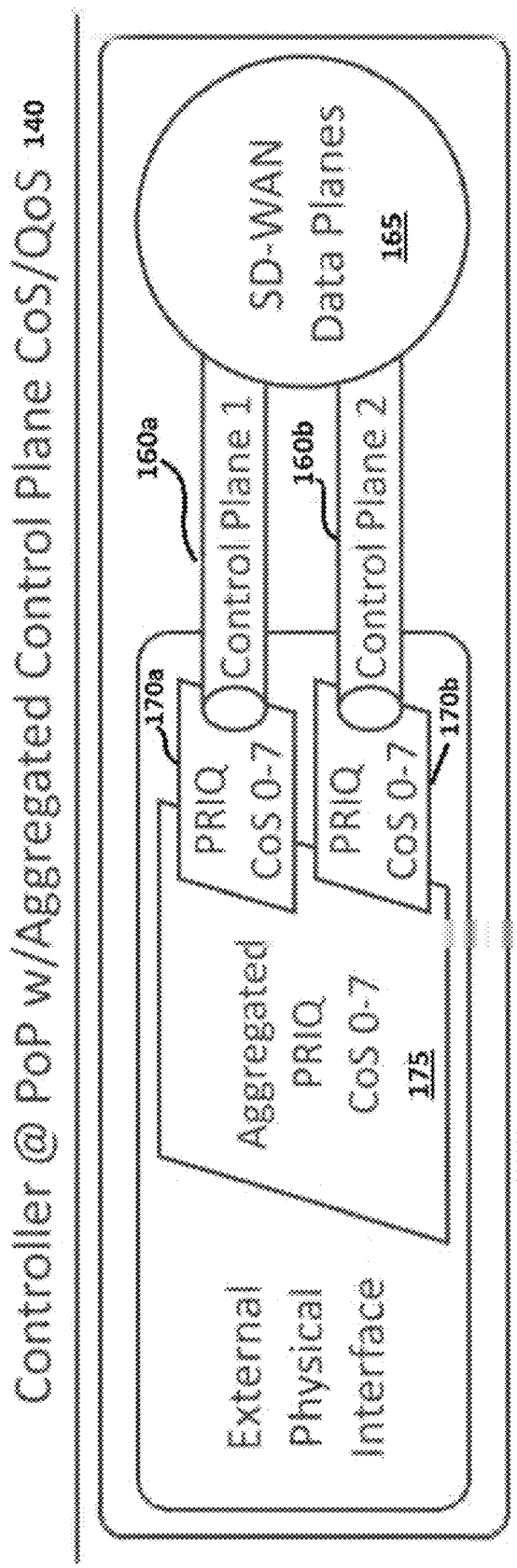
FIG. 47 illustrates an example schematic diagram for aggregated CoS/QoS monitoring at a controller.

FIG. 47 shows a controller at PoP with aggregated control planes 160a and 160b. Edge data plane 165 is joined with the control planes 160a, 160b at the controller 140. Class of Service (CoS) 170a from control plane 160a and Class of Service (CoS) 170b from control plane 160b are aggregated at the controller 140 as aggregated PRIQ CoS 175.

Carrier Grade Multi-Tenant Overlay QoS Strategy

To provide a more granular traffic engineering system for QoS, in some embodiments, a nested PRIQ traffic strategy may be implemented for aggregated control plane and data plane traffic throughout the cloud network.

Nested Overlay CoS/QoS for SDN PoP

In one example embodiment, classification and quality control for IP packets on multi-tenant may overlay within the controller and point-of-presence. This approach may expose the TOS Byte data in the P2MP overlay control plane allowing for the implementation of differentiated services CoS/QoS within the data center/PoP/controller for multi-tenant.

Preserve ToS Byte Data for Control Plane Overlay

Exposing the TOS Byte on the control plane overlay may preserve the CoS so that the controller PRIQ system can manage the aggregate QoS packet priority across the multi-tenant control plane overlays combined.

Figure 48:
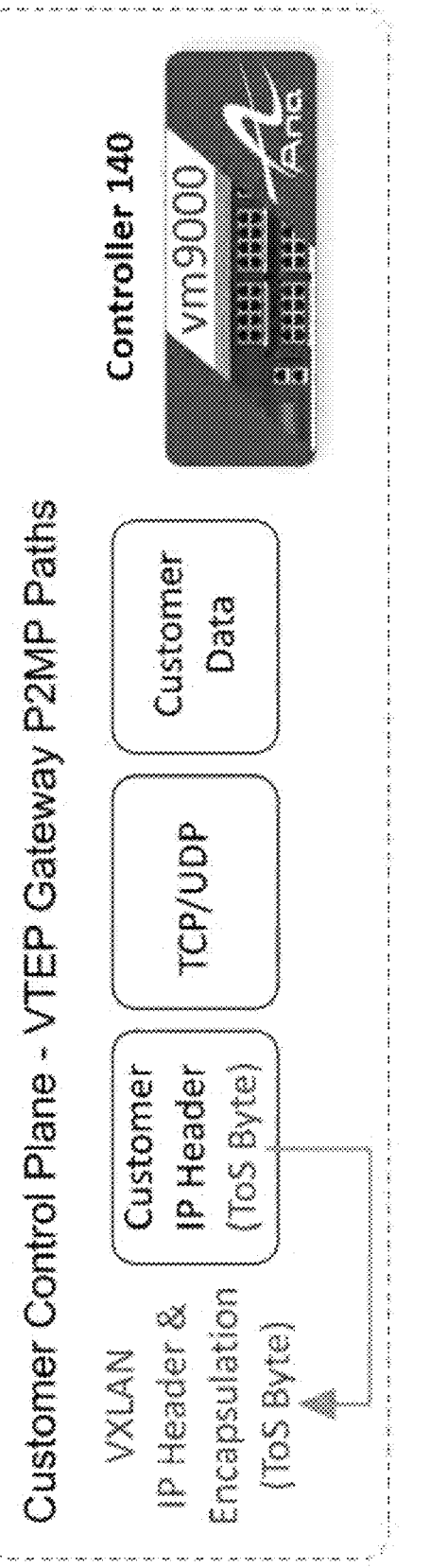
FIG. 48 illustrates another example customer control plane.

In one embodiment, as shown in FIG. 48, memory storing network packets and socket buffers (e.g. the mbuf) may be analyzed before VxLAN encapsulation is performed and the original TOS Byte data are transferred/preserved to the new VxLAN underlay packet header.

Figure 49:
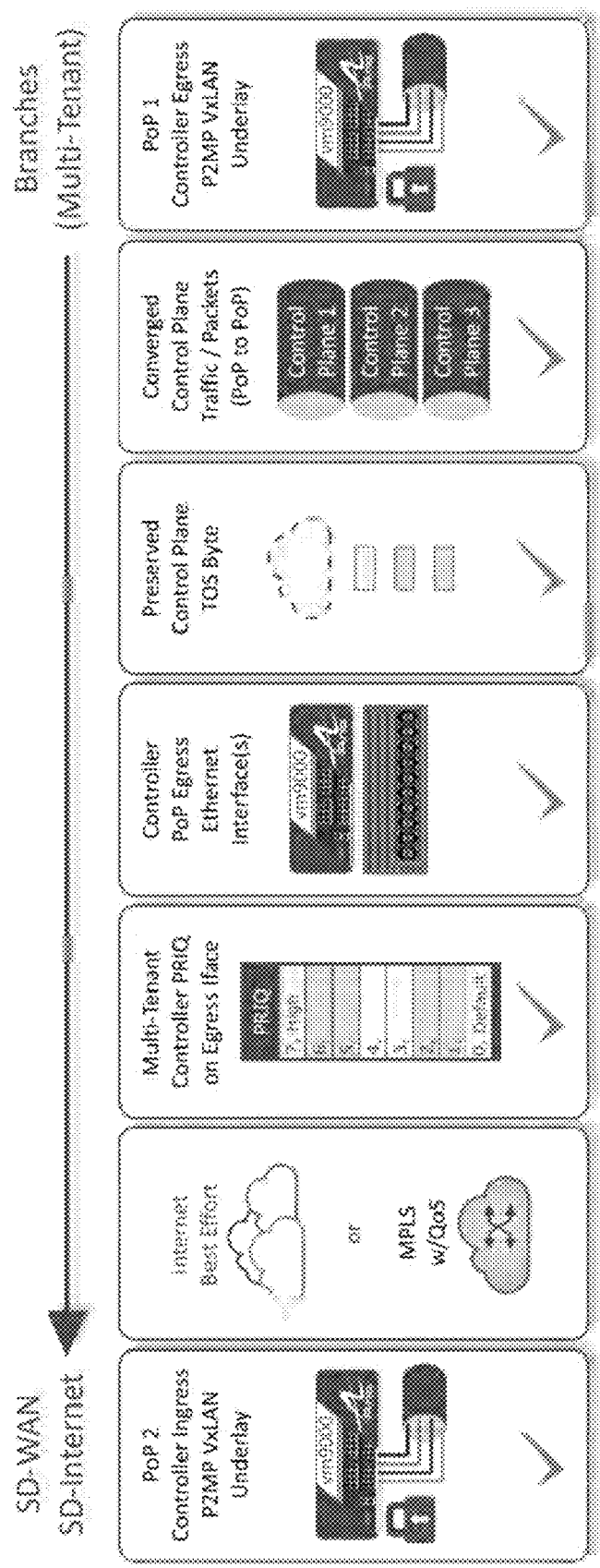
FIG. 49 illustrates an example diagram for multi-tenant aggregated CoS/QoS control plane.

FIG. 49 illustrates a framework for multi-tenant aggregated CoS/QoS control plane 160. At the branches, diverse links are aggregated with failover safe measures. As can be seen, data traffic may converge at various data planes from PoP to PoP. Once data traffic from multiple tenants arrives at multi-tenant controller, a priority queue PRIQ is formed for the data traffic at egress interface.

In one embodiment, a secure and private customer network system is provided with carrier grade service quality. The solution brings WAN, Cloud and Internet together as one unified enterprise solution with end-to-end CoS/QoS/QoE between offices.

Figure 50:
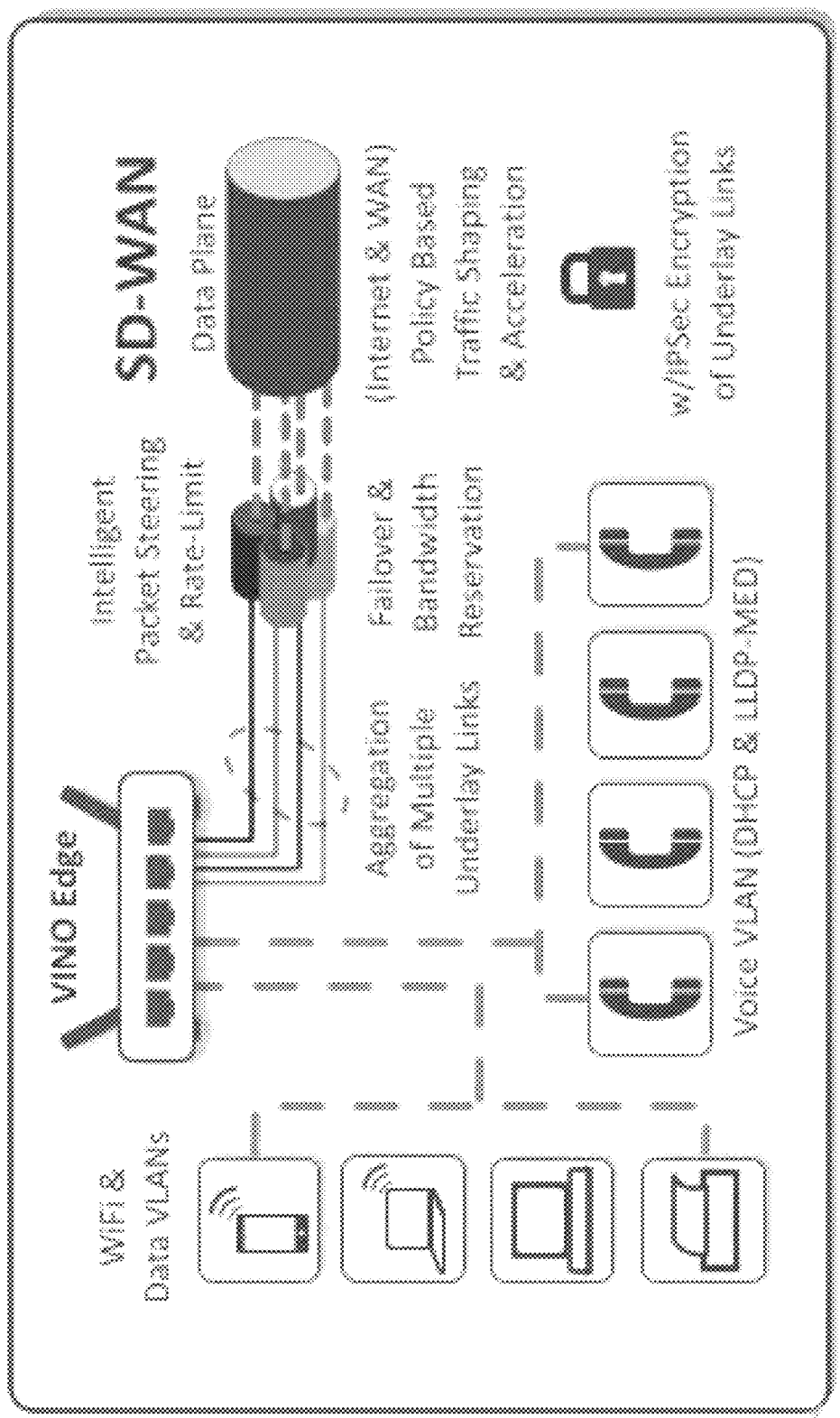
FIG. 50 illustrates an example schematic diagram for edge data plane.

As shown in FIG. 50, a system may aggregate multiple underlays into a single unified overlay. The underlay connections are each encrypted with IPSec AES 256 bit transport mode between the the Edge device port and the controller at the nearest PoP. In some embodiments, failover for high-availability may be implemented (e.g. MDPS). Bidirectional QoS between the PoP and branch may be then delivered using the IPDE system.

Figure 51:
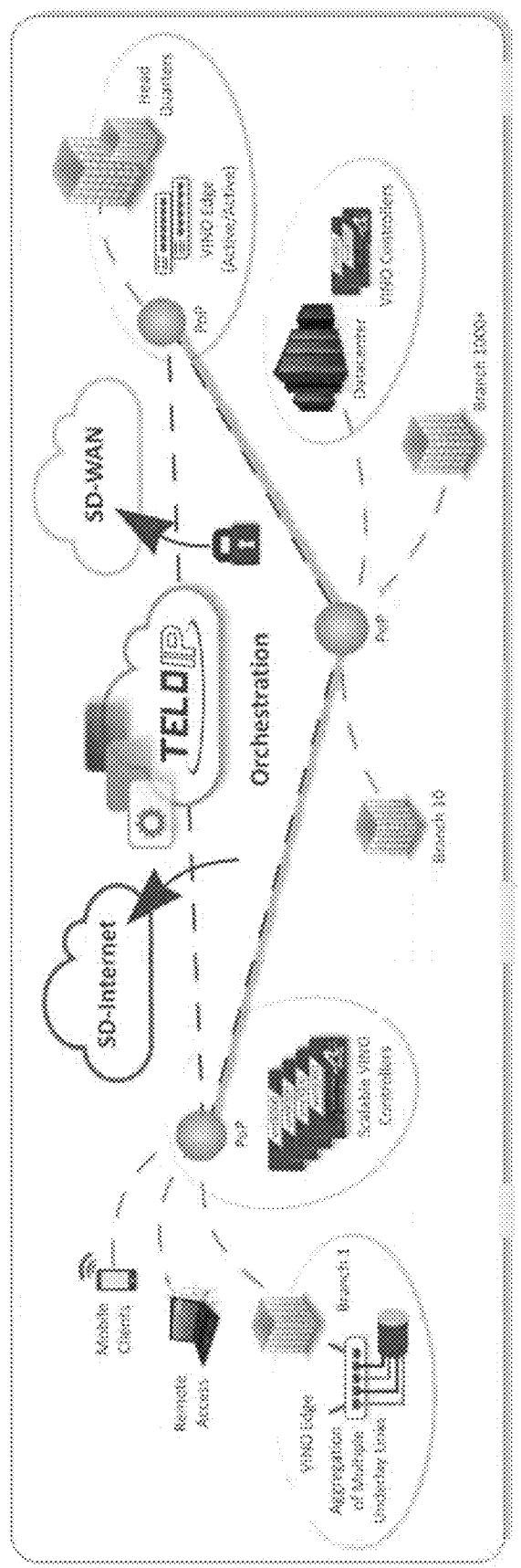
FIG. 51 illustrates an example WAN network diagram in accordance with one embodiment.

Referring now to FIG. 51, which illustrates an example network diagram for an embodiment WAN network. Edge data plane sessions are joined with the control plane at the controller which forms a Point-to-Multi-Point interconnected control plane between PoPs and other controllers. Control plane underlay traffic is encrypted with IPSec AES 256 bit transport mode between controllers. A P2MP VxLAN over unicast technology forms the control plane network between PoPs/controllers with IGP/OSPF dynamically managing the WAN routing environment.

Figure 52:
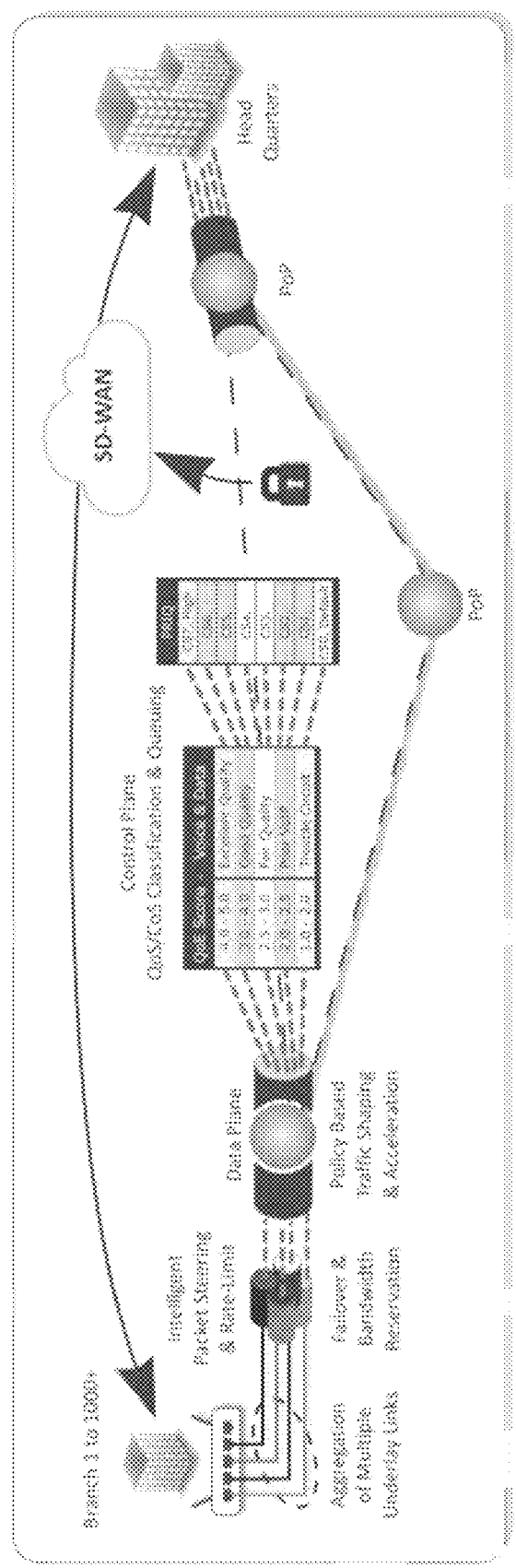
FIG. 52 illustrates an example WAN QoS network diagram in accordance with one embodiment.

Referring now to FIG. 52, which illustrates an example QoS diagram for an embodiment WAN network. On the edge, ANA, IPDE, and MDPS may deliver Bi-Directional CoS/QoS, which may achieve avoidance of Poor-Quality-Bandwidth-Region on the underlays and bandwidth reservation and queue bypass for urgent traffic delivery. In the Core, P2MP VxLAN over unicast connections may use priority queuing CoS/QoS to deliver control plane traffic engineering (e.g. CS0-CS7 PRIQ).

Figure 53:
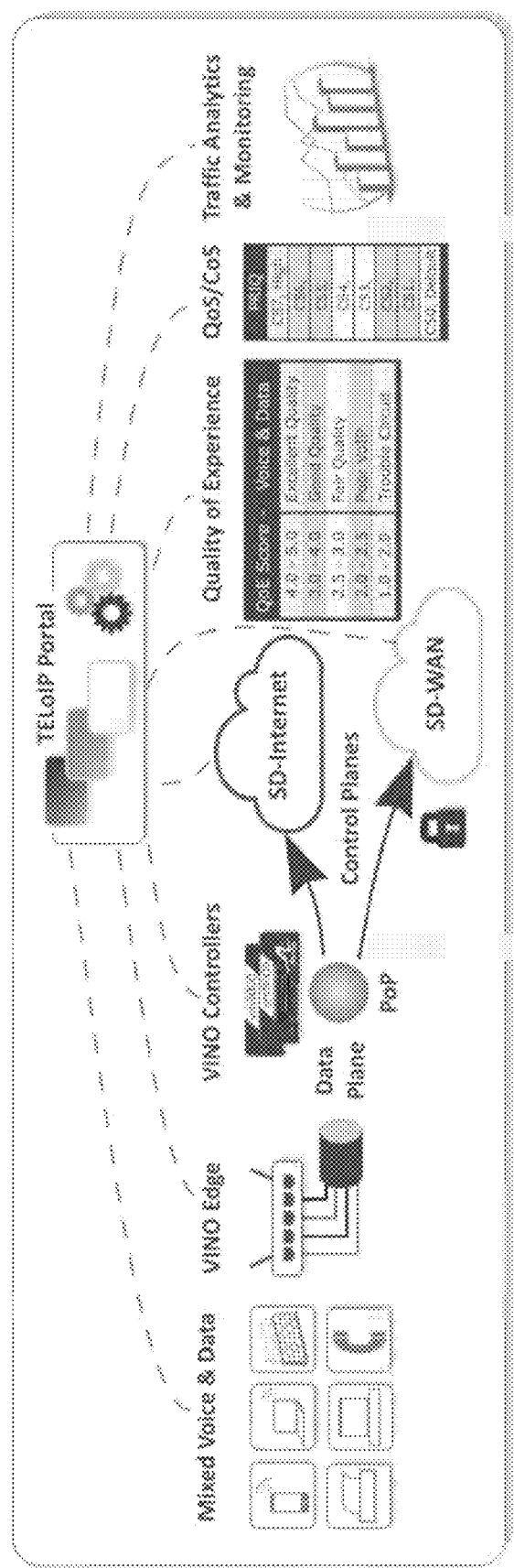
FIG. 53 illustrates an example orchestration diagram for a centralized portal.

Referring now to FIG. 53, which illustrates an orchestration diagram in accordance with an example embodiment. Centralized Portal may handle all CoS/QoS/QoE policy and admission control/configuration.

Figure 54:
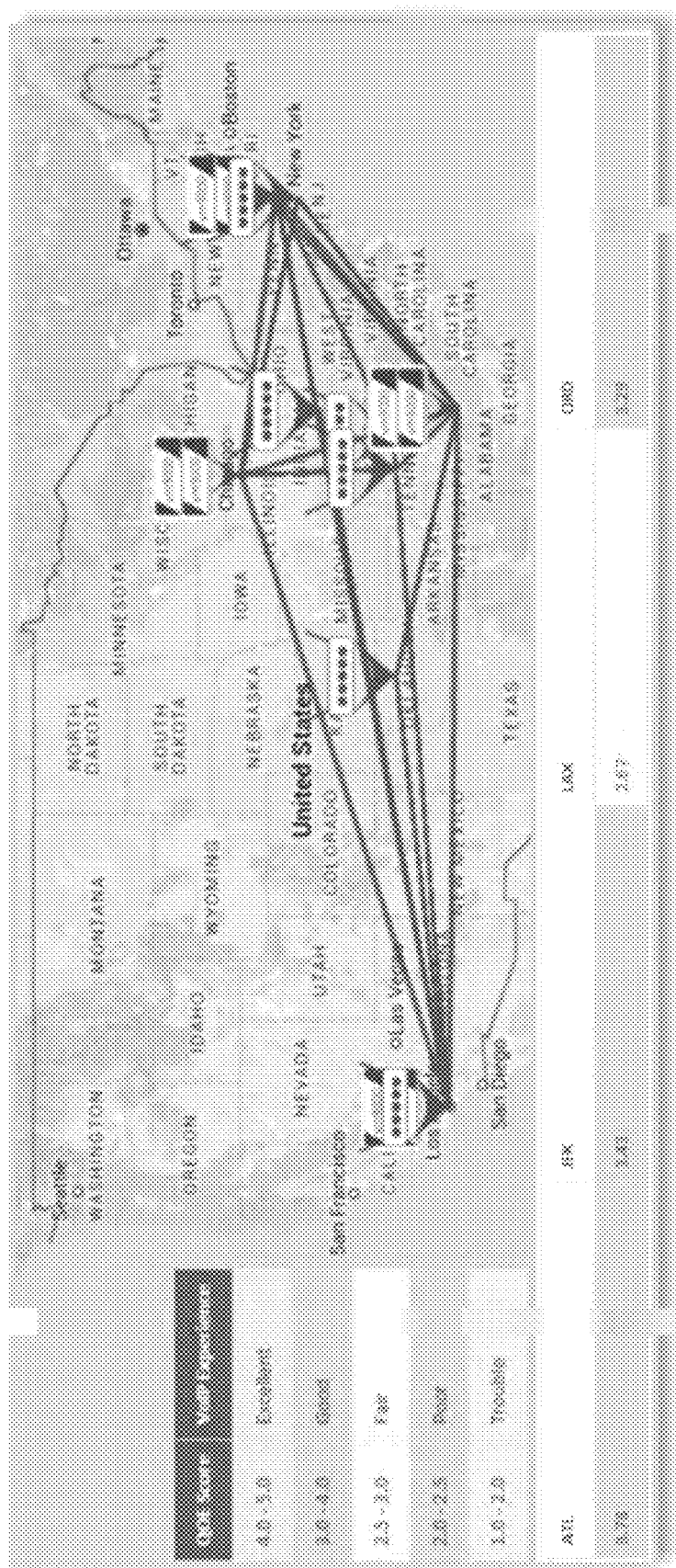
FIG. 54 illustrates an example view for network QoE in accordance with one embodiment.

FIG. 54 shows a network-wide QoE values as collected and mapped to depict customer network quality at a glance.

Figure 55:
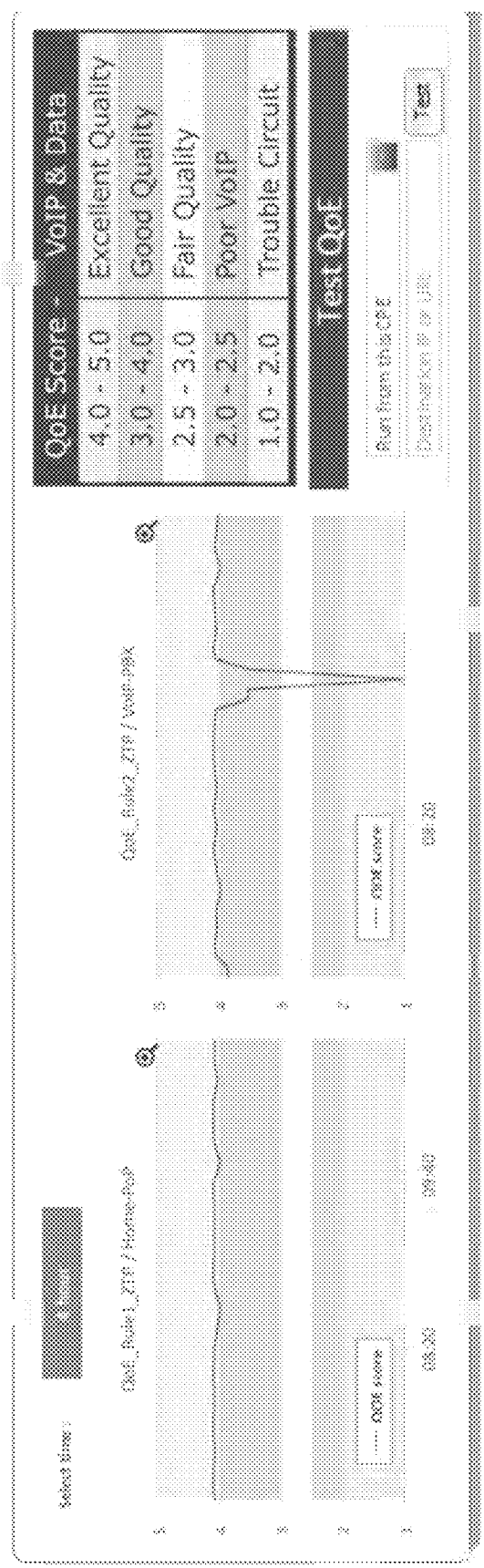
FIG. 55 illustrates example graphics and chart for a network as shown by a portal in accordance with one embodiment.

The graph on the left-hand side of FIG. 55 shows that overlay edge service with multiple underlay connections is in good health to PoP. The graph in the middle of FIG. 55 shows that one can visivally identify the problem in a short period of time (e.g. within seconds) and focus on the voice path. The chart on the right-hand side of FIG. 55 shows that one can troubleshoot and perform QoE path checks to any IP address.

VINO WAN Security—Underlay Encryption & Overlapping Subnets

Figure 56:
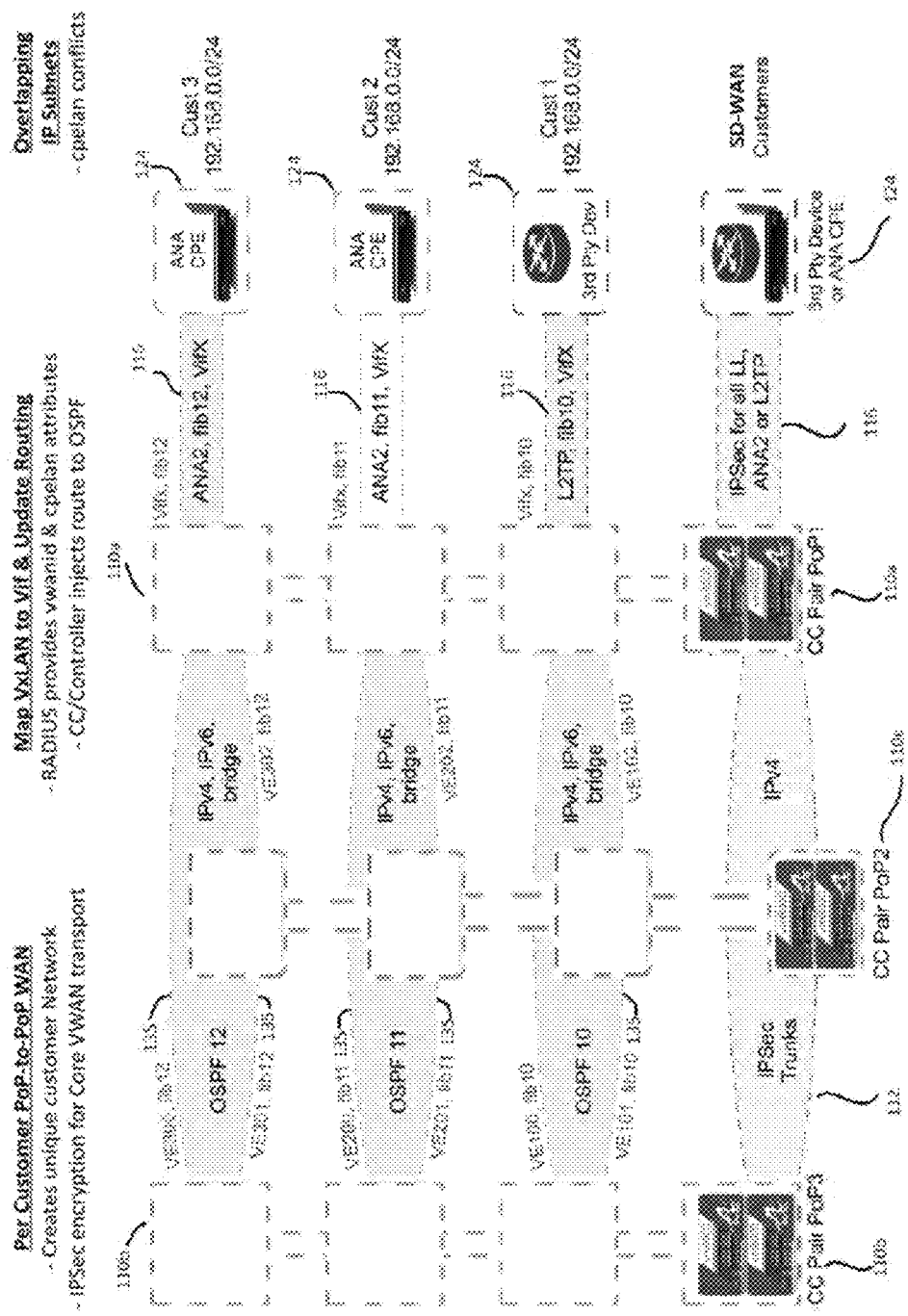
FIG. 56 illustrates an example network framework in accordance with one embodiment.

Referring now to FIG. 56, which shows an example of a Virtual Intelligent Network Overlay (VINO) WAN network framework in accordance with one embodiment. An encryption process from the customer LAN subnets may be deployed to gain efficiency and provide flexible multi-tenant data security by abstracting the customer LAN subnets (CPELAN) from the encryption process. This allows a network manager or user to address overlapping customer IP domain issues outside of the encryption process by offloading this task to the Overlay/ANA process. As can be seen, Underlay Transport Protocol Encryption may be implemented for both the edge and core, and the Overlay encapsulated packets may be carried between the CPE and Controller, and from controller to controller between PoPs.

At customer premises, a CPE 124 or a third party device may be used to connect to concentrator element 110*a* through aggregated/bonded connections 116.

The CPE 124 or a third party device may be situated at overlapping IP subnets and possibly dealing with cpelan conflicts. The concentrator elements 110*a* may map Virtual Edge to CPE Vif and update routing accordingly, via for example RADIUS protocol, which provides overlay identifier (e.g. vwanid) and other attributes (e.g. cpelan attributes). Concentrator elements 110*a* may also inject route to OSPF. Concentrator elements 110*a* may also inject the route(s) into the Virtual Core's dynamic routing mechanism such as OSPF, RIP, or BGP.

In some embodiments, as shown, various VC connections 135 can be established between various concentrator elements 110*a*, 110*b*. These VC connections form a POP-to-POP Network Overlay, where each POP may include one or more concentrator elements 110. Transparent Encryption may be provided for the Virtual Network Overlay core transport. The Virtual Core connection 135 addresses the Virtual Control Plane aspect of the SDN to SCN Mapping as per the tables of system and network components herein. The transparent encryption of the virtual core tunneling protocol connections address the Core/Branch Infrastructure component of the SDN to SCN mapping for the Lower Plane infrastructure architecture as per the tables of system and network components herein.

Carrier Grade IPSec Transport Mode

In some embodiment, IPSec Transport mode is used by carriers to securely bridge core network segments with Ethernet over IP, while transparently providing payload encryption to protect customer traffic entering the network. SD-WAN and VPN may use tunnel modes with traffic policy based on customer subnets prone to overlapping subnet issues in a multi-tenant implementation.

Benefits of using IPSec Transport Mode at the Underlay may include:
  No IPSec tunneling involved to setup the SD-WAN
  Carrier Grade IPSec Transport Mode on every packet in the underlay protects the Overlay
  Underlay edge and core control plane packets are AES 256 bit encrypted and authenticated
  Protects the customer SD-WAN from packet spoofing attacks on the edge and in the core SD-WAN Overlay Network Control for Overlapping Subnets Aggregated bonding (e.g. ANA) may be used for creating the data plane connection between the CPE and the controller. ANA may use encapsulation to create aggregated/bonded overlay connections with intelligent capabilities to manage data plane traffic moving across multiple and diverse underlay connections. The created overlay connections may encapsulate and obfuscate the customer packet header, and abstract customer WAN subnet management from the encryption process.

Virtual Control Plane VRF w/IGP Control

The controllers may join each edge data plane connection to its corresponding SD-WAN control plane in a customer protected Route Domain/VRF/FIB.

VINO Data Plane Security/Encryption Diagram

Figure 57:
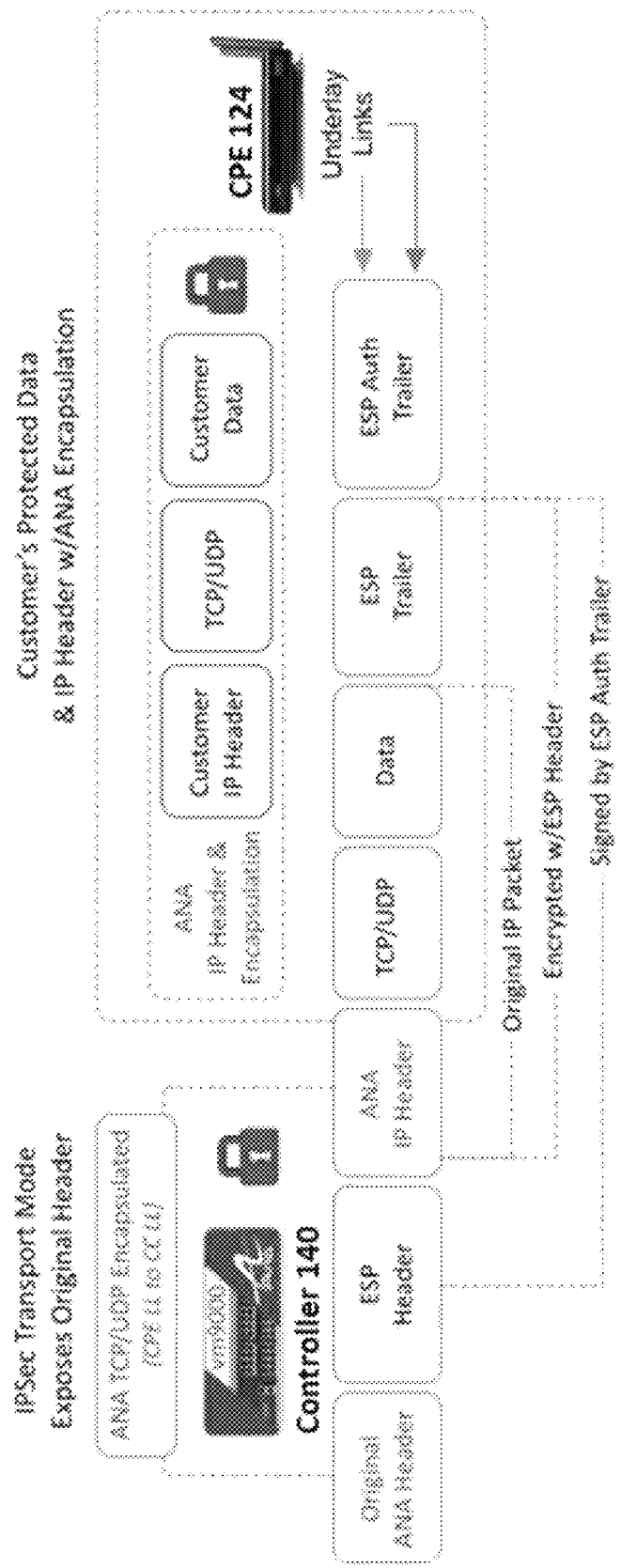
FIG. 57 illustrates an example schematic diagram for data plane security/encryption in accordance with one embodiment.

Referring now to FIG. 57, a schematic diagram for data plane security/encryption is shown. As can be seen, customer's data and IP header are protected with ANA encapsulation between a CPE 124 and a controller 140, then at controller 140, IPSec Transport Mode may expose original headers for further processing. However, since an overlay is created for the Data Plane, the customer's original IP header is further encapsulated, protecting it from the IPSec Transport Mode header exposition.

VINO Control Plane Security/Encryption Diagram

Figure 58:
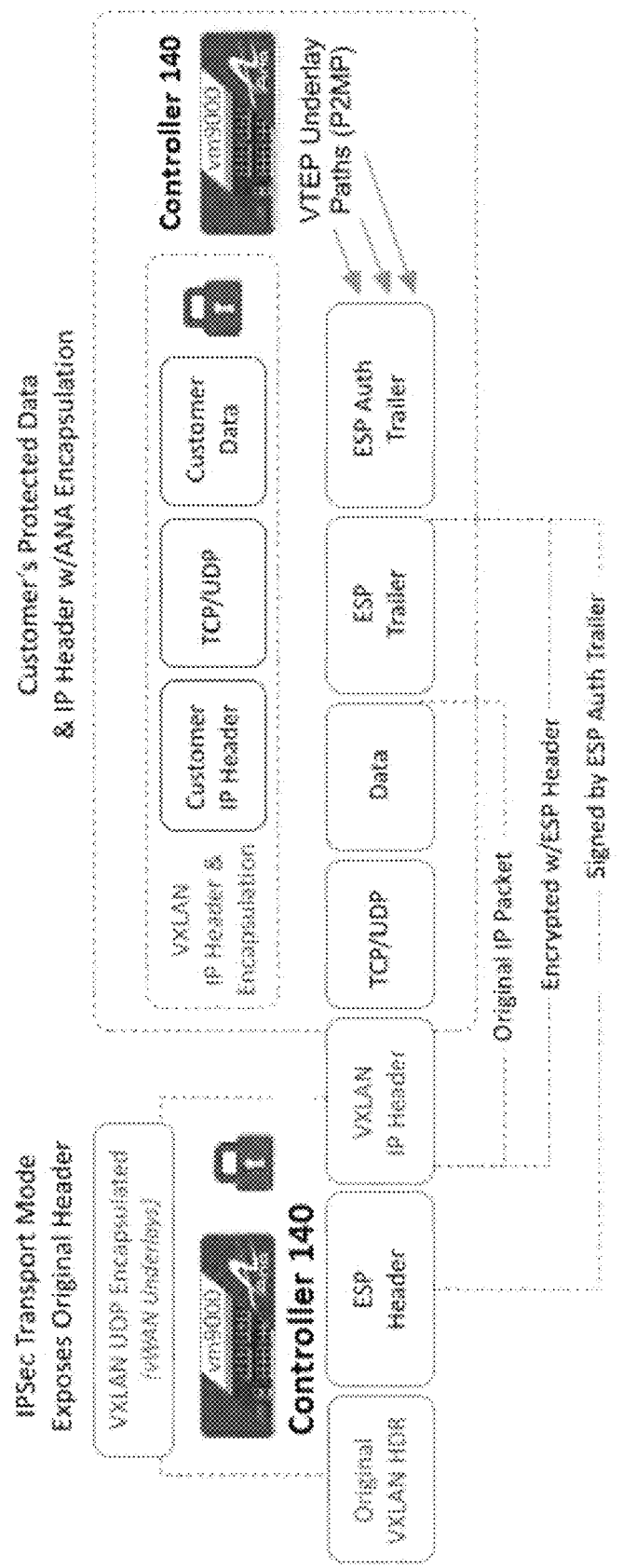
FIG. 58 illustrates an example schematic diagram for control plane security/encryption in accordance with one embodiment.

Referring now to FIG. 58, a schematic diagram for control plane security/encryption is shown. As can be seen, customer's data and IP header are protected with ANA encapsulation between two controllers 140. At the second controller, IPSec Transport Mode may expose original headers for further processing. However, since an overlay for the Control Plane is created, the customer's original IP header is further encapsulated, protecting it from the IPSec Transport Mode header exposition.

Advantages and Use Case

One or more embodiments disclosed herein may significantly improve network performance between disparate locations by leveraging network bonding/aggregation technology, but by implementing a system, method and network configuration that provides intervening network components disposed adjacent to access points so as to manage traffic between two or more sites such that bonded/aggregated connections are terminated and traffic is directed to a network backbone, and optionally passed to one or more further bonded/aggregated connections associated with a remote additional site.

The network solutions disclosed herein may be flexible, responsive, scalable and easy to implement. In an embodiment, new sites, optionally having their own CPE/concentrator can be easily added, and the network solution supports various types of multi-point network communications, and various network performance improvement strategies including various QoS techniques.

The network solutions disclosed herein may be easily updated with new programming or logic that is automatically distributed on a peer to peer basis based on the interoperation of network components that is inherent to their design, as previously described.

In an embodiment, network performance may be significantly improved over prior art solutions as illustrated in the examples provided above.

The scope of the claims should not be limited by the example embodiments set forth in the examples disclosed herein but should be given the broadest interpretation consistent with the description as a whole.

The invention claimed is:

1. A network system for improving network communication performance between at least a first client site and a second client site, wherein the first client site and the second client site are at a distance from one another that requires long haul network communication, the system comprising:
  at least one client site network component implemented at least at the first client site, the client site network component bonding or aggregating one or more diverse network connections to configure a bonded/aggregated connection that has increased throughput;
  at least one network server component configured to connect to the client site network component using the bonded/aggregated connection, the network server component including at least one concentrator element implemented at a network access point of at least one network, the network server component automatically terminating the bonded/aggregated connection and passing data traffic to the at least one network through the network access point of the at least one network;
  a virtual control plane interface at the at least one network server component, the virtual control plane interface configured to establish a unicast path between the at least one network server component and each of a plurality of remote network server components connected to or within the at least one network, wherein a virtual network overlay is established between the at least one network server component and each of the plurality of remote network server components and each unicast path is used for data transmission over the corresponding virtual network overlay; and a cloud network controller configured to:
  manage the data traffic to provide a managed network overlay that incorporates at least one long haul network path carried over the at least one network, the at least one long haul network path including the virtual network overlay; and
  control the virtual control plane interface to provide a priority queue for the data traffic exchanged with a plurality of client site network components including the at least one client site network component.

2. The system of claim 1, wherein the cloud network controller is further configured to control the virtual control plane interface to provide a classification of service or quality of service indicator for the data traffic from or to the plurality of client site network components including the at least one client site network component.

3. The system of claim 1, wherein the virtual control plane interface is configured to receive converged data traffic from the plurality of client site network components and the cloud network controller is further operable to configure the virtual control plane interface to provide at least one of: a priority queue, a classification of service indicator, and a quality of service indicator for the converged data traffic from the plurality of client site network components.

4. The system of claim 1 further comprising a virtual edge connection providing at least one of transparent lower-link encryption and lower-link encapsulation using a common access protocol for the bonded/aggregated connection between the client site network component and the network server component, the virtual edge connection being part of the virtual network overlay.

5. The system of claim 1 wherein the network server component comprises:
  a first concentrator element implemented at the network access point of the at least one network;
  a second concentrator element implemented at another network access point of at least one other network;
  wherein the first concentrator element and the second concentrator element are configured to interoperate to provide a virtual core connection between the network access point and the other network access point, the virtual core connection providing another bonded/aggregated connection as part of the virtual network overlay; and
  wherein the cloud network controller is configured to manage the data traffic to provide the managed network overlay that incorporates the virtual core connection and the at least one long haul network path carried over the at least one network and the at least one other network.

6. The system of claim 5 wherein the virtual core connection provides at least one of the transparent lower-link encryption and the lower-link encapsulation using the common access protocol for the other bonded/aggregated connection.

7. The system of claim 1 wherein the network server component comprises at least one other concentrator element, the at least one other concentrator element bonding or aggregating one or more other diverse network connections to configure another bonded/aggregated connection that has increased throughput, the other bonded/aggregated connection connecting the at least one concentrator element and the at least one other concentrator element.

8. The system of claim 7 wherein the cloud network controller is configured to manage the data traffic to provide the managed network overlay that incorporates the bonded/aggregated connection and the other bonded/aggregated connection.

9. The system of claim 1 wherein the client site network component is configured to separate lower-link data traffic and encapsulate data packets of the lower-link data traffic using the common access protocol for the bonded/aggregated connection.

10. The system of claim 1 wherein the client site network component is configured with a route to the at least one network server component to separate the lower-link traffic to prepare the data traffic for the bonded/aggregated connection or the managed network overlay.

11. The system of claim 8 wherein the route is a static route, a dynamic route or a route from a separate or independent virtual routing forwarding table.

12. The system of claim 1 wherein the network server component is configured to connect with an intelligent packet distribution engine that manages data packets transmission over the at least one long haul network path by obtaining data traffic parameters and, based on the data traffic parameters and performance criteria, selectively applies one or more techniques to alter the traffic over the at least one long haul network path to conform to the data traffic parameters.

13. The system of claim 1 wherein the network server component is configured to provide Multi-Directional Pathway Selection (MDPS) for pre-emptive failover using echo packets received from the client site network component.

14. The system of claim 1 wherein network server component is configured to provide an intelligent packet distribution engine (IPDE) for packet distribution with differing speed links using weighted packet distribution and for bi-directional (inbound and outbound) Quality of Service (QoS).

15. The system of claim 1 wherein the first client site and the second client site are at a distance from one another such that data traffic transmission between the first client site and the second client site is subject to long haul effects.

16. The system of claim 1 wherein each of the least one network server component is accessible to a plurality of client site network components, each client site network component being associated with a client site location.

17. The system of claim 1 further comprising a network aggregation device that: (A) configures a plurality of dissimilar network connections or network connections provided by a plurality of diverse network carriers ("diverse network connections") as one or more aggregated groups, at least one aggregated group creating the bonded/aggregated connection that is a logical connection of the plurality of diverse connections; and (B) routes and handles bi-directional transmissions over the aggregated network connection; wherein two or more of the diverse network connections have dissimilar network characteristics including variable path bidirectional transfer rates and latencies; wherein the logical connection is utilizable for a transfer of communication traffic bidirectionally on any of the diverse network connections without any configuration for the dissimilar network connections or by the diverse network carriers; and wherein the network aggregation engine includes or is linked to a network aggregation policy database that includes one or more network aggregation policies for configuring the aggregated groups within accepted tolerances to configure and maintain the aggregated network connection, wherein the logical connection has a total communication traffic throughput that is a sum of available communication traffic throughputs of the aggregated group of diverse network connections.

18. A client site network component implemented at least at least a first client site in network communication with a second client site, wherein the first client site and the second client site are at a distance from one another that would usually require long haul network communication, the client site network component bonding or aggregating one or more diverse network connections to configure a bonded/aggregated connection that has increased throughput, the client site network component configured to connect to at least one network server component implemented at an access point of at least one wide area network, the network server component automatically terminating the bonded/aggregated connection and passing the data traffic to the at least one wide area network through the access point of the at least one wide area network, the client site network component configuring a virtual edge providing at least one of transparent lower-link encryption and lower-link encapsulation using a common access protocol for the bonded/aggregated connection, wherein the at least one network server component includes a virtual control plane interface, the virtual control plane interface configured to establish a unicast path between the at least one network server component and each of a plurality of remote network server components connected to or within the at least one wide area network, wherein a virtual network overlay is established between the at least one network server component and each of the plurality of remote network server components and each unicast path is used for data transmission over the corresponding virtual network overlay, the virtual network overlay including the virtual edge, wherein the virtual control plane interface is configured to provide a priority queue for the data traffic from or to a plurality of client site network components including the at least one client site network component.

19. The client site network component of claim 18, wherein the virtual control plane interface is further configured to provide a classification of service or quality of service indicator for the data traffic from or to the plurality of client site network components including the at least one client site network component.

20. The client site network component of claim 18, wherein the virtual control plane interface is configured to:
receive converged data traffic from the plurality of client site network components; and
provide at least one of: a priority queue, a classification of service indicator, and a quality of service indicator for the converged data traffic from the plurality of client site network components.

21. The client site network component of claim 18 configured to separate lower-link data traffic and use the common access lower-link protocol for encapsulation of data packets of the lower-link data traffic for the bonded/aggregated connection.

22. The client site network component of claim 21 configured a route to the at least one network server component to separate the lower-link traffic to prepare the data traffic for the bonded/aggregated connection or the managed network overlay.

23. The client site network component of claim 21 wherein the route is a static route, a dynamic route or a route from a separate or independent virtual routing forwarding table.

24. The client site network component of claim 21 configured to transmit echo packets to the network server component to provide Multi-Directional Pathway Selection for pre-emptive failover using the echo packets.

25. The client site network component of claim 21 further configured to provide IPDE for packet distribution with differing speed links using weighted packet distribution and for bi-directional (inbound and outbound) QoS.

26. A network server component configured to interoperate with a client site network component at a first client site to bond or aggregate one or more diverse network connections to configure a bonded/aggregated connection that has increased throughput, the network server component including at least one concentrator element implemented at a network access point of at least one network, the network server component automatically terminating the bonded/aggregated connection and passing data traffic to the at least one network through the network access point of the at least one network for data transmission to a second client site, the first client site and the second client site at a distance from one another that is such that would usually require long haul network communication, the network server component in communication with a cloud network controller configured to manage the data traffic to provide a managed network overlay that incorporates at least one long haul network path carried over the at least one network, wherein the network server component includes a virtual control plane interface, the virtual control plane interface configured to establish a unicast path between the network server component and each of a plurality of remote network server components connected to or within the at least one network, wherein a virtual network overlay is established between the network server component and each of the plurality of remote network server components and each unicast path is used for data transmission over the corresponding virtual network overlay, and the at least one long haul network path including the virtual network overlay, wherein the cloud network controller is configured to control the virtual control plane interface to provide a priority queue for the data traffic from or to a plurality of client site network components including the client site network component.

27. The network server component of claim 26, wherein the cloud network controller is further operable to configure the virtual control plane interface to provide a classification of service or quality of service indicator for the data traffic from or to the plurality of client site network components including the client site network component.

28. The network server component of claim 26, wherein the virtual control plane interface is configured to receive converged data traffic from the plurality of client site network components, and the cloud network controller is further operable to configure the virtual control plane interface to provide at least one of: a priority queue, a classification of service indicator, and a quality of service indicator for the converged data traffic from the plurality of client site network components.

29. The network server component of claim 26, further configuring a virtual edge connection providing at least one of transparent lower-link encryption and lower-link encapsulation using a common access protocol for the bonded/aggregated connection, the virtual network overlay including the virtual edge connection.

30. The network server component of claim 29 further comprising:
- a first concentrator element implemented at the network access point of the at least one network;
- a second concentrator element implemented at another network access point of at least one other network;
- wherein the first concentrator element and the second concentrator element are configured to interoperate to provide a virtual core connection between the network access point and the other network access point, the virtual core connection providing another bonded/aggregated connection; and
- wherein the cloud network controller is configured to manage the data traffic to provide the managed network overlay that incorporates the virtual edge connection, the virtual core connection and the at least one long haul network path carried over the at least one network and the at least one other network.

31. The network server component of claim 29 configured to use the common access lower-link protocol for encapsulation of data packets of the lower-link data traffic for the bonded/aggregated connection.

32. The network server component of claim 29 configured to receive echo packets from the client site network component to provide Multi-Directional Pathway Selection (MDPS) for pre-emptive failover using the echo packets.

33. The network server component of claim 26 further configured to provide IPDE for packet distribution with differing speed links using weighted packet distribution and for bi-directional (inbound and outbound) QoS.

* * * * *